United States Patent
Yamada et al.

(10) Patent No.: US 12,504,826 B2
(45) Date of Patent: Dec. 23, 2025

(54) SENSORY CONTROL METHOD, SENSORY CONTROL SYSTEM, METHOD FOR GENERATING CONVERSION MODEL, CONVERSION MODEL GENERATION SYSTEM, METHOD FOR CONVERTING RELATIONAL EXPRESSION, AND PROGRAM

(71) Applicant: Alps Alpine Co., Ltd., Tokyo (JP)

(72) Inventors: Yukimitsu Yamada, Miyagi-ken (JP); Takeshi Shirasaka, Miyagi-ken (JP); Munemitsu Abe, Miyagi-ken (JP); Hisato Shimomura, Miyagi-ken (JP); Takashi Uenomachi, Miyagi-ken (JP); Akihisa Itoh, Miyagi-ken (JP); Toshio Kawano, Miyagi-ken (JP); Naoki Ito, Miyagi-ken (JP); Kenichiro Sameshima, Miyagi-ken (JP); Hideo Kawase, Miyagi-ken (JP); Shota Takeuchi, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 113 days.

(21) Appl. No.: 18/479,880

(22) Filed: Oct. 3, 2023

(65) Prior Publication Data
US 2024/0036652 A1 Feb. 1, 2024

Related U.S. Application Data

(63) Continuation of application No. PCT/JP2022/020863, filed on May 19, 2022.

(30) Foreign Application Priority Data

May 19, 2021 (JP) .................................. 2021-084696
May 12, 2022 (JP) .................................. 2022-079095

(Continued)

(51) Int. Cl.
*H04B 3/36* (2006.01)
*G06F 3/01* (2006.01)

(52) U.S. Cl.
CPC ................................... *G06F 3/016* (2013.01)

(58) Field of Classification Search
CPC ..... G06F 3/016; G06F 2203/014; G06F 3/011
See application file for complete search history.

(56) References Cited

U.S. PATENT DOCUMENTS 8,639,585 B2    1/2014  Paul et al.
8,866,788 B1 *  10/2014 Birnbaum ............... G06F 3/016
                                                           345/173

(Continued)

FOREIGN PATENT DOCUMENTS

JP    2011-188921 A    9/2011
JP    2012-137888 A    7/2012

(Continued)

*Primary Examiner* — Toan N Pham
(74) *Attorney, Agent, or Firm* — Harness, Dickey & Pierce, P.L.C.

(57) ABSTRACT

A sensory control method includes a step of receiving, a step of converting, and a step of outputting. In the step of receiving, a sensitivity parameter is received. In the step of converting, the received sensitivity parameter is converted into, among a plurality of physical parameters included in physical properties relating to a sensory presentation, a physical parameter correlated with the sensitivity parameter. In the step of outputting, a sensory presentation signal based on the physical parameter obtained as a result of the conversion is output.

34 Claims, 67 Drawing Sheets

(30) Foreign Application Priority Data

May 12, 2022 (JP) ................................. 2022-079099
May 13, 2022 (JP) ................................. 2022-079128

(56) References Cited

U.S. PATENT DOCUMENTS

| | | | |
|---|---|---|---|
| 10,360,775 B1 | 7/2019 | Saboune et al. | |
| 10,416,767 B2* | 9/2019 | Nakamura | A63F 13/285 |
| 10,427,037 B2 | 10/2019 | Strahle et al. | |
| 10,437,341 B2* | 10/2019 | Birnbaum | H04N 21/43072 |
| 2011/0244963 A1* | 10/2011 | Grant | A63F 13/285 |
| | | | 463/37 |
| 2013/0002587 A1 | 1/2013 | Biggs et al. | |
| 2015/0199024 A1 | 7/2015 | Birnbaum et al. | |

FOREIGN PATENT DOCUMENTS

| | | |
|---|---|---|
| JP | 2013-519961 A | 5/2013 |
| JP | 5662425 B2 | 1/2015 |
| JP | 2015-135678 A | 7/2015 |
| JP | 2019-220168 A | 12/2019 |
| JP | 2020-523068 A | 8/2020 |
| WO | 2013-186847 A1 | 12/2013 |

* cited by examiner

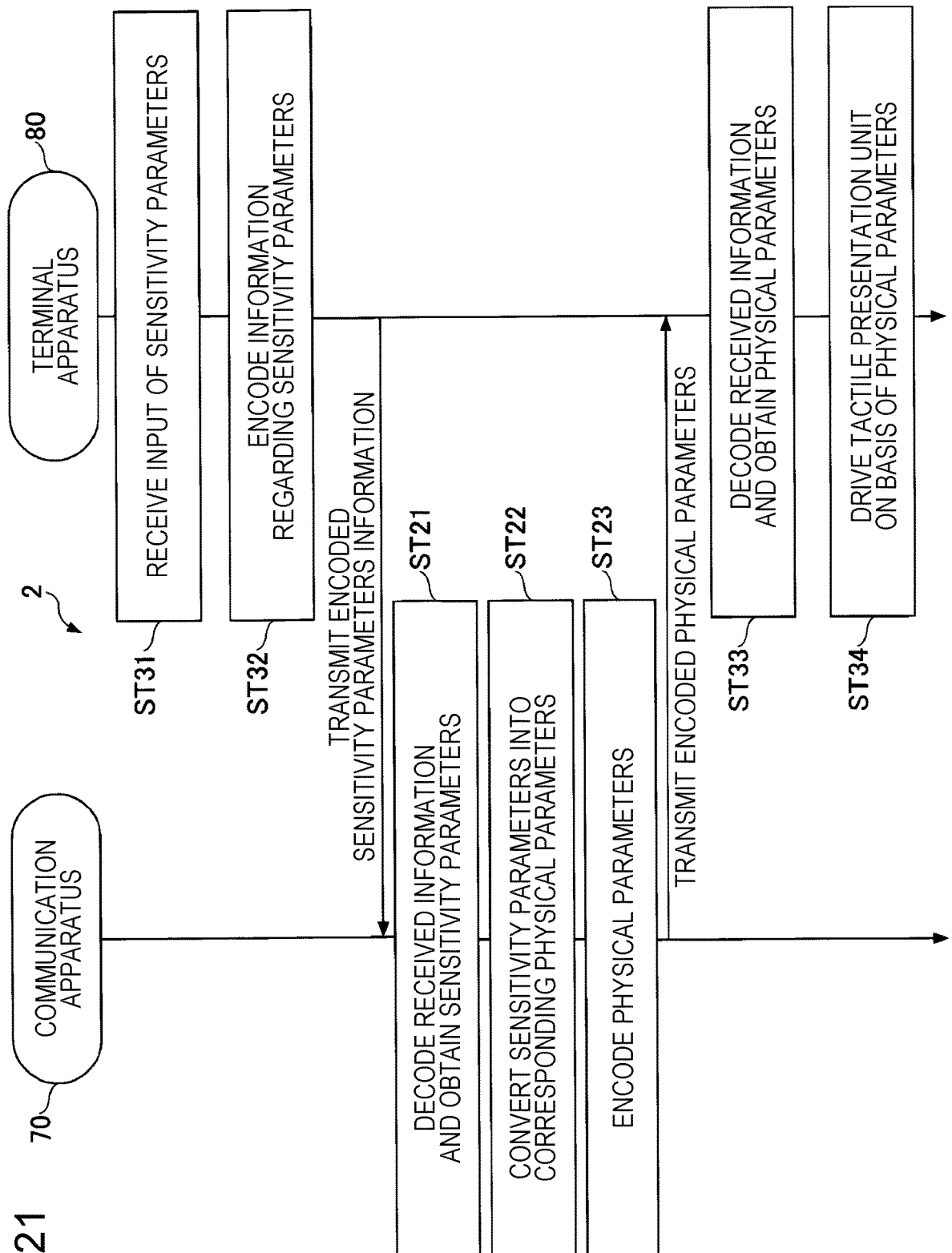

FIG. 22

$$\begin{pmatrix} A_1 \\ A_2 \\ \vdots \\ A_n \end{pmatrix} = \begin{pmatrix} B_{11} & B_{12} & \cdots & B_{1n} \\ B_{21} & B_{22} & \cdots & B_{2n} \\ \vdots & \vdots & & \vdots \\ B_{n1} & B_{n2} & \cdots & B_{nn} \end{pmatrix} \begin{pmatrix} P_1 \\ P_2 \\ \vdots \\ P_n \end{pmatrix}$$

FIG. 23

$$\begin{pmatrix} P_1 \\ P_2 \\ \vdots \\ P_n \end{pmatrix} = \begin{pmatrix} B_{11} & B_{12} & \cdots & B_{1n} \\ B_{21} & B_{22} & \cdots & B_{2n} \\ \vdots & \vdots & & \vdots \\ B_{n1} & B_{n2} & \cdots & B_{nn} \end{pmatrix}^{-1} \begin{pmatrix} A_1 \\ A_2 \\ \vdots \\ A_n \end{pmatrix}$$

FIG. 33
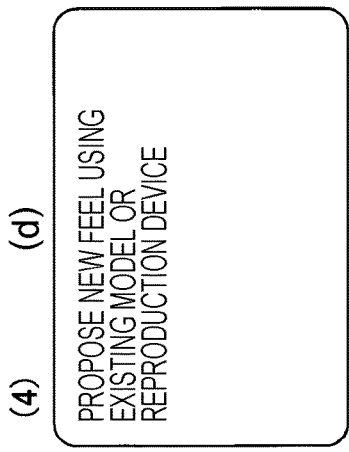
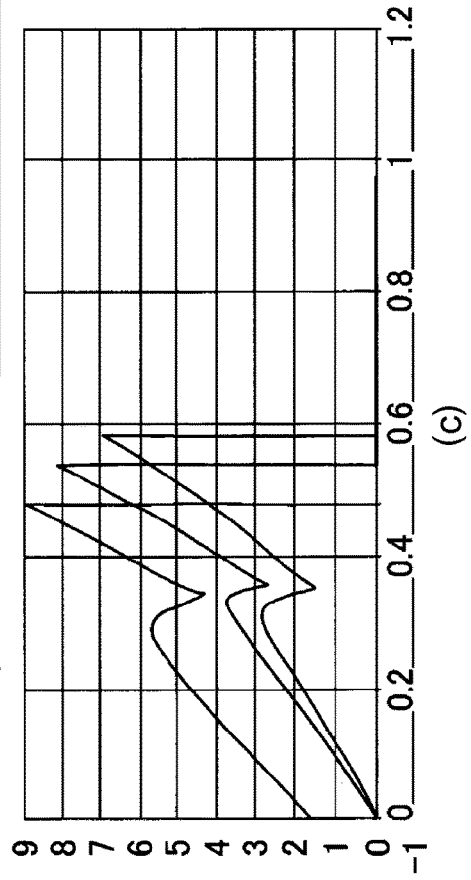
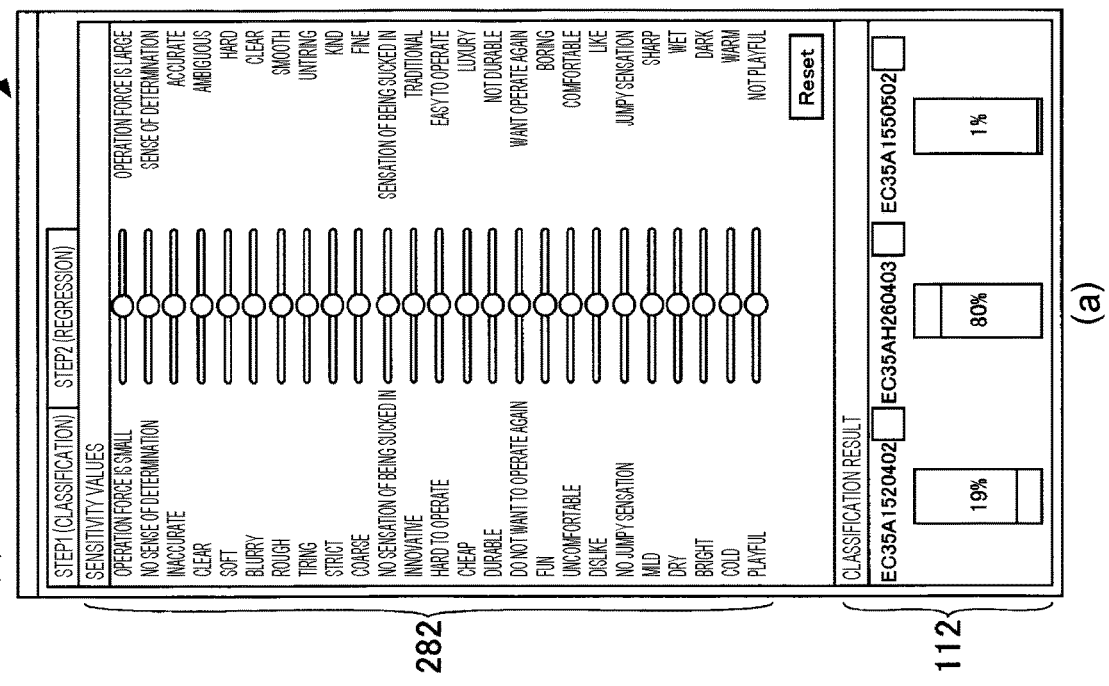

FIG. 46

| OPERATION UNIT ID | WEIGHT (g) | SIZE (RADIUS mm) | OTHER PHYSICAL PARAMETERS |
|---|---|---|---|
| 001 | 15 | 25 | **** |
| 002 | 16 | 27 | **** |
| 003 | 17 | 30 | **** |
| ... | ... | ... | ... |

FIG. 53

FIG. 63A
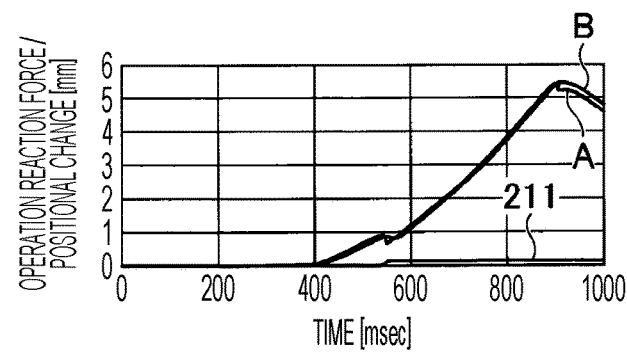
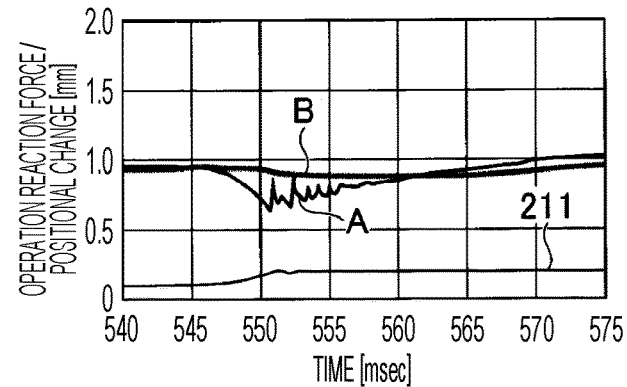
FIG. 63B
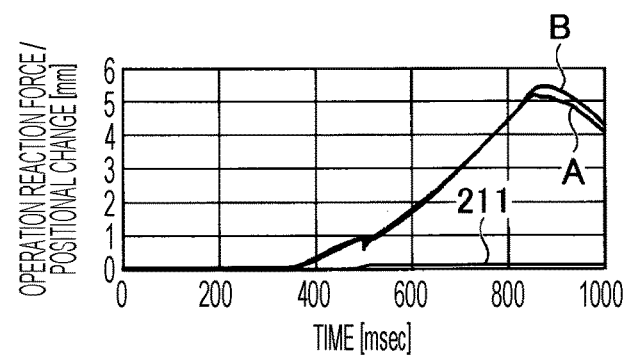
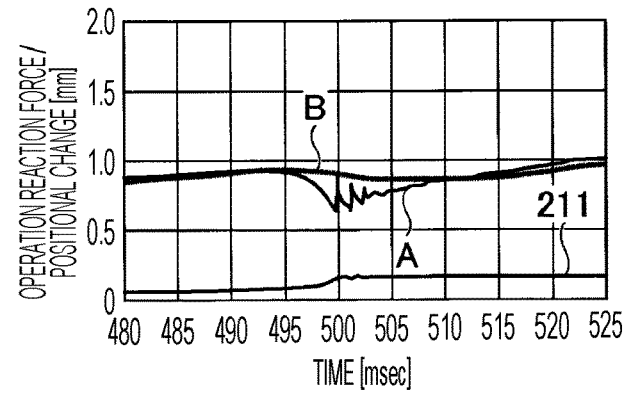

FIG. 68

| | BUCKLING PERIOD | | | FINGERTIP FALL | | | FINGERTIP COLLISION | | | FINGERTIP VIBRATION | | |
|---|---|---|---|---|---|---|---|---|---|---|---|---|
| | TIME | POSITION | TORQUE | TIME | POSITION | TORQUE | TIME | POSITION | TORQUE | TIME | POSITION | TORQUE |
| SENSE OF RECOVERY_NO SENSE OF RECOVERY | -0.30 | -0.61 | 0.51 | -0.04 | -0.52 | 0.35 | -0.61 | -0.68 | -0.64 | -0.17 | -0.30 | 0.20 |
| CHEAP_NOT CHEAP | 0.18 | 0.51 | -0.41 | -0.06 | 0.45 | -0.27 | 0.53 | 0.55 | -0.57 | 0.11 | 0.22 | -0.15 |
| CLEAR_AMBIGUOUS | -0.15 | -0.54 | 0.38 | 0.06 | -0.47 | 0.24 | -0.46 | -0.54 | -0.52 | -0.26 | -0.31 | 0.15 |
| SMOOTH_ROUGH | -0.33 | -0.31 | 0.21 | -0.20 | -0.31 | 0.21 | -0.39 | -0.32 | 0.23 | -0.11 | 0.11 | -0.35 |
| TIRING_UNTIRING | 0.06 | -0.05 | 0.17 | 0.08 | 0.01 | 0.08 | -0.01 | -0.12 | 0.21 | 0.13 | -0.31 | 0.50 |
| COMFORTABLE_UNCOMFORTABLE | -0.26 | -0.49 | 0.31 | -0.04 | -0.47 | 0.23 | -0.53 | -0.50 | -0.42 | -0.23 | -0.04 | -0.24 |
| LIKE_DISLIKE | -0.23 | -0.51 | 0.30 | 0.01 | -0.49 | 0.21 | -0.54 | -0.51 | 0.43 | -0.22 | -0.01 | -0.20 |
| PLAYFUL_NOT PLAYFUL | 0.09 | 0.38 | -0.26 | -0.05 | 0.29 | -0.14 | 0.32 | 0.47 | -0.39 | 0.23 | 0.25 | -0.21 |
| SHARP_MILD | -0.25 | -0.33 | 0.27 | -0.13 | -0.27 | 0.22 | -0.34 | -0.37 | 0.28 | -0.19 | -0.17 | 0.07 |
| WARM_COLD | -0.16 | -0.22 | 0.11 | -0.09 | -0.26 | 0.14 | -0.19 | -0.13 | 0.07 | -0.07 | 0.17 | -0.31 |
| SHALLOW_DEEP | 0.19 | 0.43 | -0.42 | -0.02 | 0.36 | -0.28 | 0.46 | 0.49 | -0.55 | 0.01 | 0.30 | -0.24 |
| KIND_UNKIND | -0.09 | 0.04 | -0.14 | -0.12 | -0.04 | -0.03 | 0.03 | 0.14 | -0.25 | -0.07 | 0.31 | -0.47 |
| SOFT_HARD | 0.04 | 0.33 | -0.32 | -0.09 | 0.23 | -0.18 | 0.27 | 0.40 | -0.43 | 0.13 | 0.38 | -0.43 |
| SENSATION OF BEING SUCKED IN_NO SENSATION OF BEING SUCKED IN | -0.32 | -0.59 | 0.48 | -0.13 | -0.56 | 0.38 | -0.51 | -0.57 | 0.54 | -0.22 | -0.15 | -0.03 |
| INPUT SENSATION_NO INPUT SENSATION | -0.17 | -0.46 | 0.34 | 0.05 | -0.40 | 0.21 | -0.49 | -0.51 | 0.47 | -0.13 | -0.23 | -0.14 |
| LIGHT_HEAVY | 0.08 | 0.38 | -0.39 | -0.06 | 0.30 | -0.24 | 0.31 | 0.43 | -0.49 | 0.06 | 0.35 | -0.38 |
| ACUTE_OBTUSE | -0.25 | -0.33 | 0.24 | -0.12 | -0.30 | 0.20 | -0.37 | -0.37 | 0.28 | -0.20 | 0.01 | -0.12 |
| CLICKING FEEL_NO CLICKING FEEL | -0.18 | -0.54 | 0.40 | 0.03 | -0.47 | 0.27 | -0.48 | -0.54 | 0.52 | -0.21 | 0.30 | 0.17 |
| CRISP_NOT CRISP | -0.10 | -0.36 | 0.17 | 0.06 | -0.35 | 0.10 | -0.36 | -0.34 | 0.27 | -0.21 | 0.01 | -0.15 |
| CLICKY_NOT CLICKY | -0.04 | -0.38 | 0.20 | 0.14 | -0.30 | 0.07 | -0.34 | -0.44 | 0.35 | -0.29 | -0.26 | 0.19 |
| MUSHY_NOT MUSHY | 0.08 | 0.36 | -0.23 | -0.05 | 0.31 | -0.14 | 0.30 | 0.38 | -0.34 | 0.21 | 0.14 | -0.09 |
| FLUID_NOT FLUID | 0.00 | 0.35 | -0.23 | -0.15 | 0.29 | -0.12 | 0.31 | 0.36 | -0.35 | 0.12 | 0.22 | -0.22 |
| LIMP_NOT LIMP | 0.09 | 0.39 | -0.26 | -0.12 | 0.30 | -0.13 | -0.43 | 0.49 | -0.41 | 0.16 | 0.31 | -0.25 |
| WOBBLY_NOT WOBBLY | -0.02 | 0.39 | -0.21 | -0.23 | 0.30 | -0.05 | 0.42 | 0.48 | -0.44 | 0.04 | 0.27 | -0.25 |

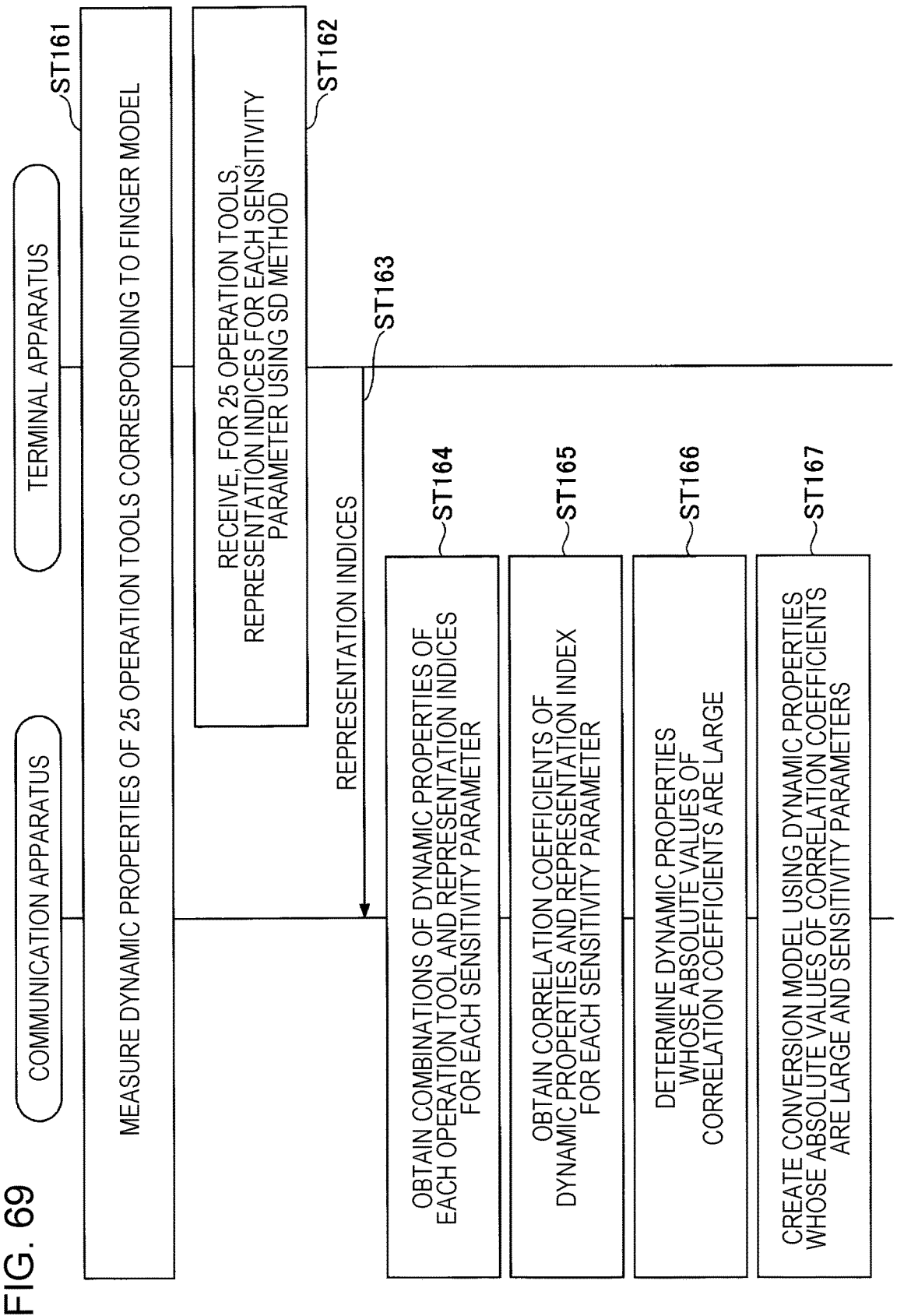

SENSORY CONTROL METHOD, SENSORY CONTROL SYSTEM, METHOD FOR GENERATING CONVERSION MODEL, CONVERSION MODEL GENERATION SYSTEM, METHOD FOR CONVERTING RELATIONAL EXPRESSION, AND PROGRAM

CLAIM OF PRIORITY

This application is a Continuation of International Application No. PCT/JP2022/020863 filed on May 19, 2022, which claims benefit of Japanese Patent Application No. 2021-084696 filed on May 19, 2021, No. 2022-079095 filed on May 12, 2022, No. 2022-079128 filed on May 13, 2022, and No. 2022-079099 filed on May 12, 2022. The entire contents of each application noted above are hereby incorporated by reference.

BACKGROUND OF THE INVENTION

1. Field of the Invention

The present disclosure relates to a sensory control method, a sensory control system, a method for generating a conversion model, a conversion model generation system, a method for converting a relational expression, and a program that control physical properties relating to a sensory presentation.

2. Description of the Related Art

Devices that perform sensory presentation by giving some stimuli to persons are known. Here, the sensory presentation includes tactile presentation, auditory presentation based on sounds, and visual presentation through display of images or the like. The tactile presentation includes, for example, operation reaction force acting upon a user's finger or another body part that operates a device (includes a case where a medium such as a stylus pen or a glove is used), vibration presentation through driving of an actuator or the like, hot/cold sensation presentation, electrical stimulation, or the like. The sensory presentation is adjusted by adjusting a signal for driving such a device. Japanese Unexamined Patent Application Publication No. 2019-220168, for example, discloses an example of a system that designs tactile sensations. In this system, when an audio capture device receives an audio signal, a tactile effect is determined on the basis of the audio signal and output from a tactile output device. More specifically, in the system described in Japanese Unexamined Patent Application Publication No. 2019-220168, when the audio capture device receives an audio signal relating to a word including a feature of a tactile effect desired by a user (e.g., description of a concept such as impact, explosion, or rain), a tactile effect having a feature simulating the concept can be determined and output.

SUMMARY OF THE INVENTION

The system described in Japanese Unexamined Patent Application Publication No. 2019-220168 can output a tactile effect having a feature simulating a concept desired by a user. There is still room for improvement, however, in performing tactile presentation that reflects human sensitivity.

The present disclosure solves the above problem in the example of the related art and aims to provide a sensory control method, a sensory control system, a method for generating a conversion model, a conversion model generation system, a method for converting a relational expression, and a program capable of performing sensory presentation that reflects human sensitivity.

A sensory control method according to an embodiment of the present disclosure includes a step of receiving, a step of converting, and a step of outputting. In the step of receiving, a sensitivity parameter is received. In the step of converting, the received sensitivity parameter is converted into, among a plurality of physical parameters included in physical properties relating to a sensory presentation, a physical parameter correlated with the sensitivity parameter. In the step of outputting, a sensory presentation signal based on the physical parameter obtained as a result of the conversion is output.

A method for generating a conversion model according to another embodiment of the present disclosure includes a step of storing, a step of extracting, and a step of generating. In the step of storing, for each of certain one or more sensory presentations, correspondence information between a physical property relating to the certain sensory presentation and a sensitivity parameter indicating a degree of a sensory representation in response to the sensory presentation is stored. In the step of extracting, on a basis of the correspondence information regarding each of the one or more sensory presentations, a physical parameter correlated with the sensitivity parameter is extracted from among the plurality of physical parameters included in the physical properties relating to the sensory presentation. In the step of generating, on a basis of the sensitivity parameter and the extracted physical parameter, a conversion model capable of converting a newly received sensitivity parameter into a physical parameter correlated with the sensitivity parameter is generated.

A method for converting a relational expression according to another embodiment of the present disclosure includes the step of converting a first relational expression that represents each of a plurality of sensitivity parameters using one of a plurality of physical parameters included in physical properties relating to the sensory presentation into a second relational expression that represents each of the plurality of physical parameters using the plurality of sensitivity parameters.

A program according to another embodiment of the present disclosure causes a computer to perform the method according to one of the above embodiments.

A sensory control system according to another embodiment of the present disclosure includes an input unit and a processor. An input unit receives a sensitivity parameter. A processor converts the received sensitivity parameter into, among a plurality of physical parameters included in physical properties relating to a sensory presentation, a physical parameter correlated with the sensitivity parameter and outputs a sensory presentation signal based on the physical parameter obtained as a result of the conversion.

A conversion model generation system according to another embodiment of the present disclosure includes a storage unit and a processor. The storage unit stores, for each of certain one or more sensory presentations, correspondence information between a physical property relating to the certain sensory presentation and a sensitivity parameter indicating a degree of a sensory representation in response to the sensory presentation. The processor extracts, on a basis of the correspondence information regarding each of the one or more sensory presentations, a physical parameter correlated with the sensitivity parameter from among the plurality of physical parameters included in the physical properties relating to the sensory presentation and generates, on a basis of the sensitivity parameter and the extracted physical parameter, a conversion model capable of converting a newly received sensitivity parameter into a physical parameter correlated with the sensitivity parameter.

With the sensory control method, the sensory control system, the method for generating a conversion model, the conversion model generation system, the method for converting a relational expression, and the program according to the embodiments of the present disclosure, sensory presentation that reflects human sensitivity can be performed.

BRIEF DESCRIPTION OF THE DRAWINGS

FIG. 21 is a sequence diagram illustrating an operation performed by the tactile control system illustrated in FIG. 20;

FIG. 22 is a diagram illustrating first relational expressions in an example of a method for generating a conversion model in the present disclosure;

FIG. 23 is a diagram illustrating second relational expressions in the example of the method for generating a conversion model in the present disclosure;

FIG. 33 is a diagram illustrating an outline of other operation performed by the user to adjust the operating feel using the tactile control apparatus;

FIG. 46 is a diagram illustrating an example of operation unit parameters;

FIG. 53 is a diagram illustrating the configuration of the tactile control system as the second embodiment of the sensory control system illustrated in FIG. 45 along with the flow of a signal;

FIGS. 63A to 63D are examples of diagrams illustrating dynamic properties at a time when the finger model push tool pushes a plurality of operation tools whose dynamic properties are different from one another;

FIG. 68 is a diagram illustrating a list of correlation coefficients between sensitivity parameters and dynamic properties; and FIG. 69 is an example of a sequence diagram where a communication apparatus and a terminal apparatus communicate with each other to estimate sensitivity parameters of an attached operation tool.

DESCRIPTION OF THE PREFERRED EMBODIMENTS

Figure 1:
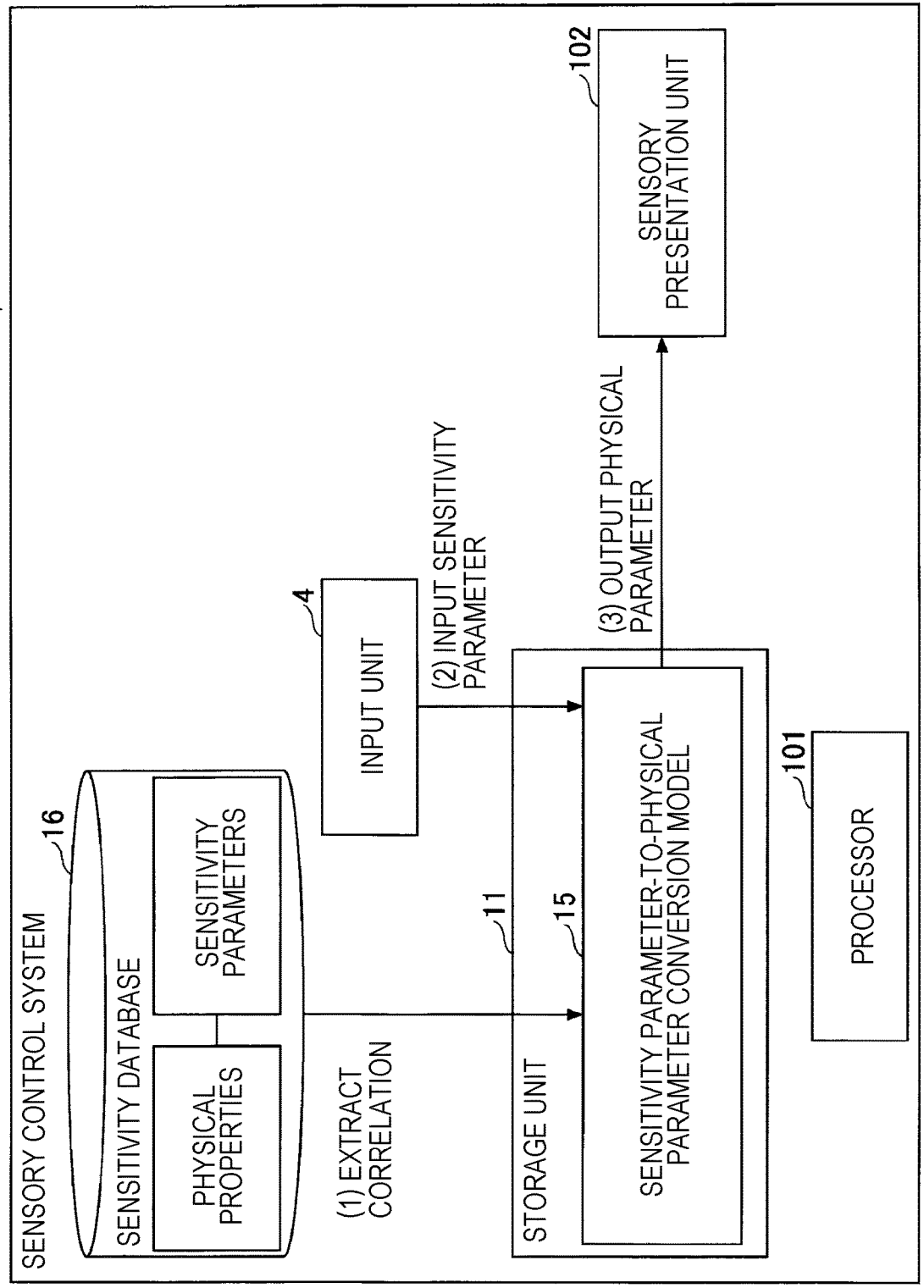
FIG. 1 is a block diagram illustrating a basic configuration of a sensory control system according to an embodiment of the present disclosure.

Aspects of the present disclosure will be described hereinafter with reference to the drawings. Components having essentially the same functions are given the same reference numerals herein and in the drawings, and redundant description thereof is omitted.

First Aspect

Sensory Control System

FIG. 1 illustrates the basic configuration of a sensory control system 100 according to a first aspect of the present disclosure. The sensory control system 100 illustrated in FIG. 1 includes a sensitivity database 16, a storage unit 11, an input unit 4, a processor 101, and a sensory presentation unit 102. The storage unit 11 stores a sensitivity parameter-to-physical parameter conversion model (hereinafter simply referred to as a "conversion model 15"). The sensory presentation unit 102 is a component that presents sensations to a person and may be achieved, for example, by a tactile presentation unit (e.g., a tactile presentation unit 30 that will be described later) that presents tactile sensations, an auditory presentation unit that presents auditory sensations, such as a speaker, a visual presentation unit that presents visual sensations, such as a display device, or any combination of these.

The conversion model 15 is a conversion model for converting sensitivity parameters into physical parameters correlated with the sensitivity parameters. Here, the sensitivity parameters are parameters indicating degrees of sensory representations in response to sensory presentations. More specifically, in the case of sensitivity evaluation based on a semantic differential (SD) method, for example, the sensitivity parameters may each be a rating on a multi-level scale indicating which of two sensory representations (adjectives, onomatopoeia, sound symbolism, etc.) a presented sensation is closer. More specifically, a combination of two sensory representations is, for example, "comfortable-uncomfortable", "light-heavy", or the like. In a rating on a multi-level scale based on the SD method, for example, a representation index of a sensitivity parameter indicating "most comfortable" may be "1", and a degree of "uncomfortable" may increase as the representation index increases to "2", "3", and "4", with "7" indicating "most uncomfortable". The sensitivity parameters are not limited to combinations of two sensory representations, and may be intensity of one sensory representation. Alternatively, a plurality of axes of sensory representations may be defined, and a parameter represented in multiple dimensions based on a set of the plurality of axes may be used. A plurality of physical parameters exist and are included in physical properties relating to a sensory presentation. The physical properties relating to a sensory presentation are physical properties that can affect the entirety of a sensory transmission system including sensory presentation means, such as the sensory presentation unit 102, and a body part of a person when a sensation is presented to the person. That is, the physical properties relating to a sensory presentation are not limited to physical properties of the sensory presentation means and can include physical properties of a body part of a person to whom a sensation is presented.

Although the sensitivity database 16 is stored in a storage unit, which is not illustrated, other than the storage unit 11 in the following description, the sensitivity database 16 may be stored in the storage unit 11, instead. The processor 101 controls operation of the entirety of the sensory control system 100. The processor 101 is a generic name for one or more processors. For example, a plurality of processors may together control each of the components of the sensory control system 100, or one processor may control all the components. It is only required that the components of the sensory control system 100 be capable of communicating information with one another so that a method for generating a conversion model and a sensory control method, which will be described later, can be performed, and how the components are connected to one another is not particularly limited. For example, the components of the sensory control system 100 may be connected to one another by wire or wirelessly, such as over a network. The sensory control system 100 may include a plurality of apparatuses or may be one apparatus.

The conversion model 15 included in the sensory control system 100 has been obtained by the following method for generating a conversion model. In the method for generating a conversion model, first, the sensitivity database 16 stores, for each of certain one or more sensory presentations, correspondence information where physical properties relating to the certain sensory presentation and sensitivity parameters indicating degrees of sensory representations in response to the sensory presentation (step of storing). The processor 101 extracts, from among a plurality of physical parameters included in the physical properties relating to the sensory presentation, physical parameters correlated with the sensitivity parameters on the basis of the correspondence information regarding each of the one or more sensory presentations stored in the sensitivity database 16 (step of extracting). The processor 101 then generates the conversion model 15 on the basis of the sensitivity parameters and the extracted physical parameters (step of generating). The conversion model 15 generated in this manner is a conversion model capable of converting newly received sensitivity parameters into physical parameters correlated with the sensitivity parameter. The sensory control system 100 functions as a conversion model generation system when executing the above-described method for generating a conversion model. In the step of extracting, a plurality of physical parameters included in a physical property relating to a sensory presentation can be extracted from physical properties relating to the sensory presentation means and physical properties of a system including a body part of a person.

The method for generating a conversion model may be performed by a conversion model generation system other than the sensory control system 100, instead. In this case, the conversion model generation system includes at least the sensitivity database 16 and the processor 101. The sensory control system 100 may obtain a conversion model 15 that is obtained by performed the method for generating a conversion model using the conversion model generation system and store the conversion model 15 in the storage unit 11. In this case, the sensory control system 100 need not include the sensitivity database 16.

The correspondence information stored in the sensitivity database 16 may be updatable, and the conversion model 15 may also be updatable on the basis of the updated correspondence information. More specifically, in the step of storing in the method for generating a conversion model, the sensitivity database 16 adds or updates the correspondence information for the one or more sensory presentations. Next, in the step of extracting, the processor 101 again extracts physical parameters correlated with the sensitivity parameter on the basis of the correspondence information regarding each of the one or more sensory presentations stored in the sensitivity database 16. Thereafter, in the step of generating, the processor 101 updates the conversion model 15 on the basis of the sensitivity parameter and the newly extracted physical parameters.

The sensory control system 100 performs the following sensory control method. First, the sensory control system 100 receives an input of sensitivity parameters from a user or the like through the input unit 4 (step of receiving). The processor 101 then converts, on the basis of the conversion model 15, the received sensitivity parameters into, among a plurality of physical parameters included in physical properties relating to a sensory presentation, physical parameters correlated with the sensitivity parameters (step of converting). The processor 101 then generates a sensory presentation signal based on the physical parameters obtained as a result of the conversion and outputs the sensory presentation signal to the sensory presentation unit 102 (step of outputting). The sensory presentation unit 102 presents a sensation to the user or the like on the basis of the sensory presentation signal (step of presenting a sensation).

Since the sensory control system 100 can present a sensation to a user or the like on the basis of a sensory presentation signal based on physical parameters correlated with received sensitivity parameters, a sensation that reflects a person's sensitivity can be presented to the user or the like.

Tactile Control System 1

Figure 2:
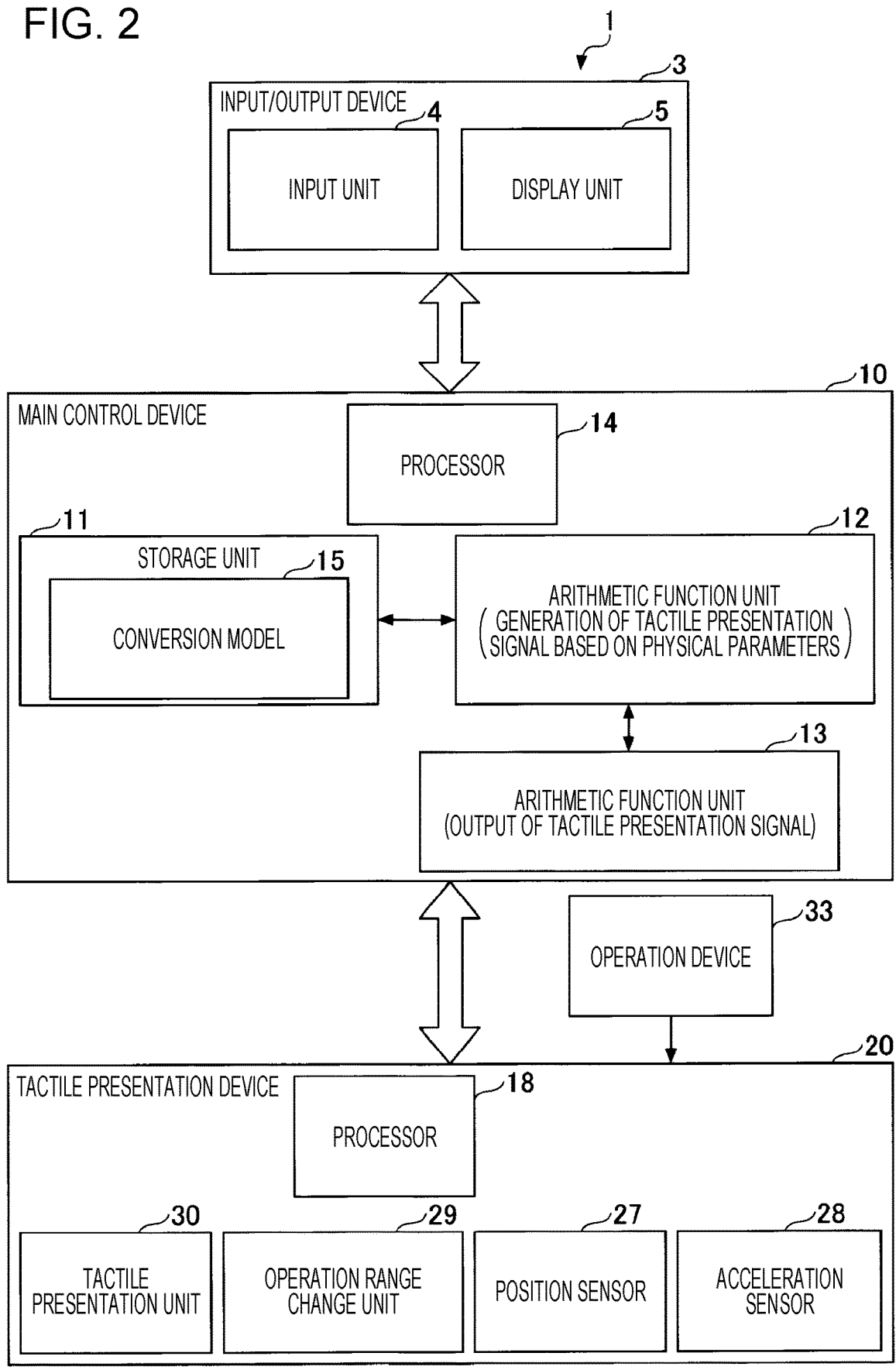
FIG. 2 is a block diagram illustrating a tactile control system as a first embodiment of the sensory control system in the present disclosure.

FIG. 2 illustrates the configuration of a tactile control system 1 as a first embodiment of the sensory control system 100 illustrated in FIG. 1 along with the flow of a signal.

The tactile control system 1 illustrated in FIG. 2 includes a main control device 10. The main control device 10 is a personal computer, a server, or the like and includes a processor (CPU) 14 and a storage unit 11 including a random-access memory (RAM) and a read-only memory (ROM). The main control device 10 includes arithmetic function units 12 and 13 executed by the processor 14.

The tactile control system 1 illustrated in FIG. 2 includes an input/output device 3. The input/output device 3 includes an input unit 4, a display unit 5, and a processor that operates the input unit 4 and the display unit 5. The input/output device 3 and the main control device 10 are connected to each other through various interfaces.

The tactile control system 1 includes a tactile presentation device 20. The tactile presentation device 20 includes a terminal processor 18 for controlling operation thereof. The arithmetic function unit 13 that functions as an output unit of the main control device 10 and the tactile presentation device 20 are connected to each other through an interface such as cable and connectors, universal serial bus (USB), high-definition multimedia interface (HDMI; registered trademark), Ethernet (registered trademark), or Wi-Fi.

The storage unit 11 of the main control device 10 illustrated in FIG. 2 stores the conversion model 15. The conversion model 15 is, as described for the sensory control system 100 illustrated in FIG. 1, a conversion model capable of converting received sensitivity parameters into physical parameters correlated with the sensitivity parameters.

Sensitivity parameters in this example are parameters indicating degrees of sensory representations in response to a tactile presentation. Sensitivity parameters in this example, for example, may be evaluation of an operating feel of a certain operation tool by a user with representations based on sensitivity. In other words, sensitivity parameters in this example are input while reflecting an operation performed on a certain operation tool. In this example, there are a plurality of physical parameters included in physical properties relating to a tactile presentation. For example, physical parameters in this example may be physical parameters included in physical properties for achieving a tactile presentation at a time when a certain operation tool is operated. Physical parameters in this example may be used to reproduce a sensory presentation of a certain operation tool by operating the tactile presentation device 20.

The tactile presentation device 20 includes at least a tactile presentation unit 30. The tactile presentation device controls the tactile presentation unit 30 and presents a tactile sensation to the user on the basis of a tactile presentation signal. Here, the tactile presentation unit 30 is an example of the sensory presentation unit 102 illustrated in FIG. 1.

The tactile presentation unit 30 may be one that presents a tactile sensation by causing drag or vibration. The tactile presentation unit 30 that causes drag or vibration may be, for example, a voice coil motor (VCM), a linear actuator (either of a resonant or non-resonant type), a piezoelectric element, an eccentric motor, a shape-memory alloy, a magnetorheological fluid, an electroactive polymer, or the like.

The tactile presentation unit 30 may be one that presents a tactile sensation by presenting a hot or cold sensation. The tactile presentation unit 30 that presents a hot or cold sensation is, for example, a Peltier element. A Peltier element utilizes transfer of heat based on a Peltier effect at a time when a direct current is applied to two opposing metal plates, and the amount of heat on surfaces of the metal plates changes in accordance with a direction of the current. By controlling the direction of the current and the amount of current, it is possible to give the user a hot or cold sensation when the user's finger or another body part touches the Peltier element.

The tactile presentation unit 30 may be one that presents a tactile sensation by giving an electrical stimulus. The tactile presentation unit 30 that gives an electrical stimulus has, for example, a configuration where an electrical stimulus is given through capacitive coupling with the user's fingertip or another body part. The tactile presentation unit 30 may present a mid-air tactile sensation. The tactile presentation unit 30 that presents a mid-air tactile sensation has, for example, a configuration where a tactile sensation is presented by causing air vibration with ultrasonic waves or the like and resonating the user's fingertip or another body part with the air vibration.

As illustrated in FIG. 2, the tactile control system 1 may include an operation device 33, and the tactile presentation unit 30 may present a tactile sensation to a user who operates the operation device 33. The tactile presentation unit 30 may present a certain operating feel by presenting a tactile sensation to the user who operates the operation device 33. More specifically, the tactile presentation unit 30 may present an operating feel that simulates the operating feel of the certain operation tool. The operation tool whose operating feel is to be simulated may be, for example, a push switch that receives pushing, a rotary switch that receives rotation, a joystick that receives tilting, a slide switch whose slide operation part receives sliding, a touch panel whose operation panel receives a touch, a press, a swipe, and other operations, or the like.

The operation device 33 may have any shape with which the same operation as for the certain operation tool can be performed. More specifically, the operation device 33 may have a shape similar to that of the certain operation tool or a shape unrelated to that of the certain operation tool, that is, the operation device 33 may be an operation device such as an operation glove that is worn on the user's hand and that receives an operation based on movement of the user's fingers.

The tactile presentation unit 30 may present a tactile sensation to the user regardless of an operation performed on the operation device 33, instead. In this case, the tactile control system 1 need not include the operation device 33.

As illustrated in FIG. 2, the tactile presentation device may include various sensors including a position sensor 27 and an acceleration sensor 28. Since the tactile presentation device 20 includes the various sensors, the tactile presentation device 20 can detect at least one of physical quantities of the tactile presentation device 20, the operation device, and the user's body part and control driving of the tactile presentation unit 30 on the basis of the physical quantity. The sensors may also include, for example, a torque sensor, an angular velocity sensor, a temperature sensor, a pressure sensor (includes a barometric pressure sensor), a humidity sensor, a magnetic sensor, an optical sensor, an ultrasonic sensor, a myoelectric sensor, or the like.

Example of Tactile Presentation Unit 30

An example of the tactile presentation unit 30 included in the tactile control system 1 according to the present aspect will be described with reference to FIGS. 3 to 5. The tactile presentation unit 30 illustrated in FIGS. 3 to 5 reproduces a tactile sensation at a time when a push operation tool is operated, and a model push operation tool is a push operation tool such as a TACT switch (registered trademark) where a disc or dome-shaped leaf spring generates operation reaction force. The tactile presentation unit 30 reproduces a tactile sensation corresponding to desired sensitivity parameters on the basis of a tactile presentation signal given from the main control device 10. By incorporating the tactile presentation unit 30 into an electronic circuit of one of various apparatuses, the tactile presentation unit 30 can be used, instead of an actual push operation tool, as a push operation tool that achieves a tactile sensation (an operating feel here) corresponding to the desired sensitivity parameters. In addition, the tactile presentation device 20 may reproduce operation reaction force, and a relationship between sensitivity parameters that represent an operating feel and physical parameters included in physical properties for operating the tactile presentation device 20 may be evaluated. The evaluation may then be used as a guideline for designing a push operation tool.

Figure 3:
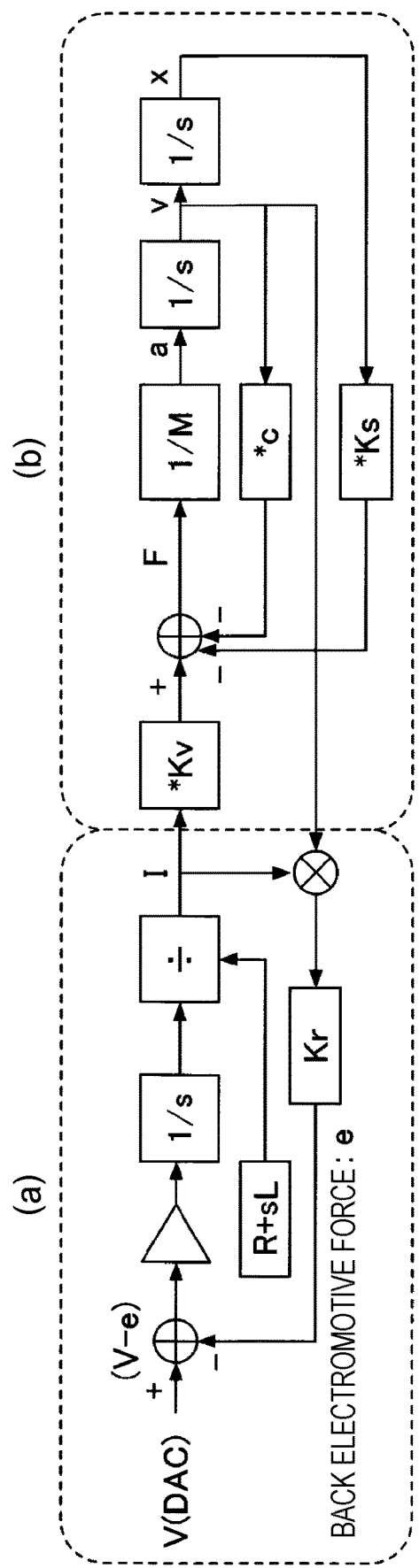
FIG. 3 is a diagram illustrating an example of the configuration of a tactile presentation unit included in the tactile control system illustrated in FIG. 2 using an equivalent circuit including Laplace transform operators.
Figure 4:
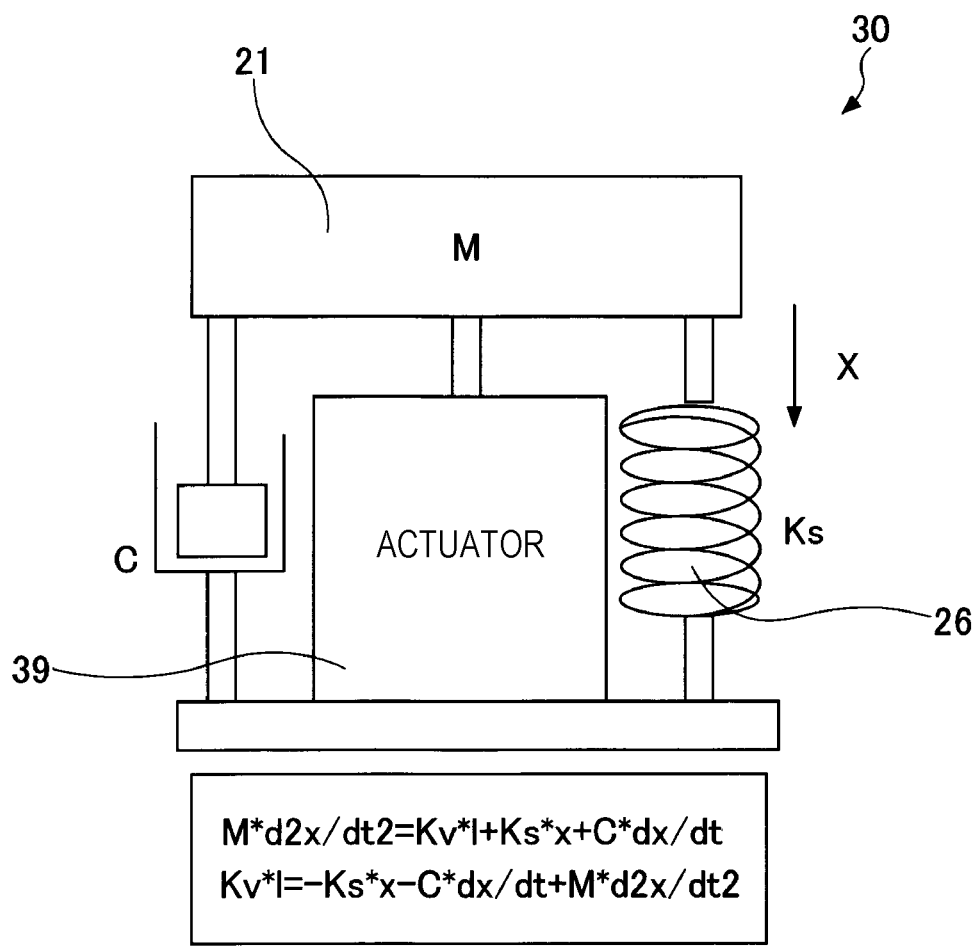
FIG. 4 is a diagram illustrating an equivalent model of an example of the tactile presentation unit included in the tactile control system illustrated in FIG. 2.

FIG. 4 illustrates an equivalent model indicating an example of components of the tactile presentation unit 30. FIG. 5 illustrates an equivalent circuit and an internal structure of an actuator 39 included in the tactile presentation unit 30. An arrow F illustrated in FIG. 5 indicates operation reaction force (vector quantity). In FIG. 3, an operation principle of the tactile presentation unit 30 is illustrated using an equivalent circuit including Laplace transform operators.

As illustrated in FIG. 4, the tactile presentation unit 30 may include a movable part 21. In this case, the operation device 33 illustrated in FIG. 2 is integrated with the movable part 21 illustrated in FIG. 4. Alternatively, the operation device 33 may be provided outside a system of the tactile presentation device 20, and the movable part 21 may be moved by operating the operation device 33. The tactile presentation unit 30 includes the actuator 39. as illustrated in FIG. 5, the actuator 39 is provided with a bobbin 24 and a coil 25 wound on the bobbin 24. The bobbin 24 and the coil 25 are part of the movable part 21.

As illustrated in FIG. 4, the tactile presentation unit 30 may include a spring member 26. The spring member 26 has a certain spring constant and is, for example, a coil spring. During normal use, the spring member 26 is held inside the tactile presentation unit 30 in a compressed state, for example, and applies operation reaction force to the movable part 21 in a direction (upward in FIG. 4) opposite a direction in which the movable part 21 is pushed. In FIG. 4, "Ks" denotes the spring constant of the spring member 26. As illustrated in FIG. 4, operation reaction force based on a viscosity coefficient "C", which is caused by a lubricant, sliding friction in a mechanism, and the like, acts upon the movable part 21. In FIG. 4, "x" denotes a stroke in the direction (downward in FIG. 4) in which the movable part 21 is pushed.

Figure 5:
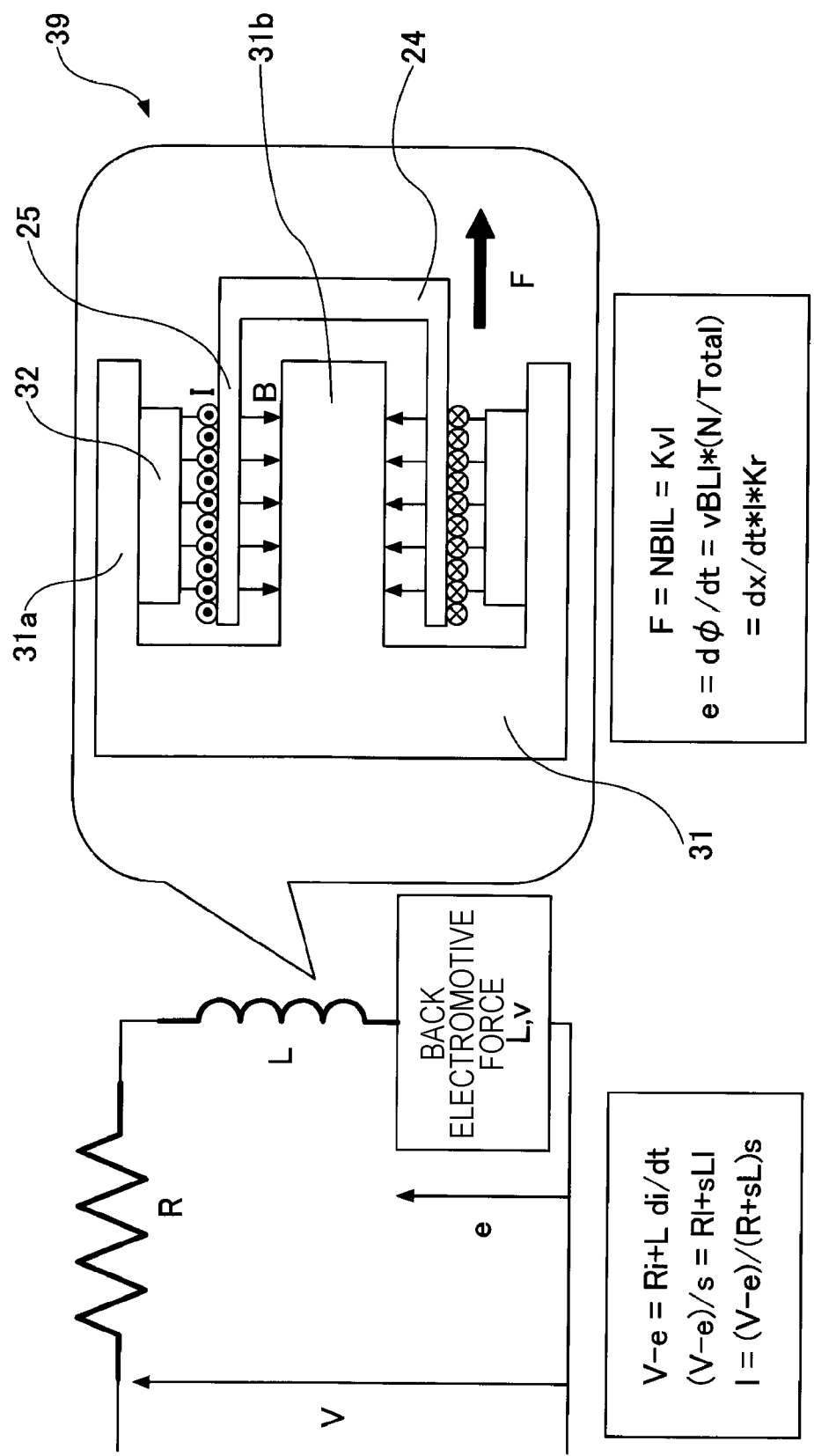
FIG. 5 is a diagram illustrating an equivalent circuit and an internal structure of an example of an actuator illustrated in FIG. 4.

As illustrated in FIG. 5, the actuator 39 includes a tubular yoke 31 composed of an iron-based magnetic material. The yoke 31 includes an outer yoke 31a and a center yoke 31b. A cylindrical magnet 32 is fixed inside the outer yoke 31a. A cylindrical magnetic gap is formed between the center yoke 31b and the magnet 32, and the cylindrical bobbin 24 and the coil are inserted into the magnetic gap. As illustrated in FIG. 5, the amount of current flowing to the coil 25 is denoted by "I", magnetic flux density of a magnetic field emanating from the magnet 32 across the coil 25 is denoted by "B", inductance of the coil 25 is denoted by "L", and an electrical resistance including the coil 25 is denoted by "R". The number of turns of the coil 25 is denoted by "N". The operation reaction force "F" acting upon the movable part 21 from the actuator 39 is controlled on the basis of a tactile presentation signal given to the tactile presentation device 20 from the main control device 10.

In this example, the position sensor 27 included in the tactile presentation device 20 illustrated in FIG. 2 detects the amount of movement (hereinafter referred to as a "stroke") "x" in the direction in which the movable part 21 is pushed. In this example, the acceleration sensor 28 included in the tactile presentation device 20 illustrated in FIG. 2 detects acceleration of the movable part 21. In this case, an operation range change unit 29 included in the tactile presentation device 20 illustrated in FIG. 2 can change the length of stroke in the direction in which the movable part 21 is pushed.

A basic operation of the tactile presentation device 20 will be described with reference to FIGS. 3 to 5. The tactile presentation device 20 can present a tactile sensation to the movable part 21 through the operation device 33 by controlling the current "I" applied to the coil 25 of the tactile presentation unit 30. The tactile presentation here is changes in the operation reaction force "F" upon the user's finger or another body part pushing the movable part 21 in the direction in which the movable part 21 is pushed. The operation reaction force "F" is resistance that reproduces the operation reaction force of the push operation tool that causes the operation reaction force using the disc or dome-shaped leaf spring.

FIG. 4 illustrates a model of the tactile presentation unit 30. The following Math. 1 represents the operation performed on the tactile presentation device 20 using an equation of "force".

$$M*d2x/dt2 = Kv*I + Ks*x + C*dx/dt \qquad \text{[Math. 1]}$$

A left-hand side of Math. 1 denotes force obtained by multiplying mass "M" of the movable part 21 and acceleration. On a right-hand side, a first term is the operation reaction force generated by the actuator 39, a second term is the operation reaction force generated by the spring member 26, and a third term is the operation reaction force based on the viscosity coefficient "C". The spring constant "Ks" and the viscosity coefficient "C" are essentially constants. When the operation of the tactile presentation unit 30 includes elements that make the spring constant and the viscosity coefficient variable, the spring constant Ks and the viscosity coefficient C may be variables that vary in accordance with a tactile presentation signal. When the tactile presentation unit 30 is filled with a functional fluid such as a magneto-rheological fluid to control application of the magnetic field, for example, the viscosity coefficient C becomes variable thanks to changes in viscosity of the functional fluid. When the tactile presentation unit 30 includes a plurality of spring members and a spring member to be used can be selected on the basis of a tactile presentation signal, the spring constant Ks becomes variable.

Math. 2, which is obtained by transforming Math. 1, is as follows.

$$Kv*I = -Ks*x - C*dx/dt + M*d2x/dt2 \qquad \text{[Math. 2]}$$

"Kv" is a physical parameter extracted from a physical property for achieving tactile presentation. The physical parameter is correlated with a sensitivity parameter. The sensitivity parameter varies depending on a representation index of an adjective representing an operating feel at a time when the certain operation tool is pushed.

In the equivalent circuit of the tactile presentation unit illustrated in FIG. 5, a voltage acting upon the coil 25 is denoted by "V", and back electromotive force acting upon the coil is denoted by "e". The following Math. 3 shows a differential equation of "V−e" and equations expressing this differential equation using a Laplace transform variable "s".

$$V - e = Ri + L\, di/dt$$

$$(V-e)/s = RI + sLI$$

$$I = (V-e)/(R+sL)s \qquad \text{[Math. 3]}$$

As illustrated in FIG. 5, tactile presentation achieved by the actuator 39, that is, the operation reaction force "F", is (N×B×L)×I. N denotes the number of turns of the coil, B denotes magnetic flux density, and I denotes a coil current. "Kv" in Math. 1 and Math. 2 is Kv=(N×B×L). The back electromotive force "e" obtained from the model of the actuator 39 is represented by a differential equation of the following Math. 4. Φ denotes the magnetic flux.

$$e = d\Phi/dt = vBLI * (N/\text{Total})$$
$$= dx/dt * I * Kr \qquad \text{[Math. 4]}$$

A first circuit part (a) of the equivalent circuit of the tactile presentation unit 30 illustrated in FIG. 3 indicates a relationship between the voltage "V" and the electromotive force "e" in Math. 3 and Math. 4 acting upon the actuator 39. A second circuit part (b) indicates a model of force acting upon the actuator 39. In the second circuit part (b), "F" denotes the operation reaction force, "α" denotes the acceleration of the movable part 21, "v" denotes the velocity of the movable part 21, and "x" denotes the stroke of the movable part 21. By changing the parameter "Kv" in accordance with the representation index of an adjective that represents tactile presentation, an operating feel represented by a desired adjective can be given to a finger pushing the operation device 33. The operating feel can also be changed by, in addition to the changing "Kv", changing "Ks" and "C". "Kv" and the like are not limited to changes in parameters in equations, but may be variables extracted from a data map stored in advance where data is associated with each other.

Process for Generating Conversion Model 15

Figure 6:
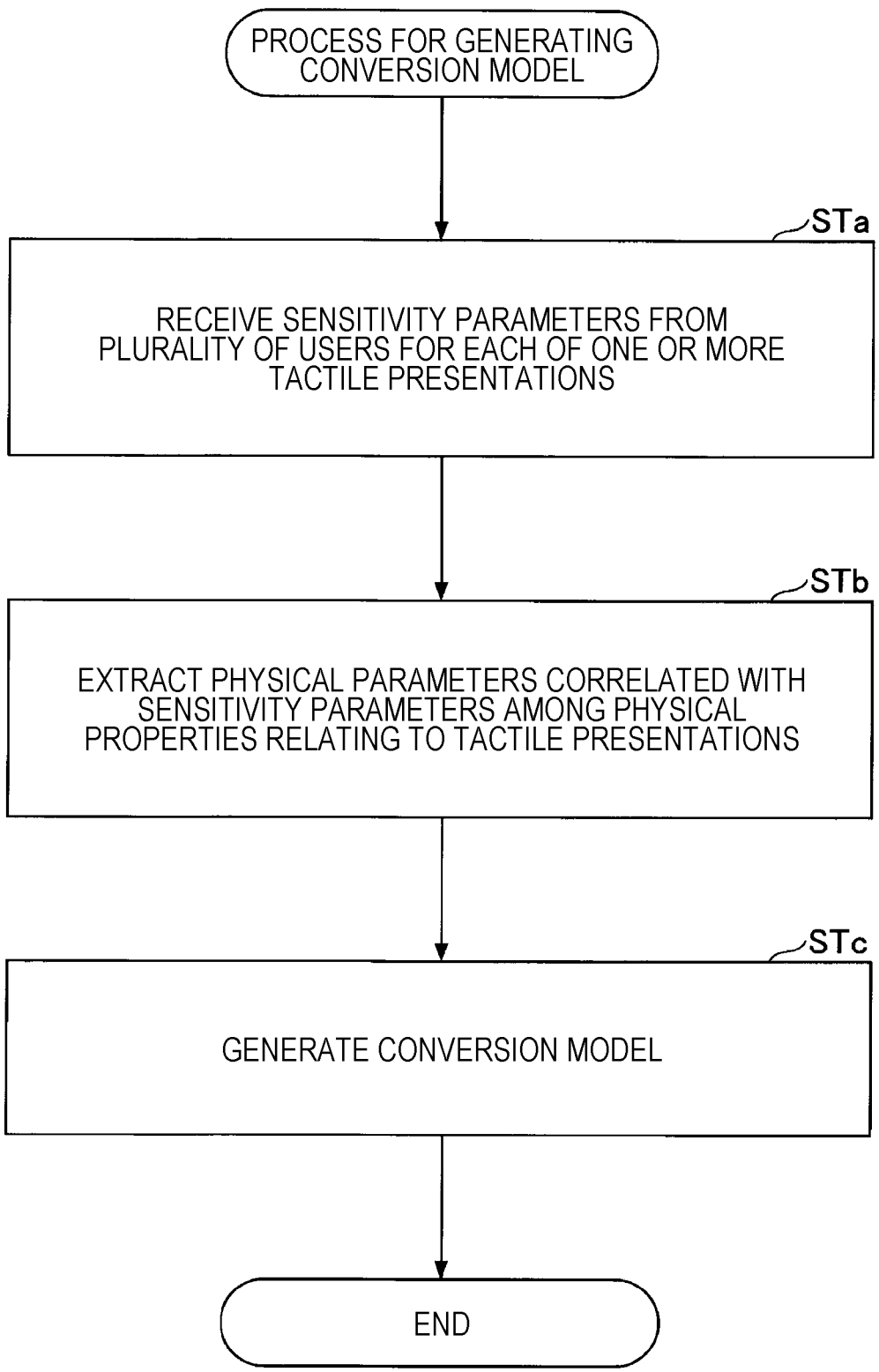
FIG. 6 is a flowchart illustrating a method for generating a conversion model using a conversion model generation system in the present disclosure.

FIG. 6 illustrates an example of a process for generating a conversion model 15 (the method for generating a conversion model) stored in the tactile control system 1 illustrated in FIG. 2. The method for generating a conversion model is performed by a conversion model generation system including at least an input unit, a storage unit, and a processor. "ST" in FIG. 6 indicates processing steps.

In STa, the conversion model generation system receives an input of sensitivity parameters from a plurality of users for each of one or more tactile presentations. The "one or more tactile presentations" here are not limited to tactile sensations at times when the users operate operation tools and also include tactile sensations given to the users at times when the users perform no operations. For example, one or more tactile sensations may be presented through suits, gloves, or the like as tactile presentations according to content such as a game or a video, and sensitivity parameters based on how the users feel about the one or more tactile presentations may be input. This step is an example of the step of storing in the method for generating a conversion model described for the sensory control system 100 illustrated in FIG. 1.

In STb in FIG. 6, the conversion model generation system extracts physical parameters correlated with the sensitivity parameters among physical properties relating to each of the various tactile presentations. This step is an example of the step of extracting in the method for generating a conversion model described for the sensory control system 100 illustrated in FIG. 1. In STc, the conversion model generation system generates a conversion model 15. This step is an example of the step of generating in the method for generating a conversion model described for the sensory control system 100 illustrated in FIG. 1. The conversion model 15 can be generated manually or using a multiple regression analysis, machine learning, or one of various other analytical methods. The conversion model 15 may be one of variations including a model capable of converting one sensitivity parameter into one physical parameter, a model capable of converting one sensitivity parameter into a plurality of physical parameters, a model capable of converting a plurality of sensitivity parameters into one physical parameter, a model capable of converting a plurality of sensitivity parameters into a plurality of physical parameters. A model capable of converting a plurality of sensitivity parameters into a plurality of physical parameters may be generated by obtaining information regarding complex correlations through machine learning based on information regarding correlations between one sensitivity parameter and one physical parameter. A data structure of the conversion model 15 may be correspondence table between sensitivity parameters and tactile parameters or may be stored in such a way as to be calculable by functions.

An example of a method for generating a conversion model capable of converting a plurality of sensitivity parameters into a plurality of physical parameters will be described hereinafter. In this example, first, in the step of extracting, the conversion model generation system extracts, for each of a plurality of sensitivity parameters, information regarding degrees of correlation between a plurality of physical parameters and the sensitivity parameter. More specifically, the conversion model generation system extracts the information regarding the plurality of degrees of correlation through a multiple regression analysis where the plurality of sensitivity parameters are objective variables and the plurality of physical parameters are explanatory variables. Here, the information regarding the plurality of degrees of correlation may be, for example, coefficients of determination, constant terms, or values derived from these in the multiple regression analysis.

Next, the conversion model generation system generates, in the step of generating on the basis of the plurality of physical parameters and the information regarding the degrees of correlation, first relational expressions that represent the plurality of sensitivity parameters (first generation step). More specifically, the first relational expressions can be as shown in the following Math. 5, when the plurality of sensitivity parameters are denoted by $A_1, A_2, \ldots,$ and $A_n$ (n is a natural number), the plurality of physical parameters are denoted by $P_1, P_2, \ldots,$ and $P_n$, and constant terms and coefficients of determination in the multiple regression analysis relating to the sensitivity parameters $A_m$ (m is a natural number smaller than or equal to n) are denoted by $B_{m1}, B_{m2}, \ldots,$ and $B_{mn}$.

$$A_1 = B_{11}*P_1 + B_{12}*P_2 + B_{13}*P_3 + \ldots + B_{1n}*P_n$$

$$A_2 = B_{21}*P_1 + B_{22}*P_2 + B_{23}*P_3 + \ldots + B_{2n}*P_n$$

$$\ldots$$

$$A_n = B_{n1}*P_1 + B_{n2}*P_2 + B_{n3}*P_3 + \ldots + B_{nn}*P_n \qquad \text{[Math. 5]}$$

The first relational expressions are as illustrated in FIG. 22 when Math. 5 is expressed as a matrix equation where a column vector indicating the plurality of sensitivity parameters is one side (a left-hand side here) and a product of a coefficient matrix indicating the information regarding the plurality of degrees of correlation and a column vector indicating the plurality of physical parameters are another side (a right-hand side here). The coefficient matrix is a square matrix of n rows and n columns.

The conversion model generation system generates, after the first generation step included in the step of generating on the basis of the first relational expressions, second relational expressions that represent the plurality of physical parameters using the plurality of sensitivity parameters and the information regarding the plurality of degrees of correlation (second generation step). More specifically, the conversion model generation system generates the second relational expressions by multiplying both sides of the first relational expressions illustrated in FIG. 22 by an inverse matrix of the coefficient matrix from the left. As illustrated in FIG. 23, one side (a left-hand side here) of the second relational expressions of the second relational expressions is the column vector indicating the plurality of physical parameters, and another side (a right-hand side here) of the second relational expressions is a product of the inverse matrix of the coefficient matrix and the column vector indicating the plurality of sensitivity parameters.

The conversion model generation system generates, after the second generation step included in the step of generating on the basis of the second relational expressions, the conversion model 15 capable of converting the plurality of sensitivity parameters into the plurality of physical parameters correlated with the plurality of sensitivity parameters (third generation step). The conversion model generation system can thus generate the conversion model 15 capable of converting the plurality of sensitivity parameters into the plurality of physical parameters.

Although the coefficient matrix is a square matrix in the above example, the coefficient matrix need not necessarily be a square matrix. By using a pseudo-inverse matrix as the inverse matrix, for example, the conversion model 15 capable of converting the plurality of sensitivity parameters into the plurality of physical parameters can be generated, too, when the coefficient matrix is not a square matrix.

The sensory control method performed by the sensory control system 100 illustrated in FIG. 1 may be performed as follows when the conversion model 15 obtained in this example is used. First, the sensory control system 100 receives, in the step of receiving, a plurality of sensitivity parameters from users or the like through the input unit 4. The processor 101 then converts, in the step of converting, the plurality of obtained sensitivity parameters into a plurality of physical parameters correlated with the plurality of sensitivity parameters on the basis of the conversion model 15. The step of outputting and the step of presenting a sensation are the same as above, and description thereof is omitted.

Specific Example of Tactile Presentation

An example where the tactile presentation device 20 illustrated in FIG. 2 performs tactile presentation simulating an operating feel of a certain operation tool will be described hereinafter. Sensitivity parameters of the conversion model 15 in this example are representation indices of adjectives that represent an operating feel of a push operation tool as the certain operation tool. Physical parameters of the conversion model 15 in this example are included in physical properties for achieving a sensory presentation at a time when the push operation tool as the certain operation tool is operated. The tactile control system 1 receives an input of certain sensitivity parameters from the input unit 4 and converts the received certain sensitivity parameters into physical parameters using the conversion model 15. Sensitivity parameters that assume a push operation tool are degrees of sensory representations such as adjectives or onomatopoeia that represents an operating feel at a time when a person pushes the push operation tool. The physical properties achieved by the physical parameters are, for example, displacement caused by the operation (e.g., a stroke), operation reaction force (load), velocity, acceleration, and jerk of the movable part 21, an elastic property of an operator's finger or another body part, quantities obtained from these physical properties, and the like. The physical parameters herein are defined as including one or more variables of the physical properties.

Figure 7:
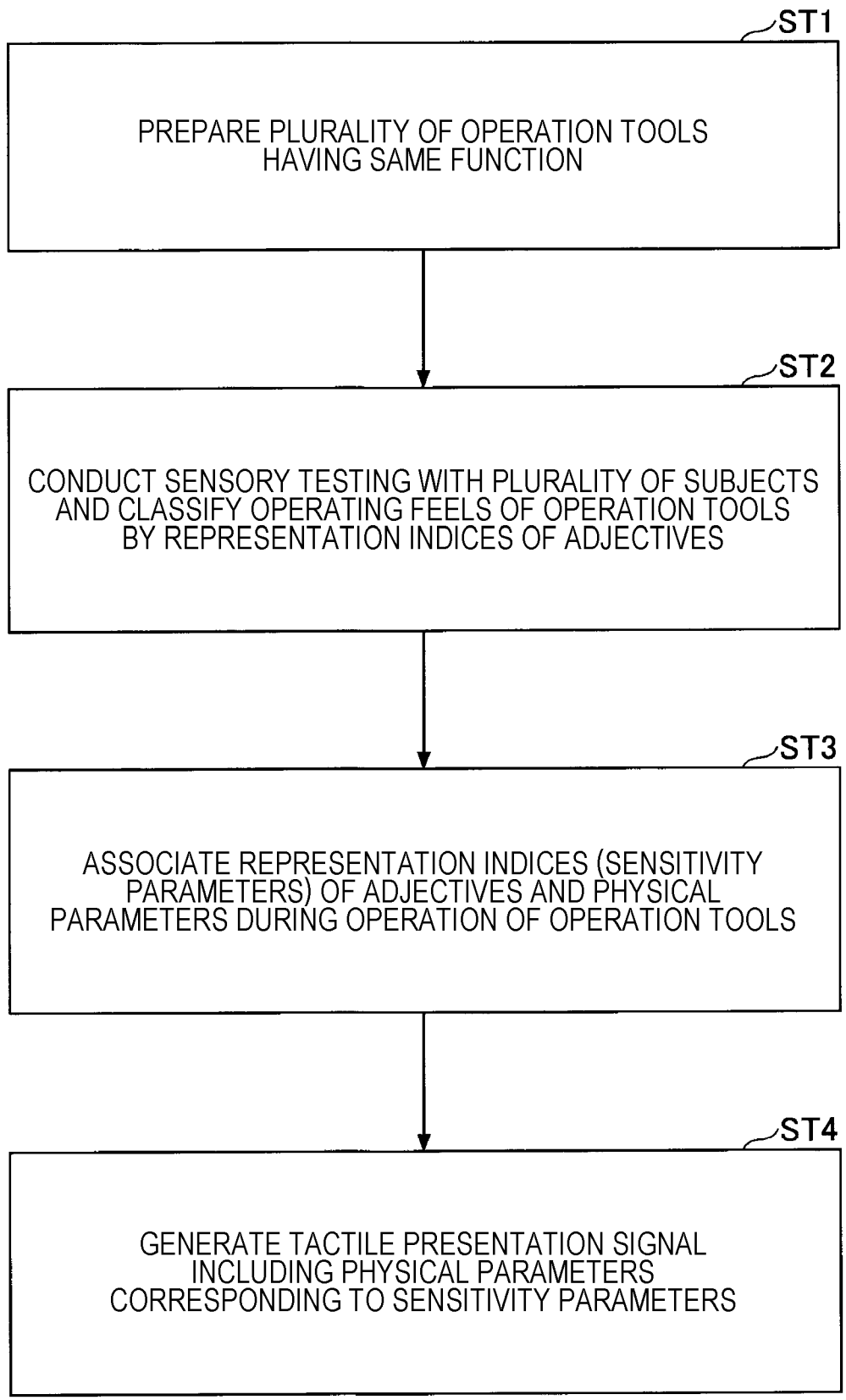
FIG. 7 is a flowchart illustrating a specific example of a method for generating a conversion model and a tactile presentation method.

FIG. 7 is a flowchart illustrating a specific example of the method for generating a conversion model and the tactile presentation method. Although "ST" indicates processing steps in the flowchart of FIG. 7, ST1, ST2, and the like include artificial processing, whereas ST3, ST4, and the like include processing performed by the processor 14 of the main control device 10 illustrated in FIG. 2.

In ST1 in FIG. 7, a plurality of operation tools that have the same function but whose operating feels are different from one another are prepared. In ST2, sensory testing is conducted with a plurality of users, and the operating feels of the prepared operation tools are classified by representation indices of adjectives as sensitivity parameters. In ST3, the processor 14 of the tactile control system 1 associates, on the basis of correlation coefficients or the like, the representation indices of the adjectives as the sensitivity parameters and the physical parameters included in the physical properties for achieving sensory presentations at times when the operation tools are operated. The sensitivity parameters and the physical parameters each include at least one variable. The sensitivity parameters and the physical parameters associated with each other are stored as the sensitivity database 16 illustrated in FIG. 1. In ST4, the processor 14 converts, using the conversion model 15, newly received representation indices of adjectives as sensitivity parameters into correlated physical parameters. The arithmetic function unit 12 generates a tactile presentation signal based on the physical parameters, and the arithmetic function unit 13 outputs the tactile presentation signal. The tactile presentation device 20 is operated on the basis of the tactile presentation signal to present a tactile sensation. By controlling at least one of the coefficients illustrated in FIG. 4, namely "Kv", "Ks", and "C", using the tactile presentation signal based on the physical parameters, a tactile sensation corresponding to the sensitivity parameters is presented through the tactile presentation device 20.

Figure 11:
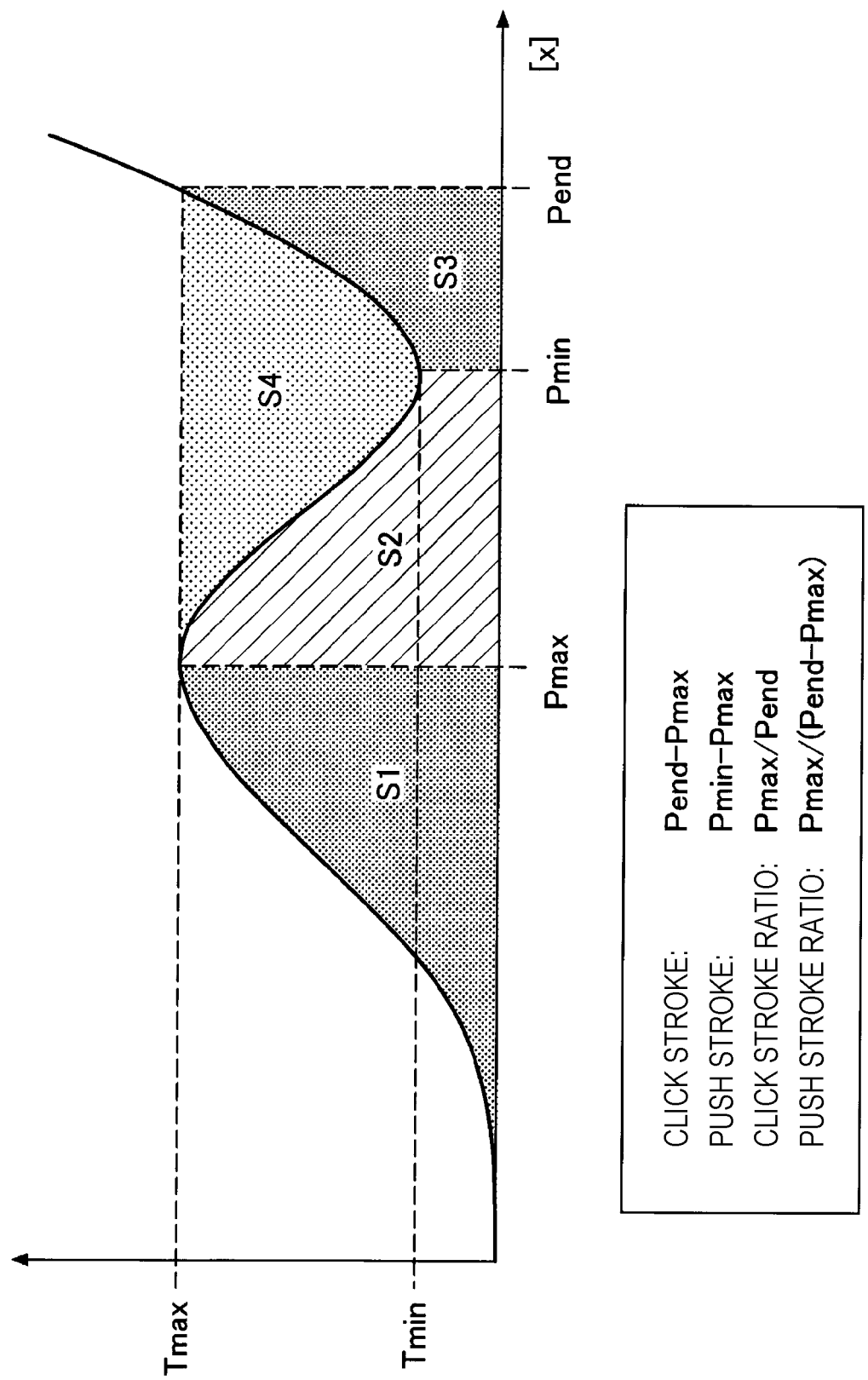
FIG. 11 is a diagram illustrating an operation performed on the push operation tools.

In ST1 in FIG. 7, for example, a plurality of push operation tools that are actual products including a disc or dome-shaped leaf spring, such as TACT switches (registered trademark), are prepared as the operation tools. FIG. 11 schematically illustrates changes in operation reaction force at a time when a push operation tool is pushed. FIG. 11 illustrates physical properties for achieving a sensory presentation at a time when a push operation tool as an operation tool is operated on a coordinate plane whose horizontal axis represents displacement caused by the operation and whose vertical axis represents operation reaction force acting upon an operating user's finger or another body part. The "displacement caused by operating an operation tool" herein includes the amount of operation performed on the operation tool, operation time of the operation tool, or a combination of the amount of operation and the operation time. That is, the physical properties for achieving the sensory presentation at a time when the operation tool is operated can be represented by a relationship between the amount of operation performed on the operation tool and the operation reaction force, a relationship between the operation time of the operation tool and the operation reaction force, or a relationship between the combination of the amount of operation and the operation time of the operation tool and the operation reaction force. The "displacement caused by operating an operation tool" can also include displacement due to an elastic property of a finger or another body part of an operator who operates the operation tool. In FIG. 11, the "displacement caused by operating an operation tool" is the amount of operation performed on the push operation tool as the operation tool and will be referred to as a "stroke "x"" hereinafter as necessary. The amount of operation performed on the operation tool is an amount in a one-dimensional, two-dimensional, or three-dimensional space. In FIG. 11, the amount of operation of the push operation tool as the operation tool is an amount in the one-dimensional space along a direction of the pushing. The operation tool may include a movable part that moves as the operation tool is operated. The push operation tool as the operation tool includes a knob pushed by a user or the like as the movable part. The amount of operation performed on the push operation tool, therefore, may be the amount of movement of the movable part of the push operation tool.

A curve indicating physical properties for achieving a sensory presentation at a time when an operation tool is operated on a coordinate plane whose horizontal axis represents the amount of operation performed on the operation tool (the amount of movement of a movable part) and whose vertical axis represents operation reaction force, such as that illustrated in FIG. 11, is called a force-stroke (F-S) curve, a feeling curve, an operation force curve, a load displacement curve, or the like. The curve will be referred to as a "load displacement curve" hereinafter as necessary. As illustrated in FIG. 11, operation reaction force gradually increases due to compression of the disc or dome-shaped leaf spring as the user pushes the push operation tool and the stroke "x" in the direction of the pushing increases. When the stroke "x" reaches a maximum position Pmax, the operation reaction force reaches a maximum value Tmax. As the push operation tool is further pushed, the disc or dome-shaped leaf spring buckles and reverses, and the operation reaction force sharply decreases. When the stroke "x" reaches a minimum position Pmin, the operation reaction force becomes a minimum value Tmin. If the user further pushes the push operation tool, the buckled disc or dome-shaped leaf spring is compressed, and the operation reaction force keeps increasing until a final stroke position, where the disc or dome-shaped leaf spring comes into contact with a fixed contact, instead. In FIG. 11, a stroke when the operation reaction force becomes equal to the maximum value Tmax halfway between the minimum position Pmin and the final position is referred to as a load recovery position Pend.

If the user removes pushing force upon the push operation tool after pushing the push operation tool down to the final stroke position, where the disc or dome-shaped leaf spring comes into contact with the fixed contact, the knob as the movable part of the push operation tool returns to an initial position thereof due to elastic restoring force of the disc or dome-shaped leaf spring. The load displacement curve when the operation device 33 is restored has hysteresis in relation to the load displacement curve illustrated in FIG. 11 at a time when the displacement increases due to the pushing. The operation will be described hereinafter using only the load displacement curve at a time when the displacement increases due to the pushing for convenience of description.

A plurality of (a total of 23) push operation tools were classified into groups (A), (B), and (C) in accordance with a total stroke at a time when a final stroke was reached. A total stroke of the group (A) was larger than or equal to 0.25 mm and smaller than or equal to 0.35 mm, a total stroke of the group (B) was larger than or equal to 0.15 mm and smaller than 0.25 mm, and a total stroke of the group (C) was smaller than 0.15 mm.

Sensory testing was conducted with 25 users using the plurality of push operation tools. In the sensory testing, operating feels (tactile sensations) experienced by the users were classified by a representation index based on the SD method. In the sensory testing, a certain sensitivity parameter A was used as the sensitivity parameter, and seven levels, namely "1", "2", "3", "4", "5", "6", and "7", were used for evaluation. In the sensory testing, the representation index of the sensitivity parameter A for the push operation tools in the group (A) greatly varied between around "1" to around "6". The representation index of the sensitivity parameter A for push operation tools in the group (B) varied in an intermediate range of around "2.5" to "3.5". The representation index of the sensitivity parameter for push operation tools in the group (C) varied between around "3.5" and around "6". Here, the sensitivity parameter A was a parameter relating to "sense of determination", "comfort", or "tactile sensation", for example, and in the case of a parameter relating to "sense of determination", a lower representation index may indicate "stronger sense of determination" and a higher representation index may indicate "weaker sense of determination".

Figure 9:
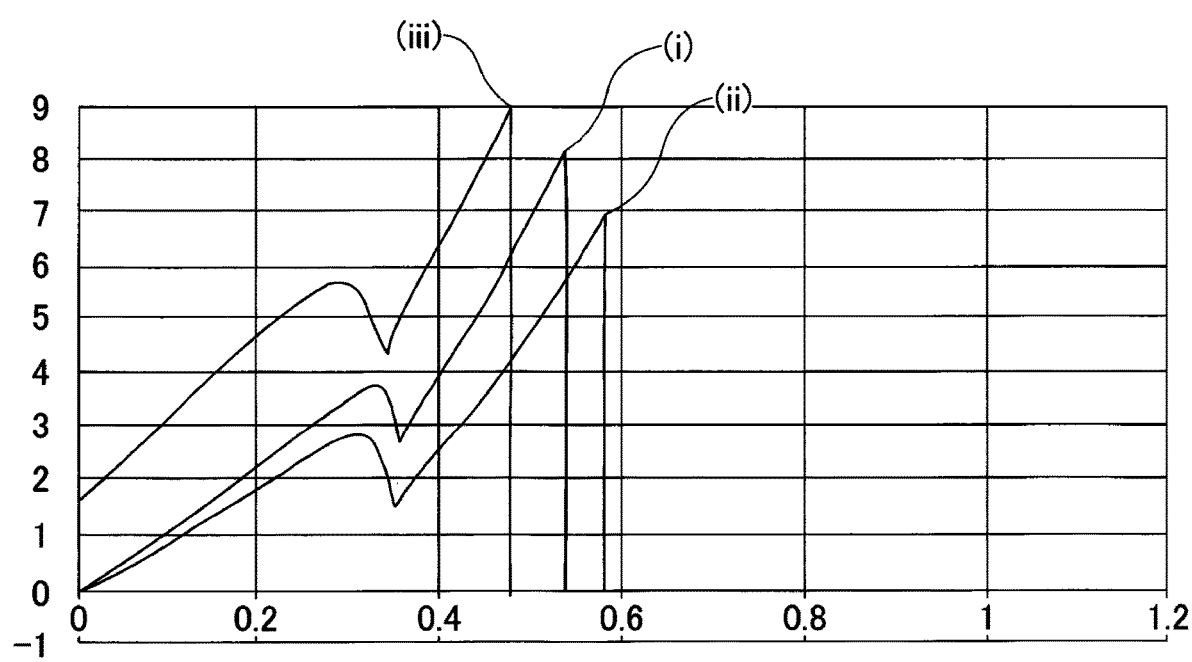
FIG. 9 is a diagram illustrating physical properties of push operation tools.
Figure 10A:
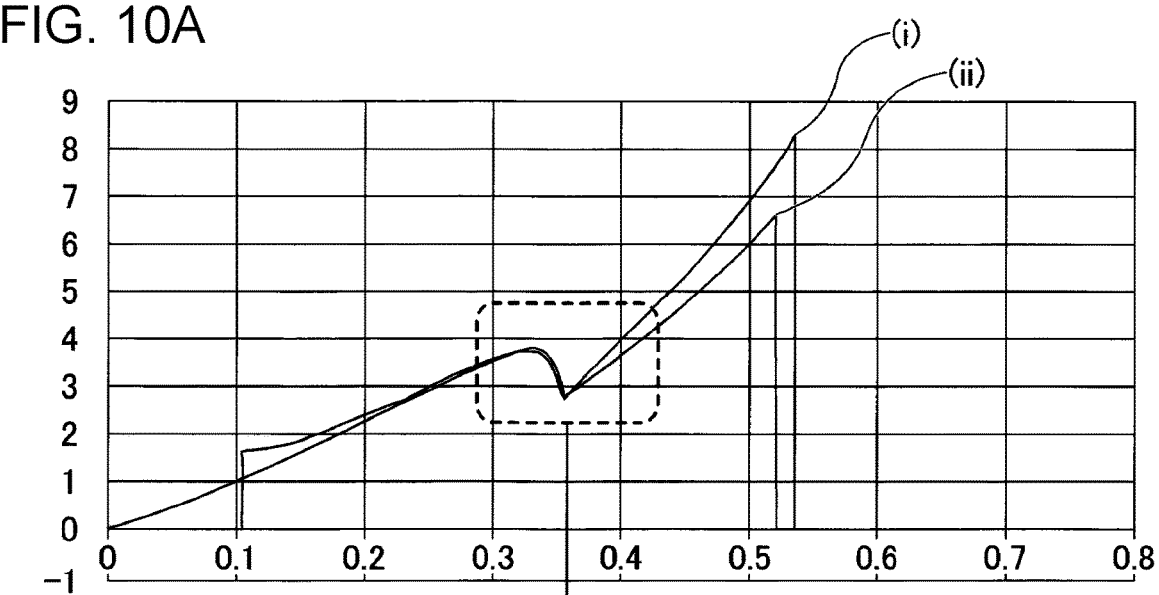
FIGS. 10A and 10B are diagrams illustrating an example of physical parameters of the push operation tools.
Figure 10B:
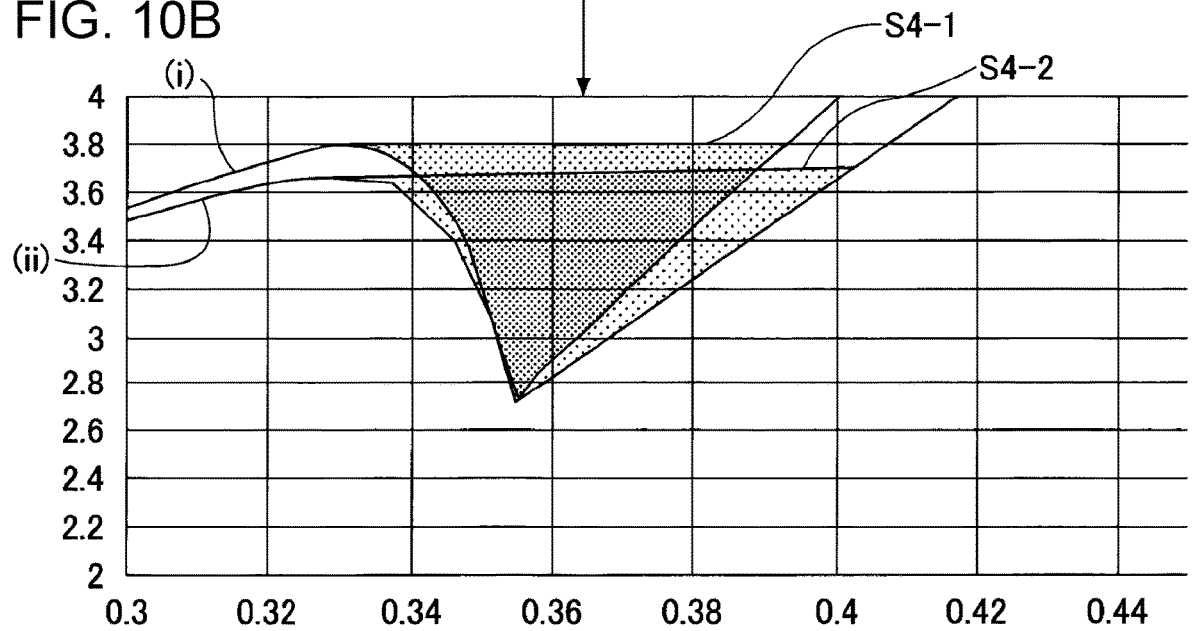

As described above, a correlation between the sensitivity parameter A and the total strokes of the push operation tools as the physical parameter is not necessarily clear. Physical properties other than the total stroke used for the classification, therefore, were focused upon with the 23 push operation tool, and presence or absence of a correlation between a physical parameter extracted from the physical properties and the sensitivity parameter A was examined. FIG. 9 illustrates load displacement curves (i), (ii), and (iii) of three push operation tools whose total strokes are different from one another. In FIG. 10A, area S4-1 of an indentation of the load displacement curve (i) and area S4-2 of an indentation of the load displacement curve (ii) are extracted as variables in a physical quantity of operation, and in FIG. 10B, the area S4-1 and the area S4-2 are translated such that minimum values Tmin thereof match for comparison.

As illustrated in FIG. 11, area S4 is area of an indentation defined by the operation reaction force at the maximum value Tmax returning to the maximum value Tmax after reaching the minimum value Tmin on the coordinate plane whose horizontal axis represents the amount of operation performed on the operation tool and whose vertical axis represents the operation reaction force. In other words, the area S4 is the area of a section defined, on the coordinate plane, by the load displacement curve and a straight line that passes through the maximum value Tmax of the load displacement curve and that is parallel to the horizontal axis. A dimension indicating the area S4 is represented by "distance (of the stroke)×load (of the operation reaction force)" and equivalent to energy (work). That is, the area S4 corresponds to energy (lost energy) that has become smaller than energy consumed expected by the user as a result of reduction in the operation reaction force while the user is operating the push operation tool. Due to the presence of the area S4, the user feels as if he/she is pulled toward the direction of the pushing.

Operation reaction force indicated by the load displacement curve (iii) in FIG. 9 includes preload when the stroke is zero. Due to the preload, so-called "play" is caused in operation. The "play" can be employed as one of physical parameters.

Figure 12:
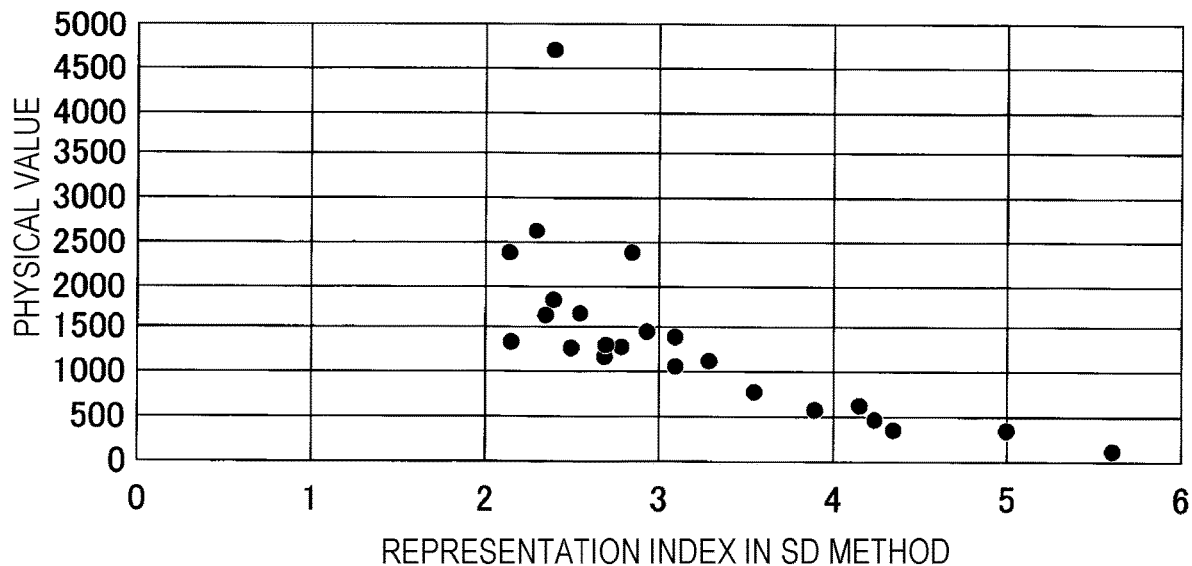
FIG. 12 is a diagram illustrating a relationship between a sensitivity parameter and a physical parameter of the push operation tools.

FIG. 12 is a graph illustrating a relationship between the sensitivity parameter A, which is the representation index in the SD method, and the area S4, which is a physical parameter extracted from the physical properties for achieving a sensory presentation at a time when an operation tool is operated. A horizontal axis in FIG. 12 represents the sensitivity parameter A, and a vertical axis represents the area S4, which is the physical parameter. It can be seen from FIG. 12 that a total of 23 push operation tools whose total strokes range from 0.35 to 0.15 mm are correlated with the area S4 illustrated in FIG. 11 and the representation index of the sensitivity parameter A. That is, with respect to the 23 push operation tools, there is a negative correlation where the representation index of the sensitivity parameter A becomes lower as the area S4 increases. Here, when a sensitivity parameter and a physical parameter are correlated with each other, an absolute value of a correlation coefficient between the sensitivity parameter and the physical parameter is preferably 0.5 or higher and more preferably 0.7 or higher.

When the area S4, which is a physical quantity, is normalized, the total strokes of the push operation tools are preferably limited within a certain range. The total strokes of the push operation tools, for example, are preferably larger than or equal to 0.05 mm and smaller than 0.5 mm and more preferably larger than or equal to 0.05 mm and smaller than 0.35 mm.

In the above example, changes in operation reaction force in response to displacement caused by an operation performed on an operation tool thus include at least a maximum and a minimum. The physical parameter includes a variable based on area of an indentation on a coordinate plane whose axes are the displacement caused by the operation and the operation reaction force, respectively, from the maximum of the operation reaction force to coordinates where the operation reaction force achieves the same value as the maximum after reaching the minimum. Here, the maximum is a part of the load displacement curve including the maximum value Tmax illustrated in FIG. 11, and the minimum is a part of the load displacement curve including the minimum value Tmin illustrated in FIG. 11.

The tactile control system 1 illustrated in FIG. 2 converts, using the conversion model 15, an input representation index of the sensitivity parameter A into the area S4, which is the physical parameter correlated with the sensitivity parameter A, and the arithmetic function unit 12 calculates a load displacement curve including the area S4 and sets a tactile presentation signal including the load displacement curve. Alternatively, the arithmetic function unit 12 calculates a plurality of load displacement curves that include the same area S4 but whose strokes or loads are different from one another and sets a plurality of tactile presentation signals including these load displacement curves. Alternatively, a plurality of load displacement curves associated with different areas S4 may be stored in the conversion model 15 in relation to the representation index of the sensitivity parameter A, and the arithmetic function unit 12 may read, from the storage unit 11, information regarding a load displacement curve corresponding to an input representation index of the sensitivity parameter A and generate a tactile presentation signal.

The input unit 4 of the input/output device 3 can receive an input of not only integer representation indices such as "2" and "3" or decimal representation indices such as "2", "2.5", "3", and "3.5" but also numerical ranges of representation indices such as "2-2.5", "2.5-3", "3-3.5", and "3.5-4". The tactile control system 1 converts, using the conversion model 15, one or a plurality of load displacement curves including the area S4, which is the physical parameter corresponding to the representation index of the sensitivity parameter received through the input unit 4. Information regarding the one or plurality of load displacement curves obtained as a result of the conversion is output to the input/output device 3, and the input/output device 3 displays the one or plurality of load displacement curves on the display unit 5. The user checks the one load displacement curve displayed on the display unit 5 or selects one of the plurality of load displacement curves displayed. When the input unit 4 gives this check instruction or selection instruction to the processor 14, the arithmetic function unit 12 set a tactile presentation signal based on the selected load displacement curve, and the arithmetic function unit 13 outputs the tactile presentation signal to the tactile presentation device 20. As a result, when the operation device 33 of the tactile presentation device 20 is operated, an operating feel corresponding to the representation index of the sensitivity parameter desired by the user can be presented.

As items input from the input unit 4, a physical parameter such as a "stroke" or the "magnitude of operation reaction force" may be directly specified along with the representation index of the sensitivity parameter A. If the tactile control system 1 receives a "stroke of 0.25 to 0.35 mm" through the input unit 4 as a physical parameter along with the representation index of the sensitivity parameter A, for example, the tactile control system 1 selects, from among a plurality of load displacement curves belonging to the group (A), a load displacement curve including the area S4 that matches the representation index of the adjective and generates a tactile presentation signal on the basis of the load displacement curve. Alternatively, when the tactile control system 1 receives an input of a numerical item of the "magnitude of operation reaction force" as a physical parameter along with the representation index of the sensitivity parameter A through the input unit 4, the tactile control system 1 may generate a tactile presentation signal based on both the representation index of the sensitivity parameter A and the "magnitude of operation reaction force" as the physical parameter.

In the above description, the total strokes are limited within the range of 0.35 to 0.15 mm, for example, and the physical parameter, which is the area S4, and the sensitivity parameter, which is the representation index of the adjective, are associated with each other on the basis of the range. The area S and the representation index of the sensitivity parameter, however, may be associated with each other on the basis of a numerical range other than the range of total strokes, instead. For example, a certain numerical range may be set on the basis of the maximum value Tmax, the minimum value Tmin, the maximum value minus the minimum value (Tmax−Tmin), a click stroke (Pend−Pmax), a push stroke (Pmax/(Pend−Pmax)), a click stroke ratio (Pmax/Pend), or a push stroke ratio (Pmax/(Pend−Pmax)) illustrated in FIG. 11 or the like, and this numerical range may be used as a reference. Alternatively, the certain numerical range may be set on the basis of area S1, S2, or S3 other than S4 or a ratio of the areas S1, S2, and S3, and this numerical range may be used as a reference. The area S4, which is the physical parameter, and the representation index of the sensitivity parameter may be associated with each other on the basis of one of these numerical ranges.

Figure 13:
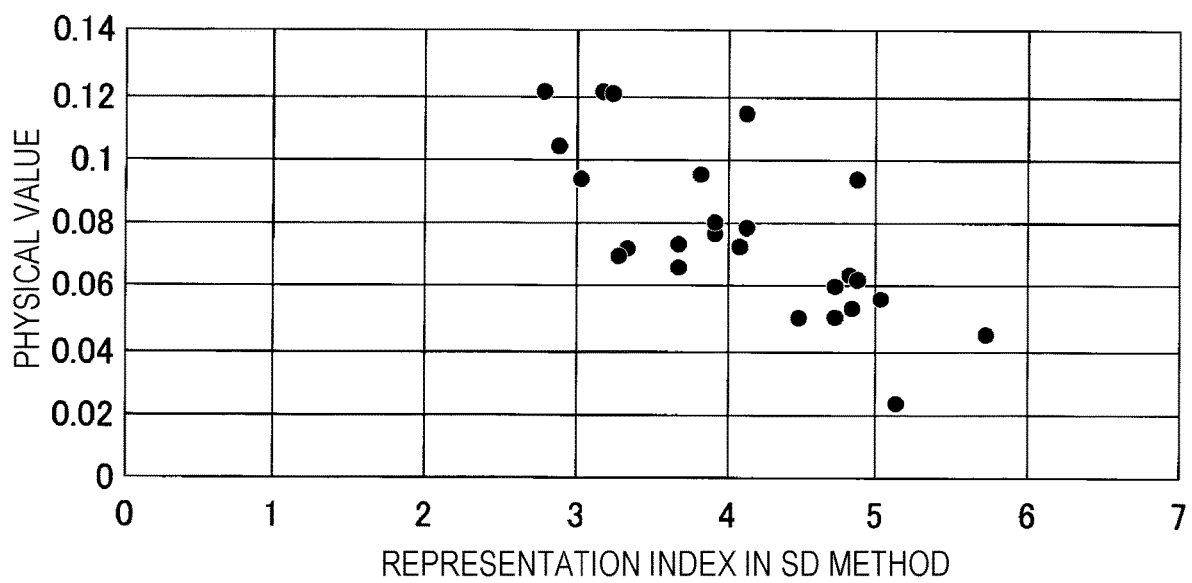
FIG. 13 is a diagram illustrating a relationship between another sensitivity parameter and another physical parameter of the push operation tools.
Figure 14:
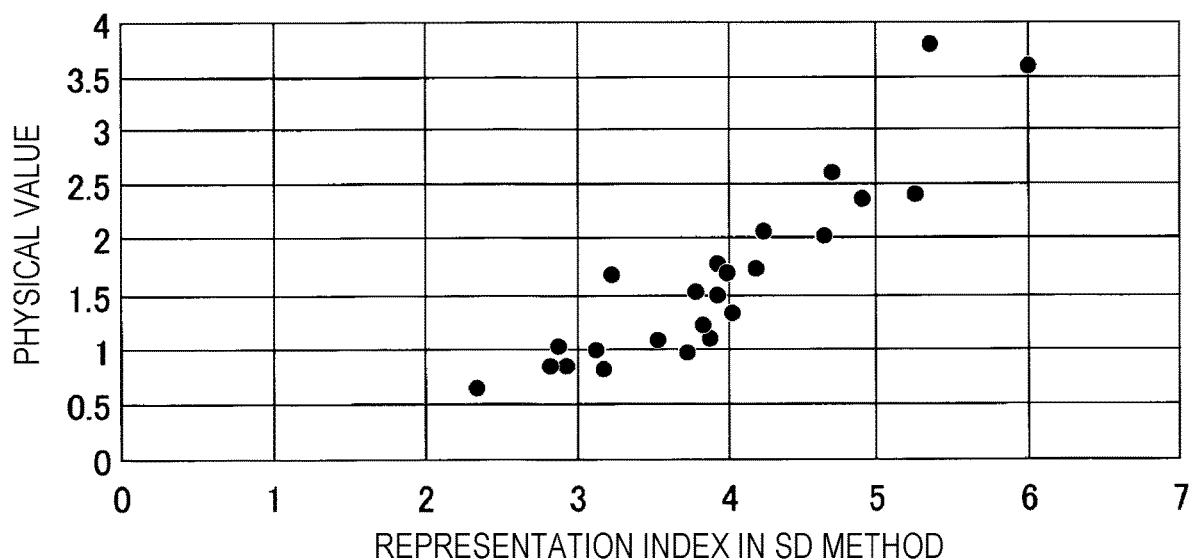
FIG. 14 is a diagram illustrating a relationship between another sensitivity parameter and another physical parameter of the push operation tools.
Figure 15:
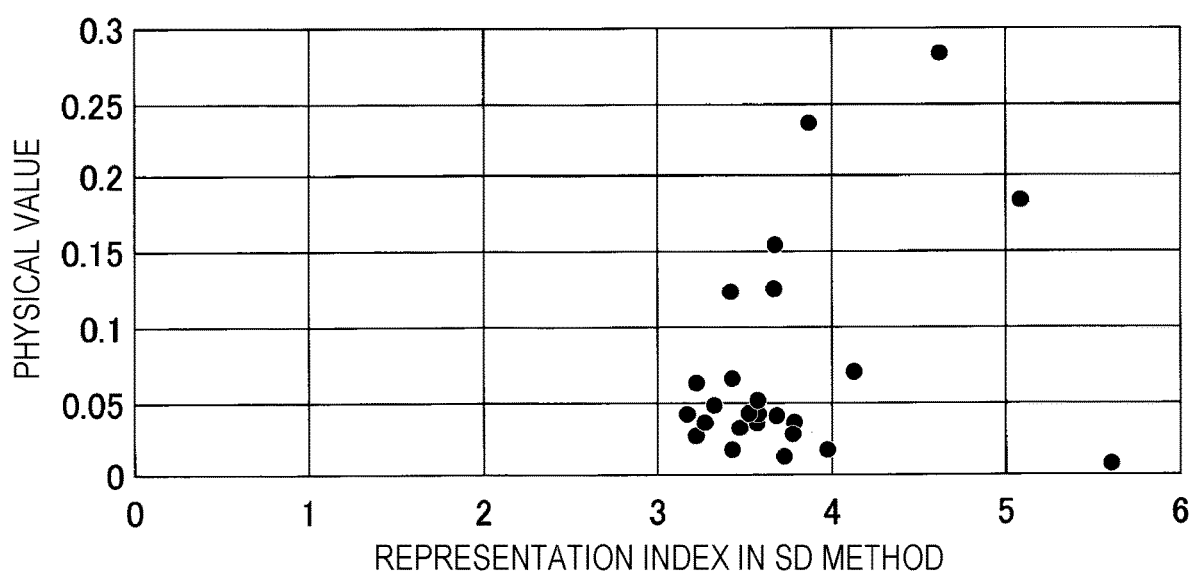
FIG. 15 is a diagram illustrating a relationship between another sensitivity parameter and another physical parameter of the push operation tools.

With respect to the above-described 23 push operation tools, sensory testing was conducted with 25 users for sensitivity parameters other than the sensitivity parameter A. FIGS. 13 to 15 illustrate results. FIGS. 13 to 15 illustrate relationships between representation indices of the sensitivity parameters other than the sensitivity parameter A and physical parameters other than the area S4 that vary depending on the representation indices.

In FIG. 13, a horizontal axis represents a representation index of a sensitivity parameter B. A vertical axis represents a variable relating to strokes of the push operation tools as a physical parameter, the variable being, for example, the "click stroke (Pend−Pmax)" illustrated in FIG. 11. FIG. 13 illustrates a negative correlation where the representation index of the sensitivity parameter B becomes lower as the "click stroke (Pend−Pmax)" as the physical parameter increases. The sensitivity parameter B is a parameter regarding "sense of determination", "comfort", or "tactile sensation", for example, and in the case of the parameter relating to "comfort", a lower representation index may indicate "more comfortable" and a higher representation index may indicate "more uncomfortable".

In the above example, the physical parameter thus includes a variable relating to the amount of displacement caused by an operation. More specifically. the physical parameter includes the "click stroke (Pend−Pmax)", which is the amount of displacement from the maximum of the operation reaction force to coordinates at which the operation reaction force achieves the same value as the maximum after reaching the minimum.

In FIG. 14, a horizontal axis represents a representation index of a sensitivity parameter C. A vertical axis represents a variable relating to loads of the push operation tools as a physical parameter, the variable being, for example, Pmax illustrated in FIG. 11. FIG. 14 illustrates a positive correlation where the representation index of the sensitivity parameter C becomes lower as Pmax as the physical parameter decreases. The sensitivity parameter C is a parameter relating to "sense of determination", "comfort", or "tactile sensation", for example, and in the case of the parameter relating to "tactile sensation", a lower representation index may indicate a softer operating feel and a higher representation index may indicate a harder operating feel.

In FIG. 15, a horizontal axis represents a representation index of a sensitivity parameter D. A vertical axis represents a variable relating to the strokes of the push operation tools as a physical parameter, the variable being, for example, the "push stroke ratio (Pmax)/(Pend−Pmax)" illustrated in FIG. 11. FIG. 15 illustrates a positive correlation where the representation index of the sensitivity parameter D becomes higher as the "push stroke ratio (Pmax)/(Pend−Pmax)" as the physical parameter increases. The sensitivity parameter D is a parameter relating to "sense of determination", "comfort", or "tactile sensation", for example, and in the case of the parameter relating to "tactile sensation", a higher representation index may indicate a sharper tactile sensation, and a lower representation index may indicate a dull tactile sensation.

In the above example, the physical parameter thus includes a variable relating to the amount of displacement caused by an operation. More specifically, the physical parameter includes a variable relating to the "push stroke ratio (Pmax)/(Pend−Pmax)", which is a ratio of the "click stroke (Pend−Pmax)", which is the amount of displacement from the maximum of the operation reaction force to coordinates where the operation reaction force achieves the same value as the maximum after reaching the minimum, to "Pmax", which is the amount of displacement from a beginning of the operation to the maximum.

The conversion model 15 may store a plurality of relationships including, as correlations between a sensitivity parameter and a physical parameter, (1) a relationship between the representation index of the sensitivity parameter A and the area S4 as the physical parameter illustrated in FIG. 12, (2) a relationship between the representation index of the sensitivity parameter B and the click stroke as the physical parameter illustrated in FIG. 13, (3) a relationship between the representation index of the sensitivity parameter C and the maximum value minus the minimum value as the physical parameter illustrated in FIG. 14, and (4) a relationship between the representation index of the sensitivity parameter D and the push stroke ratio as the physical parameter illustrated in FIG. 15. A physical parameter included in a physical quantity of a load displacement curve or the like is calculated by combining together one or more of (1) to (4), and a tactile presentation signal is generated.

As described above, the acceleration of the movable part 21 of the tactile presentation unit 30 illustrated in FIG. 4 can be detected by the acceleration sensor 28. When a disc or dome-shaped leaf spring of an actual push operation tool buckles and reverses as a result of pushing, vibration occurs and is transmitted to a finger or another body part that is pushing the push operation tool to present an operating feel.

Figure 16A:
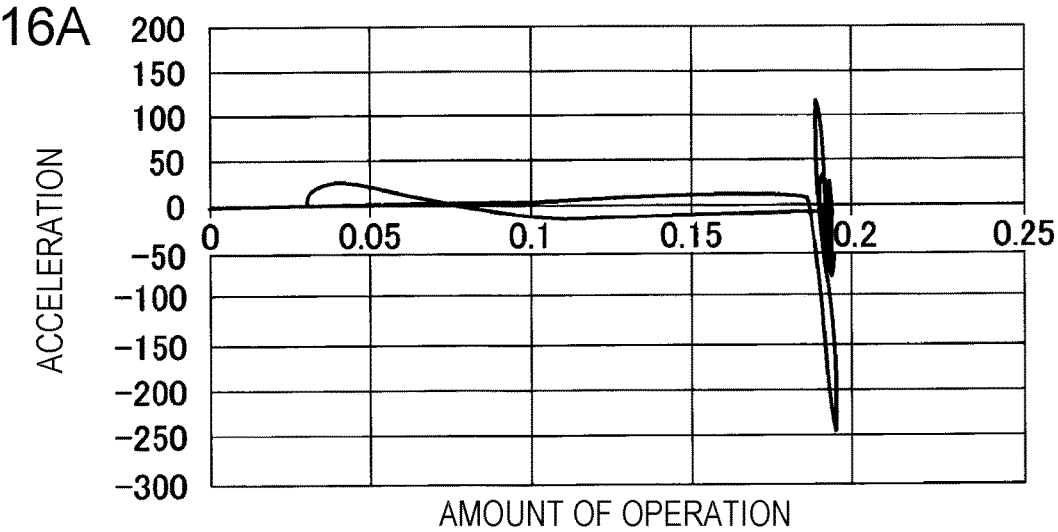
FIGS. 16A to 16C are diagrams illustrating a physical property of push operation tools.
Figure 16B:
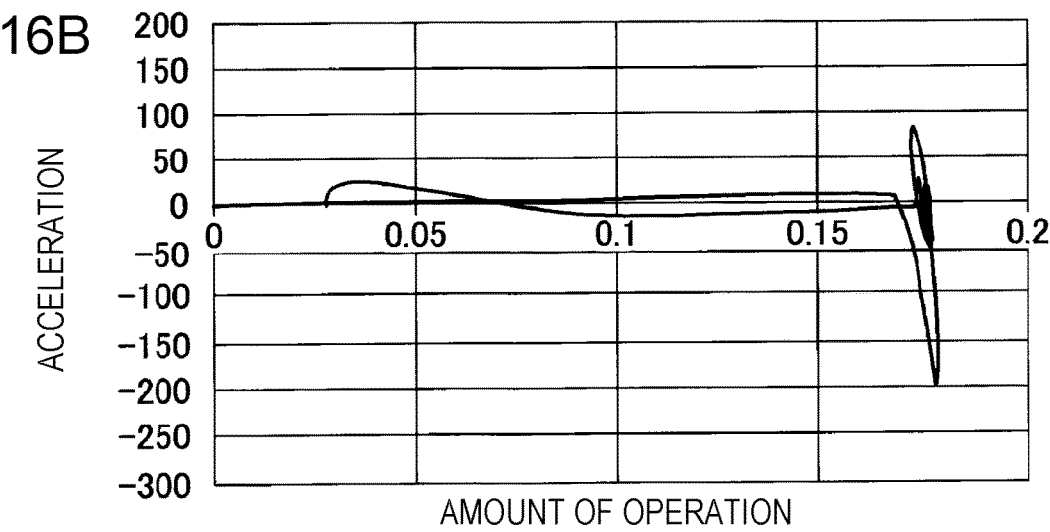
Figure 16C:
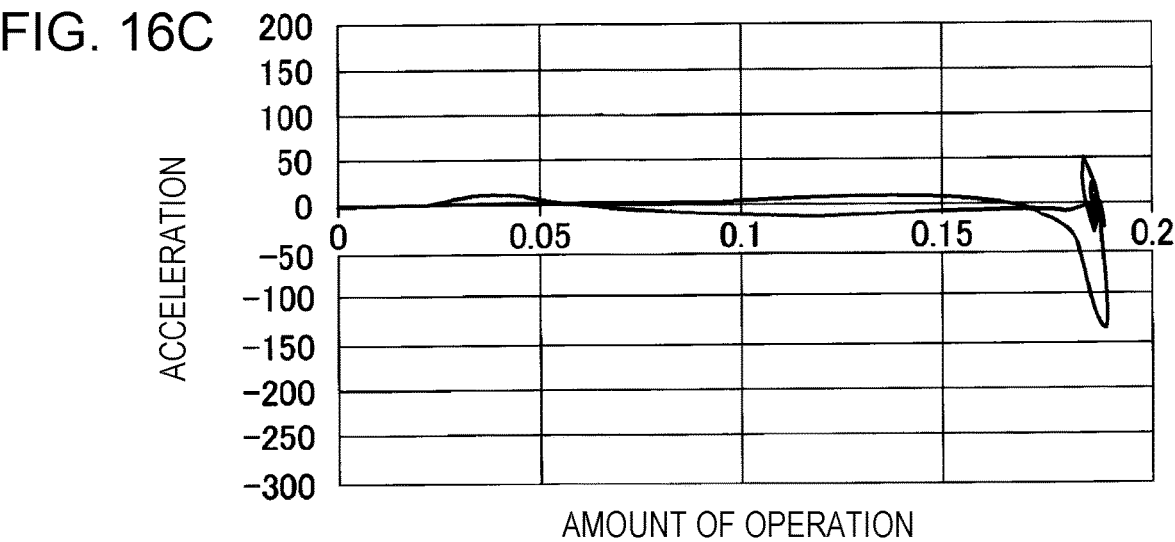

FIGS. 16(A), (B), and (C) illustrate simulation data indicating acceleration of movable parts of three push operation tools as operation tools at times when the push operation tools are pushed. Relationships between a representation index of a sensitivity parameter E relating to operating feels during the pushing and the acceleration of the movable parts of the operation tools as a physical parameter were examined through sensory testing conducted with a user using the three push operation tools. A peak-to-peak value of acceleration when a disc or dome-shaped leaf spring of the push operation tool buckles was the largest in the push operation tool in FIG. 16A and decreases in order of FIG. 16B and FIG. 16C. In the sensory testing conducted on the user, the representation index of the sensitivity parameter E in relation to an operation performed on the push operation tool in FIG. 16A was the lowest, and increased in order of FIG. 16B and FIG. 16C. The sensitivity parameter E is a parameter relating to "sense of determination", "comfort", or "tactile sensation", for example, and in the case of the parameter relating to "comfort", a lower representation index may indicate "more comfortable", and a higher representation index may indicate "more uncomfortable".

The conversion model 15 may store a correlation between the representation index of the sensitivity parameter E and acceleration of a movable part of an operation tool, which is the physical parameter, on the basis of the above-described sensory testing. The tactile control system 1 converts, using the conversion model 15, the representation index of the sensitivity parameter E input from the input unit 4 into the acceleration of the movable part of the operation tool, which is the physical parameter, and can reproduce a desired operating feel using the tactile presentation device 20 by generating a tactile presentation signal based on the acceleration and outputting the tactile presentation signal. For example, on the basis of a physical parameter (the amount of movement, velocity, acceleration, jerk, etc.) of the movable part of the operation tool, a tactile presentation signal for controlling a corresponding physical parameter of the movable part 21 of the tactile presentation device 20 may be generated.

Example of Operation of Tactile Presentation Device 20

Figure 8:
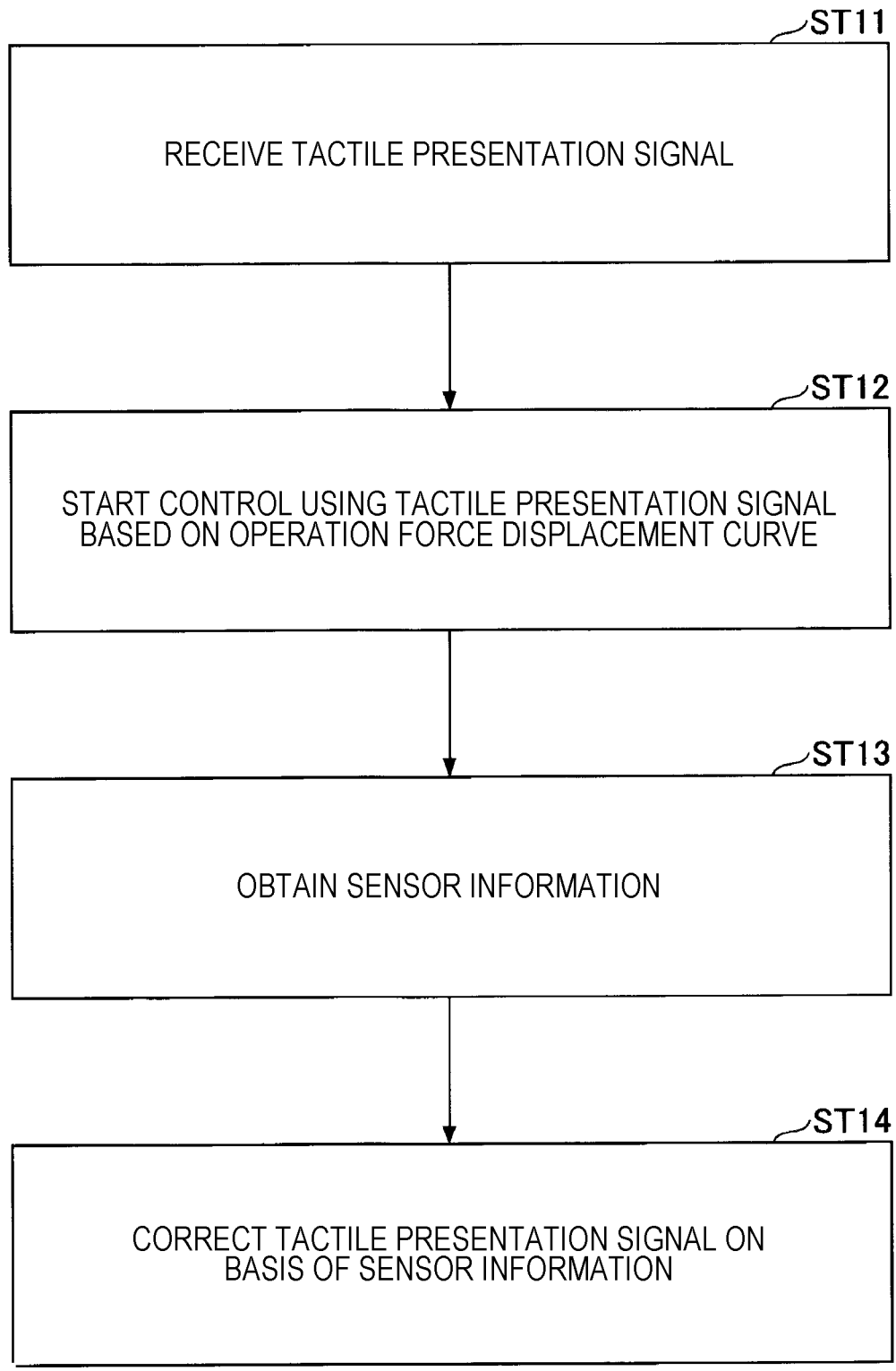
FIG. 8 is a flowchart illustrating a tactile control method using the tactile control system in the present disclosure.

FIG. 8 is a flowchart illustrating an example of a control operation performed by the tactile presentation device 20. A process illustrated in the flowchart is performed through a control operation performed by the processor 18 included in the tactile presentation device 20. In ST11 in FIG. 8, the arithmetic function unit 13 gives a tactile presentation signal to the processor 18 of the tactile presentation device 20, and in ST12, control based on a load displacement curve selected on the basis of a physical parameter starts. In ST13, the operation device 33 is operated, and detection signals relating to the movable part 21 are obtained from the position sensor 27 and the acceleration sensor 28. The processor 18 calculates a difference between an operation profile of a load displacement curve set in correspondence with a representation index, which is a sensitivity parameter, and a detected position of the movable part 21. In ST14, a current I applied to the coil 25 of the tactile presentation unit 30 is optimized, and a tactile sensation is presented such that a representation index of the sensitivity parameter desired by the user can be reproduced.

Modification of Tactile Presentation Device 20

A modification of the tactile presentation device 20 included in the tactile control system 1 will be described with reference to FIGS. 17 to 19. A tactile presentation device 40 illustrated in FIG. 19 reproduces a tactile sensation of a rotary operation tool. The rotary operation tool is, for example, a rotary switch.

Figure 19:
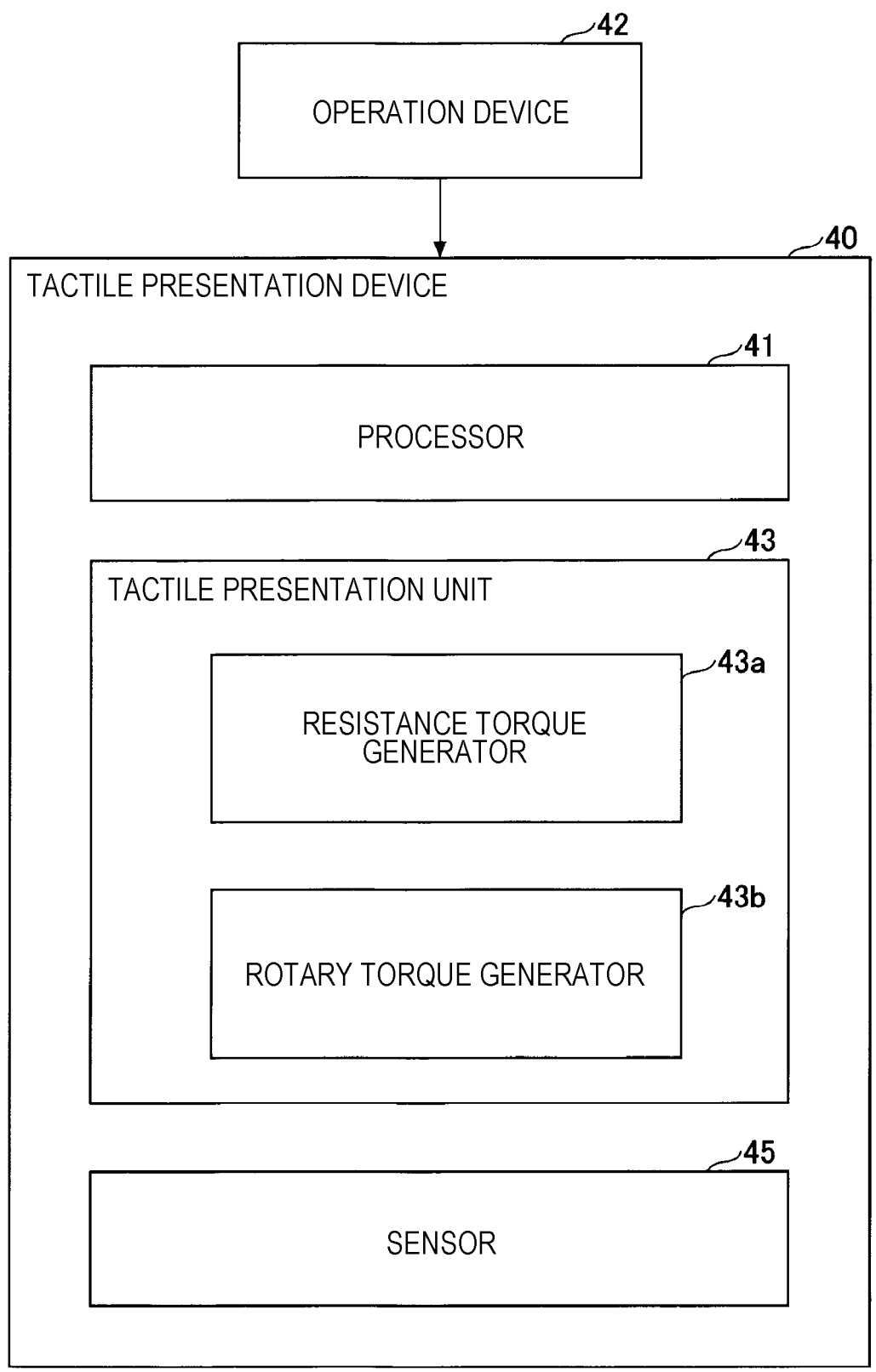
FIG. 19 is a block diagram illustrating the configuration of a rotary operation tool.

The tactile presentation device 40 illustrated in FIG. 19 includes a processor 41, a tactile presentation unit 43, and a sensor 45. The tactile presentation device 40 represents a tactile sensation to a user who rotates an operation device 42. The operation device 42 may be mechanically incorporated into the tactile presentation device 40 or provided outside the tactile presentation device 40.

The tactile presentation unit 43 includes a resistance torque generator 43a and a rotary torque generator 43b. The resistance torque generator 43a variably applies resistance torque during rotation of a rotation unit of the operation device 42 in a direction opposite a rotation direction. The resistance torque generator 43a includes, for example, a yoke composed of a magnetic material and a coil that gives a magnetic field to the yoke. A rotary plate that rotates in conjunction with rotation of the rotation unit of the operation device 42 is located in a magnetic gap of the yoke, and the magnetic gap is filled with a magnetorheological fluid between the yoke and the rotary plate. A magnetic powder may be used instead of the magnetorheological fluid. By controlling the current applied to the coil, an aggregation state of the magnetorheological fluid changes, and the resistance torque varies. The resistance torque generator 43a includes a rotary motor, for example, in addition to the above components, and can vary the resistance torque using the rotary motor. The rotary torque generator 43b variably applies the rotary torque to rotation of the rotation unit of the operation device 42 in the rotation direction. The rotary torque generator 43b includes, for example, a rotary motor. The sensor 45 detects a rotation angle of the rotation unit of the operation device 42.

Figure 18:
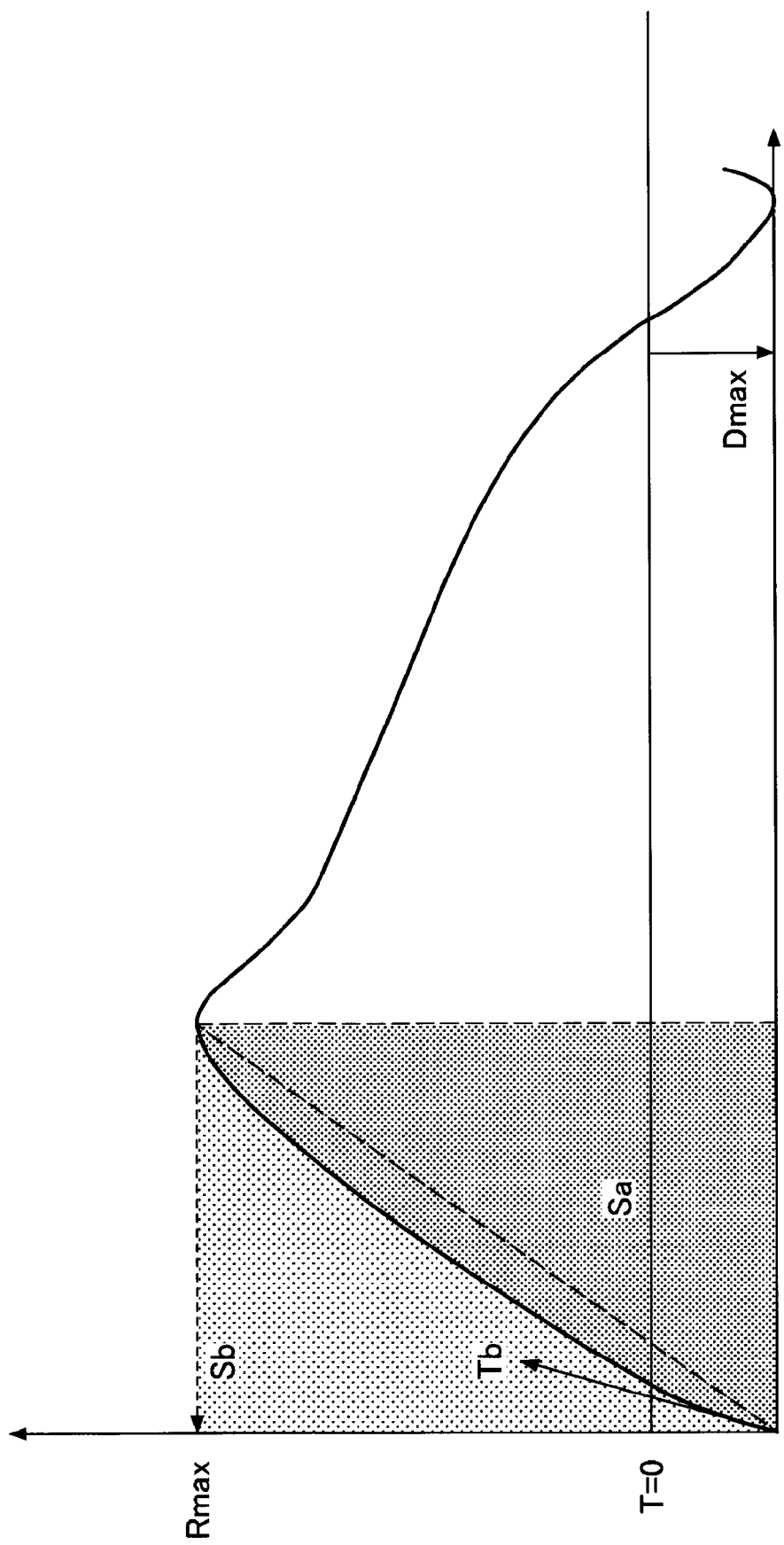
FIG. 18 is a diagram illustrating a physical property of a rotary operation tool.

FIG. 18 illustrates a load displacement curve relating to operation reaction force of a rotary switch, which is a rotary operation tool. In the rotary switch, 360 degrees (one rotation) are divided into a plurality of sub-angles.

Operation reaction force changes in each sub-angle, and the same changes in the operation reaction force are repeated in the sub-angles. FIG. 18 illustrates changes in the operation reaction force in each sub-angle. A horizontal axis in FIG. 18 represents a rotation angle of a rotation unit as the amount of operation of the rotary switch. A positive side of a vertical axis represents resistance torque acting upon the rotation unit of the rotary switch in a direction opposite an operation direction, and a negative side of the vertical axis represents rotation torque acting upon the rotation unit in the same direction as the operation direction. The rotary switch is provided with a spring contact in each sub-angle. When rotation is performed in a sub-angle, the spring contact contracts, and resistance torque acting upon the rotation unit increases. When the resistance torque exceeds a maximum value Rmax, the rotation unit is pushed in the rotation direction due to restoring force of the spring contact, the resistance torque decreases, and rotation torque acts upon the rotation unit from the spring contact in the operation direction. When the rotation unit is rotated, therefore, an operating feel is given to a finger in each sub-angle.

The conversion model 15 stores correlations between representation indices of sensitivity parameters relating to rotation and physical parameters. The tactile control system 1 receives an input of representation indices of sensitivity parameters through the input unit 4. The processor 14 of the tactile control system 1 then converts, using the conversion model 15, the received sensitivity parameters into physical parameters and generates a tactile sensation signal based on the physical parameters. The processor 14 then outputs the generated tactile presentation signal to the processor 41 included in the tactile presentation device 40 illustrated in FIG. 19. When the rotation unit of the operation device 42 is rotated by the user's finger or another body part, the tactile presentation device 40 detects a rotation angle of the rotation unit with the sensor 45 and feeds the detected output back to the processor 41. Since the processor 41 controls the tactile presentation unit 43, resistance torque and rotation torque when the rotation unit of the operation device 42 is rotated can be controlled, and a tactile sensation simulating a rotary switch that reproduces the representation indices of the sensitivity parameters can be presented.

Figure 17A:
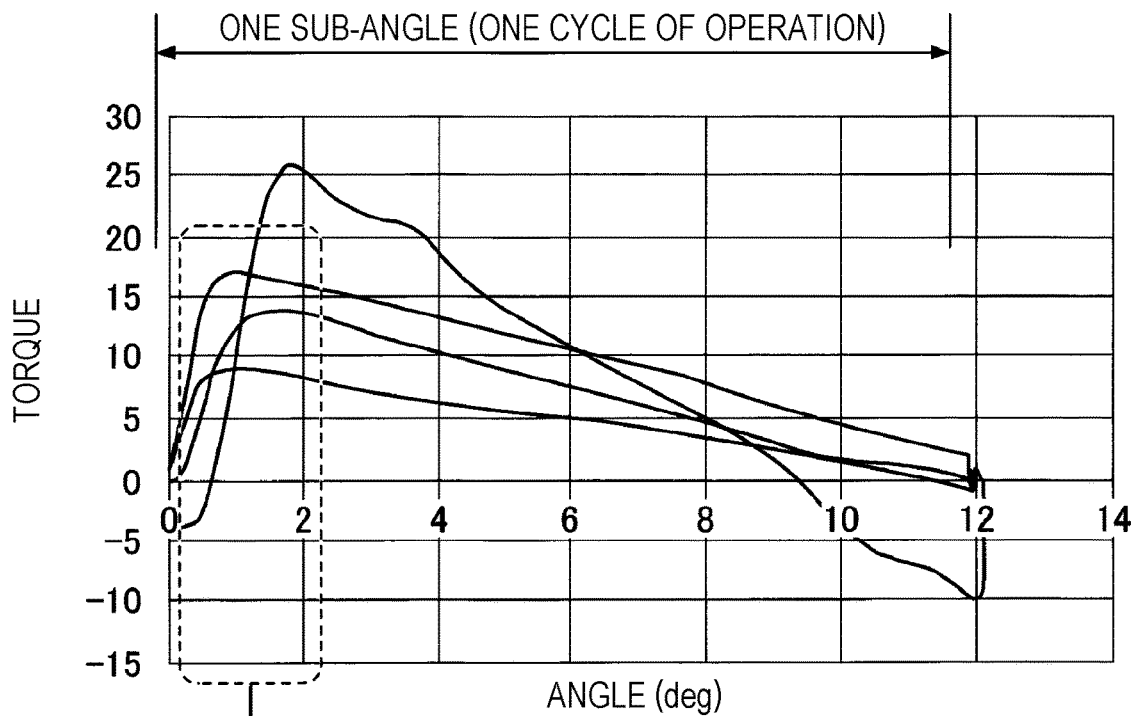
FIGS. 17A and 17B are diagrams illustrating relationships between a sensitivity parameter and a physical parameter of rotary operation tools.
Figure 17B:
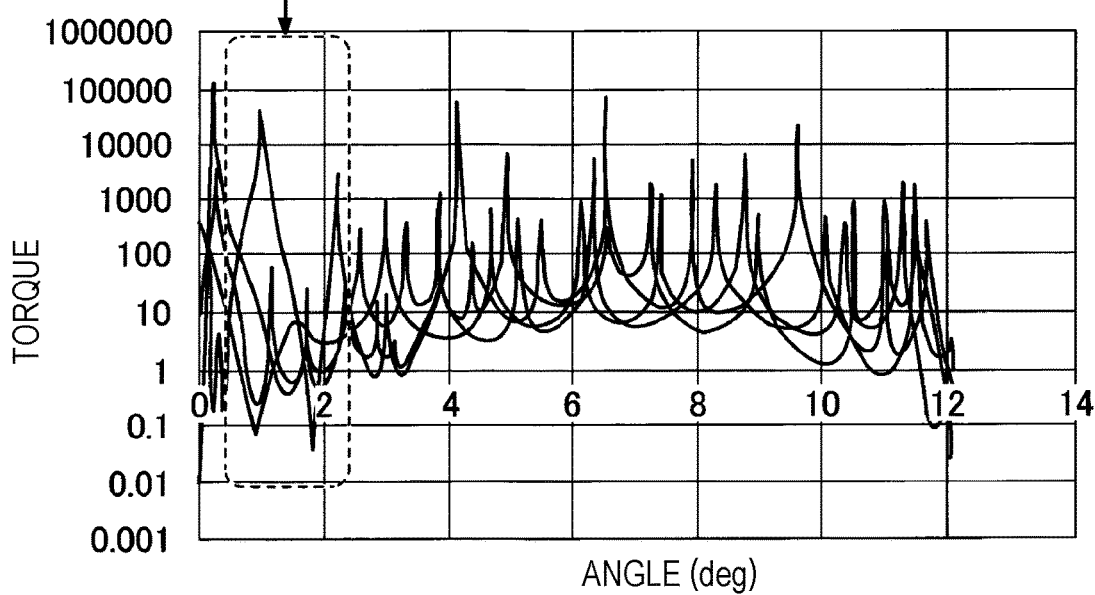

FIGS. 17A and 17B are diagrams illustrating changes in the resistance torque as an example of a physical property relating to representation indices of sensitivity parameters. FIG. 17A illustrates, as load displacement curves, operation reaction force at times when four rotary switches are rotated, and FIG. 17B illustrates changes in curvature of the load displacement curves illustrated in FIG. 17A. In sensory testing conducted with a plurality of users, when a rotation unit was rotated by a finger or another body part, resistance torque passes through a peak that is the maximum value Rmax, and it was concluded that a representation index of a sensitivity parameter F became higher as curvature of change in an operating line at the peak decreases. That is, it was confirmed that the representation index of the sensitivity parameter F was correlated with the curvature of an inflection, where a rotation load switches from an increase to a decrease. When the conversion model 15 stores a correlation between the representation index of the sensitivity parameter F and the physical parameter whose variable is the curvature of change in the resistance torque, therefore, the tactile presentation device 40 can present a rotating feel that achieves the representation index of the sensitivity parameter F as a tactile sensation. The sensitivity parameter F is a parameter relating to "sense of determination", "comfort", or "tactile sensation", for example, and in the case of the parameter relating to "tactile sensation", a higher representation index may indicate a sharper tactile sensation, and a lower representation index may indicate a dull tactile sensation.

In the above example, changes in operation reaction force in response to displacement caused by an operation performed on the operation tool include at least a maximum. The physical parameter includes a variable relating to the curvature of the maximum including the maximum value Rmax. Here, the maximum is a part of the load displacement curve illustrated in FIG. 18 including the maximum value Rmax.

As illustrated in FIG. 18, a physical parameter including a variable relating to a rise at an increase in a rotation load, such as an angle of a rising vector Tb of resistance torque from a start point of a sub-angle in the rotation angle as the amount of operation of the rotary switch or a ratio of area Sa to Sb indicated by a load displacement curve at a rise of resistance torque, and a representation index of an adjective, such as a "hard operating feel, resistance", as a sensitivity parameter can be associated with each other. In this example, the physical parameter thus includes a variable relating to a rise of operation reaction force from a beginning of an operation to a maximum.

Here, the area Sa illustrated in FIG. 18 is area defined by the load displacement curve, the horizontal axis, and a straight line that passes through an intersection between the load displacement curve and the maximum value Rmax and that is parallel to the vertical axis. In other words, the area Sa is a value obtained by integrating the load displacement curve within a range of rotation angles from a start point of a sub-angle in the rotation angle as the amount of operation to the maximum value Rmax of the operation reaction force. The area Sb is area defined by the load displacement curve, the vertical axis, and a straight line that passes through the maximum value Rmax and that is parallel to the horizontal axis. In other words, the area Sb is area obtained by subtracting the area Sa from area of a rectangle where a side thereof is a value of the rotation angle at the intersection between the load displacement curve and the maximum value Rmax and another side thereof is the maximum value Rmax. That is, when operation reaction force linearly changes on a coordinate plane from a beginning of an operation to the maximum value Rmax as indicated by a broken line in FIG. 18, for example, area Sa area Sb=1:1, which means that the load displacement curve bulges more greatly on the positive side of the vertical axis on the coordinate plane as the area Sb becomes smaller relative to the area Sa. That is, the ratio of the area Sa to the area Sb indicates how greatly the load displacement curve bulges. The rising vector Tb of the resistance torque as the physical parameter illustrated in FIG. 18 includes a variable relating to a derivative relating to the amount of operation of operation reaction force. Similarly, the physical parameters may include a variable relating to a derivative relating to operation time of operation reaction force or a variable relating to a second derivative of displacement of operation reaction force.

A maximum value Dmax of rotation torque (pull-in torque) illustrated in FIG. 18 acting in the same direction as the operation direction, that is, a variable relating to the amount of pull with which a direction of the rotation load is reversed, and a representation index of an adjective such as "fast rotation" can be associated with each other. In this example, the physical parameters thus include a variable relating to the amount of pull with which a minimum becomes negative. Here, the minimum is a part of the load displacement curve illustrated in FIG. 18 including the maximum value Dmax.

In the above example, FIG. 18 illustrates the load displacement curve relating to the operation reaction force of a rotary switch, which is a rotary operation tool. FIG. 18, however, may be used as a diagram illustrating a load displacement curve relating to operation reaction force of a slide switch that receives sliding of a sliding unit. That is, the horizontal axis in FIG. 18 represents the amount of sliding of the sliding unit, and the positive side of the vertical axis represents operation reaction force in relation to sliding of the sliding unit. As the amount of sliding of the sliding unit increases, the operation reaction force gradually increases, reaches the maximum value Rmax, begins to decrease after the maximum value Rmax, and reaches a minimum value (a maximum value on a negative side of the vertical axis) Dmax as pulling force acting in the same direction as the operation direction. An operating feel can thus be presented in accordance with an operation performed on a slide switch.

The correlations between sensitivity parameters and physical parameters described for the rotary switch hold true for the slide switch.

First Modification of Sensory Control Method

A first modification of the sensory control method performed by the sensory control system 100 in the present disclosure further includes a step of obtaining a sensory stimulation signal and a step of specifying sensitivity parameters on the basis of the obtained sensory stimulation signal. The above-described step of receiving an input of sensitivity parameters is not limited to an input from a user or the like and is a step of receiving sensitivity parameters specified in the step of specifying. As a result, the sensory control system 100 according to the first modification can specify sensitivity parameters on the basis of an obtained sensory stimulation signal and output a sensory presentation signal based on physical parameters correlated with the specified sensitivity parameters.

Here, the sensory stimulation signal is an auditory stimulation signal based on an auditory stimulation element such as a sound, a visual stimulation signal based on a visual stimulation element such as an image or a video, a tactile stimulation signal based on a tactile stimulation element such as operation reaction force or vibration, or a signal based on any combination of these. In the step of obtaining, the sensory control system 100 according to the first modification may generate and obtain a sensory stimulation signal by sensing an auditory stimulation element, a visual stimulation element, a tactile stimulation element, or a combination of these.

In the step of specifying, the sensory control system 100 according to the first modification may convert physical parameters included in physical properties of at least an auditory stimulation element, a visual stimulation element, or a tactile stimulation element (hereinafter generically referred to as a sensory stimulation element) that forms a basis of a sensory stimulation signal into sensitivity parameters correlated with the physical parameter and specify the sensitivity parameters. When physical parameters are converted into sensitivity parameters correlated therewith, the above-described conversion model 15 may be used, or a conversion model other than the conversion model 15 may be used. The conversion model other than the conversion model 15 can be generated, as with the conversion model 15, through an artificial intelligence (AI) analysis or the like including machine learning on the basis of the correspondence information stored in the sensitivity database 16. Physical parameters included in physical properties of a sensory stimulation element such as a sound, an image, or a video can be extracted through an AI analysis or the like including machine learning.

As described above, the sensory control system 100 according to the first modification can obtain a sensory stimulation signal based on a sensory stimulation element such as a sound, an image, or a video, extract physical parameters included in physical properties of the sensory stimulation element through an AI analysis or the like, specify correlated sensitivity parameters, and output a sensory presentation signal based on physical parameters correlated with the specified sensitivity parameters. As a result, a tactile presentation signal based on sensitivity parameters adjusted on the basis of a sound, an image, or a video, for example, can be output.

Second Modification of Sensory Control Method

The operation device 33 in the present disclosure may include an operation surface that receives sliding. Sliding is an operation where a user's finger or another body part moves while being in contact with the operation surface of the operation device 33. In this case, the tactile presentation unit 30 in the present disclosure causes operation reaction force by vibrating the operation surface of the operation device 33. A method for vibrating the operation surface of the operation device 33 may be, for example, vibration of a weight by an actuator or the like. A step of presenting a sensation in a second modification of the sensory control method in the present disclosure may be a step of presenting a tactile sensation by causing, using the operation device 33 and the tactile presentation unit 30, operation reaction force from the tactile presentation unit 30 in response to sliding performed on the operation device 33. More specifically, in the step of presenting a sensation, when sliding is performed on the operation surface of the operation device 33, the operation device 33 detects the sliding and causes operation reaction force from the tactile presentation unit 30 in response to the detected sliding.

Physical parameters convertible on the basis of the conversion model 15 stored in the storage unit 11 of the sensory control system 100 according to the second modification include parameters relating to changes in operation reaction force in response to displacement caused by sliding performed on the operation device 33, and the changes in the operation reaction force include at least a maximum and a minimum. By controlling the tactile presentation unit 30 on the basis of a tactile presentation signal based on such physical parameters in the step of presenting a sensation, changes in the operation reaction force in response to displacement caused by sliding performed on the operation device 33 can be simulated such that the changes include the maximum or the minimum. Here, the tactile presentation unit 30 supplies a driving signal for causing vibration of the operation surface of the operation device 33 on the basis of a received tactile presentation signal to drive the operation surface in a first direction at rises of the driving signal and in a second direction, which is opposite the first direction, at falls of the driving signal. The maximum or the minimum, therefore, can be simulated by making temporal changes of the rises and the falls of the driving signal different from each other and making average force in the first direction corresponding to the rises or the second direction corresponding to the falls in given time larger than the other. Here, the driving signal for causing vibration of the operation surface of the operation device 33 may be, for example, a signal for driving a weight using an actuator or the like and cause vibration of the operation surface indirectly through the vibration of the weight.

Figure 24A:
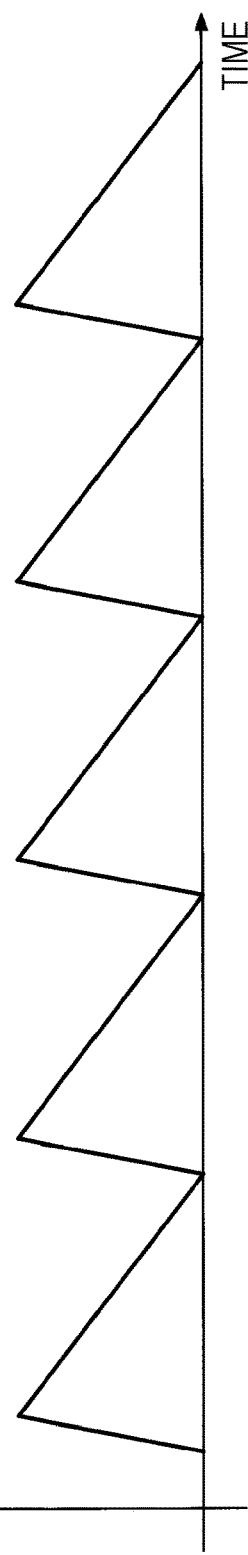
FIGS. 24A and 24B are diagrams illustrating examples of temporal changes in intensity of a driving signal supplied to a weight on the basis of a tactile presentation signal.
Figure 24B:
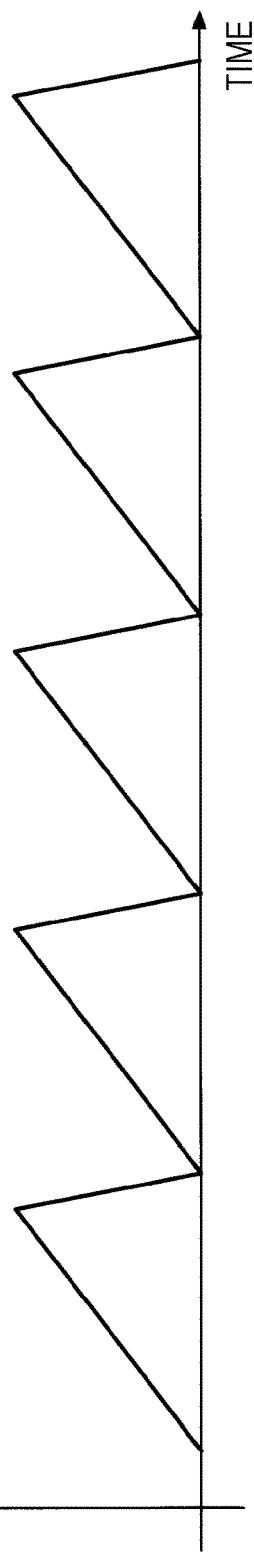

FIGS. 24A and 24B are diagrams illustrating examples of temporal changes in intensity of the driving signal supplied to the weight on the basis of a tactile presentation signal. In the examples illustrated in FIGS. 24A and 24B, when a temporal change in the intensity of the driving signal is positive, the weight is driven in the first direction, and when a temporal change in the intensity of the driving signal is negative, the weight is driven in the second direction. As illustrated in FIG. 24A, when temporal changes in rises of the driving signal for the weight are larger on average in given time than temporal changes in falls of the driving signal for the weight, force in the first direction corresponding to the rises of the driving signal is larger than force in the second direction corresponding to the falls of the driving signal. When temporal changes in falls of the driving signal for the weight are larger on average in given time than temporal changes in rises of the driving signal for the weight as illustrated in FIG. 24B, on the other hand, force in the first direction corresponding to the rises of the driving signal is larger than force in the second direction corresponding to the falls of the driving signal. The maximum or the minimum can thus be simulated by switching between a period illustrated in FIG. 24A where the force in the first direction is increased and a period illustrated in FIG. 24B where the force in the second direction is increased.

The first direction and the second direction may be directions intersecting with the operation surface of the operation device 33 or may be directions along the operation surface (parallel directions). When the first direction and the second direction are directions intersecting with the operation surface of the operation device 33, for example, drag in a direction in which the operation surface is pushed varies in relation to the user's finger or another body part that performs sliding on the operation surface, and friction, that is, operation reaction force, between the body part and the operation surface during the sliding can be varied. When the first direction and the second direction are directions along the operation surface of the operation device 33, for example, drag on the operation surface in a sliding direction varies in relation to the user's finger or another body part that performs sliding on the operation surface, and friction, that is, operation reaction force, between the body part and the operation surface during the sliding can be varied.

The conversion model 15 stored in the storage unit 11 of the sensory control system 100 according to the second modification may be obtained by a method for generating a conversion model including the following step of storing. That is, in the step of storing in the method for generating a conversion model according to the second modification, the sensitivity database 16 stores, for each of certain one or more operation tools, correspondence information where physical properties for achieving a sensory presentation at a time when the certain operation tool is operated and sensitivity parameters input on the basis of the operation performed on the certain operation tool. Here, the operation tools each include an operation surface that receives sliding. Changes in operation reaction force in response to displacement caused by sliding performed on the operation tool include at least a maximum and a minimum. Here, the operation reaction force is caused by vibration of the operation surface of the operation tool. As with the vibration of the operation surface of the operation device 33, the vibration of the operation surface of the operation tool may be indirect vibration caused by an actuator through vibration of a weight. The maximum or the minimum included in changes in operation reaction force in response to displacement caused by sliding performed on the operation tool is simulated by making temporal changes of rises and falls of a driving signal, which cause the vibration of the operation surface of the operation tool, different from each other and making average force in a direction corresponding to the rises or a direction corresponding to the falls in given time larger than the other. By using such an operation tool, the conversion model 15 in this example can be generated more easily.

Modification of Sensitivity Database 16

As described above, the sensitivity database 16 in the present disclosure stores, for each of certain one or more sensory presentations, correspondence information where physical properties relating to the certain sensory presentation and sensitivity parameters indicating degrees of sensory representations in response to the sensory presentation. Although tactile presentation has been mainly described as sensory presentation, a "tactile sensation" mainly mentioned herein is a tactile sensation in a broad sense, which is a concept including a tactile sensation in a narrow sense, a pressure sensation, and a force sensation. When a term "tactile sensation" is simply used herein, the term refers to a tactile sensation in a broad sense. Here, the tactile sensation in a narrow sense is, for example, a sensation relating to texture of a surface of an object touched by a body part and is highly correlated with sensitivity parameters relating to sensory representations such as unevenness and roughness. The pressure sensation is, for example, a sensation relating to drag between a body part and an object and is highly correlated with sensitivity parameters relating to sensory representations such as hardness. The force sensation is, for example, a sensation relating to external force applied to a body part and is, for example, a sensation of being pulled or pushed. It is known that receptors mainly related to the tactile sensation in a narrow sense, the pressure sensation, and the force sensation are different from one another and that response characteristics of the receptors are also different from one another.

Physical properties relating to a tactile presentation include static properties and dynamic properties. The static properties are physical properties obtained when, for example, an operation tool is operated with a constant operation velocity using a tool or the like whose rigidity is high enough to ignore elasticity (hereinafter simply referred to as a rigid body). The dynamic properties are, for example, physical properties obtained when an operation tool is operated with varying operation velocities using an elastic material simulating a human body part such as a finger and include, unlike the static properties, physical parameters such as an elastic property of a body part, operation velocity, operation acceleration, operation jerk, and friction.

The correspondence information stored in the sensitivity database 16 may be information associated with at least information regarding the tactile sensation in a narrow sense, the pressure sensation, and the force sensation included in the tactile sensation in a broad sense or information regarding the static properties and the dynamic properties included in the physical properties. The correspondence information stored in the sensitivity database 16 may be, for example, information where weighting of the static properties and the dynamic properties of the sensation in a narrow sense, the pressure sensation, and the force sensation varies depending on a stage of an operation performed on the operation tool. More specifically, for example, the weighting of the static properties may be heavier than that of the dynamic properties at a stage of an operation immediately after the operation starts, and at stages of the operation where operation reaction force in response to displacement caused by the operation greatly varies (e.g., stages of the operation corresponding to the maxima of the load displacement curves illustrated in FIGS. 11 and 18 and the minimum of the load displacement curve illustrated in FIG. 11), the weighting of the dynamic properties may be heavier than that of the static properties. This is because an effect of operation velocity and the like might be small at the stage of the operation immediately after the operation starts and the physical properties can be accurately reproduced when the physical properties are approximated using the static properties, but at the stages of the operation where the operation reaction force in response to displacement caused by the operation greatly varies, the effect of operation velocity and the like might be large and in this case, the dynamic properties need to be used to accurately reproduce the physical properties. The correspondence information stored in the sensitivity database 16 may be information including physical properties that reflect differences in response characteristics between the receptors mainly related to the tactile sensation in a narrow sense, the pressure sensation, and the force sensation, respectively. By generating the conversion model 15 on the basis of such correspondence information, tactile presentation that better reflects human sensitivity can be performed.

Information Processing Device 2

Figure 20:
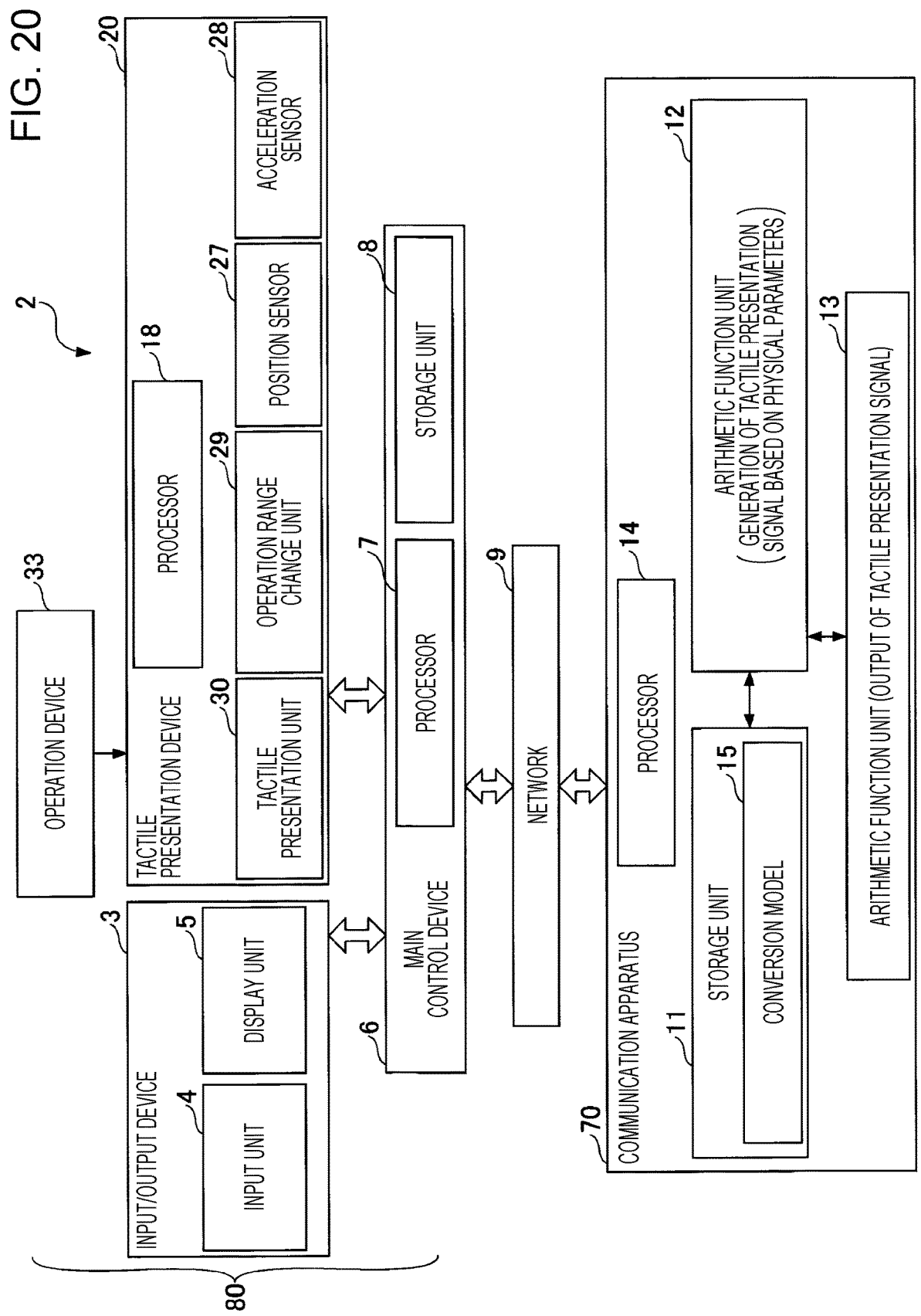
FIG. 20 is a block diagram illustrating a tactile control system as a second embodiment of the sensory control system according to the embodiment of the present disclosure.

FIG. 20 illustrates the configuration of a tactile control system 2 as a second embodiment of the sensory control system 100 illustrated in FIG. 1 along with the flow of a signal.

The tactile control system 2 illustrated in FIG. 20 includes a terminal apparatus 80 and a communication apparatus 70, which are communicably connected to each other over a network 9. The terminal apparatus 80 includes a main control device 6, an input/output device 3, and a tactile presentation device 20. The main control device 6 includes a processor 7 and a storage unit 8 and controls operation of the input/output device 3 and the tactile presentation device 20. The tactile presentation device 20 includes a tactile presentation unit 30, an operation range change unit 29, and sensors such as a position sensor 27 and an acceleration sensor 28. The communication apparatus 70 is a server apparatus, for example, and includes the processor 14, the storage unit 11, the arithmetic function unit 12, and the arithmetic function unit 13. The storage unit 11 stores the conversion model 15.

Among the components included in the tactile control system 2, the input/output device 3, the tactile presentation device 20, the processor 14, the storage unit 11, the arithmetic function unit 12, and the arithmetic function unit 13 are the same as those included in the tactile control system 1 illustrated in FIG. 2 to which the same reference numerals are given, and description thereof is omitted. The tactile control system 2 is the same as the tactile control system 1 in that the terminal apparatus 80 may include the operation device 33 and the tactile presentation unit 30 may present a tactile sensation to a user who operates the operation device 33. Furthermore, the tactile control system 2 may include the tactile presentation unit 43 illustrated in FIG. 19 instead of the tactile presentation unit 30 and the operation device 42 illustrated in FIG. 19 instead of the operation device 33.

FIG. 21 is a sequence diagram illustrating operation of the tactile control system 2. FIG. 21 illustrates processing performed by the terminal apparatus 80 and the communication apparatus 70 included in the tactile control system 2 as steps (ST). First, in ST31, the terminal apparatus 80 receives an input of sensitivity parameters. More specifically, the terminal apparatus 80 receives sensitivity parameters input by the user through the input unit 4 of the input/output device 3. Next, in ST32, the terminal apparatus 80 encodes information regarding the sensitivity parameters and transmits the encoded information regarding the sensitivity parameters to the communication apparatus 70 over the network 9. The terminal apparatus 80 may include an encoder for encoding information regarding sensitivity parameters. The terminal apparatus 80 may encode part or the entirety of the information regarding the sensitivity parameters.

After ST32, in ST21, the communication apparatus 70 decodes the information received from the terminal apparatus 80 to obtain the information regarding the sensitivity parameters. The communication apparatus 70 may include a decoder for decoding information regarding sensitivity parameters. Next, in ST22, the communication apparatus 70 converts, using the conversion model 15, the sensitivity parameters into physical parameters correlated with the sensitivity parameters. Next, in ST23, the communication apparatus 70 encodes the physical parameters obtained as a result of the conversion and transmits information regarding the encoded physical parameters to the terminal apparatus 80 over the network 9. The communication apparatus 70 may include an encoder for encoding information regarding physical parameters. The communication apparatus 70 may encode part or the entirety of the information regarding the physical parameters.

After ST23, in ST33, the terminal apparatus 80 decodes the received information to obtain the information regarding the physical parameters. The terminal apparatus 80 may include a decoder for decoding information regarding physical parameters. Thereafter, in ST34, the terminal apparatus 80 generates a tactile presentation signal based on the physical parameters and operates the tactile presentation device 20. The encoding and the decoding in ST32, ST21, ST23, and ST33 are not mandatory.

When sensitivity parameters are input to the terminal apparatus 80, the tactile control system 2 according to the present embodiment can thus receive information regarding physical parameters correlated with the sensitivity parameters from the communication apparatus 70 over the network 9 and present a tactile sensation based on a tactile presentation signal based on the physical parameters. The tactile control system 2, therefore, can perform tactile presentation that reflects human sensitivity through communication of tactile information over the network 9. The tactile control system 2 is effective especially in a field of tactile Internet.

Although a problem such as a communication delay tends to occur due to an increase in the amount of data when all physical parameters included in physical properties relating to a tactile presentation are to be communicated, the tactile control system 2 according to the present embodiment can reduce the amount of data since physical parameters correlated with sensitivity parameters are extracted and communicated. This can contribute to increasing communication speed and reducing loads of processors and the like. This effect is also produced by the tactile control system 1 according to the first embodiment but is effective especially in the tactile control system 2 according to the present embodiment, which uses tactile Internet.

The tactile control system 2 according to the present embodiment may include a plurality of terminal apparatuses 80. That is, the communication apparatus 70 may be connected to each of the plurality of terminal apparatus 80 over the network 9. In this case, the communication apparatus 70 may store identification information, such as addresses or IDs, specifying the plurality of terminal apparatuses 80 and conversion models 15 associated with different pieces of the identification information. As a result, an optimal conversion model 15 can be used for each of users who use the terminal apparatuses 80.

A plurality of conversion models 15 may be stored in the communication apparatus 70 of the tactile control system 2 according to the present embodiment for different purposes (for gaming purposes, vehicle purposes, etc.), for example, and different conversion models may be used in accordance with purposes or the like required by the terminal apparatus 80. As a result, an optimal conversion model 15 can be used for different purposes or the like such that different physical parameters can be selected for different purposes, for example, even when the physical parameters are obtained from the same sensitivity parameters through conversion.

Although FIG. 20 illustrates an example where the conversion model 15 is stored in the storage unit 11 of the communication apparatus 70, the conversion model 15 may be stored in the storage unit 8 of the main control device 6 of the terminal apparatus 80, instead. In this case, for example, the communication apparatus 70 may distribute information regarding sensitivity parameters (includes encoded information etc.), and the main control device 6 of the terminal apparatus 80 may convert the sensitivity parameters into physical parameters to generate a tactile presentation signal based on the physical parameters correlated with the sensitivity parameters.

Application Examples of Tactile Control Systems 1 and 2

The tactile control system 1 according to the first embodiment can be used, for example, for entertainment purposes including games, videos, and music. When the tactile control system 1 is used for entertainment purposes, for example, a tactile sensation from the tactile presentation device 20 may be presented to a user through an operation unit, such as a button, a joystick, or a trigger switch, included in the operation device 33 such as a gaming controller. Alternatively, a tactile sensation from the tactile presentation device 20 may be presented to a part other than the operation unit of the operation device 33, namely, for example, part or the entirety of the user's body part holding the operation device 33, such as the user's hands. The gaming controller may be, for example, a steering controller simulating a steering wheel of an automobile.

Tactile presentation may be performed on the user through the operation device 33 when an operation performed on the operation unit included in the operation device 33 is detected, when an operation, such as movement, rotation, acceleration, or deceleration, performed on part or the entirety of the operation device 33 is detected, or when tactile presentation is performed in accordance with content. A time when a tactile sensation is presented in accordance with content may be a time of tactile presentation set in advance in order to increase a sense of realism, for example, in the content such as a game, a video, or music or a time when an operation from the user is not being detected.

When the tactile control system 1 is used for entertainment purposes, tactile presentation by the tactile presentation device 20 is not limited to that through the operation device 33. The tactile presentation by the tactile presentation device 20 may be performed through, for example, a seat on which the user is seated, a suit worn exclusively by the user, a headset used for virtual reality (VR) purposes or augmented reality (AR) purposes, gloves or another garment that the user wears on his/her body part, or another wearable device. A feel of operating a virtual switch in a VR or AR space, for example, may be presented through a wearable device.

The tactile control system 1 according to the first embodiment may be used, for example, for vehicle purposes. When the tactile control system 1 is used for vehicle purposes, tactile presentation by the tactile presentation device 20 may be performed on an occupant through, for example, a device used for driving, such as a steering wheel, a pedal, or a gear shift, the operation device 33 such as an infotainment system, an air conditioning unit, or a decorative panel, or a seat. Here, the decorative panel is a device that is provided at any position inside a vehicle such as a door trim, a pillar, a glove box, a center console, a dashboard, or an overhead console to be part of the vehicle interior and that is capable of displaying information through a contact operation or an approach operation.

When the tactile control system 1 is used for vehicle purposes, main purposes for tactile presentation include notifying an occupant of an input operation performed on the operation device 33 or the like and warning an occupant against lane departure, approaching other vehicles, or the like. That is, the purposes might be different from when the tactile control system 1 is used, as described above, for entertainment purposes, where a main purpose is presentation of realism. The tactile control system 1, therefore, may store a conversion model 15 capable of converting the same sensitivity parameter into different physical parameters for different purposes.

When the tactile control system 1 is used for vehicle purposes, tactile presentation may be performed on an occupant when an input operation performed on the operation device 33 or the like is detected or when lane departure, approaching other vehicles, or another type of danger is detected.

The tactile control system 2 according to the second embodiment can be used for the same purposes as the tactile control system 1 according to the first embodiment. That is, the tactile control system 2 can be used, for example, for entertainment purposes including games, videos, and music and vehicle purposes.

When the tactile control system 2 according to the second embodiment is used for entertainment purposes, the tactile control system 2 may be used in the same manner as the tactile control system 1 illustrated in FIG. 1 or a tactile presentation signal may be communicated or distributed during live distribution of content (includes broadcasting), data updating of content, or interaction or competition between users over the network 9. When the communication apparatus 70 communicates with the plurality of terminal apparatuses 80, for example, the same sensitivity parameters may be set for the terminal apparatuses 80, different sensitivity parameters may be set for the terminal apparatuses 80, or the same sensitivity parameters may be set for some of the terminal apparatuses 80 while setting different sensitivity parameters for the other terminal apparatuses 80. When a user of each of the terminal apparatuses 80 is to work in the same VR or AR environment, for example, the environment can be individually adjusted by using the same sensitivity parameter indicating magnitude of a feel for the terminal apparatuses 80 while adjusting a sensitivity parameter indicating sharpness of the feel in accordance with preferences of the users of the terminal apparatuses 80.

When the tactile control system 2 is used for vehicle purposes, the tactile control system 2 may be used in the same manner as the tactile control system 1 or a tactile presentation signal for a warning or the like may be received on the basis of communication between vehicles, communication with a traffic sign or another roadway installation, distribution of traffic information from a server, or another type of communication over the network 9. The communication between vehicles and the communication with a roadway installation can be achieved by the tactile control system 1 according to the first embodiment, too, insofar as direct communication can be performed without using the network 9.

The tactile control system 2 according to the second embodiment can be used, for example, for medical purposes or industrial purposes. The medical purposes include, for example, transmission of tactile information in remote medicine. The industrial purposes include, for example, tactile transmission in remote operation of industrial robots. More real tactile sensations can be presented to users or comfortable operation can be achieved if tactile sensations transmitted for these purposes can be customized on the basis of sensitivity values.

The tactile control system 2 according to the second embodiment can be used, for example, for purposes of Internet shopping. For example, a tactile sensation such as a feel or a fit of a product or a writing feel of a writing tool can be presented to a user through tactile transmission. A product with a feel or a fit more desired by a user can be proposed to the user by customizing a feel or a fit of the product on the basis of sensitivity values.

The tactile control system 2 according to the second embodiment can be used for purposes of interaction between users located at remote places. A feel of shaking hands or touching each other can be presented to users located at remote places. A feel of touching an animal such as a pet can also be presented. In these cases, the tactile control system 2 can transmit warmth by using thermal presentation independently or along with tactile presentation through the tactile presentation unit 30, which is especially effective.

Second Aspect

Background Art

Operation tools that perform sensory presentation by giving some stimuli to persons are known. Here, the sensory presentation includes tactile presentation, auditory presentation based on sounds, and visual presentation through display of images or the like. The sensory presentation is adjusted by adjusting signals for driving various operation tools.

Techniques for manufacturing products in accordance with users' preferences are known (e.g., refer to Japanese Patent No. 5662425). Japanese Patent No. 5662425 discloses a technique where a user selects a reference model and in later steps, a color, a size, a material, a position, and the like are added or changed on the basis of selection performed by the user.

SUMMARY OF INVENTION

Technical Problem

The example of the related art, however, has a problem that sensory presentation cannot be adjusted on the basis of a sensitive input. That is, preferred sensations differ between users, but users might represent their preferences sensitively. Such sensitive representation, however, has not conventionally been used to change sensory presentation.

In view of the above problem, the present invention aims to provide a tactile control apparatus capable of adjusting an operating feel on the basis of a sensitive input.

Description of Second Aspect

In the first aspect, a sensory control method where sensitivity parameters are converted into physical parameters using the conversion model 15 has been described. Even when a manufacturer prototypes an operation tool that presents a tactile sensation to which physical parameters obtained from sensitivity parameters through conversion are applied, however, several attempts need to be made in order to achieve an operating feel preferred by a user. Because a large number of steps are required in order to prototype an operation tool, it might take time to complete an operation tool having an operating feel preferred by a user.

In the present aspect, therefore, a tactile control apparatus and a tactile control method performed by the tactile control apparatus capable of reproducing, in real-time, an operating feel preferred by a user.

Example of Tactile Control Apparatus

Figure 25:
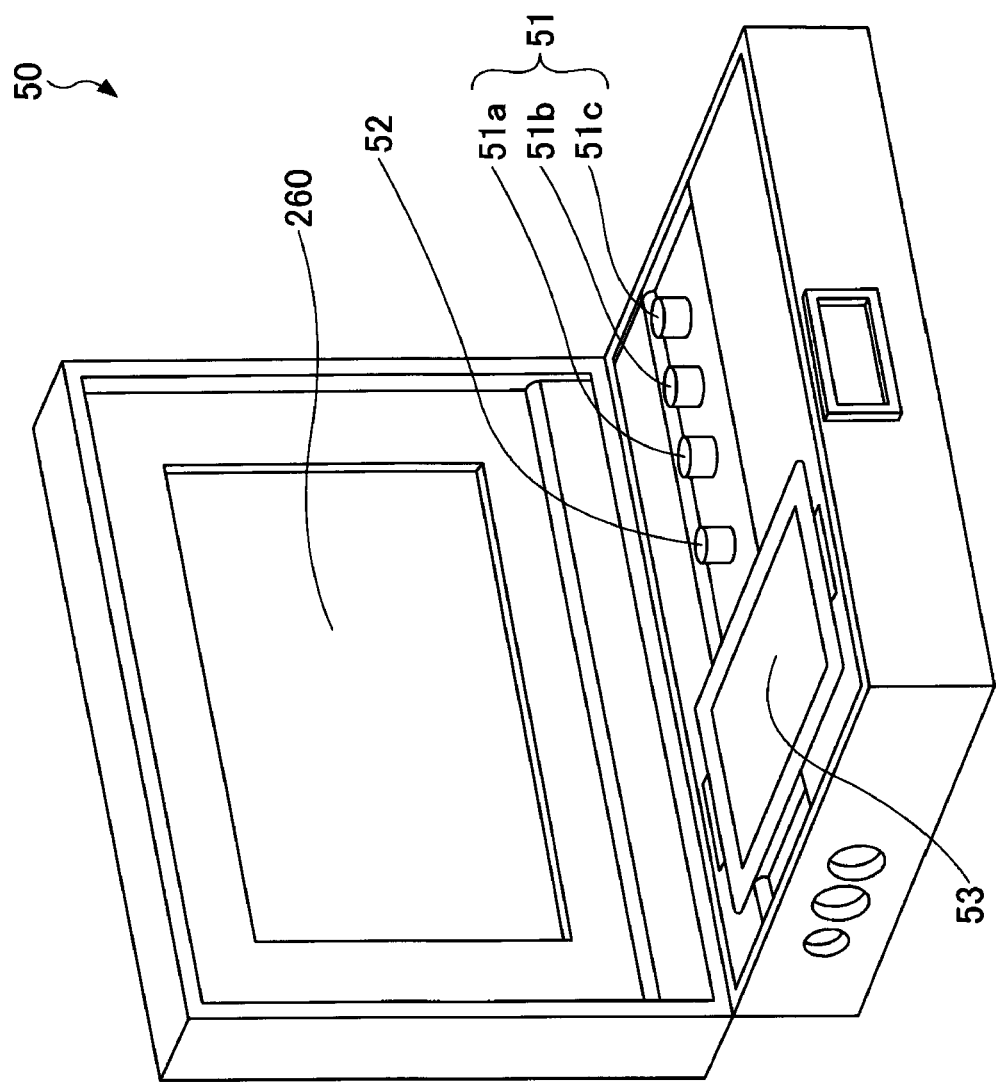
FIG. 25 is an example of a perspective view of a tactile control apparatus.

FIG. 25 is a perspective view of a tactile control apparatus 50. FIG. 25 illustrates a stand-alone tactile control apparatus 50. As illustrated in FIG. 25, the tactile control apparatus 50 includes three reference operation tools 51*a* to 51*c* (a plurality of reference operation tools), a reproduction operation tool 52, a touch panel 53, and a display 260. The reference operation tools 51a to 51c will also be referred to as "reference operation tools 51" hereinafter. The number of reference operation tools 51 may be two or more.

The display 260 displays how to use the tactile control apparatus 50, an operation menu, and the like. The touch panel 53 displays sensitivity parameters (e.g., adjectives) for which representation indices are input, and a user can input a representation index for each sensitivity parameter. Because the tactile control apparatus 50 receives an input of representation indices for the sensitivity parameters a plurality of times when the tactile control apparatus 50 reproduces an operating feel preferred by a user, the touch panel 53 displays sensitivity parameters with which the user can input the representation indices.

The three reference operation tools 51a to 51c are operation tools that are prepared as references and whose operating feels are different from one another. That is, the three reference operation tools 51a to 51c have different load displacement curves.

The user inputs preferred representation indices, and the reproduction operation tool 52 reproduces an operating feel of, among the three reference operation tools 51a to 51c, a reference operation tool 51 selected by the tactile control apparatus 50. That is, the tactile control apparatus 50 copies physical parameters of one of the three reference operation tools 51a to 51c to the reproduction operation tool 52. The user can achieve an operating feel preferred thereby by operating the reproduction operation tool 52 and inputting representation indices.

The user, therefore, can adjust the operating feel in real-time by repeatedly inputting representation indices and adjusting the operating feel of the reproduction operation tool 52 while operating the reproduction operation tool 52 and checking the operating feel of the reproduction operation tool 52. Since the user can compare the adjusted operating feel of the reproduction operation tool 52 and operating feels of the reference operation tools 51a to 51c, the user can easily achieve the representation indices preferred thereby.

A shape and an appearance illustrated in FIG. 25 are examples, and a general-purpose system configuration where the reference operation tools 51 and the reproduction operation tool 52 are connected to a PC or a tablet terminal through USB cable or the like, for example, may be used, instead.

Figure 26:
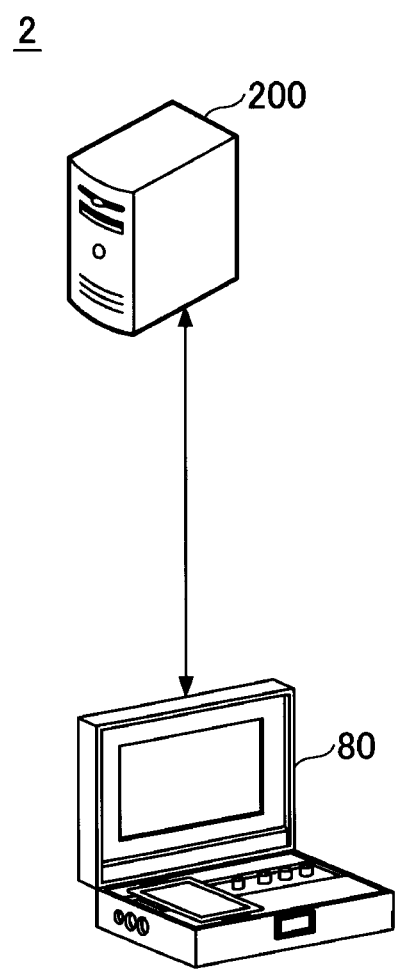
FIG. 26 illustrates an example of a tactile control system of a client server type.

FIG. 26 illustrates a tactile control system 2 of a client server type. In the tactile control system 2 illustrated in FIG. 26, the terminal apparatus 80 and a server 200 can communicate with each other over a network. The terminal apparatus 80 may execute, for example, a web browser or a dedicated application. The terminal apparatus 80 displays screens necessary to input representation indices of sensitivity parameters and receives the representation indices input by a user. The terminal apparatus 80 transmits the representation indices to the server 200, and the server 200 transmits a result of selection of one of the reference operation tools 51a to 51c, physical parameters corresponding to the reference operation tools 51a, 51b, or 51c, and adjusted physical parameters to the terminal apparatus 80.

As described above, in the case of the client server type, a user can adjust an operating feel in real-time as with the tactile control apparatus 50.

First Mode of Tactile Control Apparatus

First, an outline of operation of the tactile control apparatus 50 will be described with reference to FIGS. 27 and 28.

Figure 27:
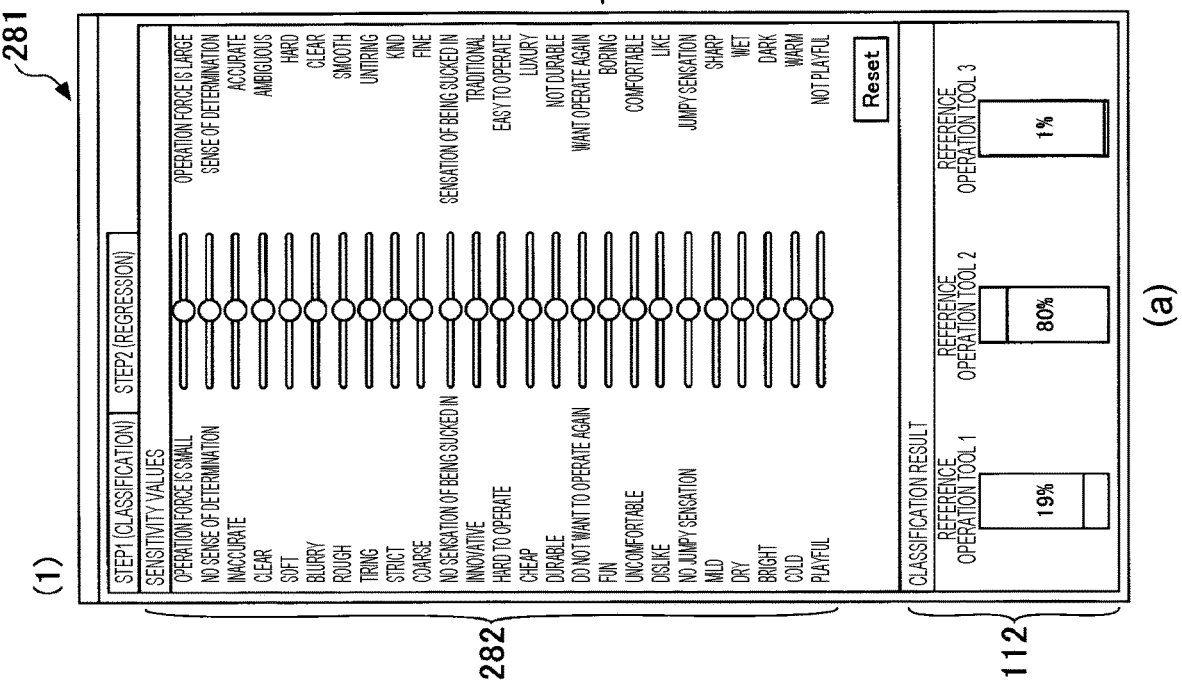
FIG. 27 is an example of a diagram illustrating an outline of operations performed by a use to adjust an operating feel using the tactile control apparatus.
Figure 28:
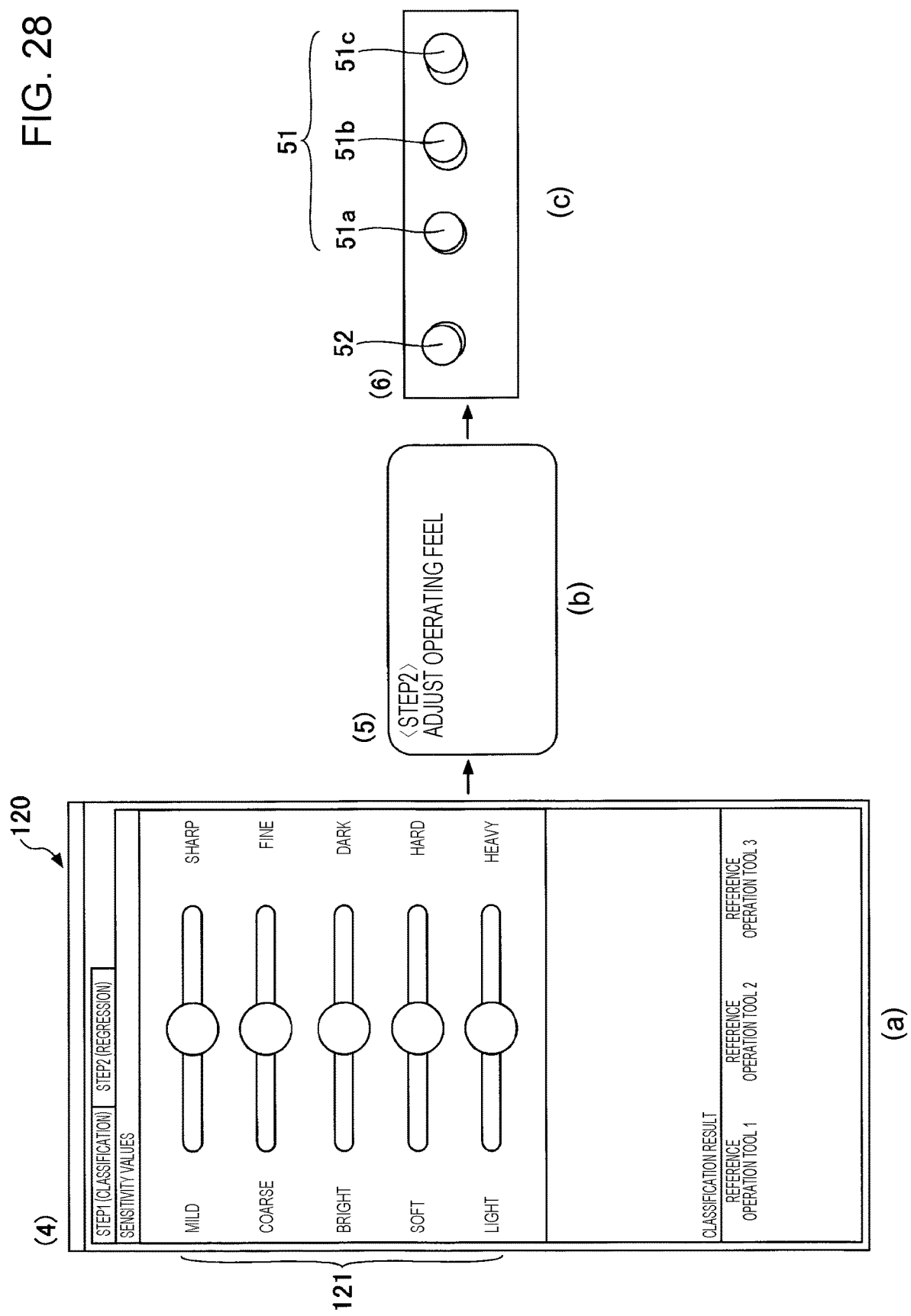
FIG. 28 is an example of a diagram illustrating an outline of other operations performed by the user to adjust the operating feel using the tactile control apparatus.

FIGS. 27 and 28 illustrate an outline of operations performed by a user to adjust an operating feel using the tactile control apparatus 50.

(1) First, the user inputs representation indices (an example of first representation indices) indicating his/her preferences for a plurality of sensitivity parameters (e.g., adjectives) (FIG. 27(a)). The touch panel 53 displays a first input screen 281 illustrated in FIG. 27(a), which includes a sensitivity parameter presentation field 282 and a reference operation tool field 112. In the sensitivity parameter presentation field 282, the user can input a representation index for each of sensitivity parameters (an example of first sensitivity parameters) using a slide bar (an example of input means). In the reference operation tool field 112, probabilities of selection of the reference operation tools 51a to 51c based on the input representation indices are displayed.

(2) The tactile control apparatus 50 selects the reference operation tool 51a, 51b, or 51c closest to the user's preferences (the input representation indices of the sensitivity parameters) on the basis of pre-learned correspondences between the representation indices of the sensitivity parameters and the reference operation tools 51a to 51c (FIG. 27(b)). This processing will be referred to as step 1.

(3) The tactile control apparatus 50 reproduces the operating feel of the reference operation tool 51a, 51b, or 51c using the reproduction operation tool 52 (FIG. 27(c)). Although the number of reference operation tools 51a to 51c is three in FIG. 27, this is just an example. The user operates the reproduction operation tool 52 and checks whether the reproduction operation tool 52 has an operating feel preferred thereby.

(4) If the operating feel is not a preferred one, the user again inputs representation indices (an example of second representation indices) indicating his/her preferences for the plurality of sensitivity parameters (FIG. 28(a)). The touch panel 53 displays a second input screen 120 illustrated in FIG. 28(a), which includes a sensitivity parameter presentation field 121. In the sensitivity parameter presentation field 121, the user can input a representation index for each of sensitivity parameters (an example of second sensitivity parameters) using a slide bar. The number of sensitivity parameters in the sensitivity parameter presentation field 121 may be smaller than the number of sensitivity parameters in the sensitivity parameter presentation field 282. This is because the reference operation tool 51 preferred by the user has already been selected in the sensitivity parameter presentation field 282. Since the number of sensitivity parameters in the sensitivity parameter presentation field 121 is small, an operation load of the user is reduced.

In an initial state of the sensitivity parameter presentation field 121, the representation indices of the slide bars are at medians. Even if the user has set a representation index of a sensitivity parameter at a minimum or maximum value in the sensitivity parameter presentation field 282, the representation index on the slide bar is at a median in the initial state of the sensitivity parameter presentation field 121. In doing so, the user can easily adjust, in the sensitivity parameter presentation field 121, the representation index within a range including, as the median, the representation index input in the sensitivity parameter presentation field 282. The representation indices in the initial state of the sensitivity parameter presentation field 121 correspond to physical parameters set for the reference operation tool 51. By making adjustments from the initial state, the user can set different representation indices.

(5) The tactile control apparatus 50 converts the representation indices of the sensitivity parameters input by the user into physical parameters on the basis of pre-learned correspondences between the representation indices of the sensitivity parameters and physical parameters (e.g., a regression model) and causes the reproduction operation tool 52 to reflect the physical parameters (FIG. 28(*b*)). This processing will be referred to as step 2.

(6) The user operates the reproduction operation tool 52 and checks whether the reproduction operation tool 52 has the operating feel preferred thereby (FIG. 28(*c*)).

The user then repeats (4) to (6), and the tactile control apparatus 50 can determine physical parameters corresponding to the operating feel preferred by the user.

Functions of Tactile Control Apparatus

Figure 29:
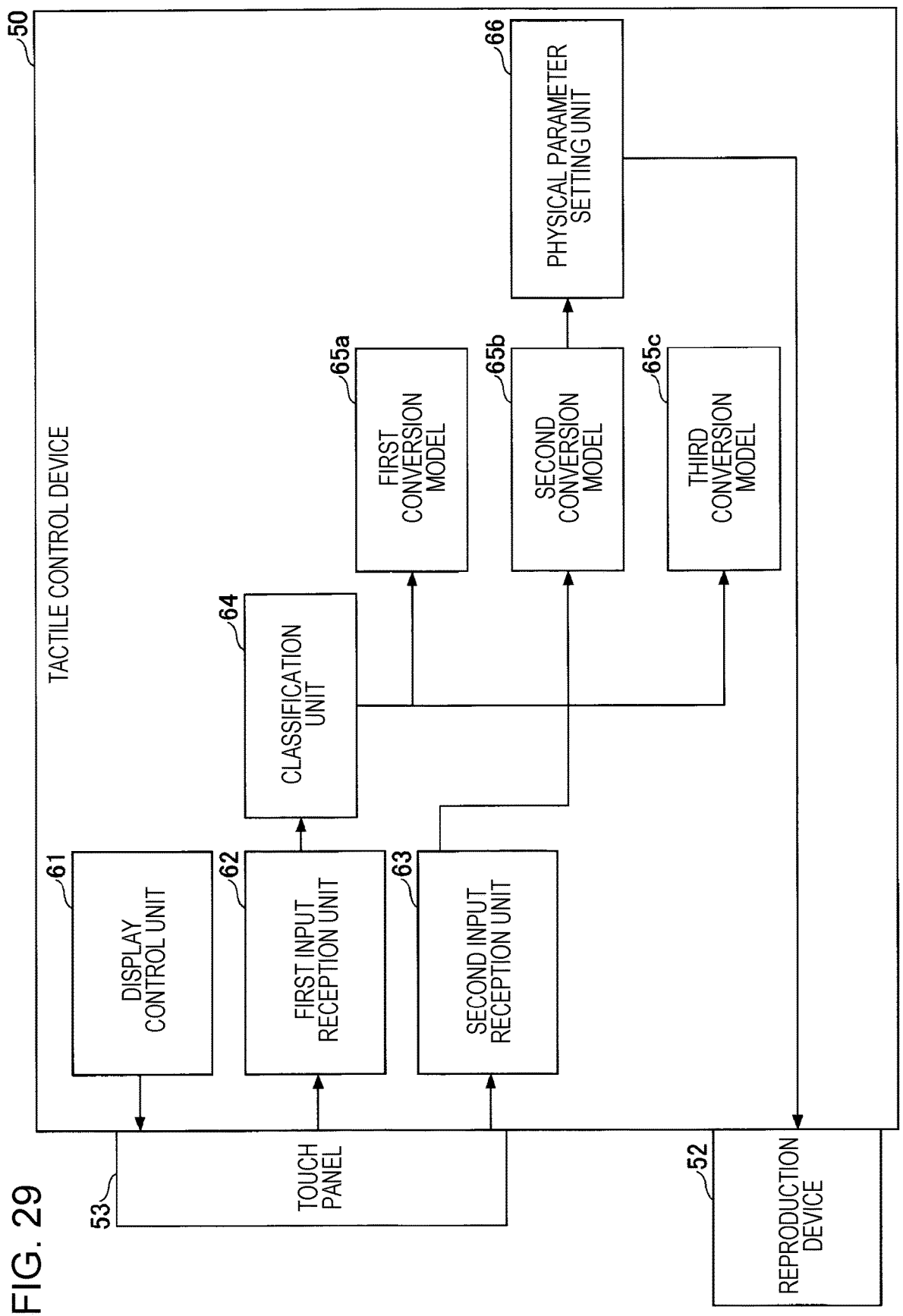
FIG. 29 is an example of a functional block diagram illustrating functions of the tactile control apparatus.

FIG. 29 is a functional block diagram illustrating functions of the tactile control apparatus 50. As illustrated in FIG. 29, the tactile control apparatus 50 includes a display control unit 61, a first input reception unit 62, a second input reception unit 63, a classification unit 64, a first conversion model 65*a*, a second conversion model 65*b*, a third conversion model 65*c*, and a physical parameter setting unit 66. These functions of the tactile control apparatus 50 are achieved when a CPU or a processor included as an information processing device executes a program loaded into a RAM. Alternatively, the functions may be achieved by a hardware circuit.

The display control unit 61 displays preset sensitivity parameters and five or seven-level representation indices set for the sensitivity parameters on the touch panel 53 in a selectable manner (displays the first input screen 281 and the second input screen 120). The representation indices may be adjusted stepwise or continuously. A method for selecting a representation index performed by the user may be tapping on the touch panel 53 or sliding of a slide bar. The method for selecting a representation index performed by the user may be voice input or button input. The display control unit 61 displays different sensitivity parameters in step 1 and step 2. The number of sensitivity parameters in step 1 may be larger than the number of sensitivity parameters in step 2.

In step 1, the first input reception unit 62 receives an input of representation indices of sensitivity parameters in accordance with a user operation. In step 2, the second input reception unit 63 receives an input of representation indices of sensitivity parameters in accordance with a user operation.

The classification unit 64 is an identification model that has learned correspondences between representation indices of sensitivity parameters received by the first input reception unit 62 and the three conversion models. There are many methods for learning classification including deep learning, decision trees, and support vector machines, but in the present aspect, any learning method may be used. The classification unit 64 outputs identification information regarding one of the first to third conversion models 65*a* to 65*c* in response to representation indices of sensitivity parameters received by the first input reception unit 62 (identifies a conversion model 15 that suits the user's preferences from among the plurality of conversion models 15).

As described in the first aspect, the first to third conversion models 65*a* to 65*c* are conversion models capable of converting sensitivity parameters into physical parameters correlated with the sensitivity parameters. The first to third conversion models 65*a* to 65*c* correspond to the three reference operation tools 51*a* to 51*c*, respectively, and are capable of converting representation indices of sensitivity parameters into physical parameters for the reference operation tools 51*a* to 51*c*. The physical parameters include, for example, a stroke of an operation tool, operation reaction force (load), velocity, acceleration, and jerk of a movable part, and an elastic property of an operator's finger or another body part. In order to reproduce different operating feels, the first to third conversion models 65*a* to 65*c* are generated through multiple regression or the like on the basis of representation indices in sensory testing for physical parameters whose load displacement curves are different from one another.

The first to third conversion models 65*a* to 65*c* then convert representation indices of sensitivity parameters received by the second input reception unit 63 into different physical parameters. In doing so, the reference conversion model selected in step 1 can convert representation indices close to the user's preferences input in step 2 into physical parameters.

The physical parameter setting unit 66 sets, for the reproduction operation tool 52, the physical parameters output from one of the first to third conversion models 65*a* to 65*c*. The tactile control apparatus 50, therefore, can reproduce an operating feel desired by the user in real-time.

Figure 30:
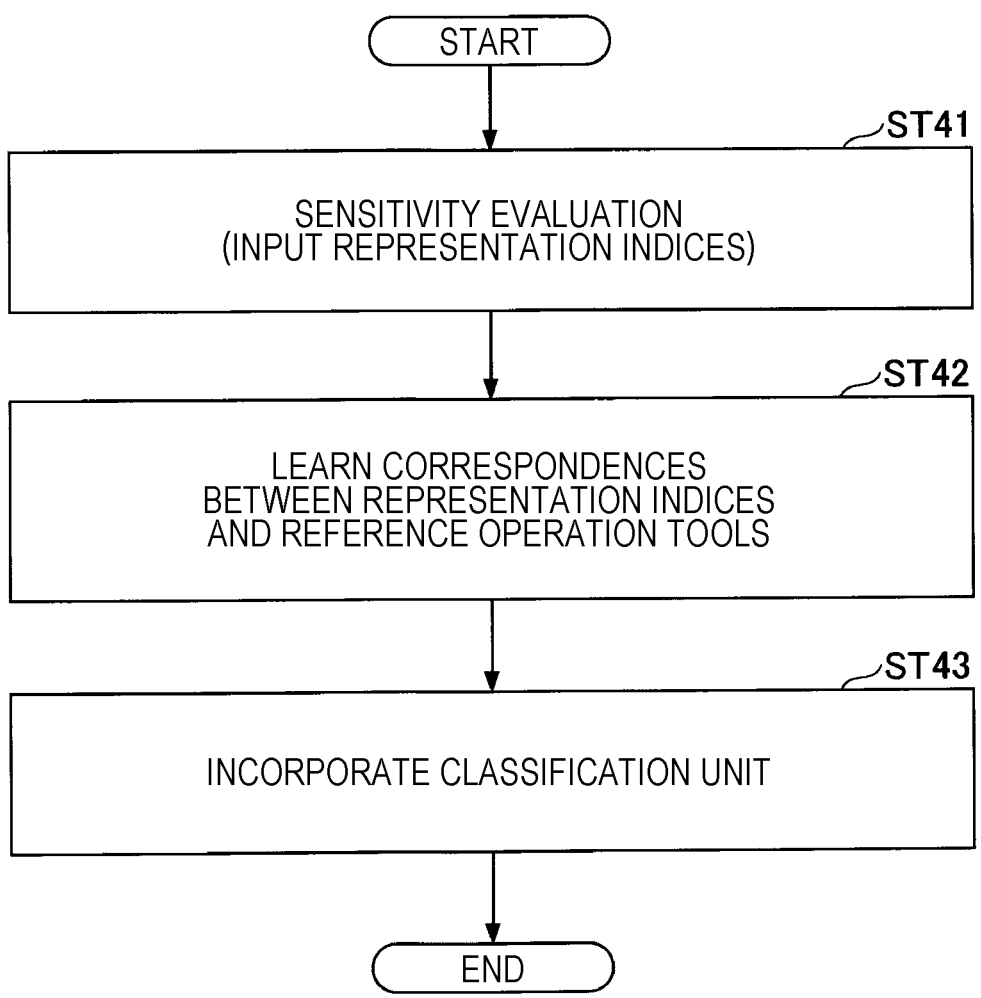
FIG. 30 is an example of a flowchart illustrating a procedure of learning for generating a classification unit.

Generation of Classification Unit and Learning of Correspondences Between Representation Indices of Sensitivity Parameters and Physical Parameters Next, generation of the classification unit 64 will be described with reference to FIG. 30 and other drawings. FIG. is a flowchart illustrating a procedure of learning for the generation of the classification unit 64. Although it is assumed that the tactile control apparatus 50 performs various types of learning, any other information processing device may perform the learning, instead.

In ST41, the tactile control apparatus 50 receives an input of representation indices. FIG. 27(*a*) illustrates sensitivity parameters used to generate the classification unit 64. The following 24 sensitivity parameters, for example, are used. The number, 24, is an example, and more or fewer sensitivity parameters may be used.

"Operation force is small (large)"
"sense of determination (no sense of determination)"
"Inaccurate (accurate)"
"Clear (ambiguous)"
"Soft (hard)"
"Blurry (clear)"
"Rough (smooth)"
"Tiring (untiring)"
"Strict (kind)"
"Coarse (fine)"
"No sensation of being sucked in (sensation of being sucked in)"
"Innovative (traditional)"
"Cheap (luxury)"
"Durable (not durable)"
"Do not want to operate again (want to operate again)"
"Fun (boring)"
"Uncomfortable (comfortable)"
"Dislike (like)"
"No jumpy sensation (jumpy sensation)"
"Mild (sharp)"
"Dry (wet)"
"Bright (dark)"
"Cold (warm)"

"Playful (not playful)"

These sensitivity parameters may be automatically created through a web analysis, a tweet analysis, an SNS analysis, a thesis, a cluster analysis on a market, or extraction of features or adjectives. That is, the sensitivity parameters need not be fixed and may be dynamically changed.

In ST42, the tactile control apparatus 50 learns correspondences between representation indices of sensitivity parameters and the reference operation tools 51a to 51c through machine learning. The classification unit 64 includes these correspondences.

Machine learning is a technique for making a computer acquire learning ability like that of humans and refers to a technique where a computer autonomously generates, from training data obtained in advance, an algorithm necessary to make a determination such as data identification and performs prediction by applying the algorithm to new data. A learning method employed for machine learning is not particularly limited, and may be supervised learning, unsupervised learning, semi-supervised learning, reinforcement learning, deep learning, or any combination of these learning methods. A method of machine learning is not particularly limited, and may be a perceptron, deep learning, support vector machines, logistic regression, naive Bayes, decision trees, random forests, or the like. Deep learning and decision trees will be described later as examples of the learning method.

In ST43, the classification unit 64 generated through the machine learning is incorporated into the tactile control apparatus 50.

Figure 31:
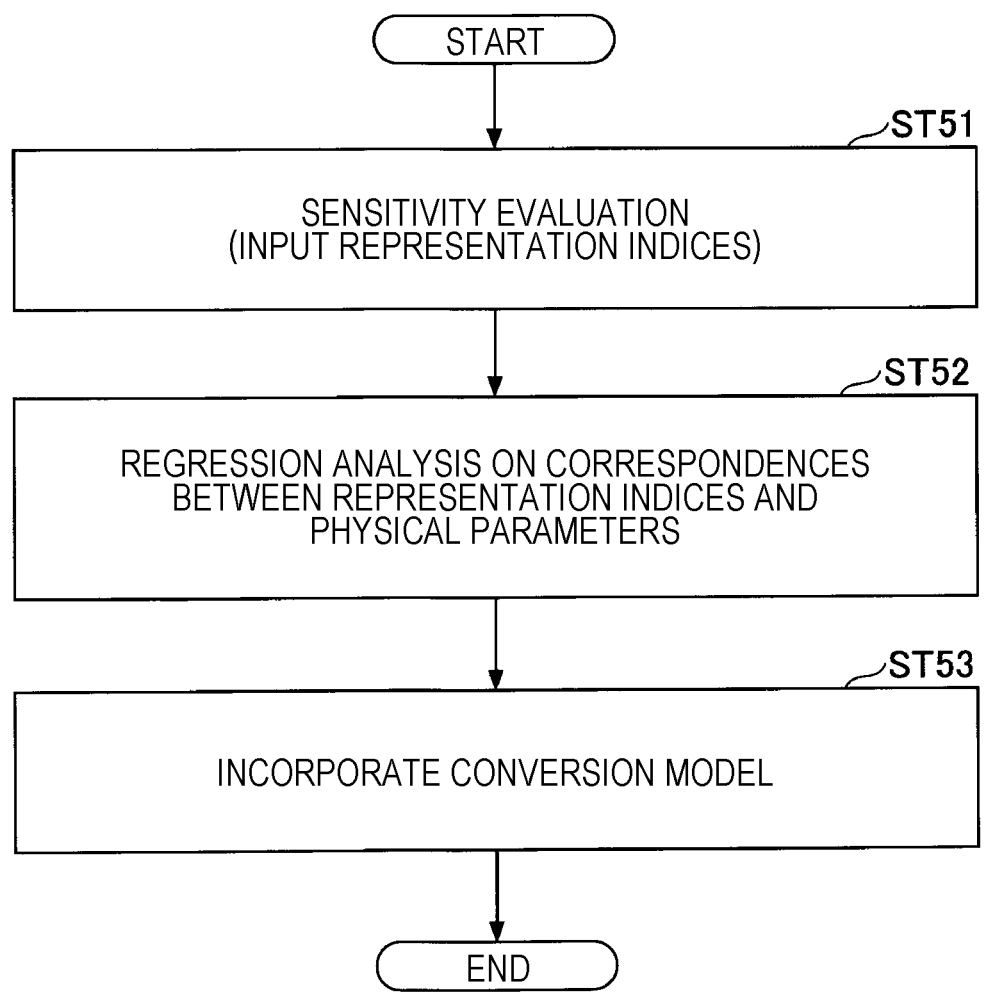
FIG. 31 is a flowchart illustrating a procedure for learning correspondences between representation indices of sensitivity parameters and physical parameters.

FIG. 31 is a flowchart illustrating a procedure for learning correspondences between representation indices of sensitivity parameters and physical parameters.

In ST51, the tactile control apparatus 50 receives an input of representation indices. FIG. 28(a) illustrates sensitivity parameters used to learn correspondences between representation indices of sensitivity parameters and physical parameters. The following five sensitivity parameters, for example, are used. The number, five, is an example, and more or fewer sensitivity parameters may be used.

"Mild (Sharp)"
"Coarse (fine)"
"Bright (dark)"
"Soft (hard)"
"Light (heavy)"

In ST52, the tactile control apparatus 50 determines the correspondences between the representation indices of the sensitivity parameters and the physical parameters through a multiple regression analysis. Since the three reference operation tools 51a to 51c are prepared in the present aspect, a load displacement curve is obtained for each of the three reference operation tools 51a to 51c. Physical parameters for achieving these load displacement curves are also known. Users operate the reference operation tools 51a to 51c and input representation indices indicating operating feels of the reference operation tools 51a to 51c. After a sufficient number of users input representation indices, the tactile control apparatus 50 performs the multiple regression analysis using Math. 5. The multiple regression analysis has been described with reference to Math. 5 and FIGS. 22 and 23 in the first aspect. As a result, determination coefficients $B_{11}$ to $B_{mn}$ for the three reference operation tools 51a to 51c can be determined, and a conversion model 15 such as that illustrated in FIG. 23 is obtained for each of the reference operation tools 51a to 51c. Conversion models for the three reference operation tools 51a to 51c are the first to third conversion models 65a to 65c, respectively.

In ST53, the first to third conversion models 65a to 65c generated through the multiple regression analysis are incorporated into the tactile control apparatus 50.

Procedure of Tactile Presentation

Figure 32:
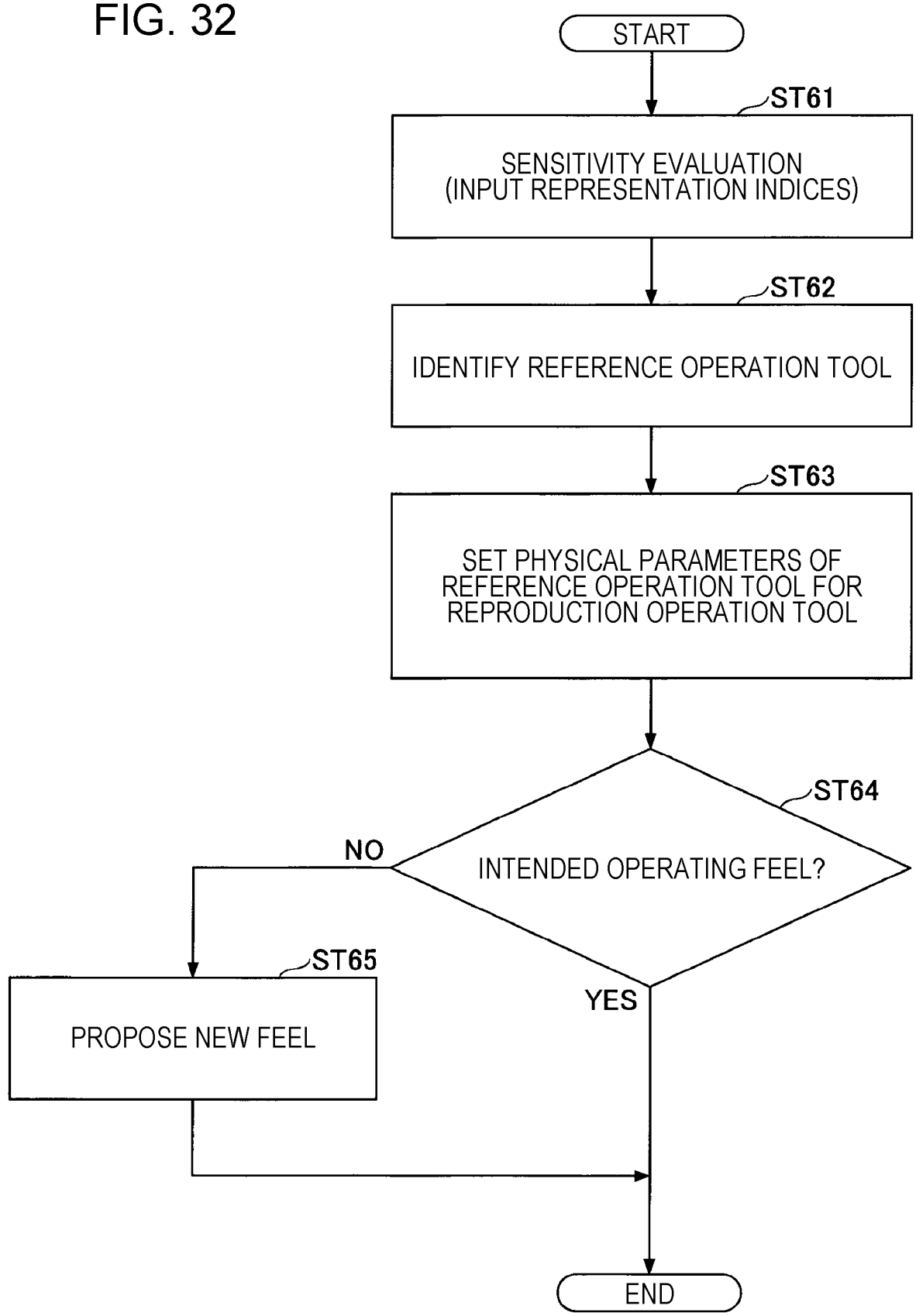
FIG. 32 is an example of a flowchart illustrating a procedure where the tactile control apparatus presents an operating feel preferred by the user using the classification unit and first to third conversion models.

FIG. 32 is a flowchart illustrating a procedure where the tactile control apparatus 50 presents an operating feel preferred by a user using the classification unit 64 and the first to third conversion models 65a to 65c.

In ST61, the first input reception unit 62 receives an input of representation indices of sensitivity parameters on the first input screen 281 in order to select one of the reference operation tools 51a to 51c (step 1).

In ST62, the classification unit 64 identifies one of the reference operation tools 51a to 51c on the basis of the representation indices of the sensitivity parameters input on the first input screen 281. When one of the reference operation tools 51a to 51c is determined, one of the first to third conversion models 65a to 65c is also determined.

In ST63, the physical parameter setting unit 66 sets physical parameters of the selected one of the reference operation tools 51a to 51c for the reproduction operation tool 52. The user can operate the reproduction operation tool 52 and check whether the reproduction operation tool 52 has an operating feel preferred thereby.

In ST64, the user determines whether to adjust the operating feel to one different from that of the reference operation tool 51a, 51b, or 51c on the basis of whether the reproduction operation tool 52 has the operating feel preferred thereby. The tactile control apparatus 50 receives an instruction to start readjustment from the user.

In ST65, if the user adjusts the operating feel to one different from that of the reference operation tool 51a, 51b, or 51c, the second input reception unit 63 receives an input of representation indices of the sensitivity parameters on the second input screen 120 (step 2). The first, second, or third conversion models 65a, 65b, or 65c selected in ST63 converts the representation indices input by the user (correspond to $A_1$ to $A_n$ in FIG. 23) into physical parameters $P_1$ to $P_n$. The physical parameter setting unit 66 sets the physical parameters $P_1$ to $P_n$ for the reproduction operation tool 52. The user can operate the reproduction operation tool 52 again and check whether the reproduction operation tool 52 has the operating feel preferred thereby.

The user can then repeatedly adjust the operating feel using the second input screen 120 until the operating feel preferred thereby is achieved.

The tactile control apparatus 50 in the present aspect can thus reproduce an operating feel preferred by a user in real-time.

Second Mode of Tactile Control Apparatus

Next, a second mode of the tactile control apparatus 50 will be described.

First, an outline of operation of the tactile control apparatus 50 in the second mode will be described with reference to FIG. 33. FIG. 33 illustrates an outline of operations where a user adjusts an operating feel using the tactile control apparatus 50.

(1) First, the user inputs representation indices indicating his/her preferences for a plurality of sensitivity parameters on the first input screen 281 (FIG. 33(a)). The first input screen 281 may be the same as that illustrated in FIG. 27 (a).

(2) The tactile control apparatus 50 determines physical parameters (an example of second physical parameters) corresponding to the representation indices on the basis of correspondences between representation indices of sensitivity parameters and physical parameters (load displacement curves) learned in advance through regression (FIG. 33 (b)).

(3) The tactile control apparatus 50 performs, using an appropriate fitting model, curve fitting on load displacement curves of the reference operation tools 51a to 51c prepared in advance (FIG. 33(c)). The fitting model is a polynomial where physical parameters are coefficients. Physical parameters (an example of first physical parameters) indicating a load displacement curve are thus obtained for each of the reference operation tools 51a to 51c. The tactile control apparatus 50 compares the physical parameters in (2) and the physical parameters in (3).

(4) If the physical parameters in (2) and the physical parameters in (3) are similar to each other, the tactile control apparatus 50 presents a similar reference operation tool 51, and if not, the tactile control apparatus 50 proposes adjustment to a new feel using the reproduction operation tool 52 (FIG. 33(d)).

Functions of Tactile Control Apparatus

Figure 34:
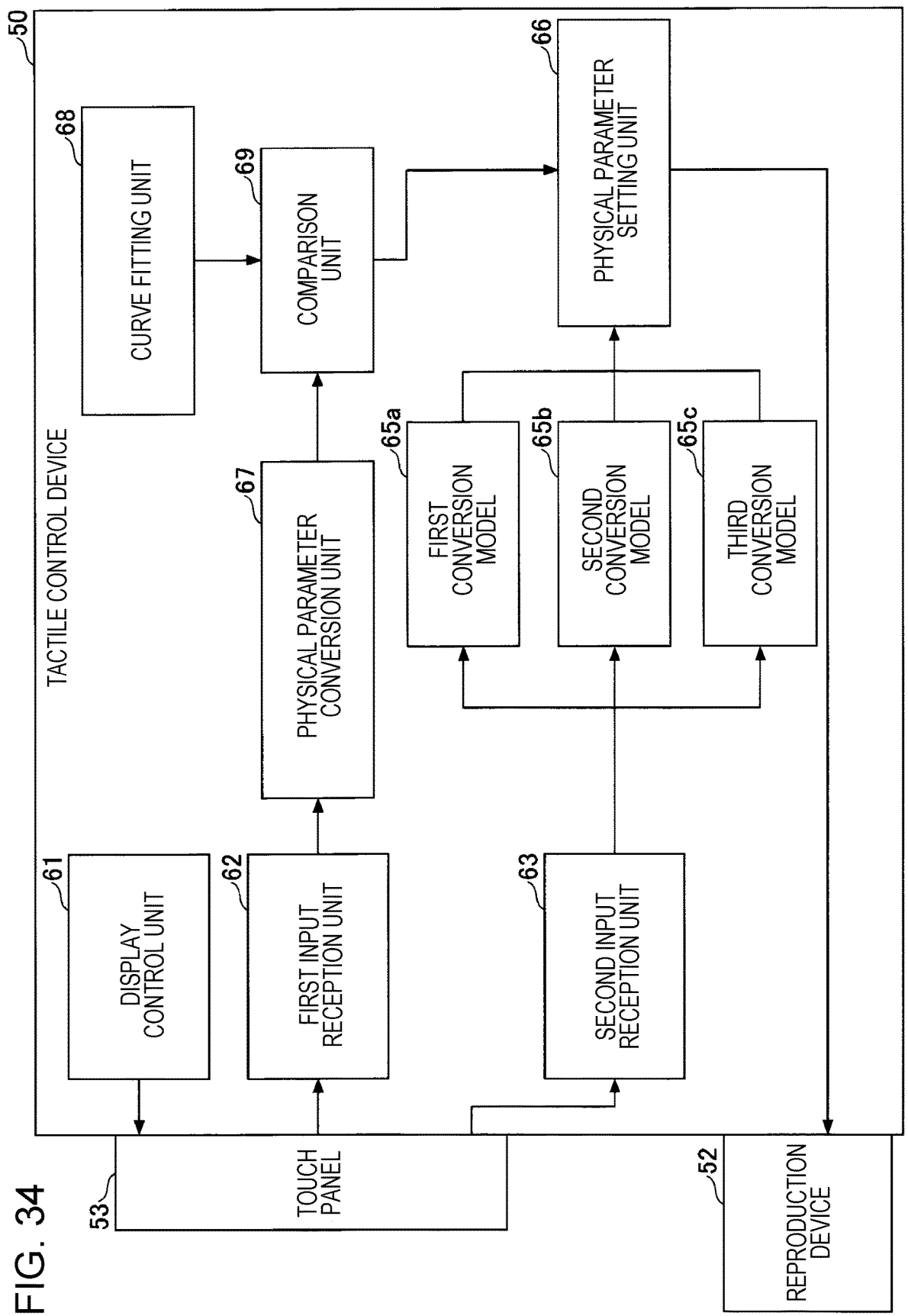
FIG. 34 is another example of the functional block diagram illustrating the functions of the tactile control apparatus.

FIG. 34 is a functional block diagram illustrating the functions of the tactile control apparatus 50. In description with reference to FIG. 34, differences from the description with reference to FIG. 29 might be described. The tactile control apparatus 50 includes the display control unit 61, the first input reception unit 62, the second input reception unit 63, a physical parameter conversion unit 67, a curve fitting unit 68, a comparison unit 69, the first conversion model 65a, the second conversion model 65b, the third conversion model 65c, and the physical parameter setting unit 66. These functions of the tactile control apparatus 50 are achieved when a CPU included as an information processing device executes a program loaded into a RAM. Alternatively, the functions may be achieved by a hardware circuit.

The physical parameter conversion unit 67 determines physical parameters for representation indices received by the first input reception unit 62 using correspondences between representation indices and physical parameters obtained through a multiple regression analysis. Since a load displacement curve is also determined once the physical parameters are determined, it can be said that the physical parameter conversion unit 67 determines a load displacement curve.

The curve fitting unit 68 fits load displacement curves of the reference operation tools 51a to 51c (first to third conversion models 65a to 65c) using an appropriate fitting model (e.g., a polynomial). The curve fitting is a mode of a multiple regression analysis. By setting physical parameters as coefficients of the polynomial, the curve fitting unit 68 can estimate the physical parameters for each of the reference operation tools 51a to 51c. The fitting model, therefore, is preferably selected such that a load displacement curve can be fitted with physical parameters.

The comparison unit 69 compares physical parameters determined by the physical parameter conversion unit 67 and physical parameters determined by the curve fitting unit 68 and determines whether the physical parameters are similar to each other. For example, the comparison unit 69 calculates the sum of squares of differences the physical parameters $P_1$ to $P_n$ and determines whether the sum is smaller than a threshold. If there are similar physical parameters, the comparison unit 69 notifies the physical parameter setting unit 66 of the physical parameters corresponding to one of the reference operation tools 51a to 51c.

The physical parameter setting unit 66 sets the physical parameters of the reference operation tool 51 for the reproduction operation tool 52.

Figure 35:
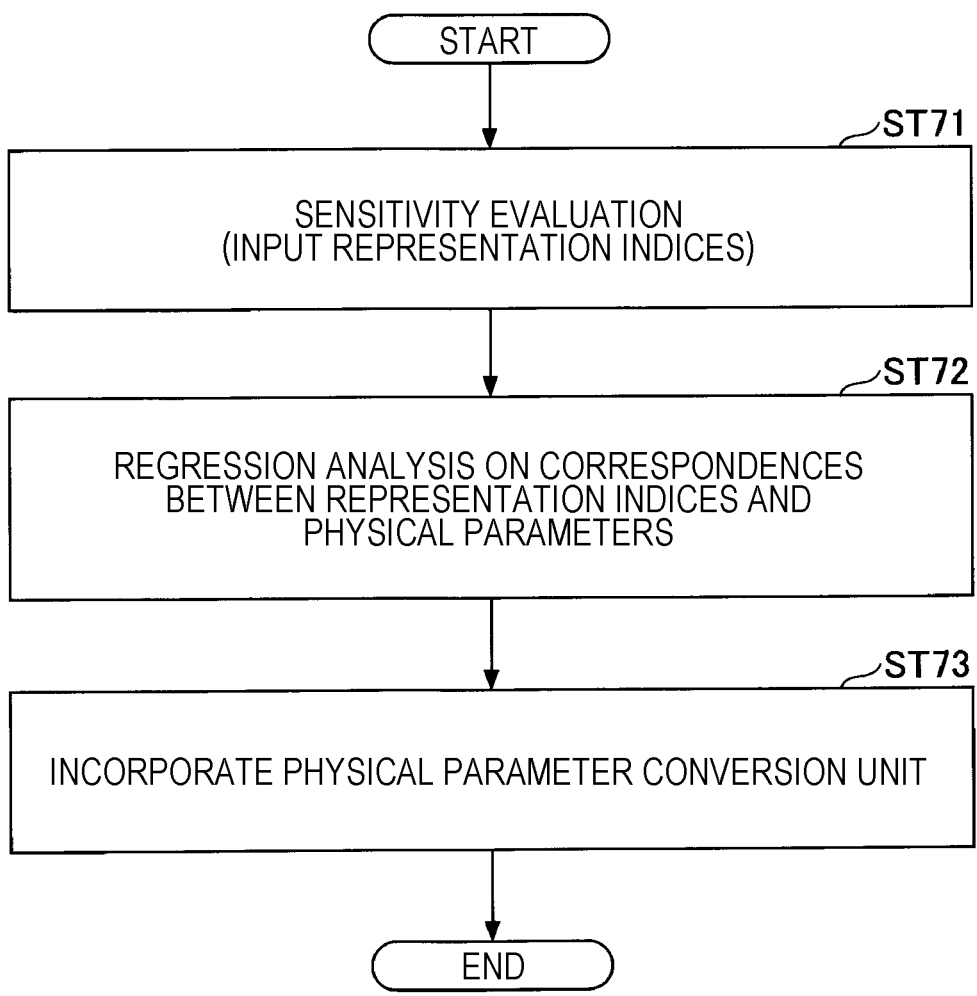
FIG. 35 is an example of a flowchart illustrating a procedure for learning physical parameters (load displacement curve) corresponding to representation indices.

Learning of Physical Parameters (Load Displacement Curve) Corresponding to Representation Indices and Curve Fitting of Load Displacement Curves of Reference Operation Tools Next, learning of physical parameters (load displacement curve) corresponding to representation indices will be described with reference to FIG. 35 and other drawings. FIG. 35 is a flowchart illustrating a procedure for learning physical parameters (load displacement curve) corresponding to representation indices.

In ST71, the tactile control apparatus 50 receives an input of representation indices. FIG. 27(a) illustrates the sensitivity parameters used to generate the classification unit 64.

In ST72, the tactile control apparatus 50 determines correspondences between representation indices of sensitivity parameters and physical parameters through a multiple regression analysis. Users input representation indices indicating operating feels for operation tools whose physical parameters are known. The operation tools whose physical parameters are known may be the reference operation tools 51 or any other operation tools. After a sufficient number of users input representation indices, the tactile control apparatus 50 conducts a multiple regression analysis using Math. 5. The multiple regression analysis has been described with reference to Math. 5 and FIGS. 22 and 23 in the first aspect. The tactile control apparatus 50, therefore, can determine the determination coefficients $B_{11}$ to $B_{mn}$ in Math. 5, and a conversion model 15 such as that illustrated in FIG. 23 is obtained.

In ST73, a physical parameter conversion unit 67 generated through the multiple regression analysis is incorporated into the tactile control apparatus 50.

Figure 36:
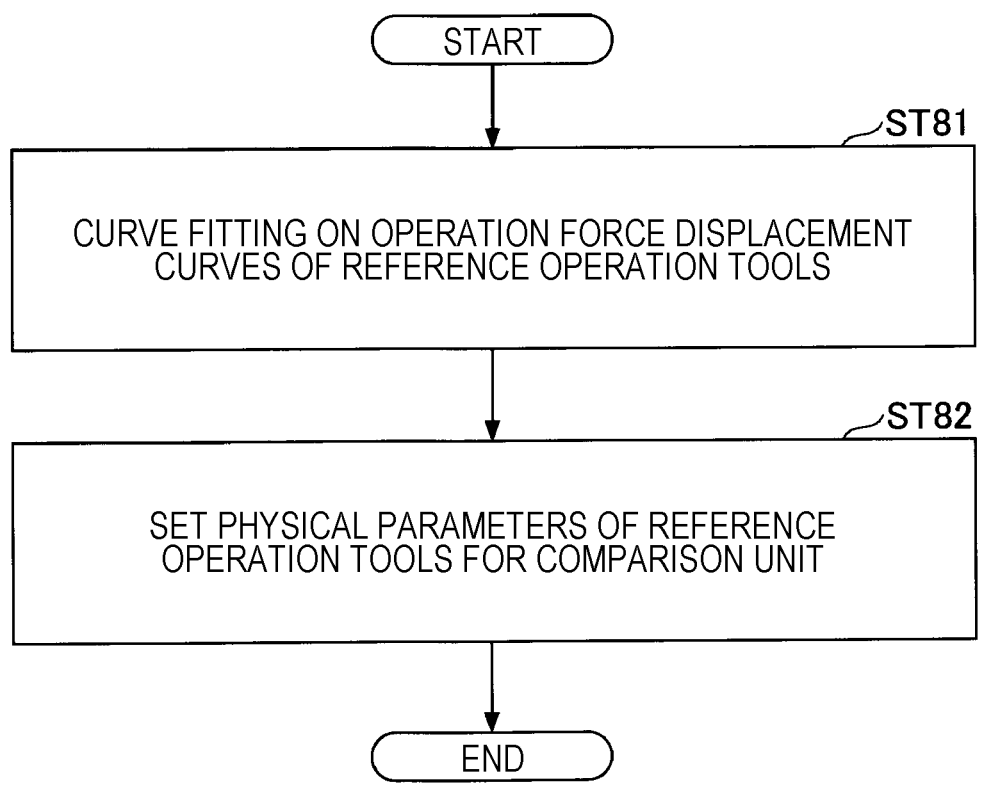
FIG. 36 is an example of a flowchart illustrating a procedure for performing curve fitting on load displacement curves of reference operation tools.

FIG. 36 is a flowchart illustrating a procedure for performing curve fitting on the load displacement curves of the reference operation tools 51a to 51c.

In ST81, the curve fitting unit 68 performs curve fitting on the load displacement curves of the reference operation tools 51a to 51c. As illustrated in FIG. 9, a correspondence between the stroke x and operation reaction force is obtained for each of the reference operation tools 51a to 51c. The curve fitting unit 68 extracts a combination of a stroke and operation reaction force from x=0 to a maximum stroke preferably at certain intervals. The curve fitting unit 68 performs curve fitting by applying the combination of the stroke x and operation reaction force y to a fitting model.

The fitting model is an expression for obtaining operation reaction force from the stroke x using physical parameters as coefficients. The following fitting model is an example, and any appropriate model (expression) with which the operation reaction force y is obtained from the stroke x using physical parameters as coefficients may be employed.

Fitting model: $y = P_1 \times x^0 + P_2 \times x^1 + P_3 \times x^2 + \ldots P_n \times x^n$ The curve fitting unit 68 can obtain $P_1$ to $P_n$ through a multiple regression analysis. The obtained $P_1$ to $P_n$ correspond to physical parameters.

In ST82, the physical parameters of each of the reference operation tools 51a to 51c generated through the curve fitting are set for the comparison unit 69.

Procedure of Tactile Presentation

Figure 37:
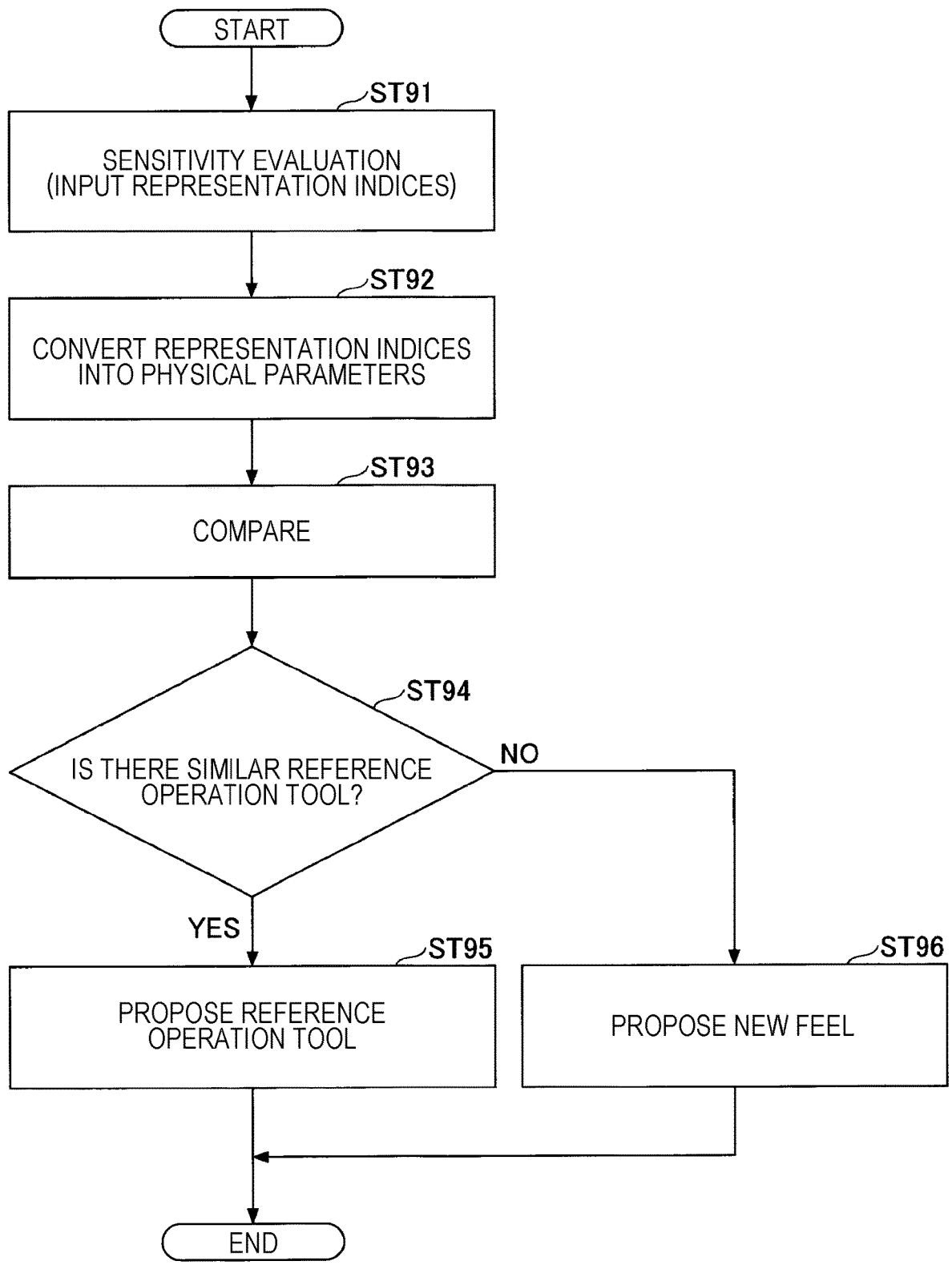
FIG. 37 is an example of a flowchart illustrating a procedure where the tactile control apparatus presents an operating feel preferred by the user using a physical parameter conversion unit and a comparison unit.

FIG. 37 is a flowchart illustrating a procedure where the tactile control apparatus 50 presents an operating feel preferred by a user using the physical parameter conversion unit 67 and the comparison unit 69.

In ST91, the first input reception unit 62 receives an input of representation indices of sensitivity parameters for selecting one of the reference operation tools 51a to 51c.

In ST92, the physical parameter conversion unit 67 converts the representation indices of the sensitivity parameters into physical parameters (load displacement curve).

In ST93, the comparison unit 69 compares the physical parameters determined by the physical parameter conversion unit 67 and physical parameters of each of the reference operation tools 51a to 51c determined by the curve fitting unit 68.

In ST94, the comparison unit 69 determines whether any of the reference operation tools 51a to 51c has physical parameters similar to those obtained as a result of the conversion performed by the physical parameter conversion unit 67. As described above, this determination is made by determining whether the sum of squares of differences between the physical parameters $P_1$ to $P_n$ determined by the physical parameter conversion unit 67 and the physical parameters $P_1$ to $P_n$ obtained through the curve fitting performed on each of the reference operation tools 51a to 51c is smaller than the threshold.

If a result of the determination in ST94 is Yes, the physical parameter setting unit 66 sets, in ST95, physical parameters of the reference operation tool 51a, 51b, or 51c similar to those determined by the physical parameter conversion unit 67 for the reproduction operation tool 52.

If the result of the determination in ST94 is No, the physical parameter setting unit 66 sets, in ST96, the physical parameters of the reference operation tool 51a, 51b, or 51c most similar to those determined by the physical parameter conversion unit 67 for the reproduction operation tool 52. Alternatively, the classification unit 64 in the first mode is provided, and the classification unit 64 may determine one of the reference operation tools 51a to 51c (first to third conversion models 65a to 65c).

The user can then repeatedly adjust the operating feel using the second input screen 120 until an operating feel preferred thereby is achieved.

The tactile control apparatus 50 in the present aspect can thus reproduce an operating feel preferred by a user in real-time.

Example of Learning of Classification

Figure 38:
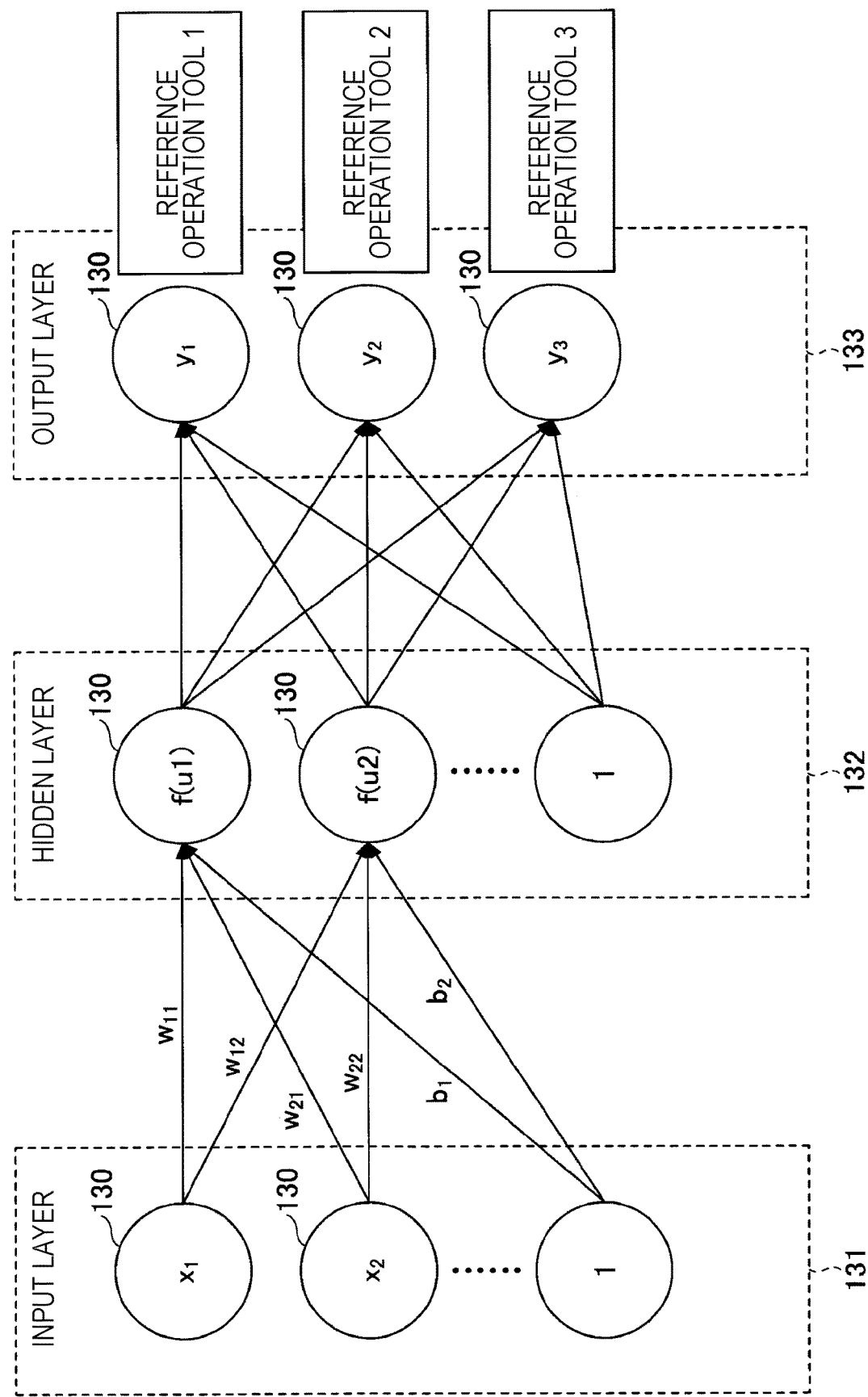
FIG. 38 is a diagram illustrating an example of a neural network at a time when the classification unit is achieved by the neural network.

A method for learning classification will be described with reference to FIG. 38 and other drawings. FIG. 38 illustrates an example of a neural network at a time when the classification unit 64 is achieved by a neural network. In the neural network illustrated in FIG. 38, three nodes in an output layer 133 each output an output value yi for data input to an input layer 131. The output value yi is a probability, and y1+y2+y3 equals 1.0. In the present aspect, the three nodes in the output layer 133 correspond to the three reference operation tools 51a to 51c, respectively, and probabilities of the reference operation tools 51a to 51c indicating which of the reference operation tools 51a to 51c is the most probable are output in accordance with representation indices.

FIG. 38 illustrates a neural network where a total of L layers (e.g., three layers) from the input layer 131 to the output layer 133 are fully connected to each other. A neural network with a deep hierarchy is called a deep neural network (DNN). A layer between the input layer 131 and the output layer 133 is called a hidden layer 132. Because the number of hidden layers and the number of nodes may be set as desired, the number of layers and the number of nodes 130 in each layer, for example, are just examples. In the present aspect, the number of nodes 130 in the input layer is the number of sensitivity parameters (24 in FIG. 27(a)). A representation index may be set stepwise, such as with five or three levels, or continuously for each sensitivity parameter.

In the neural network, all nodes 130 in an (l−1)th layer are connected to each of nodes 130 in an l-th layer (l is 2 or 3) other than the input layer, and a product of an output z of a node 130 in the (l−1)th layer and a weight w of connection is input to a node in the l-th layer. Expression (1) indicates a method for calculating a signal output from a node 130.

[Math. 6]

$$u_j^{(l)} = \sum_{i=1}^{I} w_{ji}^{(l,l-1)} z_i^{(l-1)} + b_j \qquad (1)$$

In expression (1), $w_{ji}^{(l,l-1)}$ denotes a weight between a j-th node in the l-th layer and an i-th node in the (l−1)th layer, and $b_j$ denotes a bias component in the network. $u_j^{(l)}$ denotes an output of the j-th node in the l-th layer, and $z_i^{(l-1)}$ denotes an output of the i-th node in the (l−1)th layer. I denotes the number of nodes in the (l−1)th layer.

[Math. 7]

$$z_j^{(l)} = f(u_j^{(l)}) \qquad (2)$$

As indicated by expression (2), an input $u_j^{(l)}$ of a node is activated by an activation function f. f denotes an activation function of a node. Known examples of the activation function include ReLU, tan h, and sigmoid. A node in the input layer 131 just transfers input data to a second layer and is not activated. The nodes 130 in the l-th layer non-linearize an input with the activation function and output the non-linearized input to the nodes 130 in the (l+1)th layer. In the neural network, this process is repeated from the input layer 131 to the output layer 133.

$z_i$ output from the nodes in the hidden layer 132 is input to each node in the output layer 133, and the node in the output layer 133 sums up $z_i$. An activation function for the output layer is then used for the node in the output layer 133. In the case of multilevel classification (selection of one of the reference operation tools 51a to 51c), the activation function for the output layer 133 is generally a softmax function. Each node in the output layer 133 outputs an output value $y_i$ of the softmax function. During learning, a teacher signal (1 or 0) is set after each node in the output layer 133 is associated with a reference operation tool. If learning is appropriately performed, each node in the output layer 133 can output a probability of one of the reference operation tools 51a to 51c associated with the 24 sensitivity parameters. In the figure, the nodes correspond to the reference operation tools 51a to 51c, respectively, from the top. If an output value is smaller than a threshold, however, the output value may be determined as unclassified.

Training of a neural network will be described. A plurality of users operate the three reference operation tools 51a to 51c and input representation indices of the reference operation tools 51a to 51c. In doing so, training data, which is (the number of users×the number of reference operation tools) pairs of 24 sensitivity parameters and one teacher signal (one of the reference operation tools), is obtained. The teacher signal is (1, 0, 0), (0, 1, 0), or (0, 0, 1).

A representation index input to the input layer 131 is processed by the neural network, and the output layer 133 outputs an output value yi. A teacher signal included in a piece of training data paired with the input representation index is input to the nodes in the output layer 133. During learning, an error between the output value yi of the nodes in the output layer 133 and the teacher signal is calculated by a loss function. If the activation function of the output layer 133 is the softmax function, the loss function is cross-entropy. The error between the teacher signal and the output value calculated by the loss function propagates to the nodes in the input layer 131 by a calculation method called backpropagation. The weight w between nodes is learned during the propagation. Details of backpropagation are omitted.

As a result of the learning, the node 130 in the output layer 133 corresponding to the reference operation tool 51$a$ is expected to output a value close to 1.0 and the nodes 130 corresponding to the reference operation tools 51$b$ and 51$c$ are expected to output a value close to 0.0 for a representation index input for the reference operation tool 51$a$, for example, in the neural network.

Although the nodes are fully connected to each other in FIG. 38, a convolution layer, a pooling layer, or the like may also be included.

Figure 39:
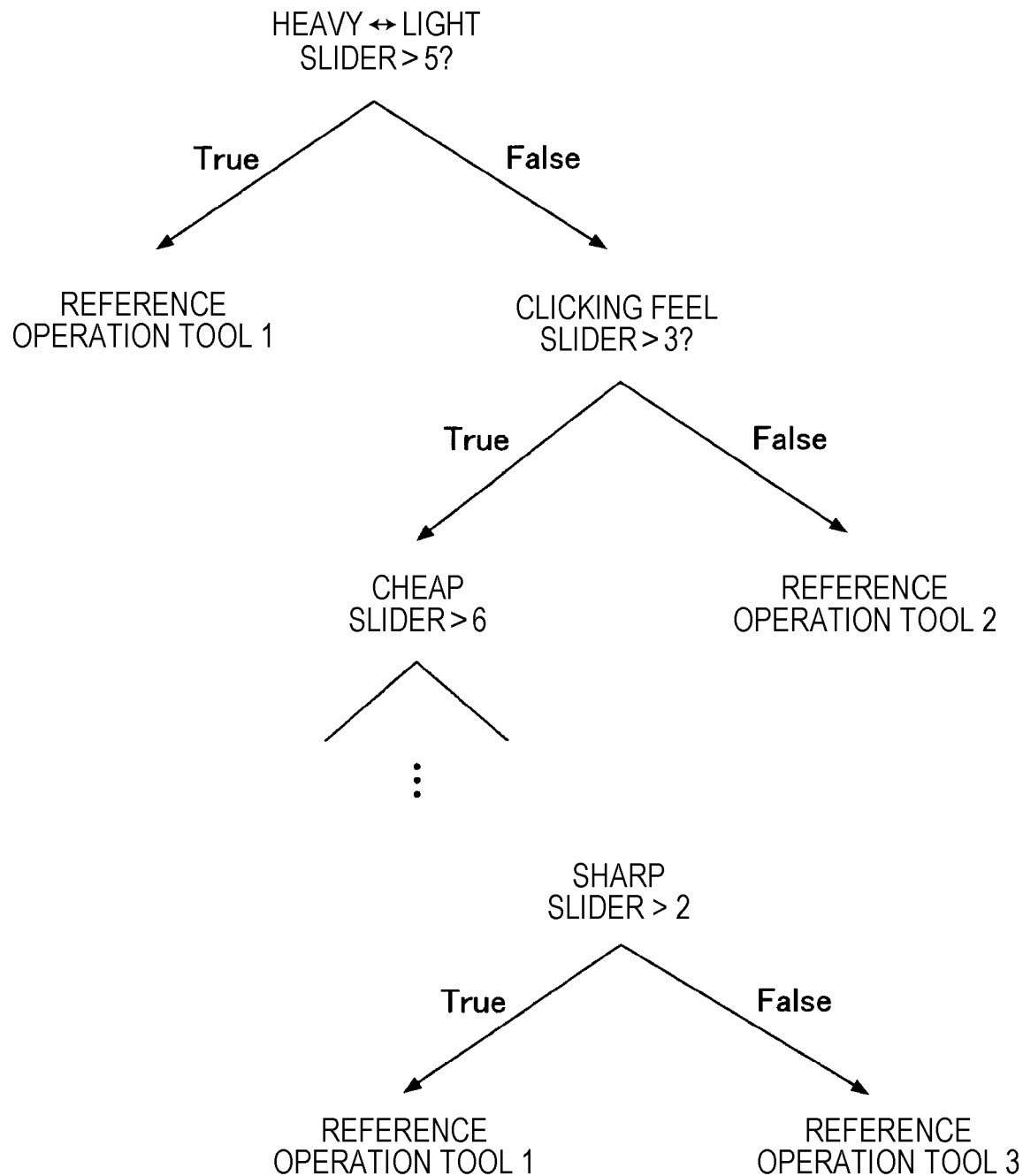
FIG. 39 is a diagram illustrating an example of a decision tree at a time when the classification unit is achieved by the decision tree.

FIG. 39 illustrates an example of a decision tree at a time when the classification unit 64 is achieved by the decision tree. A decision tree is a method of machine learning where a chunk of data where a certain feature is well represented is found and rules for classifying the certain feature are generated. In the present aspect, determination of sensitivity parameters well represented by each of the three reference operation tools 51$a$ to 51$c$ and representation indices of the sensitivity parameters corresponds to learning. An example of a method for learning the structure of a decision tree is a method employing entropy.

As machine learning suitable for classification, support vector machines, random forests, or logistic regression, for example, may be used instead of neural networks and decision trees.

Supplementary Information about First Input Screen

Figure 40:
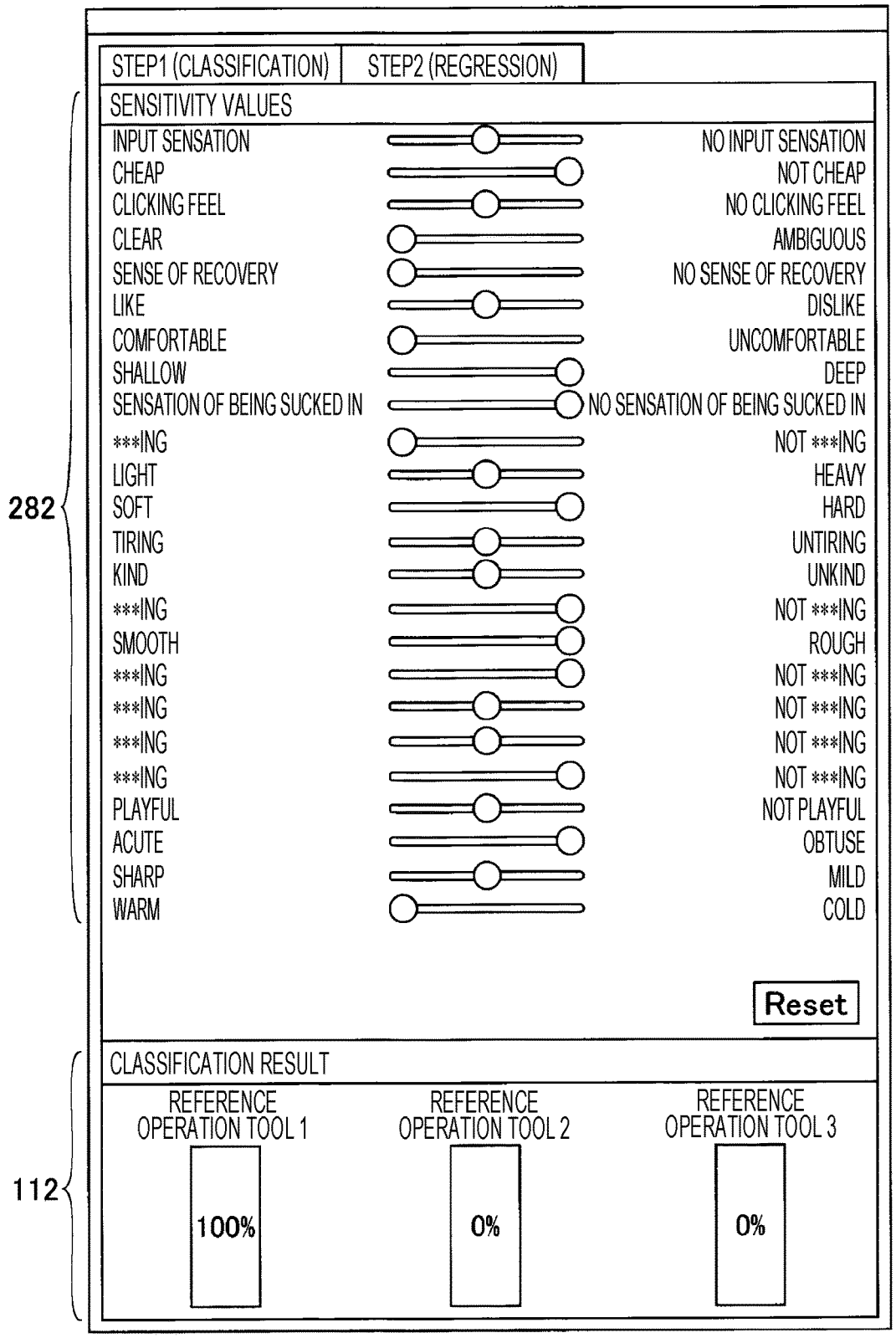
FIG. 40 is a diagram illustrating a first input screen for representation indices.

FIG. 40 is a diagram illustrating the first input screen 281 for representation indices in step 1. A user inputs a representation index for each sensitivity parameter using a slide bar. The classification unit 64 described in the first mode calculates, using a result of learning, a probability that each of the reference operation tools 51$a$ to 51$c$ will be selected if current representation indices are confirmed. The display control unit 61 displays the probability of each of the reference operation tools 51$a$ to 51$c$ in the reference operation tool field 112. The user, therefore, can understand which of the reference operation tools 51$a$ to 51$c$ the current representation indices are closest to by operating the reference operation tools 51$a$ to 51$c$. The probability may be displayed in real-time or when the user inputs a confirmation operation.

When the user presses an icon corresponding to one of the reference operation tools 51$a$ to 51$c$ in the reference operation tool field 112, the display control unit 61 initializes the slide bars in the sensitivity parameter presentation field 282 to representation indices set for the reference operation tool 51$a$, 51$b$, or 51$c$. The user, therefore, can easily check the representation indices set for the reference operation tools 51$a$ to 51$c$. The representation indices after the initialization may be medians or averages of representation indices input for the reference operation tool 51, for example, in sensory testing.

Operation of Client Server System

Figure 41:
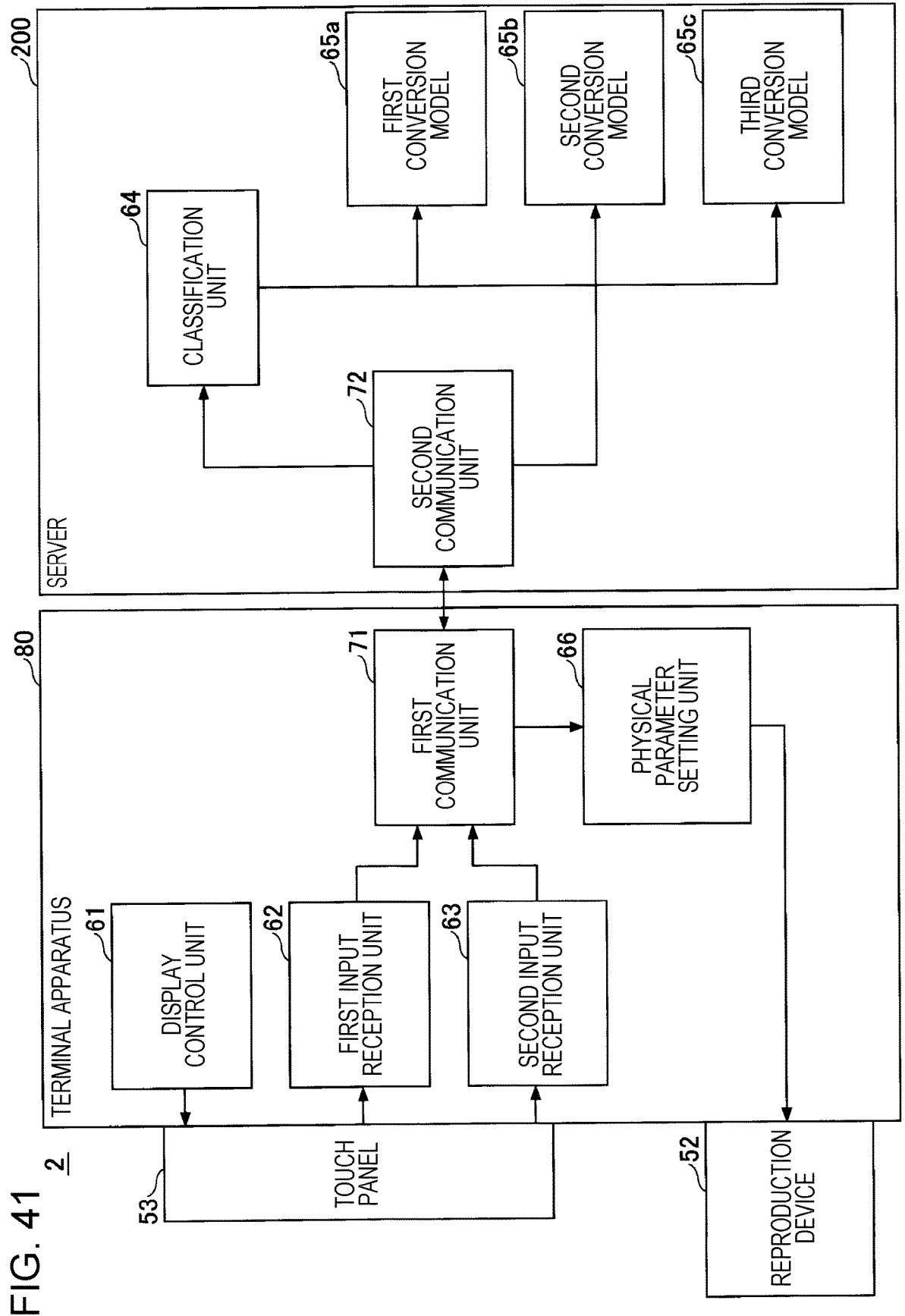
FIG. 41 is an example of a functional block diagram of a tactile control system where the tactile control apparatus in a first mode is applied to a client server system.

Next, operation of a client server system will be described with FIG. 41 and other drawings. FIG. 41 is a functional block diagram of the tactile control system 2 achieved by applying the tactile control apparatus 50 in the first mode to a client server system. In description with reference to FIG. 41, differences from FIG. 29 will be mainly described. As illustrated in FIG. 41, the terminal apparatus 80 and the server 200 have the same functions as those of the tactile control apparatus 50 illustrated in FIG. 29 except that the terminal apparatus 80 and the server 200 include a first communication unit 71 and a second communication unit 72, respectively.

Figure 42:
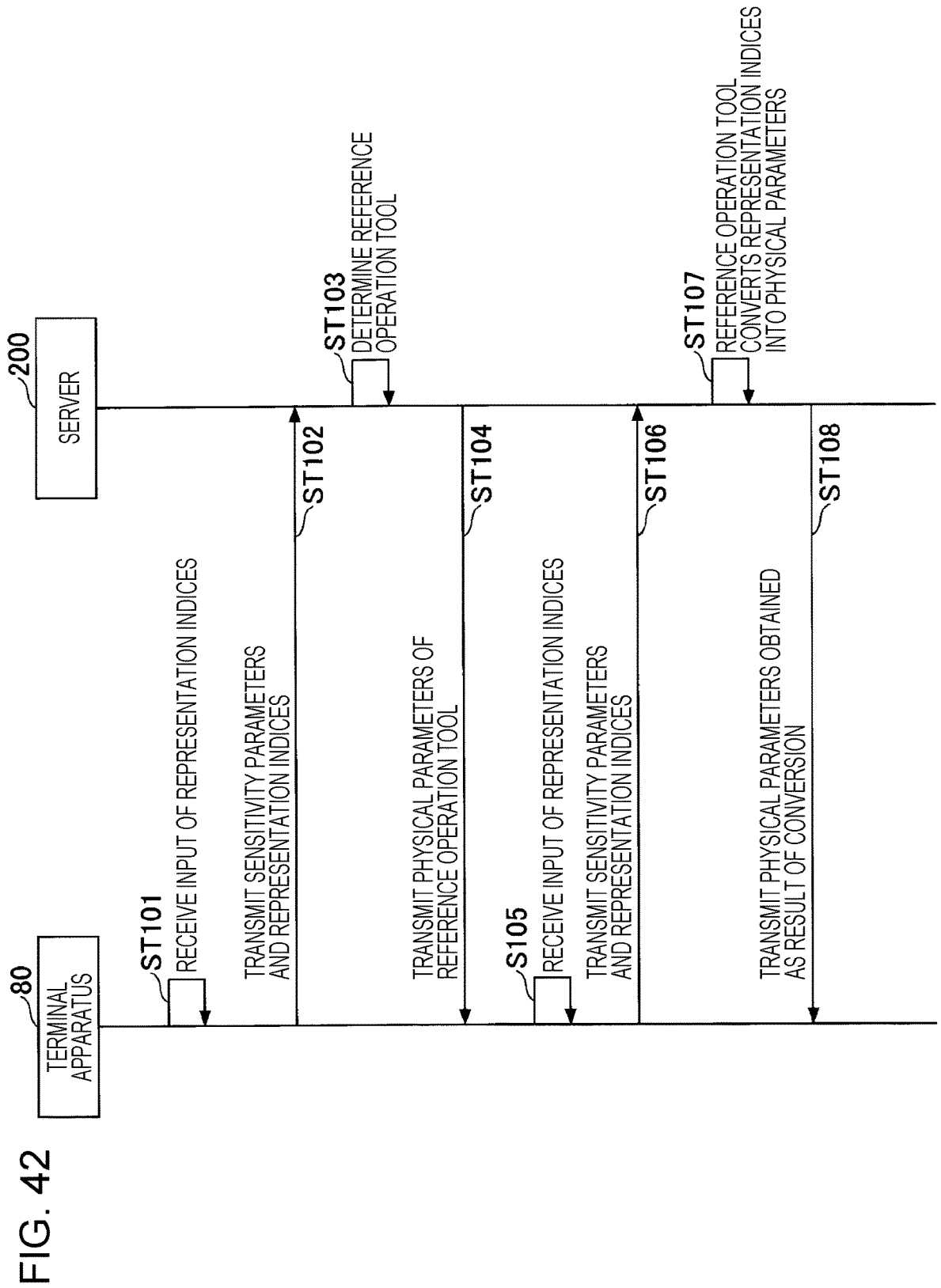
FIG. 42 is an example of a sequence diagram illustrating an operation performed by the tactile control system.

FIG. 42 is a sequence diagram illustrating the operation of the tactile control system 2. In description with reference to FIG. 42, differences from FIG. 32 will be mainly described.

In ST101, the first input reception unit 62 receives an input of representation indices of sensitivity parameters for selecting one of the reference operation tools 51$a$ to 51$c$ input on the first input screen 281 (step 1).

In ST102, the first communication unit 71 of the terminal apparatus 80 transmits the representation indices of the sensitivity parameters to the server 200.

In ST103, the classification unit 64 of the server 200 selects one of the reference operation tools 51$a$ to 51$c$ on the basis of the representation indices of the sensitivity parameters.

In ST104, the second communication unit 72 of the server 200 transmits physical parameters of the selected reference operation tool 51$a$, 51$b$, or 51$c$ to the terminal apparatus 80. The first communication unit 71 of the terminal apparatus 80 receives the physical parameters of the reference operation tool 51$a$, 51$b$, or 51$c$, and the physical parameter setting unit 66 sets the physical parameters for the reproduction operation tool 52.

In ST105, the user determines whether to set an operating feel different from that of the reference operation tool 51$a$, 51$b$, or 51$c$ in accordance with whether an operating feel preferred thereby has been achieved. If the user is to set an operating feel different from that of the reference operation tool 51$a$, 51$b$, or 51$c$, the second input reception unit 63 receives an input of representation indices of sensitivity parameters input on the second input screen 120 (step 2).

In ST106, the first communication unit 71 of the terminal apparatus 80 transmits the representation indices of the sensitivity parameters to the server 200.

In ST107, one of the first to third conversion models 65$a$ to 65$c$ of the server 200 (already selected in ST103) converts the representation indices into physical parameters $P_1$ to $P_n$.

In ST108, the physical parameter setting unit 66 of the server 200 transmits the physical parameters obtained as a result of the conversion to the terminal apparatus 80 through the second communication unit 72. The physical parameters of the reference operation tool 51$a$, 51$b$, or 51$c$ received by the first communication unit 71 of the terminal apparatus 80 for the reproduction operation tool 52.

The tactile control system 2 according to the present aspect can thus reproduce an operating feel preferred by a user in real-time even with a client server system.

Figure 43:
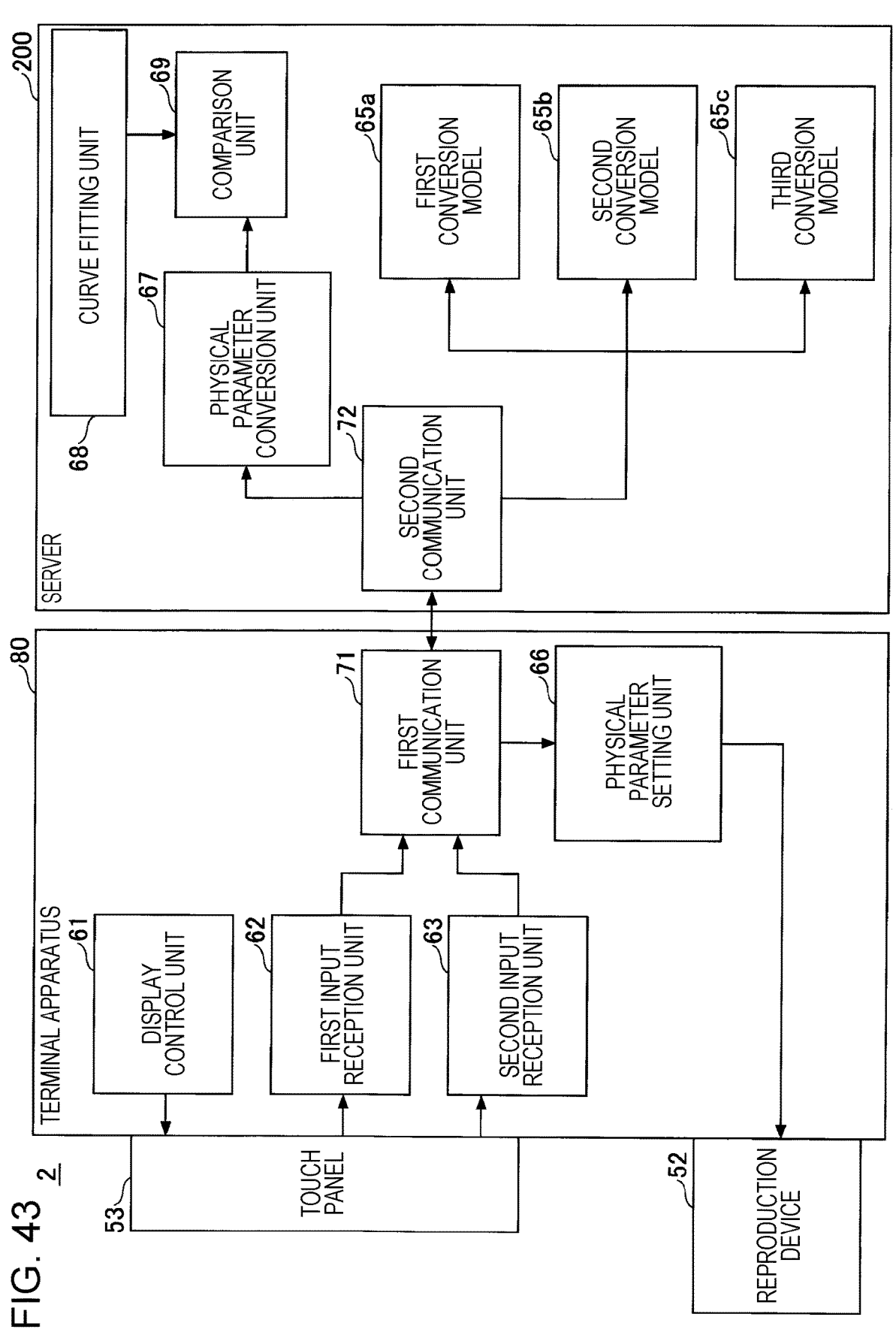
FIG. 43 is an example of a functional block diagram of a tactile control system where the tactile control apparatus in a second mode is applied to a client server system.

FIG. 43 is a functional block diagram of the tactile control system 2 obtained by applying the tactile control apparatus 50 in the second mode to a client server system. In description with reference to FIG. 43, differences from FIG. 34 will be mainly described. As illustrated in FIG. 43, the terminal apparatus 80 and the server 200 have the same functions as those of the tactile control apparatus 50 illustrated in FIG. 34 except that the terminal apparatus 80 and the server 200 include the first communication unit 71 and the second communication unit 72, respectively.

Figure 44:
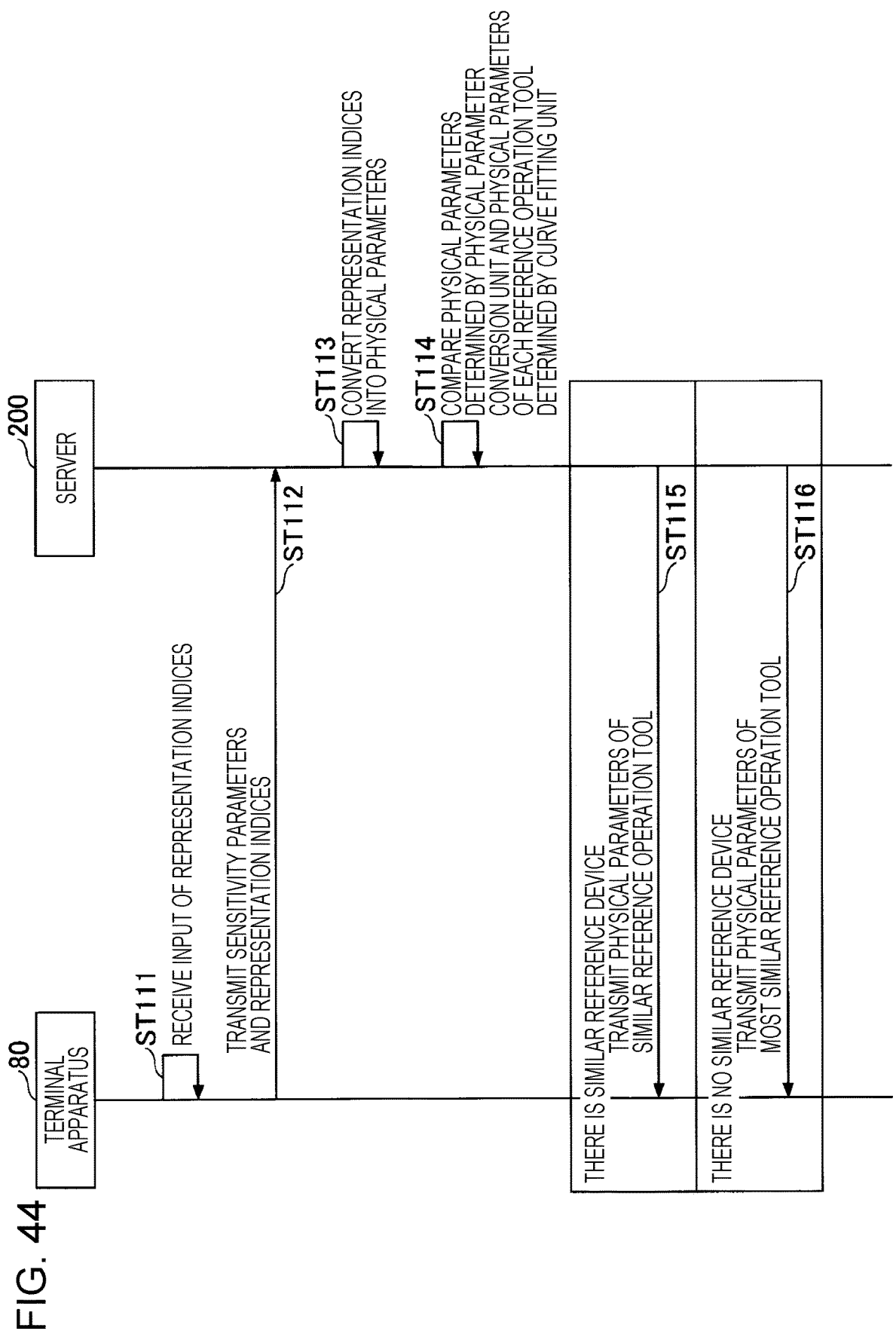
FIG. 44 is an example of a sequence diagram illustrating an operation performed by the tactile control system in the second mode.

FIG. 44 is a sequence diagram illustrating operation of the tactile control system 2 in the second mode. In description with reference to FIG. 44, differences from FIG. 37 will be mainly described.

In ST111, the first input reception unit 62 receives an input of representation indices of sensitivity parameters on the first input screen 281.

In ST112, the first communication unit 71 of the terminal apparatus 80 transmits the representation indices of the sensitivity parameters to the server 200.

In ST113, the physical parameter conversion unit 67 of the server 200 converts the representation indices of the sensitivity parameters into physical parameters (load displacement curve).

In ST114, the comparison unit 69 of the server 200 compares the physical parameters obtained as a result of the conversion performed by the physical parameter conversion unit 67 and the physical parameters of each of the reference operation tools 51*a* to 51*c* determined in advance by the curve fitting unit 68.

In ST115, if the physical parameters of any of the reference operation tools 51*a* to 51*c* are similar to those determined by the physical parameter conversion unit 67, the second communication unit 72 transmits the similar physical parameters of the reference operation tool 51*a*, 51*b*, or 51*c* to the terminal apparatus 80. The first communication unit 71 of the terminal apparatus 80 receives the physical parameters of the reference operation tool 51*a*, 51*b*, or 51*c*, and the physical parameter setting unit 66 sets the physical parameters for the reproduction operation tool 52.

In ST116, if none of the physical parameters of the reference operation tools 51*a* to 51*c* are similar to the physical parameters determined by the physical parameter conversion unit 67, the second communication unit 72 transmits the physical parameters of the reference operation tools 51*a*, 51*b*, or 51*c* with a highest level of similarity to the terminal apparatus 80. The first communication unit 71 of the terminal apparatus 80 receives the physical parameters of the reference operation tool 51*a*, 51*b*, or 51*c*, and the physical parameter setting unit 66 sets the physical parameters for the reproduction operation tool 52. Alternatively, the classification unit 64 in the first mode may be provided and determine one of the reference operation tools 51*a* to 51*c* (first to third conversion models 65*a* to 65*c*).

The tactile control system 2 according to the present aspect can thus reproduce, in real-time, an operating feel preferred by a user even with a client server system.

APPENDIX TO SECOND ASPECT

1. A tactile control apparatus that controls an operating feel of an operation tool, the tactile control apparatus comprising:
a display control unit that displays means for inputting a first representation index associated with a first sensitivity parameter;
a first input reception unit that receives an input of the first representation index in accordance with a user operation;
a physical parameter setting unit that sets a prepared physical parameter for a reproduction operation tool on a basis of the first representation index,
the display control unit displaying means for inputting a second representation index associated with a second sensitivity parameter;
a second input reception unit that receives an input of the second representation index in accordance with a user operation; and
a conversion unit that converts the second representation index into a physical parameter using a regression model,
wherein the physical parameter setting unit sets, for the reproduction operation tool, the physical parameter obtained as a result of the conversion performed by the conversion unit.

2. The tactile control apparatus according to 1, further comprising:
a classification unit that classifies the first representation index into one of a plurality of reference operation tools,
wherein the physical parameter setting unit sets, for the reproduction operation tool, the physical parameter set for the reference operation tool into which the classification unit has classified the first representation index.

3. The tactile control apparatus according to 1, further comprising:
a curve fitting unit that performs curve fitting on load displacement curves achieved by first physical parameters of a plurality of reference operation tools and that estimates the first physical parameter for each of the plurality of reference operation tools; and
a physical parameter conversion unit that converts the first representation index into a second physical parameter using a regression model,
wherein the physical parameter setting unit sets, for the reproduction operation tool, the first physical parameter of the reference operation tool whose first physical parameter is most similar to the second physical parameter.

4. The tactile control apparatus according to 2,
wherein the means for inputting the second representation index can take a representation index corresponding to the physical parameter set for the reference operation tool into which the classification unit has classified the first representation index and values around the representation index.

5. The tactile control apparatus according to 1,
wherein the first sensitivity parameter and the second sensitivity parameter each include a plurality of sensitivity parameters and the number of first sensitivity parameters is larger than the number of second sensitivity parameters.

6. The tactile control apparatus according to 2,
wherein the classification unit is generated by learning correspondences between operating feels of the plurality of reference operation tools and representation indices input, for each first sensitivity parameter, by users, who have operated the plurality of reference operation tools.

7. The tactile control apparatus according to 2,
wherein the regression model is generated by conducting a regression analysis on correspondences between the physical parameters of the plurality of reference operation tools and representation indices input, for each second sensitivity parameter, by users, who have operated the plurality of reference operation tools.

8. The tactile control apparatus according to 3,
wherein the regression model is generated by conducting a regression analysis on correspondences between physical parameters of any reference operation tools and representation indices input, for each first sensitivity parameter, by users, who have operated the reference operation tool.
9. The tactile control apparatus according to 3,
wherein the curve fitting unit performs curve fitting on the load displacement curves using a fitting model for obtaining operation reaction force from a stroke using the first physical parameters as coefficients and estimates the first physical parameters.
10. The tactile control apparatus according to 1,
wherein the first sensitivity parameter and the second sensitivity parameter are adjectives, and
wherein the first representation index and the second representation index are values indicating degrees of the adjectives.
11. The tactile control apparatus according to any of 1 to 10,
wherein the first representation index and the second representation index are tactile information obtained when the user has operated the operation tool.
12. The tactile control apparatus according to 11,
wherein, in the regression model, the first representation index and the second representation index are correlated with operation force as a tactile sensation obtained when the operation tool is operated.
13. A program causing a tactile control apparatus that controls an operating feel of an operation tool to function as:
a display control unit that displays means for inputting a first representation index associated with a first sensitivity parameter;
a first input reception unit that receives an input of the first representation index in accordance with a user operation;
a physical parameter setting unit that sets a prepared physical parameter for a reproduction operation tool on a basis of the first representation index,
the display control unit displaying means for inputting a second representation index associated with a second sensitivity parameter;
a second input reception unit that receives an input of the second representation index in accordance with a user operation; and
a conversion unit that converts the second representation index into a physical parameter using a regression model,
wherein the physical parameter setting unit sets, for the reproduction operation tool, the physical parameter obtained as a result of the conversion performed by the conversion unit.
14. A tactile control method where a tactile control apparatus that controls an operating feel of an operation tool controls a tactile sensation, the tactile control method comprising the steps of:
displaying means for inputting a first representation index associated with a first sensitivity parameter;
receiving an input of the first representation index in accordance with a user operation;
setting a prepared physical parameter for a reproduction operation tool on a basis of the first representation index;
displaying means for inputting a second representation index associated with a second sensitivity parameter;
receiving an input of the second representation index in accordance with a user operation;
converting the second representation index into a physical parameter using a regression model; and
setting the physical parameter obtained as a result of the conversion for the reproduction operation tool.
15. A tactile control system where a terminal apparatus and a server communicate with each other over a network,
wherein the terminal apparatus includes
a display control unit that displays means for inputting a first representation index associated with a first sensitivity parameter,
a first input reception unit that receives an input of the first representation index in accordance with a user operation,
a first communication unit that transmits the first representation index to the server, and
a physical parameter setting unit that sets the physical parameter transmitted from the server for the reproduction operation tool,
the display control unit displaying means for inputting a second representation index associated with a second sensitivity parameter, and
a second input reception unit that receives an input of the second representation index in accordance with a user operation,
wherein the first communication unit transmits the second representation index to the server,
wherein the server includes
a second communication unit that determines the prepared physical parameter on a basis of the first representation index received from the terminal apparatus and that transmits the determined physical parameter to the terminal apparatus, and
a conversion unit that converts the second representation index received from the terminal apparatus into a physical parameter using a regression model, and
wherein the second communication unit transmits the physical parameter obtained as a result of the conversion performed by the conversion unit to the terminal apparatus.
16. A server that communicates with a terminal apparatus over a network, the terminal apparatus including:
a display control unit that displays means for inputting a first representation index associated with a first sensitivity parameter,
a first input reception unit that receives an input of the first representation index in accordance with a user operation,
a first communication unit that transmits the first representation index to the server, a physical parameter setting unit that sets a physical parameter transmitted from the server for a reproduction operation tool,
the display control unit displaying means for inputting a second representation index associated with a second sensitivity parameter, and
a second input reception unit that receives an input of the second representation index in accordance with a user operation, the first communication unit transmitting the second representation index to the server, the server comprising:
a second communication unit that determines a prepared physical parameter on a basis of the first representation index received from the terminal apparatus and that transmits the determined physical parameter to the terminal apparatus, and
a conversion unit that converts the second representation index received from the terminal apparatus into the physical parameter using a regression model, wherein the second communication unit transmits the physical parameter obtained as a result of the conversion performed by the conversion unit to the terminal apparatus.

Third Aspect

Background Art

Operation units that perform sensory presentation by giving some stimuli to persons are known. Here, the sensory presentation includes tactile presentation, auditory presentation based on sounds, and visual presentation through display of images or the like. The sensory presentation is adjusted by adjusting signals for driving various operation units.

Gaming controllers with a replaceable button including a vibration device or the like are known (e.g., refer to Japanese Unexamined Patent Application Publication (Translation of PCT Application) No. 2020-523068). Japanese Unexamined Patent Application Publication (Translation of PCT Application) No. 2020-523068 discloses a technique for replacing a vibration device itself in order to achieve different vibration intensities.

SUMMARY OF INVENTION

Technical Problem

The example of the related art, however, has a problem that sensory presentation that suits physical properties of an operation unit is not sufficiently performed. In the case of a rotary operation unit, for example, a sensation transmitted to a user who operates the operation unit undesirably differs depending on size and mass of the operation unit, even if an actuator is driven in the same manner.

In view of the above problem, the present aspect aims to provide a technique for performing sensory presentation that suits physical properties of an operation unit.

Advantageous Effects of Invention

A technique for performing sensory presentation that suits physical properties of an operation unit can be provided.

Description of Third Aspect

In the present aspect, a sensory control method for making adjustments on the basis of physical properties of an operation unit (e.g., an operation device 33 illustrated in FIG. 45, which will be described later) will be described. When the tactile presentation device 20 generates a tactile sensation through an operation unit by driving an actuator, a feel (an operating feel perceived by a user) transmitted to a user (an example of an operator) who operates the operation unit undesirably differs depending on physical properties (size, mass, etc.) of the operation unit, even if the actuator is driven in the same manner.

That is, physical parameters correlated with sensitivity parameters are complex physical parameters including physical parameters of an operation unit and physical parameters of an actuator. The tactile presentation device 20 according to the present aspect, therefore, makes adjustments in such a way as to obtain a tactile presentation signal that suits physical parameters of an operation unit, such as size and mass. A tactile control system 110 includes an adjustment unit that adjusts at least an operation signal, a sensory presentation signal, or a sensory presentation on the basis of physical properties of an operation unit.

For example, differences in physical properties of an operation unit are detected as follows.

A user inputs the differences in the physical properties of the operation unit to the input/output device 3 as information. Size and mass of the operation unit are identified.

The tactile presentation device 20 detects, with sensors, an identifier (ID), size, mass, and the like indicating the differences in the physical properties of the operation unit.

A sensor that detects the differences in the physical properties of the operation unit is a camera, which reads a one-dimensional code or a two-dimensional code. The camera identifies the operation unit by recognizing an image of the operation unit. Alternatively, the sensor is an integrated circuit (IC) tag reader, which reads an ID.

Tactile Control System 110

Figure 45:
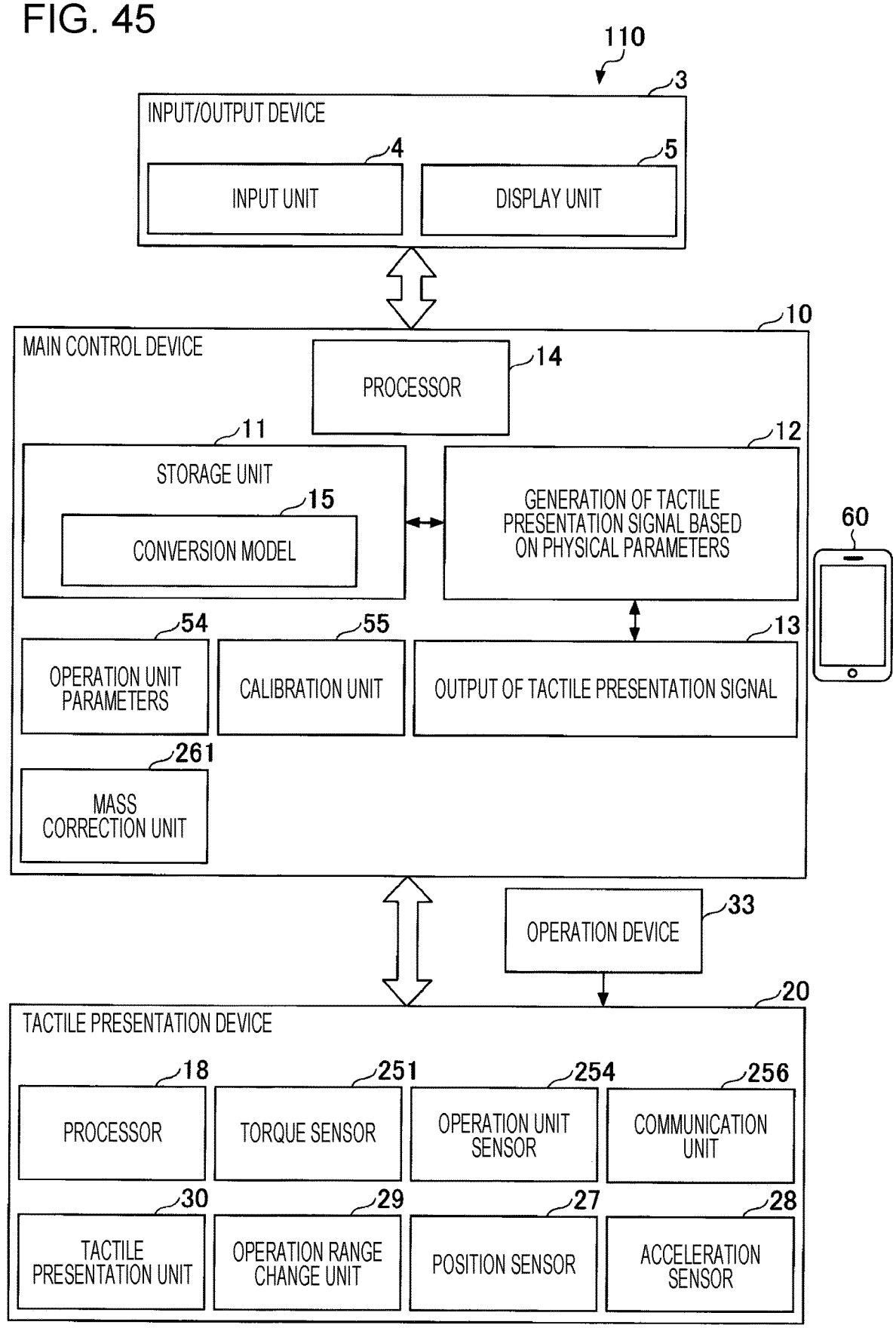
FIG. 45 is a diagram illustrating the configuration of a tactile control system as a sensory control system (second embodiment)

FIG. 45 is a diagram illustrating the configuration of the tactile control system 110, which is the sensory control system 100. In the present aspect, components given the same reference numerals as in FIG. 2 achieve the same functions, and only key components in the present aspect might be mainly described.

The tactile presentation device 20 illustrated in FIG. 45 newly includes an operation unit sensor 254, a torque sensor 251, and a communication unit 256. When a removable operation unit is attached to the tactile presentation device 20, the operation unit sensor 254 detects the attachment and information identifying the operation unit. The information identifying an operation unit is an IC tag built into the operation unit, a one-dimensional code or a two-dimensional code attached to the operation unit, an appearance of the operation unit, or the like. When the information identifying an operation unit is an IC tag, the operation unit sensor 254 is an IC tag reader, and an ID (identification information) of the operation unit is obtained from the IC tag. When the information identifying an operation unit is a one-dimensional code or a two-dimensional code, the operation unit sensor 254 is a camera, and the ID of the operation unit is obtained from the one-dimensional code or the two-dimensional code. When the information identifying an operation unit is an appearance of the operation unit, the operation unit sensor 254 is a camera and an identification device, and the identification device that has learned correspondences between image data regarding appearances of operation units and IDs identifies the operation unit (identifies the ID of the operation unit).

The operation device 33 is an example of the operation unit, and the operation unit may be an attachment removable from at least part (may be the entirety or part) of the operation device 33. The main control device 10 and the tactile presentation device 20 are an example of a sensory control apparatus.

The torque sensor converts a current for driving an actuator into torque during calibration for estimating mass of an operation unit. Details will be described later.

The communication unit 256 communicates with a mobile terminal 60 and receives size of an operation unit from the mobile terminal 60. Details will be described later.

The main control device 10 illustrated in FIG. 45 newly includes operation unit parameters 54, a calibration unit 55, and a mass correction unit 261. The operation unit parameters 54 will be described with reference to FIG. 46. The calibration unit 55 estimates mass of an operation unit through calibration. The mass correction unit 261 corrects mass of an operation unit. The calibration unit 55 and the mass correction unit 261 will be described later.

FIG. 46 illustrates an example of the operation unit parameters 54. In the operation unit parameters 54, mass, size, and other physical parameters are associated with IDs of operation units. Mass and size are physical properties of an operation unit 201 and included in physical parameters in the present aspect.

In the case of a rotary operation unit that receives rotation, size may be a radius, a diameter, or an overall length (the length of a longest part). When an operation unit is a push operation unit, size may be a length in a push direction. When an operation unit is a slide operation unit that receives sliding, size may be the amount of sliding, height, width, or thickness. When an operation unit is a pivot operation unit that receives tilting, size may be the length of the operation unit.

The other physical parameters have been described in the first aspect. As illustrated in FIG. 46, when the operation unit sensor 254 detects an ID of an operation unit, physical parameters are identified.

Detection of Operation Unit by Operation Unit Sensor

Figure 47A:
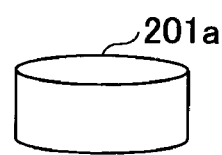
FIGS. 47A and 47B are diagrams illustrating a difference in a physical property between operation units.
Figure 47B:
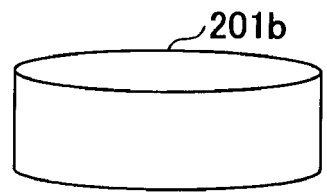

A method for detecting an operation unit performed by the operation unit sensor 254 will be described with reference to FIGS. 47A to 48C. First, FIGS. 47A and 47B are diagrams illustrating a difference in a physical property between rotary operation units. FIG. 47A illustrates a small operation unit 201a, and FIG. 47B illustrates a large operation unit 201b. The operation units 201a and 201b will be referred to as "operation units 201" hereinafter.

The operation units 201a and 201b illustrated in FIGS. 47A and 47B are of a rotary type, and feels transmitted to a user who operates the operation units undesirably differ depending on size (diameters) and mass of the operation units 201a and 201b, even if the processor 14 drives actuators in the same manner. Torque required to rotate the operation unit 201, for example, becomes smaller as the diameter increases. When reaction force in response to rotation of the operation units 201a and 201b is the same, therefore, the user might feel it hard to rotate the operation unit 201a or not feel that the operation unit 201b has any operating feel.

Even when the operation units 201 have different sizes, the operation units usually have similar shapes, and there is a certain relationship between size and mass. For example, mass is proportional to a cube of size (e.g., radius), and an approximate proportional constant can also be calculated. As described later, therefore, mass of an operation unit 201 can be obtained from size of the operation unit 201 and the size of the operation unit 201 can be obtained from the mass of the operation unit 201 using a conversion formula.

Figure 48A:
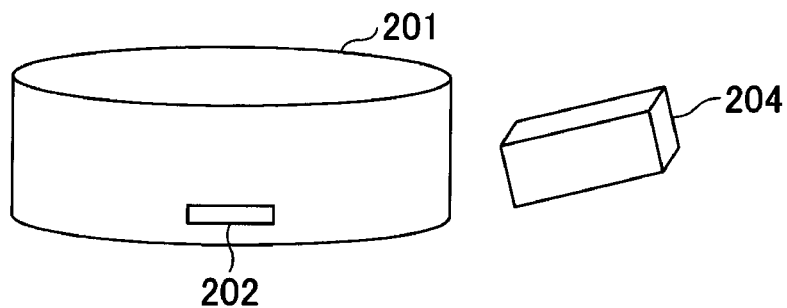
FIGS. 48A to 48C are diagrams illustrating some methods for detecting size and mass of an operation unit using an operation unit sensor.
Figure 48B:
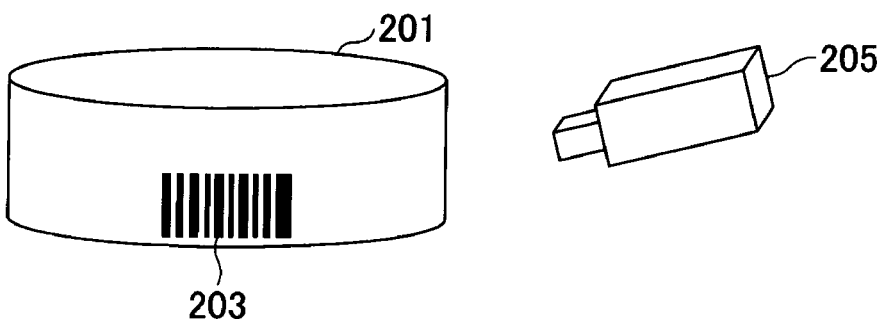
Figure 48C:
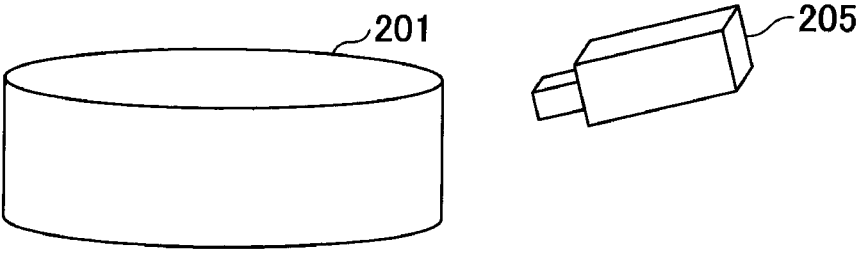

FIGS. 48A to 48C are diagrams illustrating some methods for detecting size or mass of an operation unit 201 performed by the operation unit sensor 254. In FIG. 48A, an IC tag 202 is incorporated into or attached to an operation unit 201. In this case, the operation unit sensor 254 is an IC tag reader 204. The operation unit sensor 254 activates the IC tag 202 using electromagnetic waves, communicates with the IC tag 202, and receives an ID of the operation unit from the IC tag 202. The IC tag reader 204 is preferably provided for the tactile presentation device 20, but may be an external apparatus such as the mobile terminal 60.

In FIG. 48B, a barcode 203 is attached to an operation unit 201. In this case, the operation unit sensor 254 captures an image of the barcode 203 using a camera 205 and decodes the barcode 203 to obtain an ID of the operation unit. The camera 205 is preferably provided for the tactile presentation device 20, but may be an external apparatus such as the mobile terminal 60.

In FIG. 48C, the operation unit sensor 254 captures an image of an operation unit 201 itself. The operation unit sensor 254 estimates size of the operation unit sensor 254 from image data on the basis of a preset distance between the camera 205 and the operation unit 201 and a focal length of the camera 205. Any identification device that has learned distances, focal lengths, and correspondences between image data regarding appearances of operation units and IDs can output an ID of the operation unit from the image data. With respect to mass, a conversion formula for obtaining mass from size is used.

The operation unit sensor 254 illustrated in FIG. 48A to 48C may be incorporated into the tactile presentation device 20 or provided separately from the tactile presentation device 20. For example, the operation unit sensor 254 may be an information processing device carried by a user, such as the mobile terminal 60.

when Operation Unit Detected by Operation Unit Sensor is not Included in Operation Unit Parameters There are cases where an operation unit detected by the operation unit sensor 254 is not included in the operation unit parameters. For example:

There are cases where, in the case of a controller that is used by a user, such as a gaming controller, and whose operation unit such as a knob can be replaced by the user, the user desires to achieve an operating feel suitable for an attachment.

There are cases where, in the case of an operation handle of a vehicle or the like that can be replaced by a user, the user desires to achieve an operating feel suitable for an attached handle.

When an operation unit detected by the operation unit sensor 254 is not included in the operation unit parameters, the mobile terminal 60 estimates a physical parameter. A user activates a certain application on the mobile terminal 60. The user captures an image of an operation unit 201 attached to the tactile presentation device 20 using a camera controlled by the application. As a result, the application detects size of the operation unit 201 from image data regarding the operation unit 201. The camera included in the mobile terminal 60, therefore, is preferably a stereo camera or a LiDAR scanner. The application transmits the size of the operation unit 201 to the tactile presentation device 20. The communication unit 256 receives the size of the operation unit 201.

Even after the communication unit 256 receives the size, mass is unknown. With respect to the mass of the operation unit 201, therefore, a conversion formula for obtaining mass from size is used. Alternatively, the application obtains mass from size using the conversion formula and transmits the mass to the tactile presentation device 20.

Estimation of Mass of Operation Unit Through Calibration

Next, a method for estimating mass through calibration performed by the calibration unit 55 will be described. When an operation unit 201 is attached to the calibration unit 55, the calibration unit 55 operates (in the case of a rotary type, rotates) the operation unit with a current pattern and estimates mass of the operation unit on the basis of a correspondence between a current and a position.

Figure 49A:
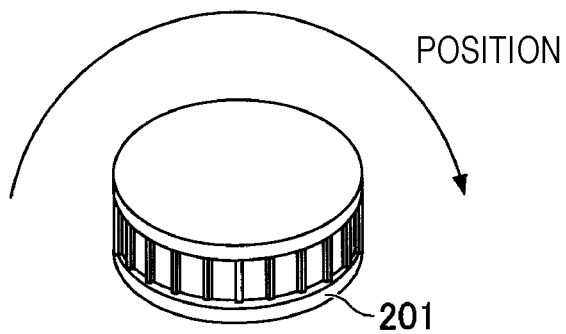
FIGS. 49A and 49B are diagrams illustrating a method for estimating mass of an operation unit through calibration.
Figure 49B:
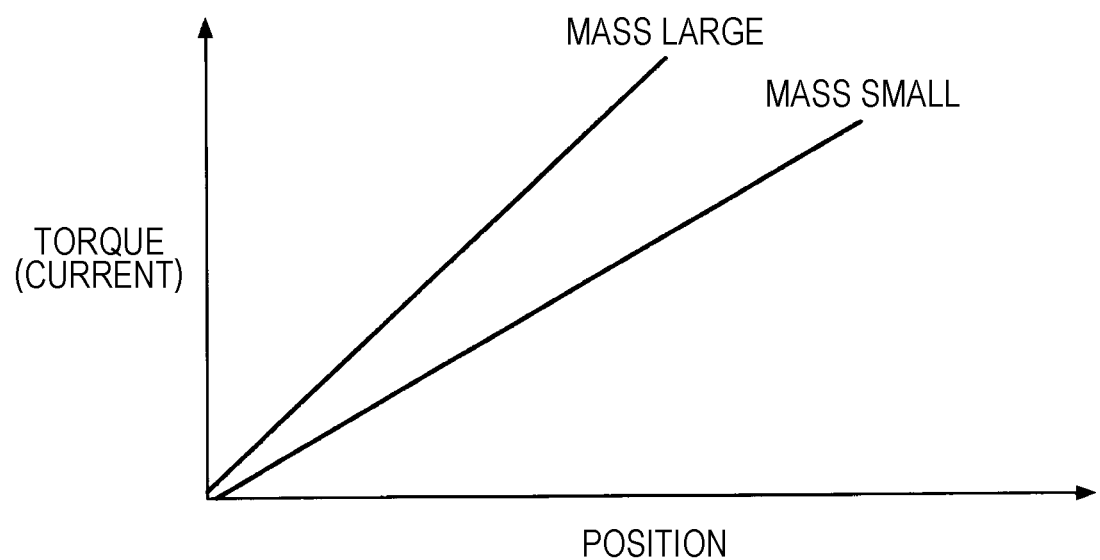

FIGS. 49A and 49B are diagrams illustrating the method for estimating mass of an operation unit through calibration. First, FIG. 49A is a diagram illustrating a position of a rotary operation unit 201. In the case of the rotary operation unit 201, the position may be a rotation angle of a center of rotation. The center of rotation is, when an upper surface of the operation unit 201 has a circular shape, the center of a circle. When the calibration unit 55 rotates the rotary operation unit 201, a larger current is needed as the mass increases.

FIG. 49B is a diagram illustrating a relationship between a current required to change the position of the operation unit 201 and the position. The relationship between the current and the position illustrated in FIG. 49B is an example for description. In general, a larger current is required as the amount of change in position increases. Current has a certain relationship with torque for rotating the operation unit, and torque required to rotate the operation unit is obtained from current. The current for changing the position is known to become larger as the mass of the operation unit increases. The torque sensor 251 converts this current into torque.

If a relationship "I=αM" between a current I required to rotate the operation unit 201 to a certain position and mass M is known, the mass M of the attached operation unit 201 can be estimated by measuring the current I required for the calibration unit 55 to rotate the operation unit 201 to a certain position. α can be easily obtained by measuring currents at times when some operation units 201 whose masses are known are rotated to certain positions.

The calibration unit 55 thus estimates the mass M of the operation unit 201 attached thereto. With respect to the size, the conversion formula for obtaining mass from size is used.

If an operation unit detected by the operation unit sensor 254 is not included in the operation unit parameters, therefore, size and mass of the attached operation unit can be estimated through calibration instead of using the application on the mobile terminal 60.

Correction of Mass in Accordance with Installation Location of Operation Unit

How much the operation unit 201 is tilted differs depending on an installation location. A tilt of the operation unit 201 differs between, for example, when the operation unit 201 is mounted on a steering wheel and when the operation unit 201 is mounted on a center console. When a tilt differs, an operating feel of especially a push operation unit differs due to an effect of gravity. The tactile presentation device 20, therefore, measures a tilt of an installation location of the operation unit 201 using the acceleration sensor 28 and corrects mass of the operation unit 201.

Figure 50A:
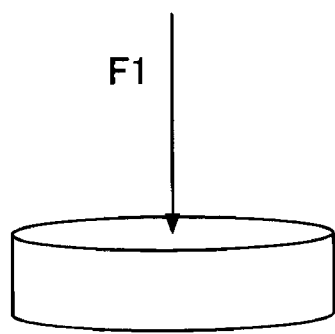
FIGS. 50A and 50B are diagrams illustrating correction of mass of an operation unit.
Figure 50B:
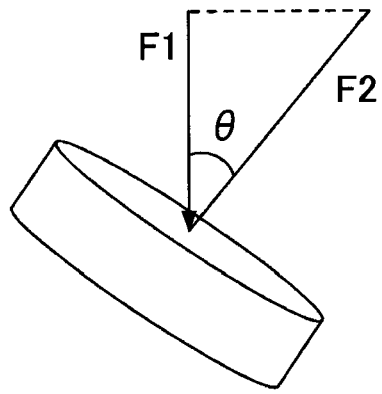

FIGS. 50A and 50B are diagrams illustrating the correction of the mass of the operation unit 201. FIG. 50A illustrates operation reaction force F1 at a time when the operation unit 201 provided at an installation location where the tilt is zero is pushed. The operation reaction force F1 is, for example, a maximum value Tmax in FIG. 11. FIG. 50B illustrates operation reaction force F2 at a time when the operation unit 201 provided at an installation location where the tilt is 0 is pushed. Due to a relationship between the operation reaction forces F1 and F2 and the tilt θ illustrated in FIG. 50B, the operation reaction force F2 becomes as follows:

$F2=F1/\cos\theta$

Large operation reaction force is thus necessary at a tilted installation location, but operation reaction force and mass are correlated with each other. A difference in operation reaction force, therefore, is regarded as a difference in mass, and the mass correction unit 261 corrects the mass of the operation unit 201. The mass correction unit 261 corrects the mass of the operation unit 201 using, for example, a relationship "corrected mass=original mass/cos θ". In doing so, even when the operation unit 201 is installed at a tilted location, a preferable operating feel can be achieved.

Operation and Process

Figure 51:
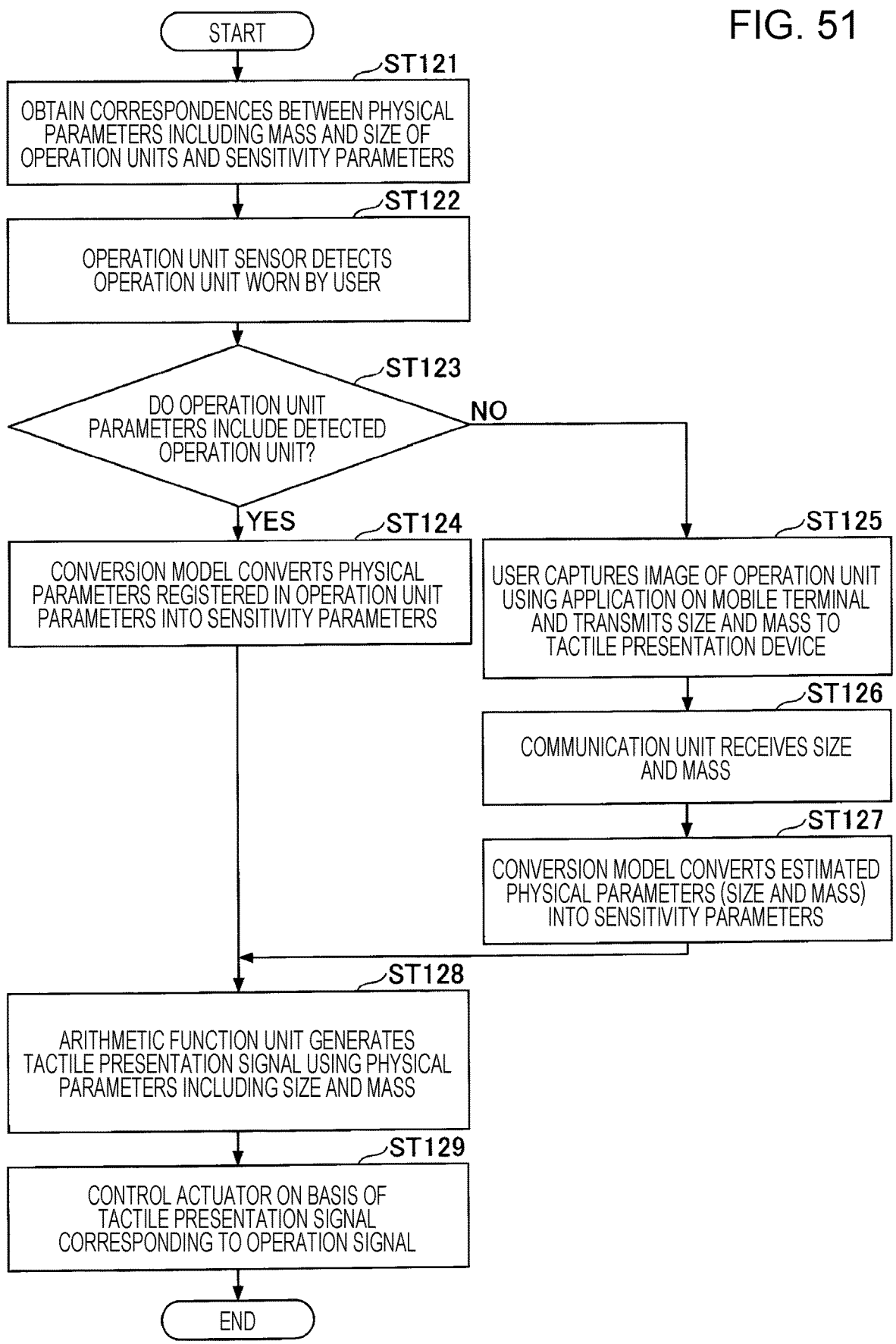
FIG. 51 is a flowchart illustrating a process where the tactile control system adjusts a tactile presentation signal in accordance with physical parameters of an attached operation unit.

FIG. 51 is a flowchart illustrating a process performed by the tactile control system 110 to adjust a tactile presentation signal in accordance with physical parameters of an attached operation unit.

First, the tactile control system 110 obtains, using the SD method or the like, correspondences between physical parameters including mass and size of operation units and sensitivity parameters (ST121).

Next, a user wears an operation unit, and the operation unit sensor 254 detects the operation unit worn by the user (ST122).

The tactile presentation device 20 determines whether the operation unit parameters 54 include the detected operation unit (ST123). A case where the operation unit sensor 254 cannot detect an ID is included in a case where the operation unit parameters 54 do not include the detected operation unit.

If a result of step ST123 is Yes, the conversion model 15 converts physical parameters registered in the operation unit parameters 54 into sensitivity parameters (ST124). The conversion model 15 in the present aspect calculates the sensitivity parameters from the physical parameters as illustrated in FIG. 22.

If the result of step ST123 is No, the user captures an image of the operation unit using the application on the mobile terminal 60 and transmits size and mass to the tactile presentation device (ST125).

The communication unit 256 receives the size and the mass from the application on the mobile terminal 60 (ST126). As described above, size and mass obtained by the calibration unit 55 through calibration may be used, instead.

The conversion model 15 converts the estimated physical parameters (size and mass) into sensitivity parameters (ST127).

The arithmetic function unit 12 then generates a tactile presentation signal using the physical parameters including the size and the mass (those registered in the operation unit parameters 54 or the estimated ones) (ST128).

The arithmetic function unit 13 transmits the tactile presentation signal to the tactile presentation device 20. The user rotates the operation unit 201, for example, and the processor 18 generates an operation signal. When the operation unit is a rotary operation unit, the operation signal indicates, for example, a rotation angle. In the case of another operation unit, the operation signal indicates the amount of operation performed on the operation unit. The tactile presentation unit 30 controls an actuator on the basis of the tactile presentation signal corresponding to the operation signal (ST129).

The arithmetic function unit 12 may again convert, into physical parameters, the sensitivity parameters obtained in step ST127 from the physical parameters through the conversion to generate a tactile presentation signal. A dedicated conversion model 15 may be prepared for the second conversion.

The tactile control system 110 can thus estimate physical parameters even when an unregistered operation unit is attached. The arithmetic function unit 12 as an adjustment unit can adjust a tactile presentation signal in accordance with the attached operation unit since the arithmetic function unit 12 generates the tactile presentation signal on the basis of the physical parameters.

The adjustment unit is not limited to adjustment of a "tactile presentation signal" and may be capable of adjusting an "operation signal", a "sensory presentation signal", a "sensory presentation" itself, or any combination of these. More specifically, the following cases are possible.

- A case where the processor 18 (an example of an operation detection unit) functions as an adjustment unit and causes an "operation signal" to reflect adjustment.
- A case where the arithmetic function unit 12 (an example of a signal generation unit) functions as an adjustment unit and causes a "sensory presentation signal" to reflect adjustment.
- A case where the tactile presentation unit 30 functions as an adjustment unit and causes a "sensory presentation" to reflect adjustment.

Since a conversion model estimates sensitivity parameters from physical parameters in the present aspect, correlations between sensitivity parameters and physical parameters that reflect physical parameters of an operation unit can be constructed. In addition, this feature can be applied to "adjustment of a sensory presentation signal". That is, when physical parameters of an operation unit have changed due to replacement of the operation unit, reproduced sensations, that is, sensitivity parameters, undesirably differ if an actuator is driven in the same manner as before the operation unit 201 is replaced. If sensitivity parameters to be achieved remain constant, physical parameters of an actuator can be adjusted by adjusting a sensory presentation signal, and a sensory presentation based on set sensitivity parameter can be performed.

Figure 52:
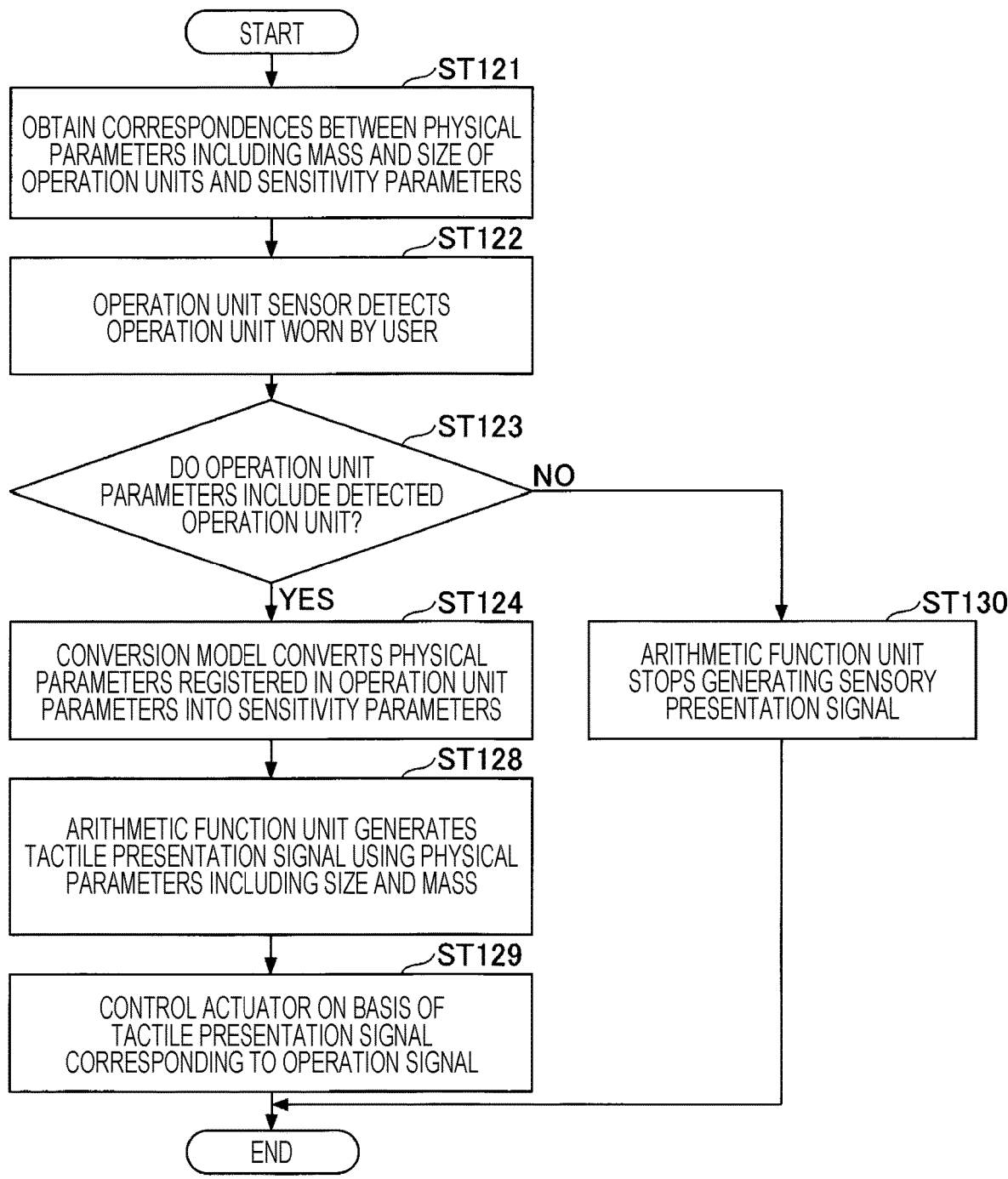
FIG. 52 is another flowchart illustrating the process where the tactile control system adjusts a tactile presentation signal in accordance with physical parameters of an attached operation unit (modification)

FIG. 52 is a flowchart illustrating, as a modification of FIG. 51, a process performed by the tactile control system 110 to adjust a tactile presentation signal in accordance with physical parameters of an attached operation unit. In description with reference to FIG. 52, differences from FIG. 51 will be mainly described.

In FIG. 52, if a result of step ST123 is No (an example of a certain condition), the arithmetic function unit 12 stops generating a sensory presentation signal (ST130).

In doing so, when an operation unit whose physical parameters are unknown is attached and it is difficult to generate an appropriate sensory presentation signal, a sensory presentation signal can be stopped.

The arithmetic function unit 12 may generate a sensory presentation signal whose initial values are predetermined instead of stopping generating a sensory presentation signal.

Figure 53:
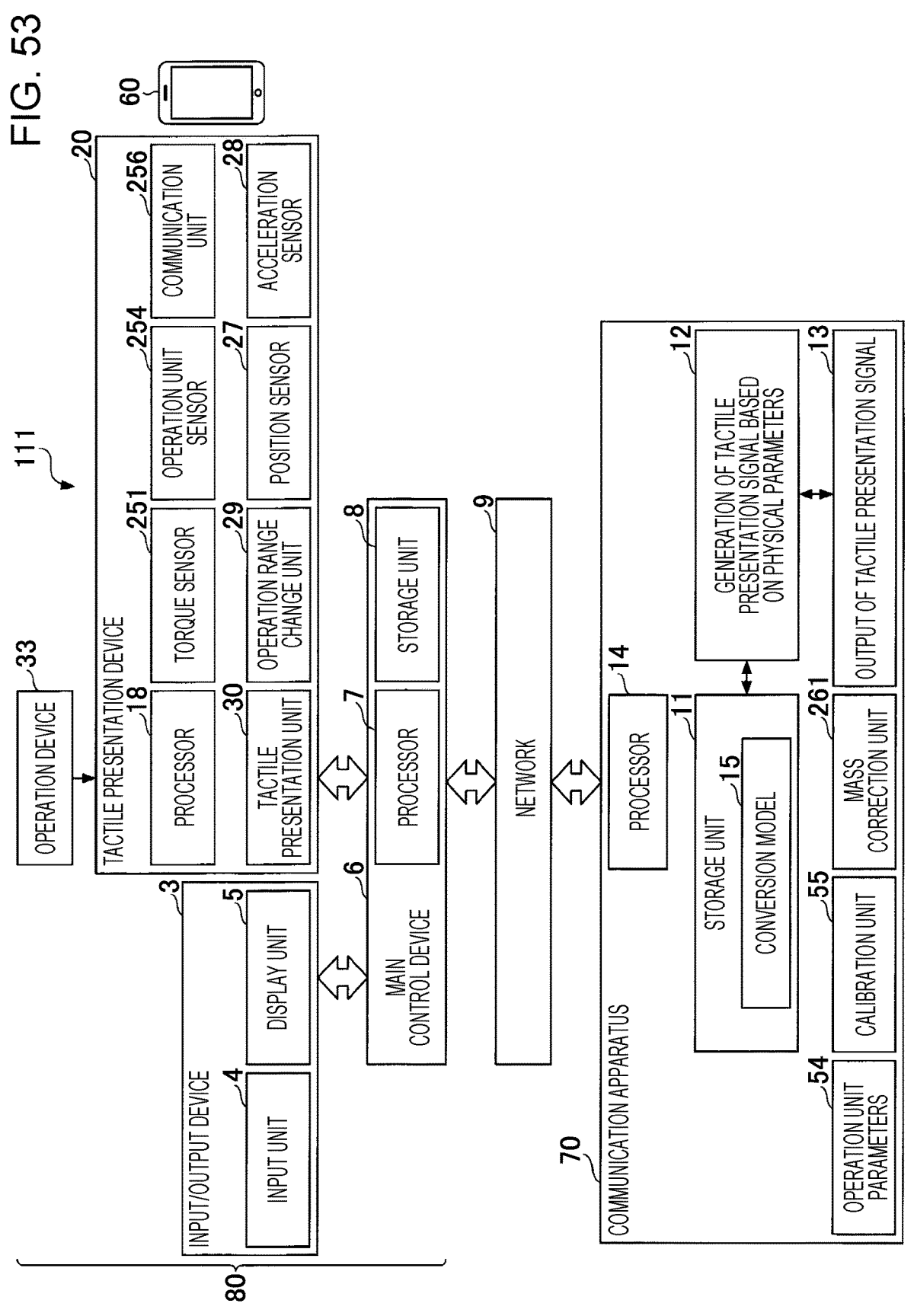

Tactile Control System Including Communication Apparatus (Server) and Terminal Apparatus Next, a tactile control system 111 including the communication apparatus 70 (server) and the terminal apparatus 80 will be described with reference to FIG. 53. FIG. 53 illustrates the configuration of the tactile control system 111 as the second embodiment of the sensory control system 100 illustrated in FIG. 45 along with the flow of a signal. In description with reference to FIG. 53, differences from FIG. 45 will be mainly described.

As illustrated in FIG. 53, the tactile presentation device 20 of the terminal apparatus 80 includes a torque sensor 251, an operation unit sensor 254, and a communication unit 256. The communication apparatus 70 includes operation unit parameters 54, a calibration unit 55, and a mass correction unit 261. The torque sensor 251, the operation unit sensor 254, the communication unit 256, the operation unit parameters 54, the calibration unit 55, and the mass correction unit 261 may be the same as those illustrated in FIG. 45.

Figure 54:
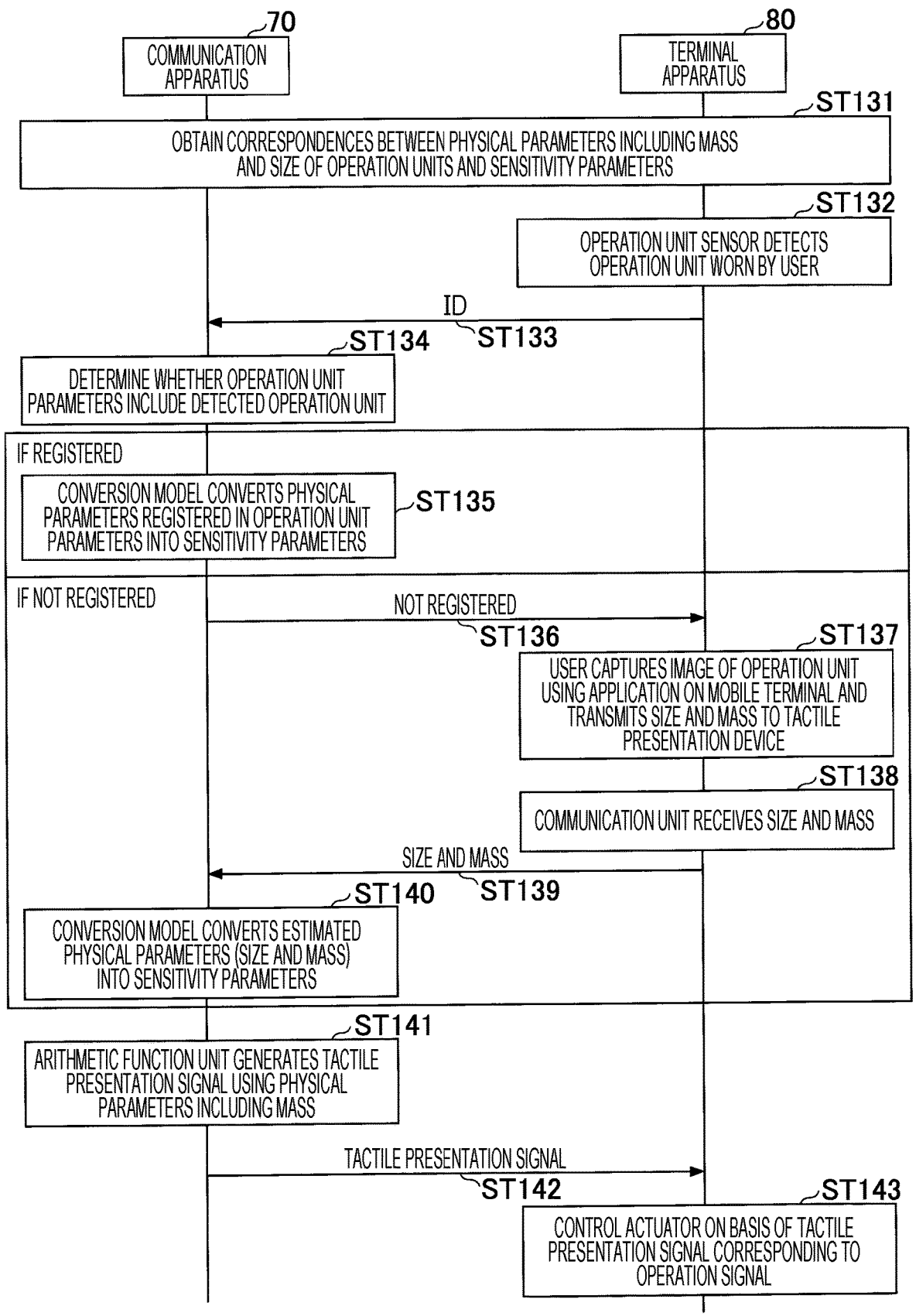
FIG. 54 is a sequence diagram where a communication apparatus and a terminal apparatus communicate with each other to estimate sensitivity parameters of an attached operation unit.

FIG. 54 is a sequence diagram where the communication apparatus 70 and the terminal apparatus 80 communicate with each other to estimate sensitivity parameters of an attached operation unit.

In step ST131, the tactile control system 111 obtains, using the SD method or the like, correspondences between physical parameters including mass and size of operation units and sensitivity parameters.

In step ST132, a user wears an operation unit, and the operation unit sensor 254 detects the operation unit worn by the user.

In ST133, the terminal apparatus 80 transmits an ID of the operation unit detected by the operation unit sensor 254 to the communication apparatus 70. If the operation unit sensor 254 cannot detect an ID, the terminal apparatus 80 notifies the communication apparatus 70 of non-detection of an ID.

In step ST134, whether the operation unit parameters 54 include the attached operation unit on the basis of the ID of the operation unit received by the communication apparatus 70.

If the operation unit is registered in the operation unit parameters 54, the conversion model 15 converts, in step ST135, physical parameters registered in the operation unit parameters 54 into sensitivity parameters.

If the operation unit is not registered in the operation unit parameters 54, the communication apparatus 70 notifies, in step ST136, the terminal apparatus 80 that the operation unit is not registered.

In step ST137, the user captures an image of the operation using the application on the mobile terminal 60 and transmits size and mass to the tactile presentation device 20.

In step ST138, the communication unit 256 receives the size and the mass from the application on the mobile terminal 60.

In step ST139, the mobile terminal 60 transmits the size and the mass to the communication apparatus 70.

In step ST140, the conversion model 15 converts the estimated physical parameters (size and mass) into sensitivity parameters.

In step ST141, the arithmetic function unit 12 generates a tactile presentation signal using the physical parameters including the size and the mass (those registered in the operation unit parameters 54 or the estimated ones).

In step ST142, the communication apparatus 70 transmits the tactile presentation signal to the terminal apparatus 80.

In step ST143, the tactile presentation unit 30 controls an actuator on the basis of a tactile presentation signal corresponding to an operation signal based on a user operation. The communication apparatus 70 or the terminal apparatus 80 may adjust at least the operation signal, a sensory presentation signal, or a sensory presentation.

Key Effects

With the tactile control systems 110 and 111 according to the present aspect, since physical parameters of an operation unit are adjusted in accordance with size and mass of the operation unit, a feel transmitted to a user who operates the operation unit can be adjusted to one preferable to the user even if the size or the mass of the operation unit changes.

Others

For example, the operation unit in the third aspect is not limited to a removable one. When a plurality of operation units whose knob sizes and designs are different from one another are provided in a system, the differences can be recognized and an appropriate feel can be generated.

In addition, the operation unit sensor 254 may estimate size and mass of an attached operation unit through comparison with a reference operation unit, instead of directly obtaining the size and mass using the application on the mobile terminal 60 or through calibration. When an operation unit whose ID is registered in the operation unit parameters 54 and an operation unit whose ID is not registered in the operation unit parameters 54 are provided in proximity to each other, for example, image data shows the two operation units. The processor 18 compares a ratio of size of the operation unit whose ID is registered to size of the operation unit whose ID is not registered and multiplies the ratio and the size and mass of the operation unit whose ID is registered to estimate the size and mass of the operation unit whose ID is not registered.

The processor 18 is an example of an operation detection unit, the arithmetic function unit 12 is an example of a signal generation unit, and the tactile presentation unit 30 is an example of a sensory presentation unit.

APPENDIX TO THIRD ASPECT

1. A sensory control apparatus comprising:
an operation unit;
an operation detection unit that detects an operation performed on the operation unit and that generates an operation signal;
a signal generation unit that generates a sensory presentation signal on a basis of the operation signal;
a sensory presentation unit that performs sensory presentation for an operator on a basis of the sensory presentation signal; and
an adjustment unit that adjusts at least the operation signal, the sensory presentation signal, or the sensory presentation on a basis of a physical property of the operation unit.

2. The sensory control apparatus according to 1,
wherein the physical property of the operation unit includes at least one physical parameter, namely mass, diameter, radius, or overall length, of at least part of the operation unit.

3. The sensory control apparatus according to 1, further comprising:
an operation unit sensor that detects an attached operation unit,
wherein the operation unit sensor obtains identification information included in the operation unit and identifies the physical property of the operation unit, or
identifies the physical property of the operation unit from image data obtained by capturing an image of the operation unit.

4. The sensory control apparatus according to 1,
wherein, if the physical property of the operation unit satisfies a certain condition, the sensory presentation unit stops generating the sensory presentation signal.

5. The sensory control apparatus according to 1,
wherein the operation unit is a push operation unit that receives pushing.

6. The sensory control apparatus according to 1,
wherein the operation unit is a slide operation unit that receives sliding.

7. The sensory control apparatus according to 1,
wherein the operation unit is a pivot operation unit that receives tilting.

8. The sensory control apparatus according to 1,
wherein the operation unit is a rotary operation unit that receives rotation.

9. The sensory control apparatus according to 1,
wherein the sensory presentation signal is correlated with a sensitivity parameter.

10. The sensory control apparatus according to 1,
wherein the sensory presentation unit is a tactile presentation unit that performs tactile presentation for the operator.

11. The sensory control apparatus according to 1,
wherein at least part of the operation unit is removable.

12. The sensory control apparatus according to 1, further comprising:
a torque sensor that detects torque required when the operation unit is driven by an actuator; and
a calibration unit that estimates mass of the operation unit from the torque detected by the torque sensor on a basis of a prepared relationship between torque and mass.

13. The sensory control apparatus according to 1, further comprising:
an acceleration sensor that detects a tilt of the operation unit; and
a mass correction unit that corrects mass of the operation unit in accordance with the tilt detected by the acceleration sensor.

14. A sensory control method performed by an apparatus including an operation unit, the sensory control method comprising the steps of:
detecting an operation performed on the operation unit and generating an operation signal;
generating a sensory presentation signal on a basis of the operation signal;
performing sensory presentation for an operator on a basis of the sensory presentation signal; and
adjusting at least the operation signal, the sensory presentation signal, or the sensory presentation on a basis of a physical property of the operation unit.

15. A sensory control system comprising:
a communication apparatus and a terminal apparatus communicable with each other,
wherein the terminal apparatus includes
an operation unit,
an operation detection unit that detects an operation performed on the operation unit and that generates an operation signal, and
a sensory presentation unit that performs sensory presentation for an operator on a basis of a sensory presentation signal transmitted from the communication apparatus,
wherein the communication apparatus includes a signal generation unit that generates the sensory presentation signal on a basis of the operation signal, and
wherein the terminal apparatus or the communication apparatus includes an adjustment unit that adjusts at least the operation signal, the sensory presentation signal, or the sensory presentation on a basis of a physical property of the operation unit.

Fourth Aspect

Background Art

Operation tools that perform sensory presentation by giving some stimuli to persons are known. Here, the sensory presentation includes tactile presentation, auditory presentation based on sounds, and visual presentation through display of images or the like. The sensory presentation is adjusted by adjusting signals for driving various operation tools.

Tactile systems that present clicking feels in consideration of a fingertip model are known (e.g., refer to Japanese Unexamined Patent Application Publication (Translation of PCT Application) No. 2013-519961). Japanese Unexamined Patent Application Publication (Translation of PCT Application) No. 2013-519961 discloses a technique for evaluating parameters by applying responses to shear vibration generated by a fingertip during key presses to fingertip mass-spring-damper system approximation.

SUMMARY OF INVENTION

Technical Problem

Because the example of the related art does not assume deformation of an elastic body, such as a finger, in an operation direction, such as buckling during pushing, however, there is a problem that a range of expressiveness of sensory presentation is narrow. That is, a finger includes elastic bodies such as skin and flesh, but sensory presentation does not reflect buckling of the elastic bodies.

In view of the above problem, the present aspect aims to provide a technique where a range of expressiveness of sensory presentation is increased.

Advantageous Effects of Invention

A technique where a range of expressiveness of sensory presentation is increased can be provided.

Description of Fourth Aspect

In the present aspect, a tactile control system 1 that outputs a sensory stimulation signal based on physical parameters including dynamic properties and a sensory control method performed by the tactile control system 1 will be described. The dynamic properties are physical properties including a time factor and, for example, vary over time.

The present aspect will be described while assuming that the block diagram of FIG. 1, the hardware configuration diagram of the tactile control system 1 of FIG. 2, and other necessary explanations used in the first aspect can be made use of.

A load displacement curve when a user pushes an operation tool such as a switch conventionally assumes that the operation tool is pushed by a rigid body and is based on static properties, which do not include the time factor. Correspondence information between sensitivity parameters and physical parameters, therefore, is not obtained in a state where buckling, which occurs when a user actually pushes an operation tool with his/her finger, is reproduced.

In the present aspect, in order to establish a situation similar to one where a user pushes an operation tool with his/her finger, an operation tool is pushed by a finger model push tool, where an elastic body (corresponds to flesh and skin of a finger) integrated with a rigid body is provided between the rigid body (corresponds to a finger bone) and the operation tool. By analyzing a change [mm] in a position of the operation tool and two force sensor values [N] between the elastic body and the operation tool at a time when the finger model push tool pushes the operation tool, measurement and evaluation based on the SD method were performed with a configuration that took into consideration a human finger. Since new physical parameters obtained in this manner include dynamic properties, correspondence information between sensitivity parameters and physical parameters is generated in a state where buckling, which occurs when a user actually pushes an operation tool with his/her finger, is reproduced.

More specifically, the following correlations are obtained. A buckling period T1, a fingertip collision period T3, and a fingertip vibration period T4 are periods illustrated in FIG. 60B, which will be referred to later, and details will be described later.

Correlations between physical parameters (a movement distance of an operation tool in the fingertip collision period T3, the amount of change in the force sensor values in the fingertip collision period T3, and the fingertip collision period T3) and a sensitivity parameter (sense of recovery)

A correlation between a physical parameter (a change in position in the buckling period T1) and a sensitivity parameter (sensation of being sucked in)

A correlation between a physical parameter (fingertip vibration period T4) and a sensitivity parameter (fatigue sensation)

Example of Configuration of Finger Model Push Tool and Operation Tool

Figure 55:
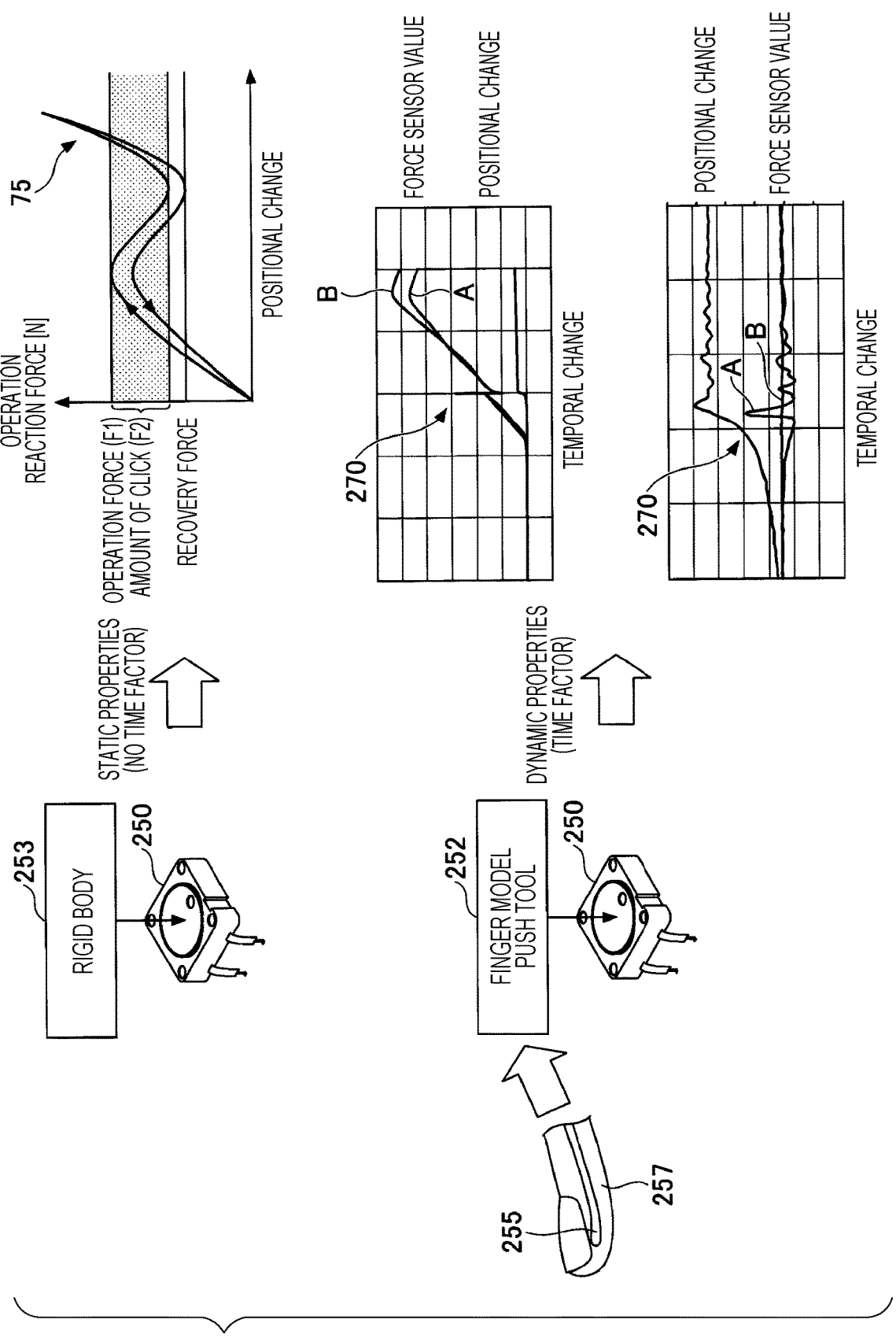
FIG. 55 is a diagram illustrating static properties obtained by a rigid push tool and dynamic properties obtained by a finger model push tool that is a combination of a rigid body and an elastic body.

FIG. 55 is a diagram illustrating static properties obtained by a rigid push tool and dynamic properties obtained by a finger model push tool 252, which is a combination of a rigid body and an elastic body. First, a load displacement curve of an operation tool 250 based on the push tool composed of a rigid body 253 can represent only the static properties that do not include the time factor. A load displacement curve 75 does not include an effect produced by the elastic body corresponding to flesh 257 of a finger and does not sufficiently represent physical properties contributing to a tactile sensation perceived by an operator.

Next, pushing of the operation tool 250 by the finger model push tool 252 will be described. First, the flesh 257 of the finger is an elastic body that deforms under stress. The finger also includes a bone 255 that can be regarded as a rigid body. As described later, the finger model push tool 252 is designed in such a way as to have properties of the flesh 257 and the bone 255. The properties include dynamic properties where operation reaction force and positional changes over time when the finger model push tool 252, which is a combination of a rigid body and an elastic body, pushes the operation tool 250. FIG. 55 illustrates positional changes and two force sensor values A and B as dynamic properties 270. The two force sensor values A and B detect operation reaction force caused by the finger model push tool 252 on the operation tool 250. The two force sensor values A and B are measured by different force sensors, which are provided at a position where the flesh 257 of the finger and the operation tool 250 come into contact with each other and a rigid part (corresponds to the bone 255) inside the finger, respectively. Details will be described with reference to FIGS. 59A and 59B. As indicated by the dynamic properties 270, movement of the finger in consideration of time, that is, occurrence and changes of sensations, can be grasped through the pushing of the operation tool 250 by the finger model push tool 252, and correlations close to those in actual situations where the user pushes the operation tool 250 with his/her finger can be obtained.

Figure 56:
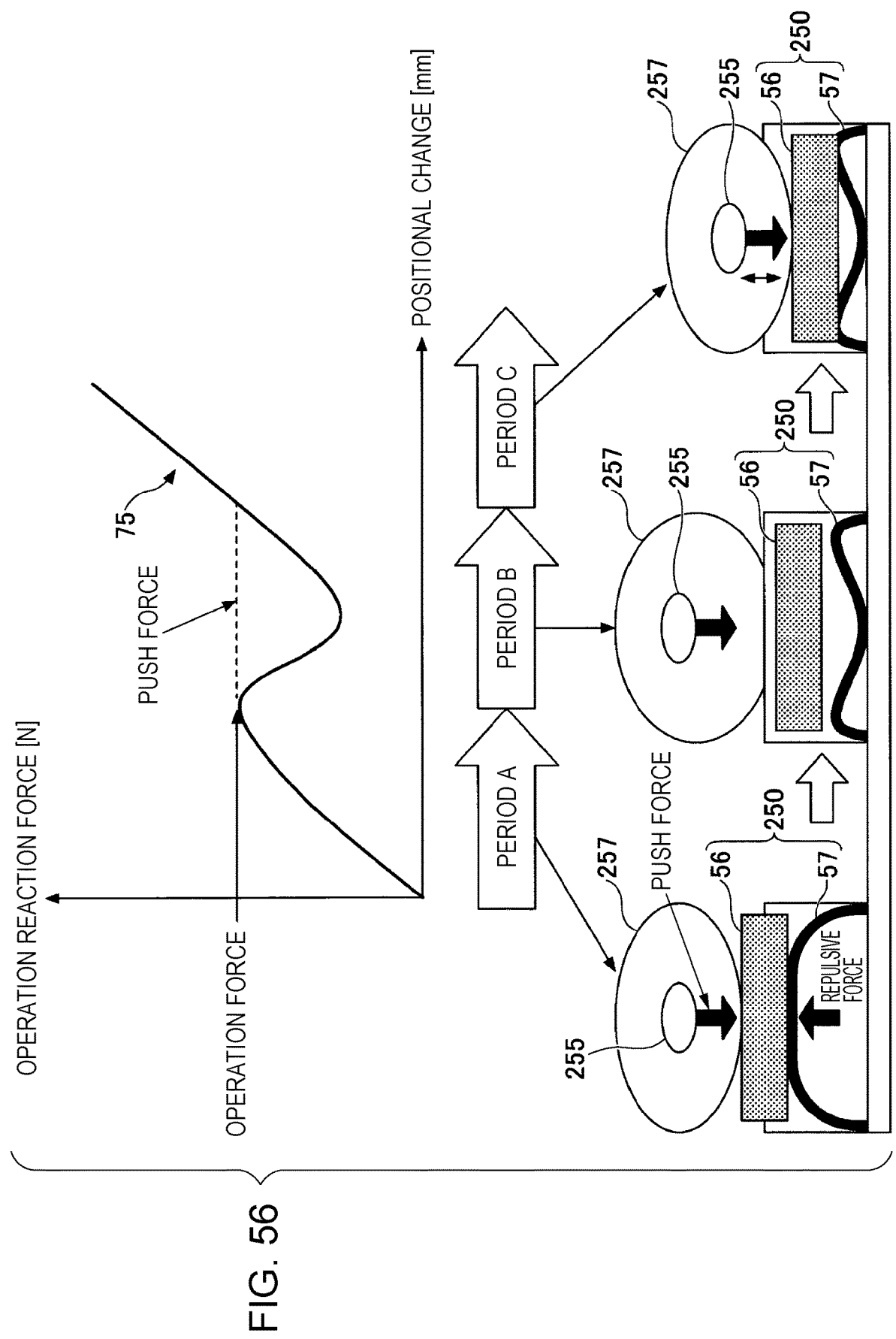
FIG. 56 is a diagram illustrating relative positions of a deforming finger and an operation tool.

FIG. 56 is a diagram illustrating relative positions of a deforming finger and the operation tool 250. An upper part of FIG. 56 illustrates periods A to C read from a load displacement curve 75. A lower part of FIG. 56 schematically illustrates deformation of the flesh of the finger corresponding to the periods A to C.

As illustrated in the lower part of FIG. 56, in the period A, a position of a button part 56 of the operation tool 250 gradually lowers with pushing force of the finger and repulsive force remaining in balance.

In the period B, a metal contact 57 of the operation tool 250 deforms (buckles), thereby losing the repulsive force. The button part 56 goes downward while maintaining downward force. The operation reaction force causes a difference from the period A. The operation reaction force at a contact between the finger and the button, therefore, has decreased.

In the period C, the finger and the button part 56 again collide with the metal contact 57. At this time, maximum operation reaction force is again caused at the contact between the fingertip and the button part 56. As a result of the collision, vibration also occurs at the button part 56.

Figure 57:
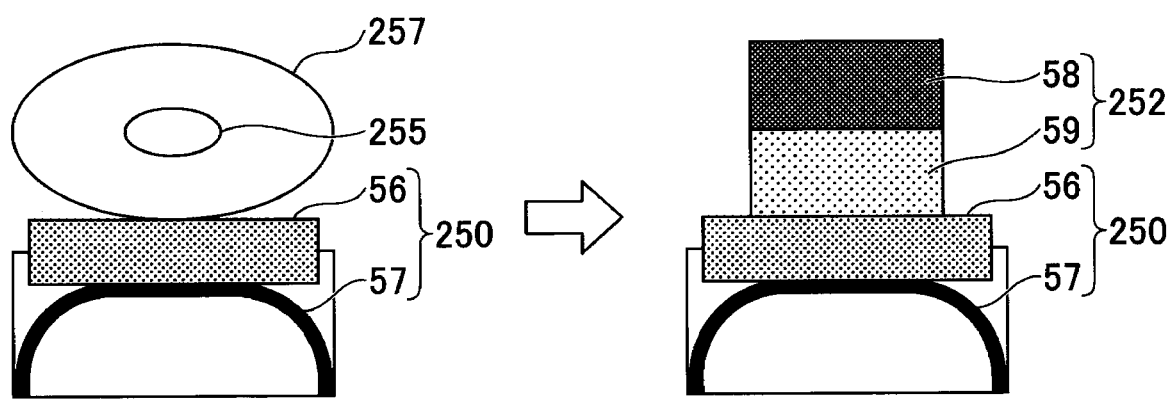
FIG. 57 is a diagram illustrating the finger model push tool.

FIG. 57 is a diagram illustrating the finger model push tool 252. As described with reference to FIG. 56, a finger is an elastic body where the flesh 257 deforms. The finger also includes the bone 255, which can be regarded as a rigid body. The finger model push tool 252, which includes an elastic body 59 that comes into contact with the button part 56 and a rigid body 58 that pushes the button part 56 through the elastic body 59, is an appropriate model when a finger pushes the operation tool 250.

Generation of Sensory Presentation Signal with Clicking Feel

Figure 58B:
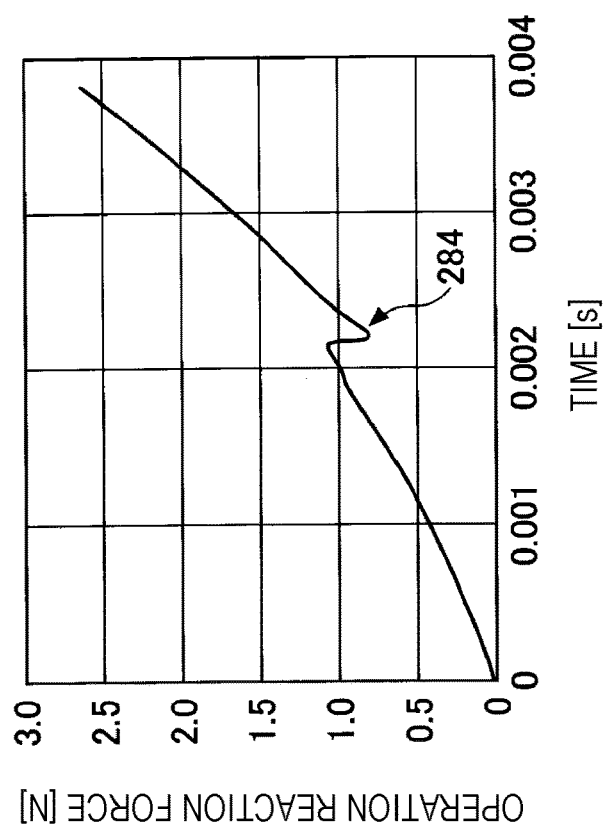
FIGS. 58A and 58B are diagrams illustrating generation of a sensory presentation signal with a clicking feel.
Figure 58A:
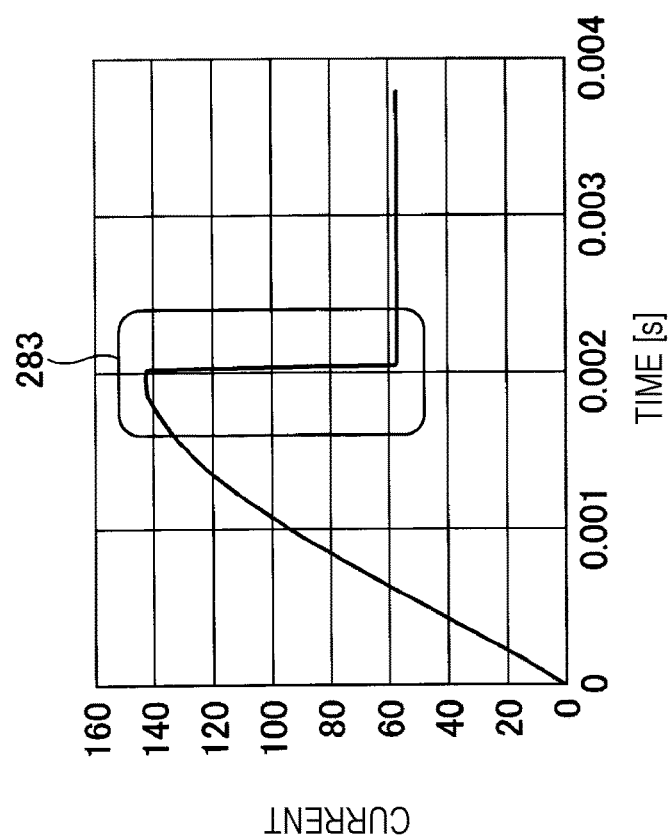

FIGS. 58A and 58B are diagram illustrating generation of a sensory presentation signal with a clicking feel. A clicking feel refers to a response from an input device such as a button, as if a switch is pressed. In the case of a mechanical switch, a clicking feel can be obtained by resistance or deformation of the metal contact 57 or the like. How a clicking feel occurs, however, depends on the structure of a button.

In the case of an operation tool 250 that electrically generates a sensory presentation signal as in the present aspect, a clicking feel is controlled by a current supplied to an actuator.

FIG. 58A illustrates a current value of an actuator against time, and FIG. 58B illustrates operation reaction force against time. The current value sharply decreases in a frame 283, and accordingly the operation reaction force sharply decreases. A convex 284 in FIG. 58B corresponds to time when the current value sharply decreases. When the user pushes the operation tool 250 with his/her finger, therefore, a response (clicking feel) as if the user pushes a mechanical switch can be obtained. Timing of the sharp drop in the current value and the amount of decrease in the current illustrated in FIG. 58A are examples and may be adjusted as necessary.

Figure 59B:
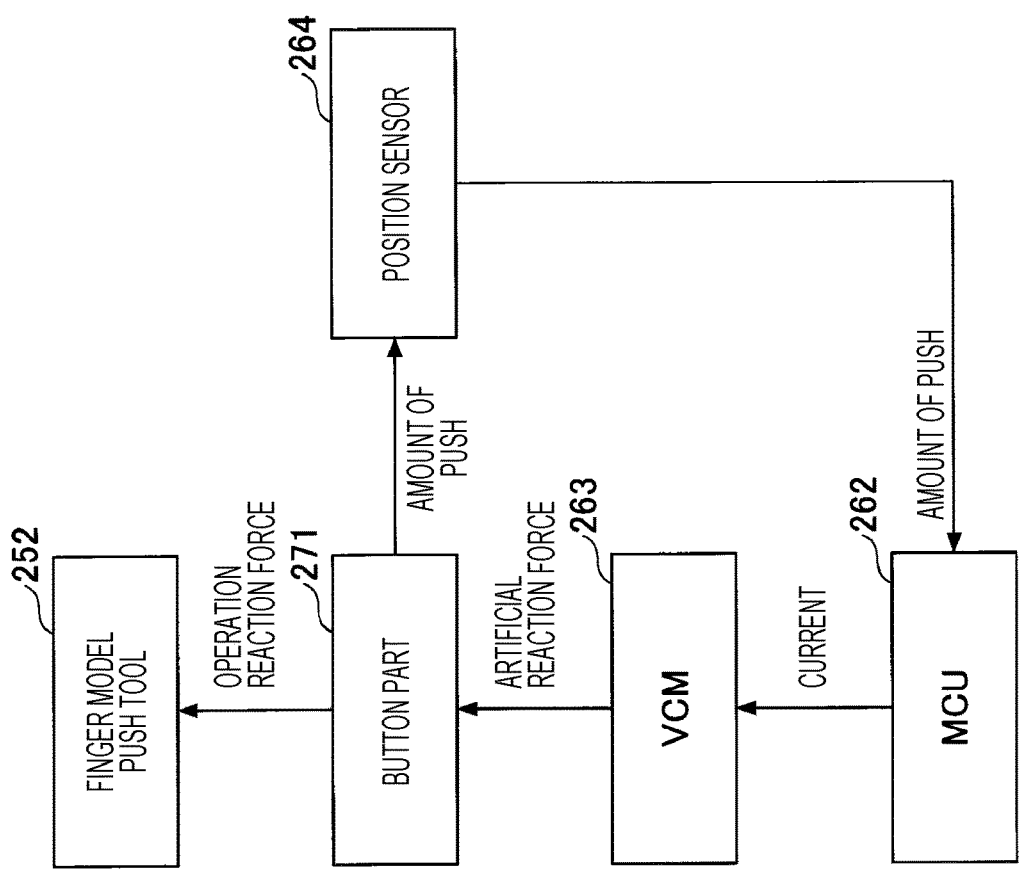
FIGS. 59A and 59B are examples of a functional configuration diagram and a block diagram of a push operation tool.
Figure 59A:
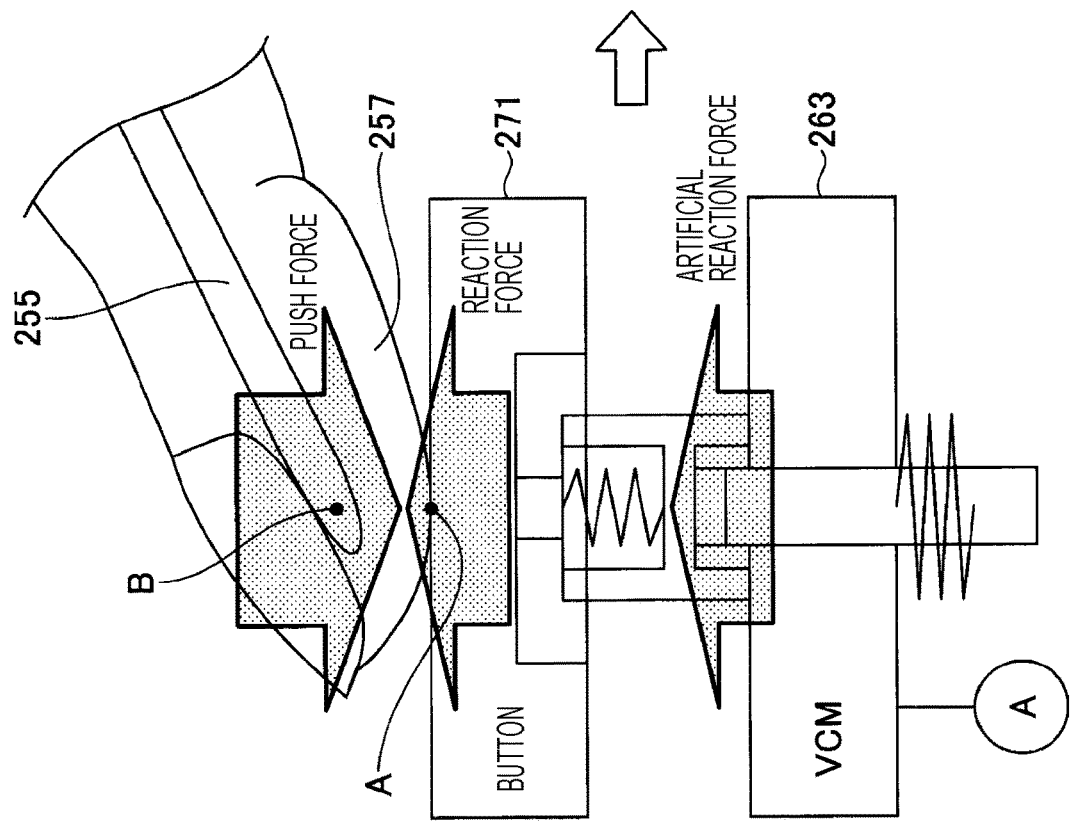

FIG. 59A is a functional configuration diagram of a push operation tool, and FIG. 59B is a block diagram of the push operation tool. A button part 271 illustrated in FIGS. 59A and 59B is an example of the operation device 33 illustrated in FIG. 2, and a VCM 263 is an example of the tactile presentation unit 30 illustrated in FIG. 2. As illustrated in FIG. 59A, the finger model push tool 252 is provided with the two force sensors A and B. The force sensor A is provided at the contact between the elastic body 59 of the finger model push tool 252 and the button part 271, and the force sensor B is provided inside the rigid body 58 of the finger model push tool 252. In doing so, buckling can be monitored by the force sensor value A detected by the force sensor A.

The block diagram of FIG. 59B illustrates just an example of the push operation tool, which will be described briefly. An MCU circuit 262 is an example of the processor 18 illustrated in FIG. 2, and a position sensor 264 is an example of the position sensor 27 illustrated in FIG. 2. As illustrated in FIG. 59B, the MCU circuit 262 outputs a current according to the amount of operation (positional change), that is, how deep the button part 271 of the operation tool 250 is pressed, to a VCM 263. The VCM 263 applies artificial reaction force proportional to the current to the button part 271. Since the finger model push tool 252 pushes the button part 271 from an opposite side of the VCM 263, the artificial reaction force is transmitted to the finger model push tool 252. The force sensors A and B measure the artificial reaction force.

Dynamic Properties Obtained by Finger Model Push Tool

Figure 60A:
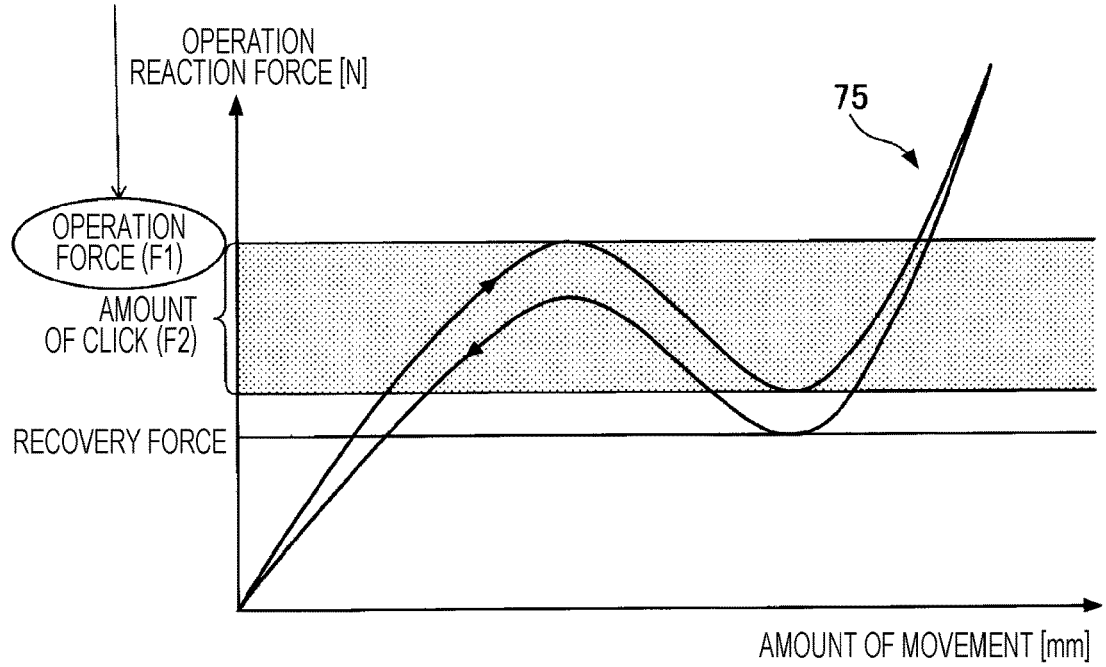
FIGS. 60A and 60B are diagrams illustrating dynamic properties at a time when the finger model push tool pushes an operation tool.
Figure 60B:
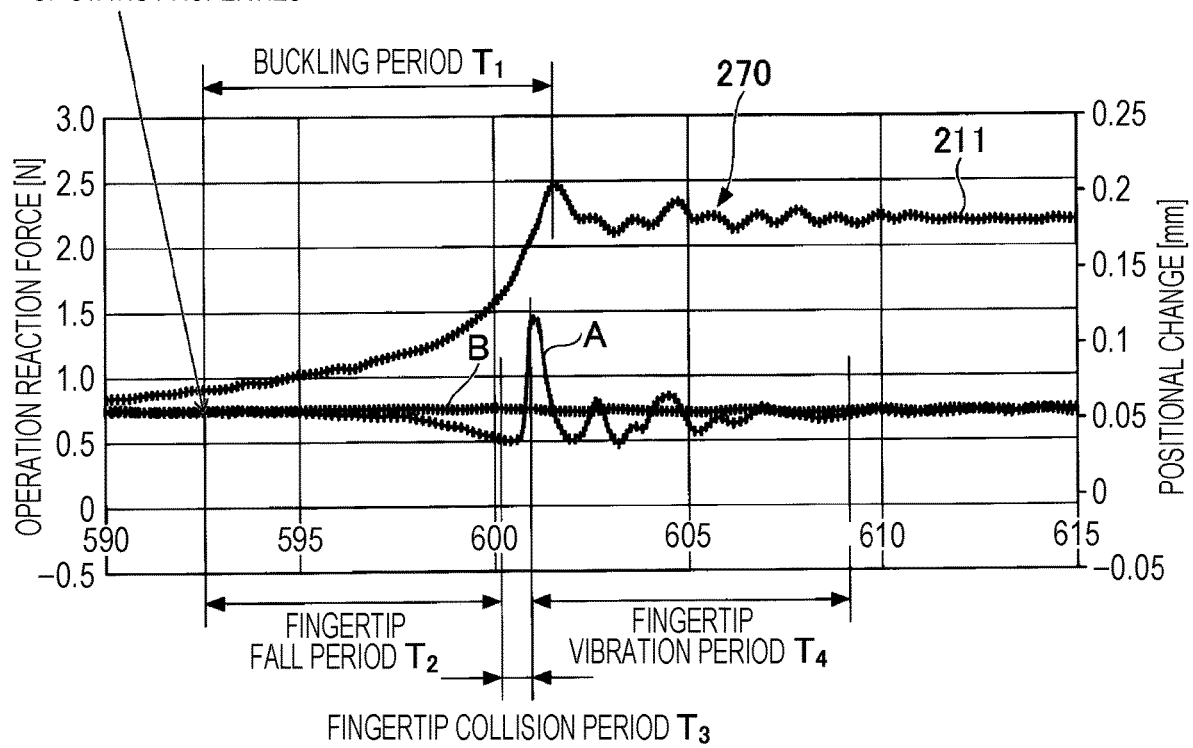

FIGS. 60A and 60B are diagrams illustrating dynamic properties at a time when the finger model push tool 252 pushes the operation tool 250. FIG. 60A illustrates the load displacement curve 75 as a reference, and FIG. 60B illustrates an example of dynamic properties 270 at a time when the finger model push tool 252 pushes the operation tool 250. In FIG. 60B, a horizontal axis represents time, and a vertical axis represents the two force sensor values A and B and positional changes 211. A unit of time is [msec], and a unit of the force sensor values A and B is [N]. The dynamic properties 270 greatly vary depending on the operation tool 250, and it is to be noted that FIG. 60B is just an example.

Dynamic properties (the buckling period T1, a fingertip fall period T2, the fingertip collision period T3, and the fingertip vibration period T4) extracted from the two force sensor values A and B against time and the positional changes 211 against time will be described with reference to FIGS. 60A to 61D. FIGS. 61A to 61D are diagrams illustrating temporal changes in relative positions the finger model push tool 252 and the operation tool 250.

Figure 61A:
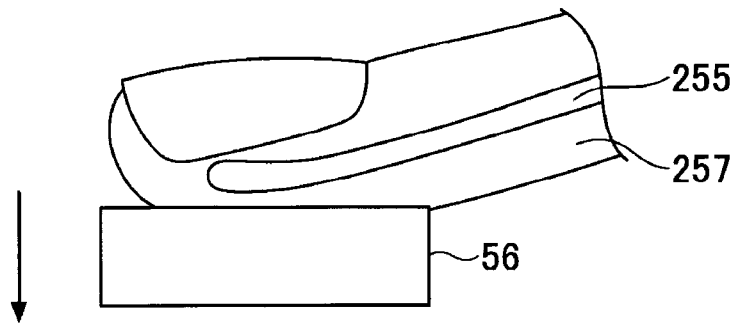
FIGS. 61A to 61D are diagrams illustrating temporal changes in relative positions of the finger model push tool and the operation tool.

The buckling period T1 is a period from a peak of the force sensor value B to a peak of the positional changes 211. It is hard to tell because of scale, but the force sensor value B is not constant and has a peak at a beginning of the buckling period T1. The peak will be described with reference to FIG. 62. The peak of the force sensor value B corresponds to a maximum value of the operation reaction force in the load displacement curve 75. The buckling period T1, therefore, is a period that begins when the operation reaction force reaches the maximum value and that ends when the positional changes 211 become largest. FIG. 61A illustrates relative positions of the finger model push tool 252 and the button part 56 at the beginning of the buckling period T1. Since the maximum value of the operation reaction force in the load displacement curve 75 is achieved at the beginning of the buckling period T1, the elastic body 59 of the finger model push tool 252 is strongly pushed. An arrow to the left of the button part 56 indicates a direction of a positional change.

Figure 61B:
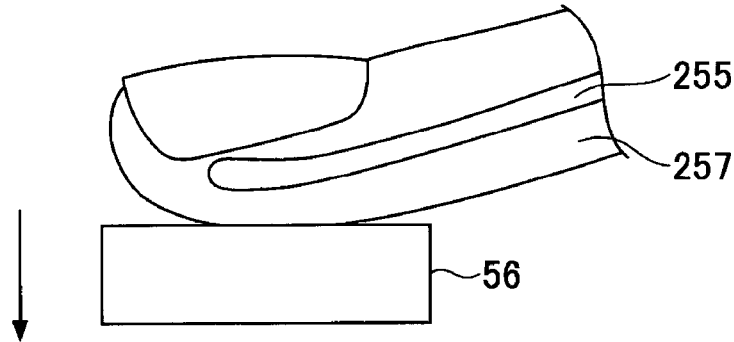

The fingertip fall period T2 is a period from the peak of the force sensor value B to a downward peak of the force sensor value A. As indicated by the load displacement curve 75, the operation reaction force sharply decreases to create a clicking feel after the operation reaction force reaches the maximum value. Since the operation reaction force upon the finger model push tool 252 decreases, the elastic body 59 of the finger model push tool 252 is restored after the beginning of the fingertip fall period T2. As a result, the force sensor value A decreases in the fingertip fall period T2. The fingertip fall period T2, therefore, is a period that begins when the operation reaction force reaches the maximum value and that ends when the elastic body of the finger model push tool 252 is fully restored. FIG. 61B illustrates the relative positions of the finger model push tool 252 and the button part 56 at the end of the fingertip fall period T2. It can be seen that, compared to FIG. 61A, the elastic body 59 of the finger model push tool 252 has been restored.

Figure 61C:
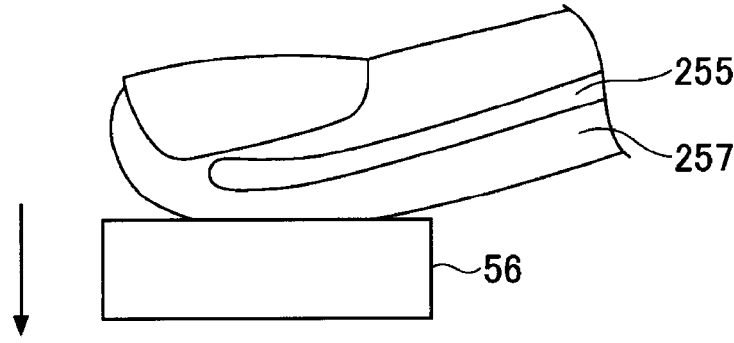

The fingertip collision period T3 is a period from the downward peak of the force sensor value A to an upward peak of the force sensor value A. In the fingertip collision period T3, the pushing by the finger model push tool 252 continues even after the elastic body 59 of the finger model push tool 252 is fully restored in FIG. 61B, the force sensor value A sharply increases. The fingertip collision period T3, therefore, is a period that begins when the elastic body 59 of the finger model push tool 252 is fully restored and that ends when the elastic body 59 is pushed most deeply. FIG. 61C illustrates the relative positions of the finger model push tool 252 and the button part 56 at the end of the fingertip collision period T3. It can be seen that, compared to FIG. 61B, the elastic body 59 of the finger model push tool 252 is pushed.

Figure 61D:
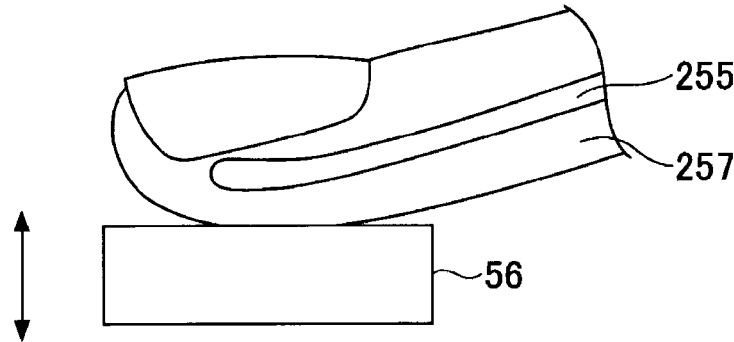

The fingertip vibration period T4 is a period from the upward peak of the force sensor value A to variation of the force sensor value A falling within a certain range. Since the operation reaction force has already decreased to create a clicking feel, the force sensor value A sharply decreases even though the positional changes 211 increase due to the pushing. Because the positional changes 211 then stop increasing (the finger model push tool 252 no longer moves), the force sensor value B accordingly hardly changes, and the force sensor value A vibrates like chattering. The fingertip vibration period T4, therefore, is a period when the elastic body pushed most strongly is restored and stabilized. FIG. 61D illustrates the relative positions of the finger and the button part 56 at an end of the fingertip vibration period T4. It can be seen that, compared to FIG. 61C, the elastic body 59 of the finger model push tool 252 has been restored.

The buckling period T1, the fingertip fall period T2, the fingertip collision period T3, and the fingertip vibration period T4 are an example of the dynamic properties. In each of the buckling period T1, the fingertip fall period T2, the fingertip collision period T3, and the fingertip vibration period T4, changes in the force sensor values A and B and the positional changes 211 can be extracted. These can also be used as dynamic properties in the present aspect.

The dynamic properties may thus be physical properties including temporal changes in at least operation reaction force or the amount of operation caused by the operation performed on a certain operation tool 250. The physical properties are physical properties for achieving sensory presentation at a time when the elastic body 59 of the finger model push tool 252 comes into contact with the operation tool 250 and operates the operation tool 250.

Figure 62:
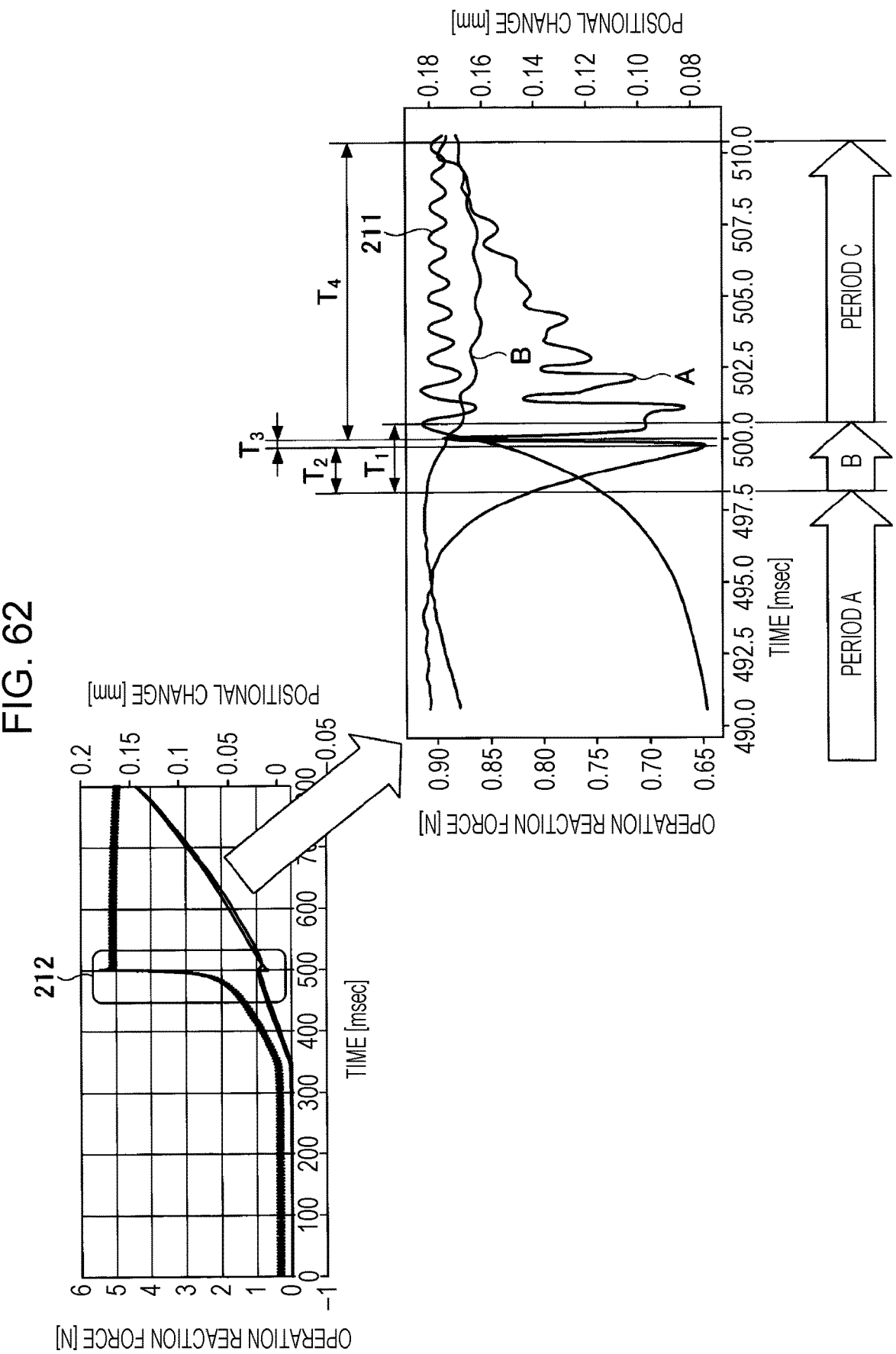
FIG. 62 is a diagram illustrating the dynamic properties in more details along with periods A to C.
Figure 63C:
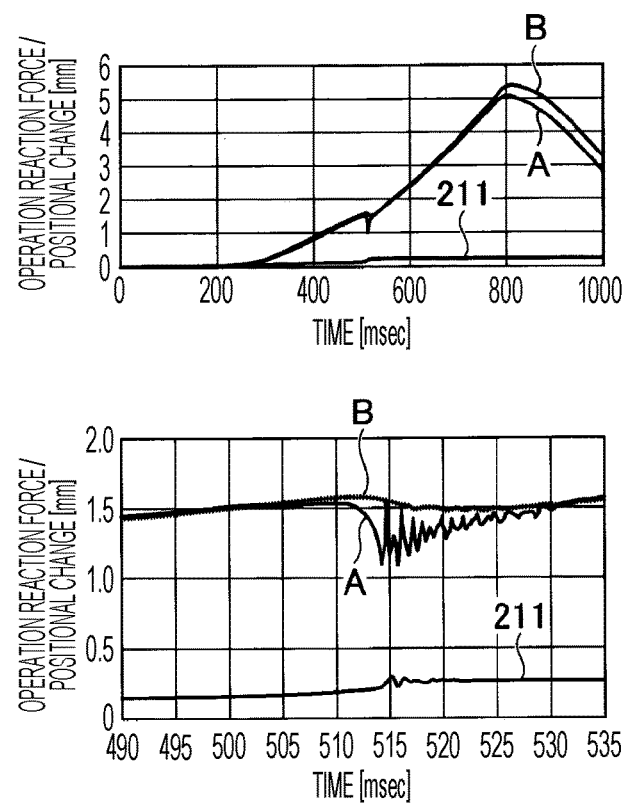
Figure 63D:
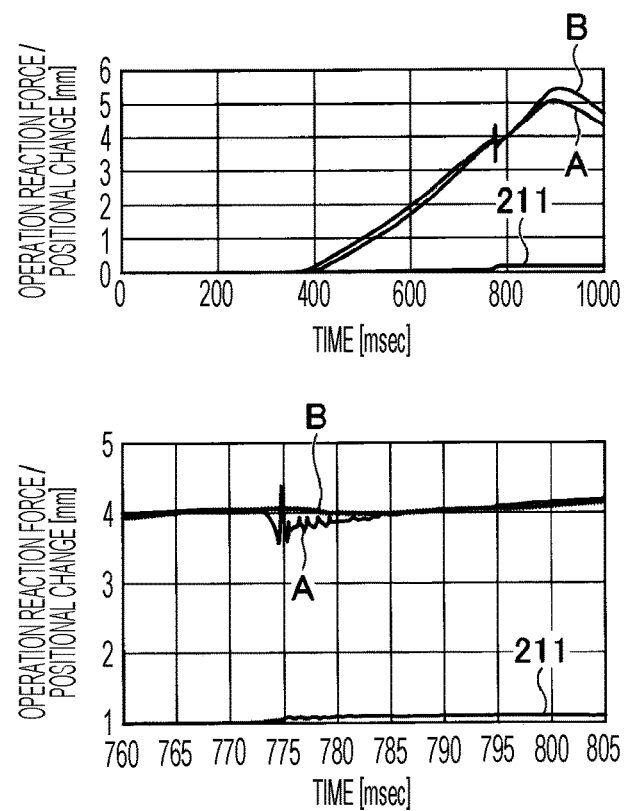

FIG. 62 is a diagram illustrating the dynamic properties in more details along with the periods A to C. An upper-left part of FIG. 62 is an overall view including a beginning to an end of the dynamic properties, and a lower-right part of FIG. 62 is an enlarged view of the dynamic properties in a frame 212 in the upper-left part of FIG. 62. The lower-right part of FIG. 62 illustrates correspondences between the dynamic properties and the periods A to C. The force sensor value A detected by the force sensor greatly varies due to pushing and restoring of the elastic body 59. The force sensor value B detected by the force sensor value B is hardly affected by deformation of the elastic body 59 and changes therein are small.

The lower-right part of FIG. 62 illustrates the buckling period T1, the fingertip fall period T2, the fingertip collision period T3, and the fingertip vibration period T4, which are as described with reference to FIGS. 60A and 60B. The peak of the force sensor value B (the beginning of the buckling period T1 and the fingertip fall period T2), which is not clear in FIGS. 60A and 60B, is clearly observed.

Dynamic Properties Correlated with Sensitivity Parameters

Some of the dynamic properties described with reference to FIGS. 60 and 62 are correlated with sensitivity parameters. Appropriate dynamic properties correlated with sensitivity parameters are physical parameters in the present aspect.

The tactile control system 1 evaluates appropriate dynamic properties correlated with sensitivity parameters using the SD method. A plurality of operation tools 250 whose dynamic properties were different from one another were prepared for this purpose.

FIGS. 63A to 63D illustrate dynamic properties at a time when the finger model push tool 252 pushes the plurality of operation tools 250 whose dynamic properties are different from one another. For the sake of description, it is assumed in the present aspect that 25 operation tools 250 were prepared and dynamic properties were measured for each of the 25 operation tools 250. FIGS. 63A to 63D illustrate the dynamic properties of four of the operation tools 250. In each of FIGS. 63A to 63D, an upper diagram illustrates the dynamic properties 270 in total duration (about 1 second) of pushing, and a lower diagram is an enlarged view of the dynamic properties 270 during and around the buckling period T1, the fingertip fall period T2, the fingertip collision period T3, and the fingertip vibration period T4.

Determination of Physical Parameters Correlated with Sensitivity Parameters

Figure 64:
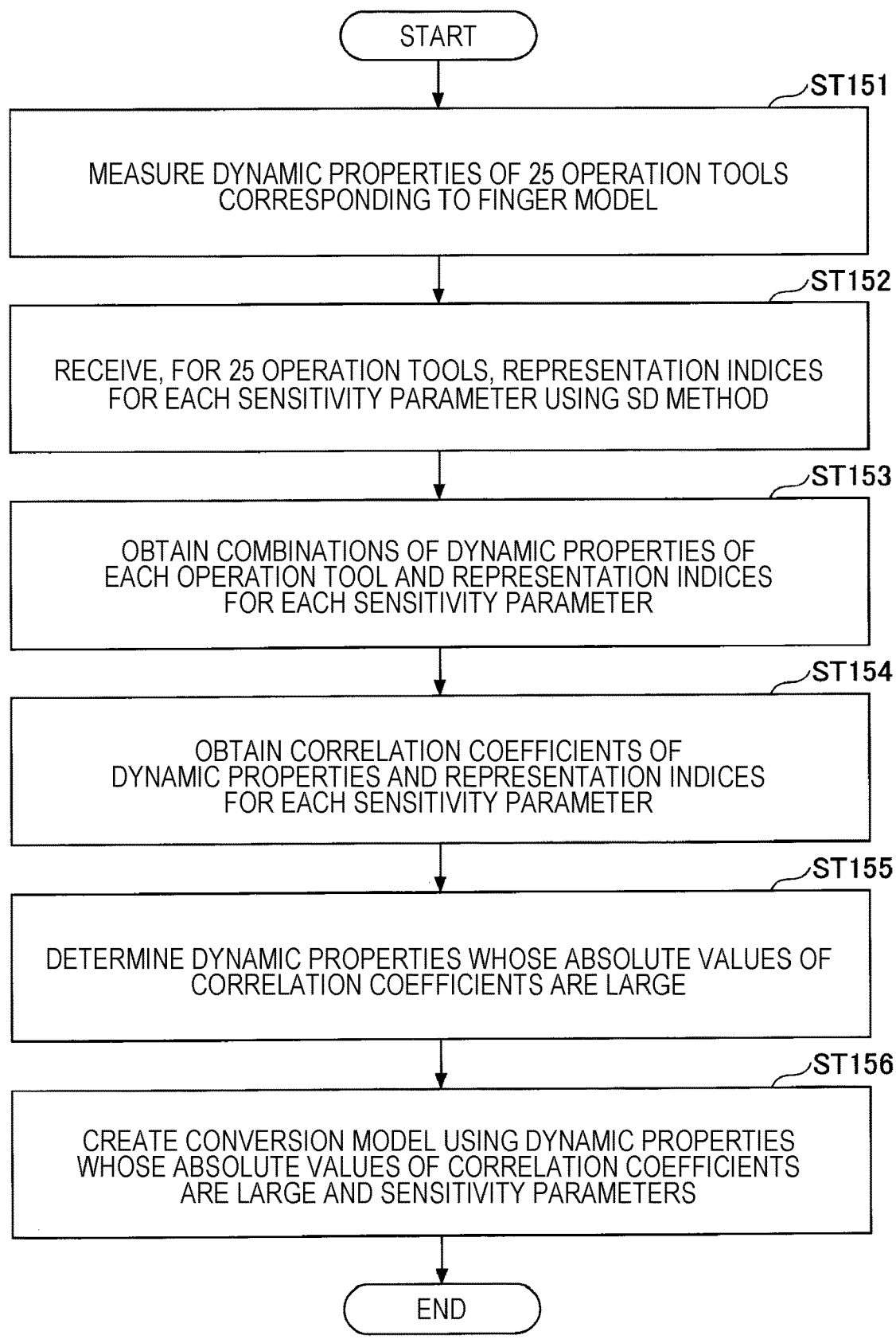
FIG. 64 is an example of a flowchart illustrating a procedure for determining physical parameters correlated with sensitivity parameters.

FIG. 64 is a flowchart illustrating a procedure for determining physical parameters correlated with sensitivity parameters.

In step ST151, the tactile control system 1 measures dynamic properties at a time when the finger model push tool 252 pushes the 25 operation tools 250.

Next, in step ST152, the input unit 4 receives, for the operation tools 250, representation indices for each sensitivity parameter using the SD method.

Next, in step ST153, the processor 101 obtains combinations of the dynamic properties of each operation tool 250 and the representation indices for each sensitivity parameter.

Next, in step ST154, the processor 101 obtains correlation coefficients of the dynamic properties and representation indices for each sensitivity parameter.

Next, in step ST155, the processor 101 determines dynamic properties whose absolute values of the correlation coefficients are large. The absolute value of a correlation coefficient may be regarded as large when larger than or equal to, say, 0.5.

Next, in step ST156, the processor 101 creates a conversion model 15 by applying the multiple regression analysis described with reference to Math. 5 to the physical parameters highly correlated with the sensitivity parameters and the sensitivity parameters.

Figure 65:
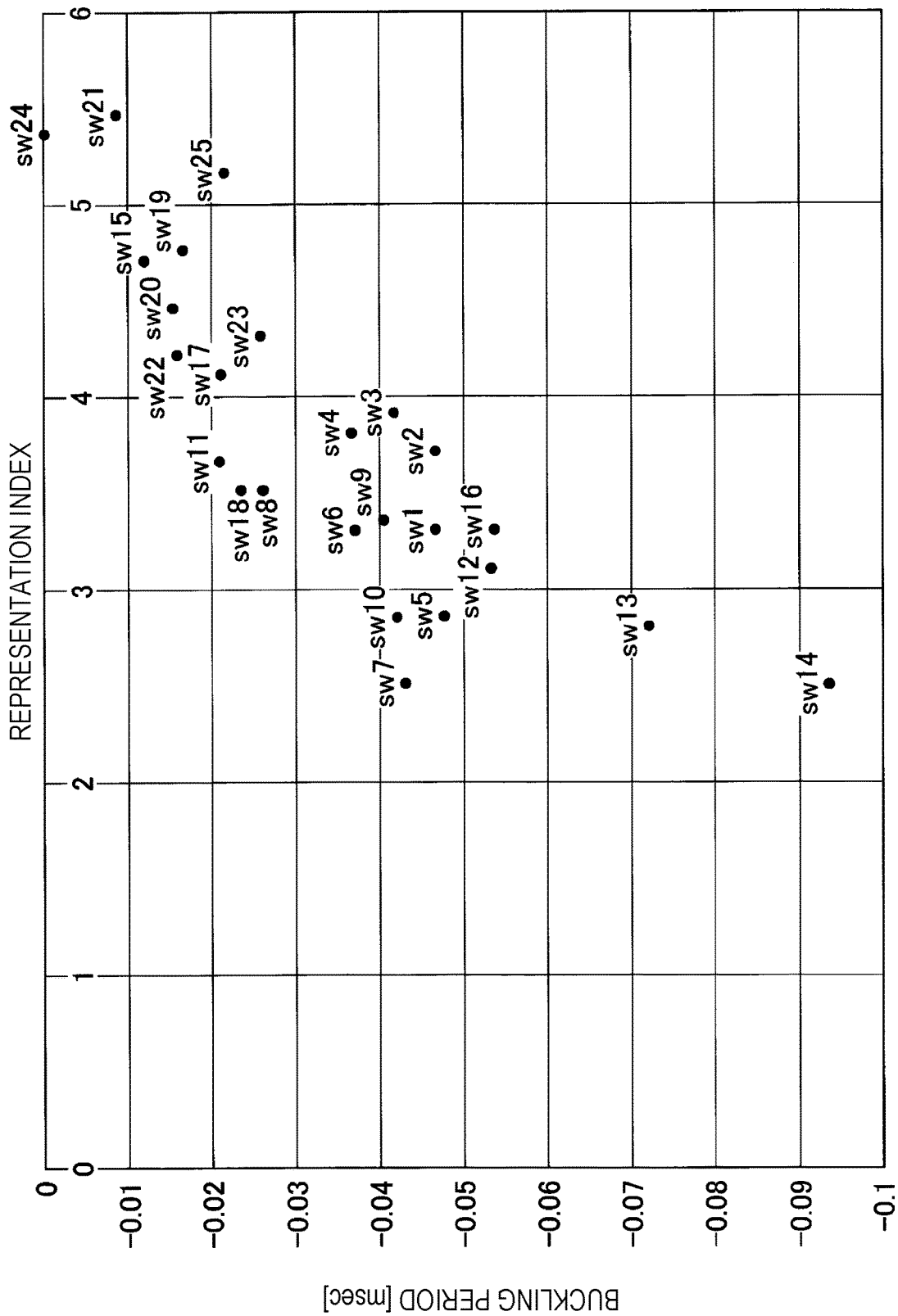
FIG. 65 is a scatter plot of combinations of a dynamic property of operation tools and a representation index for a sensitivity parameter "sense of recovery (no sense of recovery)" obtained by a processor in step ST153.

FIG. 65 is a scatter plot of combinations of the dynamic properties of the operation tools 250 and the representation indices for a certain sensitivity parameter obtained by the processor 101 in step ST153. In FIG. 65, a horizontal axis represents "sense of recovery (no sense of recovery)" as the sensitivity parameter, and a vertical axis represents the buckling period T1. The buckling period T1 and the representation index of "sense of recovery (no sense of recovery)" have a generally upward trend. The correlation coefficient is 0.82.

Figure 66:
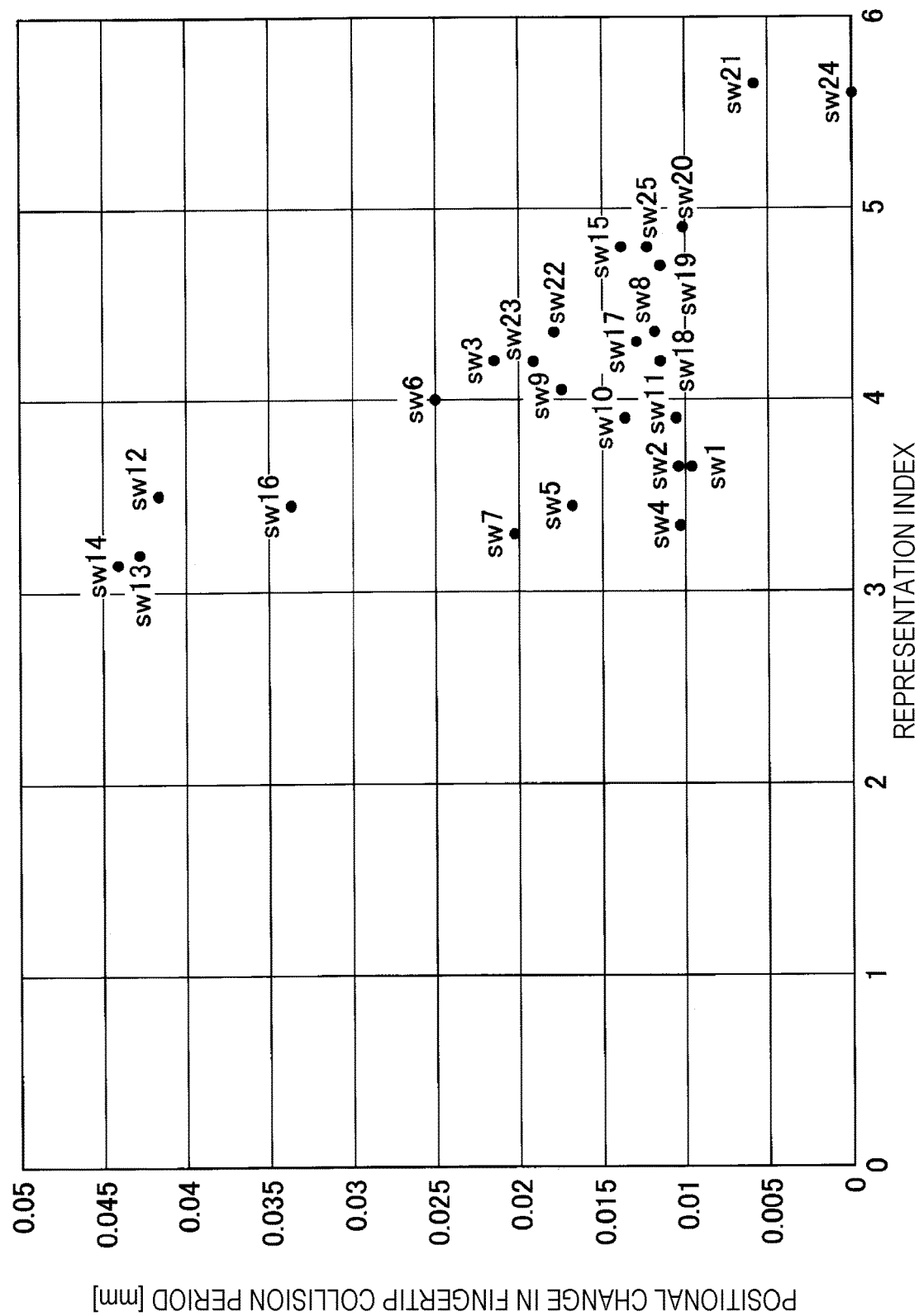
FIG. 66 is a scatter plot of combinations of another dynamic property of the operation tools and another representation index for a sensitivity parameter "sensation of being sucked in (no sensation of being sucked in)" obtained by the processor in step ST153.

FIG. 66 is a scatter plot of combinations of the dynamic properties of the operation tools 250 and the representation indices for another certain sensitivity parameter obtained by the processor 101 in step ST153. In FIG. 66, a horizontal axis represents "sensation of being sucked in (no sensation of being sucked in)" as the sensitivity parameter, and a vertical axis represents positional changes in the fingertip collision period T3. The positional changes in the fingertip collision period T3 and the representation index of "sensation of being sucked in (no sensation of being sucked in)" have a generally downward trend. The correlation coefficient is 0.65.

Figure 67:
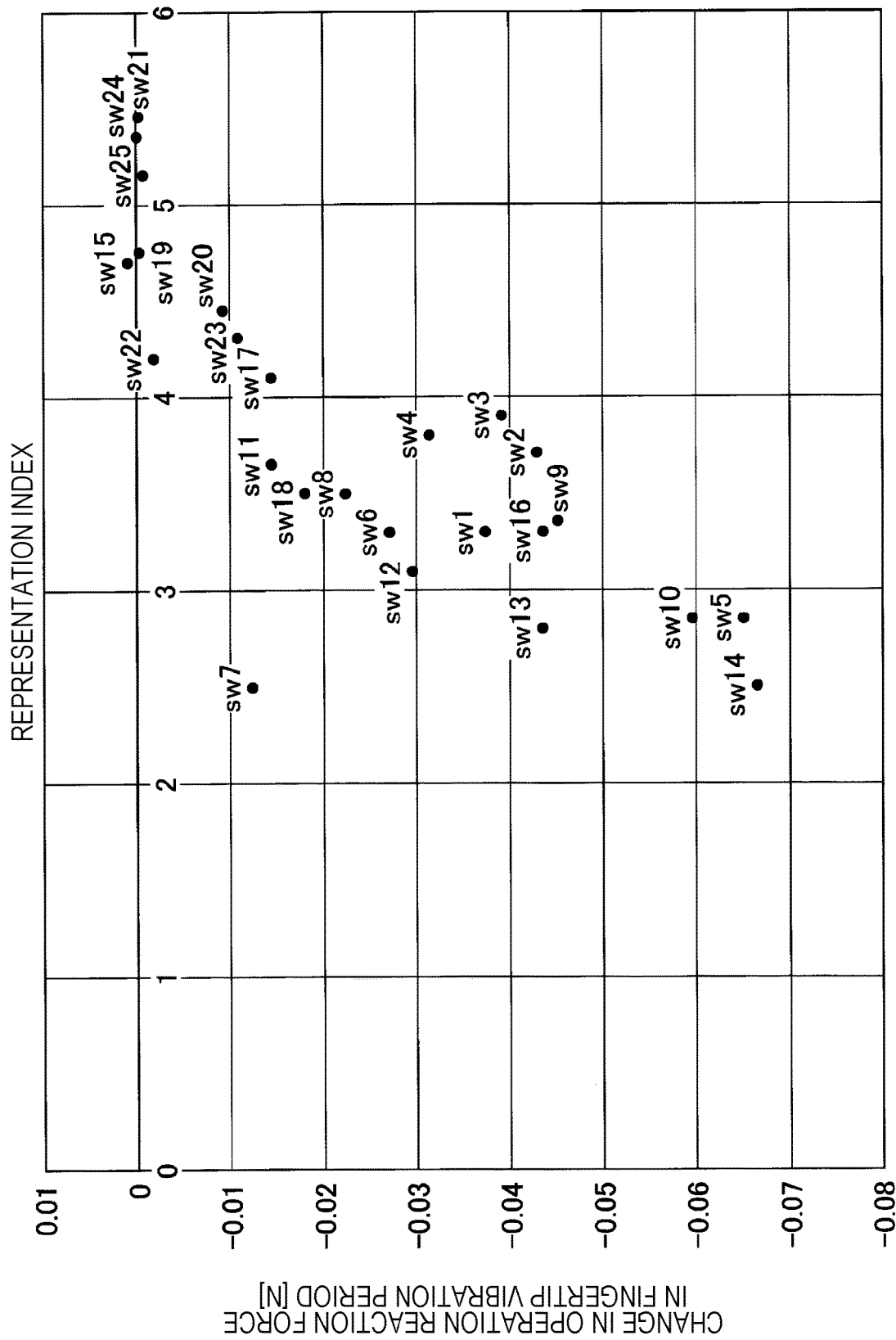
FIG. 67 is a scatter plot of combinations of another dynamic property of the operation tools and the representation index for the sensitivity parameter "sense of recovery (no sense of recovery)" obtained by the processor in step ST153.

FIG. 67 is a scatter plot of combinations of the dynamic properties of the operation tools 250 and the representation indices for the certain sensitivity parameter obtained by the processor 101 in step ST153. In FIG. 67, a horizontal axis represents "sense of recovery (no sense of recovery)" as the sensitivity parameter, and a vertical axis represents changes in operation reaction force (force sensor value A) in the fingertip vibration period T4. The changes in operation reaction force in the fingertip vibration period T4 and the representation index of "sense of recovery (no sense of recovery)" have a generally upward trend. The correlation coefficient is 0.78.

The processor 101 associates the sensitivity parameters and the dynamic properties illustrated in FIGS. 65, 66, and 67 using a least squares method (an example of the regression analysis) or the like. As a result of the least squares method, strength of correlations between the sensitivity parameters and the dynamic properties is estimated using correlation coefficients.

FIG. 68 illustrates a list of correlation coefficients between sensitivity parameters and dynamic properties. In FIG. 68, row headings indicate the sensitivity parameters, and column headings indicate the dynamic properties of the operation tool 250. In FIG. 68, correlation coefficients higher than or equal to 0.5 are highlighted by hatching. It can therefore be seen that dynamic properties whose correlation coefficients are high are appropriate as physical parameters.

When the finger model push tool 252 pushes each operation tool 250 like this and physical parameters highly correlated with sensitivity parameters are determined, the processor 101 can create a conversion model 15 by applying the multiple regression analysis described with reference to Math. 5 to the physical parameters highly correlated with the sensitivity parameters and the sensitivity parameters. The physical parameters whose correlation coefficients are high determined in step ST154 are employed as the physical parameters $P_1$ to $P_n$ used in Math. 5. The multiple regression analysis has been described with reference to Math. 5 and FIGS. 22 and 23 in the first aspect. The determination coefficients $B_{11}$ to $B_{mn}$ of each operation tool 250, therefore, can be determined, and a conversion model 15 such as that illustrated in FIG. 23 can be obtained for each operation tool 250.

Tactile Control System Including Communication Apparatus (Server) and Terminal Apparatus Next, the tactile control system 2 including the communication apparatus 70 (server) and the terminal apparatus 80 will be described with reference to FIG. 69. A block diagram of the tactile control system 2 may be the same as that of FIG. 20.

FIG. 69 is a sequence diagram where the communication apparatus 70 (server) and the terminal apparatus 80 communicate with each other to estimate sensitivity parameters of an attached operation tool 250.

In step ST161, the communication apparatus 70 and the terminal apparatus 80 communicate with each other, and the finger model push tool 252 pushes the 25 operation tools 250 to measure dynamic properties of the operation tools 250.

Next, in step ST162, the input unit 4 receives, for the operation tools 250, representation indices for each sensitivity parameter using the SD method.

Next, in step ST163, the terminal apparatus 80 transmits the representation indices to the communication apparatus 70.

Next, in step ST164, the processor 14 obtains, for each sensitivity parameter, combinations of dynamic properties of each operation tool 250 and the representation indices.

Next, in step ST165, the processor 14 obtains, for each sensitivity parameter, correlation coefficients between the dynamic properties and the representation indices.

Next, in step ST166, the processor 14 determines dynamic properties whose absolute values of the correlation coefficients are large. The absolute value of a correlation coefficient may be regarded as large when, for example, larger than or equal to 0.5.

Next, in step ST167, the processor 14 creates a conversion model 15 by applying the multiple regression analysis described with reference to Math. 5 to physical parameters highly correlated with sensitivity parameters and the sensitivity parameters.

Key Effects

As described above, the tactile control system 1 in the present aspect can extract dynamic properties correlated with sensitivity parameters by pushing operation tools 250 using the finger model push tool 252. Since a conversion model that converts sensitivity parameters into these dynamic properties can be created, therefore, a sensory presentation signal that offers preferable dynamic properties can be generated.

Others

Although a push operation tool has been described in the second aspect, for example, the second aspect can be similarly applied to a rotary operation tool that receives rotation. In the case of a rotary operation tool, rotation angles are positional changes, and resistance to rotation is operation reaction force.

Although the finger model push tool 252 including the elastic body 59 of a single type has been described, the finger model push tool 252 may include elastic bodies of a plurality of types having different elastic forces on a side thereof coming into contact with the button part 56, instead. The elastic bodies of a plurality of types having different elastic forces include, for example, an elastic body corresponding to skin and an elastic body corresponding to flesh. The elastic bodies of a plurality of types having different elastic forces may be provided as layers such that elastic force increases toward the rigid body 58. In doing so, a finger model push tool 252 with dynamic properties closer to the human tactile sense can be constructed.

A shape of the finger model push tool 252 may be a simple cube or mimic a shape of a finger. The finger may be that of a man, a woman, an adult, a child, or one of various races and have different sizes or shapes.

APPENDIX TO FOURTH ASPECT

1. A sensory control method comprising the steps of:
   receiving an input of a sensitivity parameter indicating a degree of a sensory representation at a time when an operation tool is operated;
   converting the received sensitivity parameter into, among a plurality of physical parameters included in physical properties relating to a sensory stimulus, a physical parameter correlated with the sensitivity parameter; and outputting a sensory stimulation signal based on the physical parameter obtained as a result of the conversion,
wherein the physical properties include a dynamic property.

2. The sensory control method according to 1,
wherein the dynamic property is a physical property including a temporal change in at least operation reaction force or an amount of operation caused by an operation performed on a certain operation tool.

3. The sensory control method according to 2,
wherein the physical property is a physical property for achieving a sensory presentation at a time when an elastic body of a finger model push tool, which includes a rigid body and the elastic body, comes into contact with the certain operation tool and operates the operation tool.

4. The sensory control method according to 1,
wherein the physical parameter is a buckling period.

5. The sensory control method according to 1,
wherein the physical parameter is a fingertip fall period.

6. The sensory control method according to 1,
wherein the physical parameter is a fingertip collision period.

7. The sensory control method according to 1,
wherein the physical parameter is a fingertip vibration period.

8. The sensory control method according to 1,
wherein the physical parameter is correlated with the sensitivity parameter.

9. The sensory control method according to 1,
wherein the operation tool is a push operation tool that receives pushing.

10. The sensory control method according to 1,
wherein the operation tool is a rotary operation tool that receives rotation.

11. An apparatus comprising:
an input unit that receives an input of a sensitivity parameter indicating a degree of a sensory representation at a time when an operation tool is operated;
converting the sensitivity parameter received by the input unit into, among a plurality of physical parameters included in physical properties relating to a sensory stimulus, a physical parameter correlated with the sensitivity parameter; and
a sensory presentation unit that outputs a sensory stimulation signal based on the physical parameter obtained as a result of the conversion,
wherein the physical properties include a dynamic property.

12. A sensory control system comprising:
a communication apparatus and a terminal apparatus communicable with each other,
wherein the terminal apparatus includes an input unit that receives an input of a sensitivity parameter indicating a degree of a sensory representation at a time when an operation tool is operated,
wherein the communication apparatus includes a conversion model that converts the sensitivity parameter transmitted from the terminal apparatus into, among a plurality of physical parameters included in physical properties relating to a sensory stimulus, a physical parameter correlated with the sensitivity parameter, and
wherein the terminal apparatus includes a sensory presentation unit that outputs a sensory stimulation signal based on the physical parameter obtained as a result of the conversion, and
wherein the physical properties include a dynamic property.

13. A program causing an apparatus to function as:
an input unit that receives an input of a sensitivity parameter indicating a degree of a sensory representation at a time when an operation tool is operated;
a conversion model that converts the sensitivity parameter received by the input unit into, among a plurality of physical parameters included in physical properties relating to a sensory stimulus, a physical parameter correlated with the sensitivity parameter; and
a sensory presentation unit that outputs a sensory stimulation signal based on the physical parameter obtained as a result of the conversion,
wherein the physical properties include a dynamic property.

Others

Although best modes for implementing the present invention have been described using some aspects, the present invention is not limited to these aspects at all, and the aspects may be subjected to modification and replacement without deviating from the scope of the present invention. For example, the functions of the components or the steps may be rearranged without causing a logical contradiction, and a plurality of components or steps may be combined together or further divided.

The present application claims priority to Japanese Patent Application No. 2021-084696, filed with Japan Patent Office on May 19, 2021, Japanese Patent Application No. 2022-079095, filed with Japan Patent Office on May 12, 2022, Japanese Patent Application No. 2022-079099, filed with Japan Patent Office on May 12, 2022, and Japanese Patent Application No. 2022-079128, filed with Japan Patent Office on May 13, 2022, and the entire contents of Japanese Patent Application No. 2021-084696, Japanese Patent Application No. 2022-079095, Japanese Patent Application No. 2022-079099, and Japanese Patent Application No. 2022-079128 are incorporated herein.

What is claimed is:

1. A sensory control method comprising the steps of:
receiving a sensitivity parameter;
converting the received sensitivity parameter into, among a plurality of physical parameters included in physical properties relating to a sensory presentation, a physical parameter correlated with the sensitivity parameter; and
outputting a sensory presentation signal based on the physical parameter obtained as a result of the conversion.

2. The sensory control method according to claim 1,
wherein the step of converting is performed on a basis of a conversion model capable of converting the received sensitivity parameter into the physical parameter correlated with the sensitivity parameter.

3. The sensory control method according to claim 2,
wherein the conversion model used in the step of converting is obtained through the steps of:
storing, for each of certain one or more sensory presentations, correspondence information between a physical property relating to the certain sensory presentation and the sensitivity parameter indicating a degree of a sensory representation in response to the sensory presentation,
extracting, on a basis of the correspondence information regarding each of the one or more sensory presentations, the physical parameter correlated with the sensitivity parameter from among the plurality of physical parameters included in the physical properties relating to the sensory presentation, and
generating the conversion model on a basis of the sensitivity parameter and the extracted physical parameter.

4. The sensory control method according to claim 3, wherein the step of storing is a step where, for each of certain one or more operation tools, correspondence information between a physical property for achieving a sensory presentation at a time when the certain operation tool is operated and a sensitivity parameter input while reflecting the operation performed on the operation tool is stored.

5. The sensory control method according to claim 4, wherein changes in operation reaction force in response to displacement caused by the operation performed on the operation tool include at least a maximum and a minimum, and
wherein the physical parameter includes a variable based on area of an indentation defined, on a coordinate plane whose axes represent the displacement caused by the operation and the operation reaction force, respectively, by the operation reaction force at the maximum returning to the maximum after reaching the minimum.

6. The sensory control method according to claim 5, wherein the displacement caused by the operation performed on the operation tool is an amount of operation performed on the operation tool, operation time of the operation tool, or a combination of the amount of operation and the operation time.

7. The sensory control method according to claim 6, wherein the amount of operation performed on the operation tool is an amount in a one-dimensional space, a two-dimensional space, or a three-dimensional space.

8. The sensory control method according to claim 4, wherein changes in operation reaction force in response to displacement caused by an operation performed on the operation tool include at least a maximum and a minimum, and
wherein the physical parameter includes a variable relating to an amount of displacement caused by the operation.

9. The sensory control method according to claim 8, wherein the physical parameter includes a variable relating to the amount of displacement caused by the operation from a beginning of the operation to appearance of the maximum.

10. The sensory control method according to claim 8, wherein the physical parameter includes a variable relating to a ratio of the amount of displacement, on a coordinate plane whose axes represent the displacement caused by the operation and the operation reaction force, respectively, from the operation reaction force at the maximum returning to the maximum after reaching the minimum to the amount of displacement from the beginning of the operation to the maximum.

11. The sensory control method according to claim 4, wherein changes in operation reaction force in response to displacement caused by the operation performed on the operation tool include at least a maximum, and
wherein the physical parameter includes a variable relating to curvature of the maximum on a coordinate plane whose axes represent the displacement caused by the operation and the operation reaction force, respectively.

12. The sensory control method according to claim 4, wherein changes in operation reaction force in response to displacement caused by the operation performed on the operation tool include at least a maximum, and
wherein the physical parameter includes a variable relating to a rise of the operation reaction force from a beginning of the operation to the maximum.

13. The sensory control method according to claim 4, wherein changes in operation reaction force in response to displacement caused by the operation performed on the operation tool include at least a maximum and a minimum, and
wherein the physical parameter includes a variable relating to an amount of pull with which the minimum becomes negative on a coordinate plane whose axes represent the displacement caused by the operation and the operation reaction force, respectively.

14. The sensory control method according to claim 4, wherein at least operation reaction force changes in response to displacement caused by the operation performed on the operation tool, and
wherein the physical parameter includes a variable relating to a derivative relating to the displacement of the operation reaction force.

15. The sensory control method according to claim 4, wherein at least operation reaction force changes in response to displacement caused by the operation performed on the operation tool, and
wherein the physical parameter includes a variable relating to a second derivative relating to the displacement of the operation reaction force.

16. The sensory control method according to claim 4, wherein the operation tool includes a movable part, wherein changes in operation reaction force in relation to an amount of movement of the movable part caused by the operation performed on the operation tool includes at least a maximum and a minimum, and
wherein the physical parameter includes a variable relating to acceleration of the movable part.

17. The sensory control method according to claim 4, wherein the operation tool includes an operation surface that receives sliding,
wherein changes in operation reaction force in response to displacement caused by the sliding performed on the operation tool include at least a maximum and a minimum,
wherein the operation reaction force is caused by vibration of the operation surface, and
wherein the maximum or the minimum is simulated by making temporal changes in a rise and a fall of a driving signal for causing the vibration of the operation surface different from each other and making average force in a direction corresponding to the rise or a direction corresponding to the fall in given time larger than the other.

18. The sensory control method according to claim 3, wherein the step of extracting includes a step of extracting, for each of a plurality of sensitivity parameters, information regarding a degree of correlation between each of a plurality of physical parameters and the sensitivity parameter, and
wherein the step of generating includes
a first generation step, where first relational expressions that represent the plurality of sensitivity parameters using the plurality of physical parameters and the information regarding the degrees of correlation, a second generation step, where second relational expressions that represent, on a basis of the first relational expressions, the plurality of physical parameters using the plurality of sensitivity parameters and the information regarding the degrees of correlation, and a third generation step, where a conversion model capable of converting the plurality of sensitivity parameters into the plurality of physical parameters correlated with the plurality of sensitivity parameters is generated on a basis of the second relational expressions.

19. The sensory control method according to claim 18, wherein the step of extracting includes a step of extracting the information regarding the degrees of correlation through a multiple regression analysis where the plurality of sensitivity parameters are objective variables and the plurality of physical parameters are explanatory variables.

20. The sensory control method according to claim 18, wherein, in the first generation step, the first relational expressions are generated as a matrix equation where a column vector indicating the plurality of sensitivity parameters is one side and a product of a coefficient matrix indicating the information regarding the degrees of correlation and a column vector indicating the plurality of physical parameters are another side, and wherein, in the second generation step, the second relational expressions are generated by multiplying both sides of the first relational expressions by an inverse matrix of the coefficient matrix.

21. The sensory control method according to claim 20, wherein the coefficient matrix is a square matrix.

22. The sensory control method according to claim 20, wherein the inverse matrix is a pseudo-inverse matrix.

23. The sensory control method according to claim 18, wherein the step of receiving is a step where a plurality of sensitivity parameters are received, and wherein the step of converting is a step where the plurality of received sensitivity parameters are converted into a plurality of physical parameters correlated with the plurality of sensitivity parameters on a basis of the conversion model.

24. The sensory control method according to claim 1, further comprising the steps of:

obtaining a sensory stimulation signal; and specifying a sensitivity parameter on a basis of the obtained sensory stimulation signal, wherein the step of receiving is a step where the sensitivity parameter specified in the step of specifying is received.

25. The sensory control method according to claim 24, wherein the sensory stimulation signal is an auditory stimulation signal based on an auditory stimulation element, a visual stimulation signal based on a visual stimulation element, a tactile stimulation signal based on a tactile stimulation element, or a signal based on any combination of these.

26. The sensory control method according to claim 25, wherein the step of specifying is a step where a physical parameter included in a physical property of at least the auditory stimulation element, the visual stimulation element, or the tactile stimulation element that forms a basis of the obtained sensory stimulation signal is converted into a sensitivity parameter correlated with the physical parameter and specified.

27. The sensory control method according to claim 1, further comprising the step of:

presenting a sensation on a basis of the sensory presentation signal.

28. The sensory control method according to claim 1, wherein the sensory presentation includes at least a tactile presentation, an auditory presentation, or a visual presentation.

29. The sensory control method according to claim 1, further comprising the step of:

presenting a sensation on a basis of the sensory presentation signal, wherein the step of presenting a sensation is a step where a tactile sensation is presented by causing operation reaction force from a tactile presentation unit in response to an operation performed on an operation device, wherein the operation device includes an operation surface that receives sliding, wherein the tactile presentation unit causes operation reaction force by vibrating the operation surface, and wherein, in the step of presenting a sensation, changes in the operation reaction force in response to displacement caused by the sliding performed on the operation device are caused to include at least a maximum or a minimum by making temporal changes in a rise and a fall of a driving signal for causing the vibration of the operation surface different from each other and making average force in a direction corresponding to the rise or a direction corresponding to the fall in given time larger than the other.

30. A method for generating a conversion model, the method comprising the steps of:

storing, for each of certain one or more sensory presentations, correspondence information between a physical property relating to the certain sensory presentation and a sensitivity parameter indicating a degree of a sensory representation in response to the sensory presentation, extracting, on a basis of the correspondence information regarding each of the one or more sensory presentations, a physical parameter correlated with the sensitivity parameter from among the plurality of physical parameters included in the physical properties relating to the sensory presentation, and generating, on a basis of the sensitivity parameter and the extracted physical parameter, a conversion model capable of converting a newly received sensitivity parameter into a physical parameter correlated with the sensitivity parameter.

31. A method for converting a relational expression, the method comprising the step of:

converting a first relational expression that represents each of a plurality of sensitivity parameters using one of a plurality of physical parameters included in physical properties relating to a sensory presentation into a second relational expression that represents each of the plurality of physical parameters using the plurality of sensitivity parameters.

32. A non-transitory computer-readable medium for causing a computer to perform the method according to claim 1.

33. A sensory control system comprising:

an input unit that receives a sensitivity parameter; and a processor that converts the received sensitivity parameter into, among a plurality of physical parameters included in physical properties relating to a sensory presentation, a physical parameter correlated with the sensitivity parameter and that outputs a sensory presentation signal based on the physical parameter obtained as a result of the conversion.

34. A conversion model generation system comprising:

a storage unit that stores, for each of certain one or more sensory presentations, correspondence information between a physical property relating to the certain sensory presentation and a sensitivity parameter indicating a degree of a sensory representation in response to the sensory presentation; and a processor that extracts, on a basis of the correspondence information regarding each of the one or more sensory presentations, a physical parameter correlated with the sensitivity parameter from among the plurality of physical parameters included in the physical properties relating to the sensory presentation and that generates, on a basis of the sensitivity parameter and the extracted physical parameter, a conversion model capable of converting a newly received sensitivity parameter into a physical parameter correlated with the sensitivity parameter.

* * * * *